(12) United States Patent
Hirose

(10) Patent No.: US 8,413,149 B2
(45) Date of Patent: Apr. 2, 2013

(54) PRIORITY BASED PROCESSOR RESERVATIONS

(75) Inventor: Yukiyoshi Hirose, Kanagawa (JP)

(73) Assignee: Sony Corporation, Tokyo (JP)

( * ) Notice: Subject to any disclaimer, the term of this patent is extended or adjusted under 35 U.S.C. 154(b) by 2283 days.

(21) Appl. No.: 11/065,649

(22) Filed: Feb. 23, 2005

(65) Prior Publication Data

US 2005/0193108 A1   Sep. 1, 2005

(30) Foreign Application Priority Data

Feb. 27, 2004 (JP) ............... P2004-054044
Dec. 21, 2004 (JP) ............... P2004-369157

(51) Int. Cl.
*G06F 9/46* (2006.01)
(52) U.S. Cl. ............................................ 718/100
(58) Field of Classification Search .............. 718/100
See application file for complete search history.

(56) References Cited

U.S. PATENT DOCUMENTS

| | | | |
|---|---|---|---|
| 5,550,906 A * | 8/1996 | Chau et al. ............... | 379/201.05 |
| 5,884,077 A | 3/1999 | Suzuki | |
| 6,112,243 A | 8/2000 | Downs et al. | |
| 6,278,712 B1 * | 8/2001 | Takihiro et al. ............... | 370/400 |
| 6,408,324 B1 * | 6/2002 | Wallace et al. ............... | 718/107 |
| 6,438,553 B1 | 8/2002 | Yamada | |
| 6,587,906 B2 | 7/2003 | Wolrich et al. | |
| 6,667,920 B2 | 12/2003 | Wolrich et al. | |
| 6,728,845 B2 | 4/2004 | Adiletta et al. | |
| 6,931,640 B2 * | 8/2005 | Asano et al. ............... | 718/104 |
| 2004/0003077 A1 | 1/2004 | Bantz | |
| 2004/0039895 A1 | 2/2004 | Wolrich et al. | |
| 2004/0054880 A1 | 3/2004 | Bernstein et al. | |
| 2004/0098496 A1 | 5/2004 | Wolrich et al. | |

FOREIGN PATENT DOCUMENTS

| | | |
|---|---|---|
| JP | 08-77026 | 3/1996 |
| JP | HEI 08-077026 | 3/1996 |
| JP | 08-221372 | 8/1996 |
| JP | 11-120014 | 4/1999 |
| JP | 2000-194674 | 7/2000 |
| JP | 2001-195268 | 7/2001 |

(Continued)

OTHER PUBLICATIONS

Search Report corresponding to European Patent Application No. 05 25 1023 completed on Sep. 17, 2007.

(Continued)

*Primary Examiner* — Mengyao Zhe
(74) *Attorney, Agent, or Firm* — K&L Gates LLP

(57) ABSTRACT

An information processing apparatus, an information processing method, an information processing system, and an information processing program are provided. The present invention can execute distributed processing effectively with certainty among different information processing apparatus connected through a common network. Each of first to fourth information processing apparatus includes a main processor and sub processors. When sub processor programs are to be executed by sub processors in response to an operation of a user, the first apparatus secures a necessary number of free sub processors if this is determined possible. If the necessary number of free sub processors are not available, then the first apparatus successively issues a request to secure sub processors to the other apparatus. If the necessary number of sub processors cannot be secured from among free sub processors in the entire network, those sub processors which are executing sub processor programs having a lower priority are secured for execution of the sub processor programs.

11 Claims, 75 Drawing Sheets

FOREIGN PATENT DOCUMENTS

| | | |
|---|---|---|
| JP | 2002-342165 | 11/2002 |
| JP | 2002-351850 | 12/2002 |
| JP | 2002-358289 | 12/2002 |
| JP | 2002-366533 | 12/2002 |
| JP | 2002-366534 | 12/2002 |
| WO | 01/13228 A2 | 2/2001 |

OTHER PUBLICATIONS

Japanese Search Report corresponding to Japanese Search Report No. JP2004-369157 dated Sep. 15, 2009.

* cited by examiner

FIG. 2A
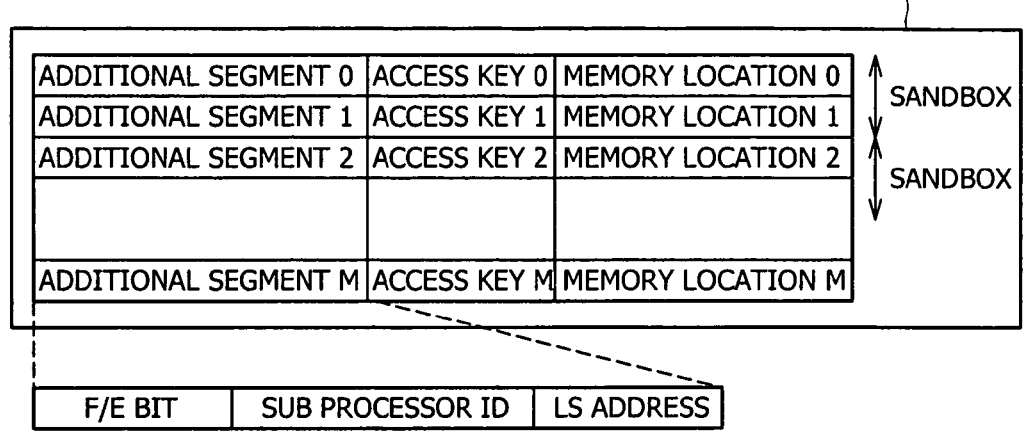
FIG. 2B
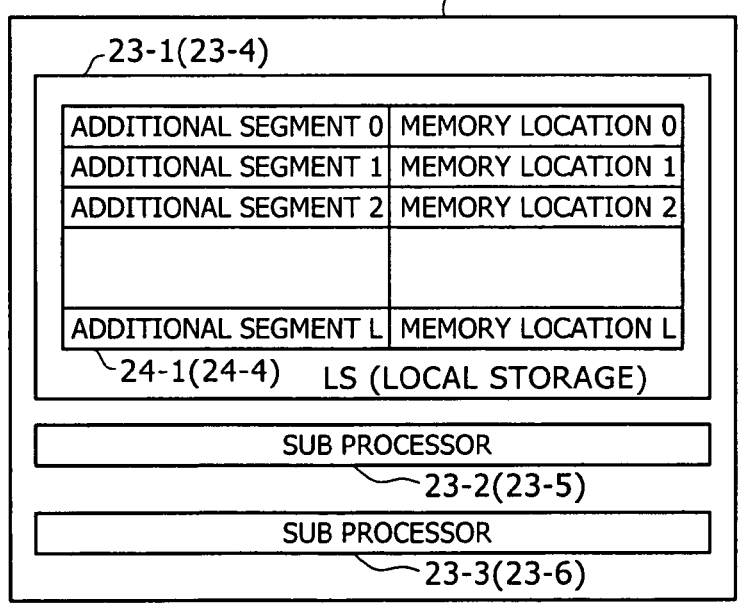
FIG. 2C
KEY MANAGEMENT TABLE
| SUB PROCESSOR ID | | |
|---|---|---|
| 0 | SUB PROCESSOR KEY 0 | KEY MASK 0 |
| 1 | SUB PROCESSOR KEY 1 | KEY MASK 1 |
| 2 | SUB PROCESSOR KEY 2 | KEY MASK 2 |
| | | |
| N | SUB PROCESSOR KEY N | KEY MASK N |

FIG. 18

SUB PROCESSOR MANAGEMENT TABLE

| INFORMATION PROCESSING APPARATUS ID | | | | | | | |
|---|---|---|---|---|---|---|---|
| SUB PROCESSOR ID | | | | | | | |
| SUB PROCESSOR STATUS | | | | | | | |
| SUB PROCESSOR PROGRAM ID | | | | | | | |
| FUNCTION PROGRAM ID | | | | | | | |
| SUB PROCESSOR PROGRAM PRIORITY | | | | | | | |
| LOCK SEQUENCE NUMBER | | | | | | | |

SUB PROCESSOR STATUS { UNUSED / RESERVED / BUSY

SUB PROCESSOR PROGRAM PRIORITY { HIGH / MIDDLE / LOW

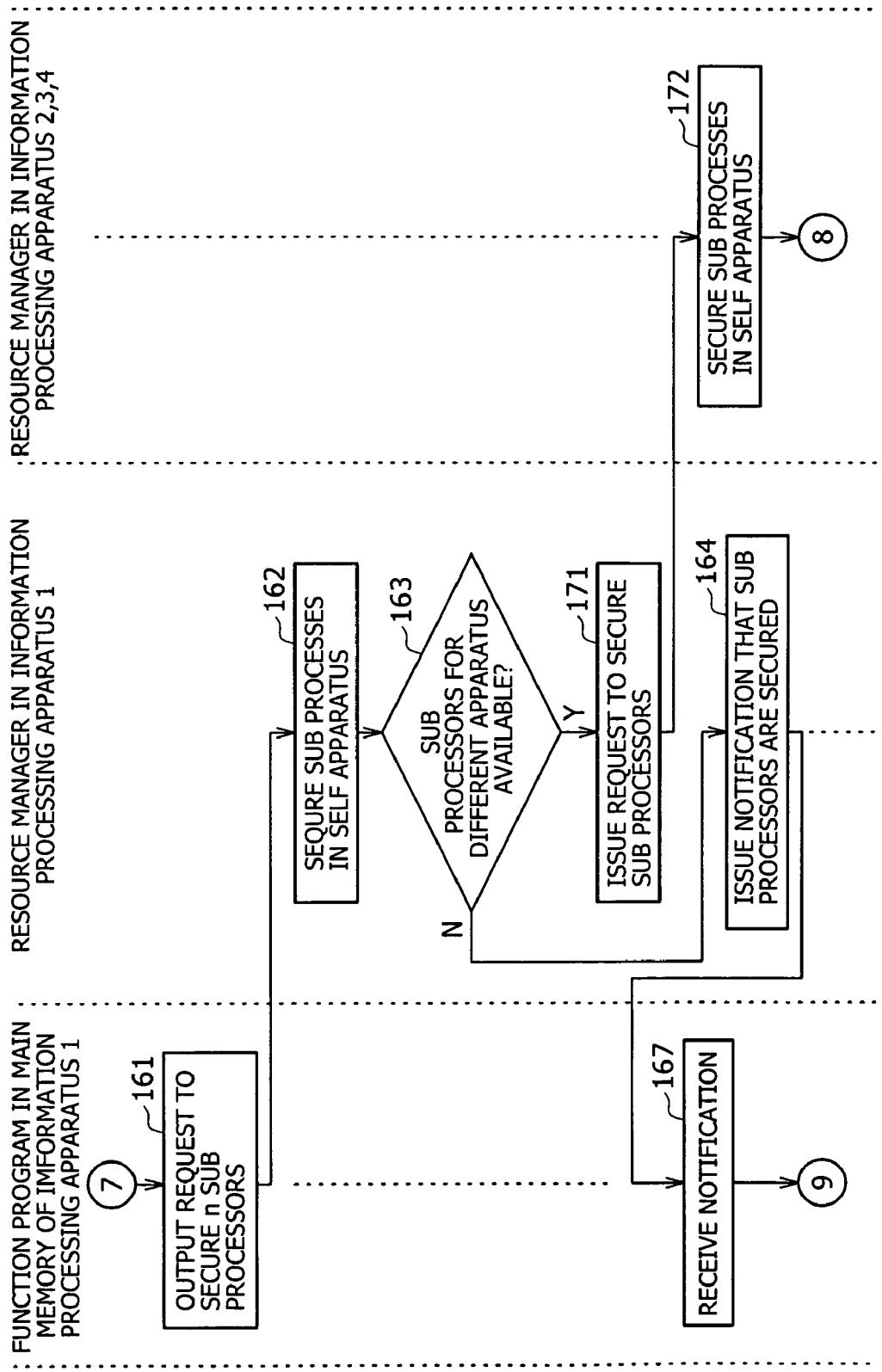

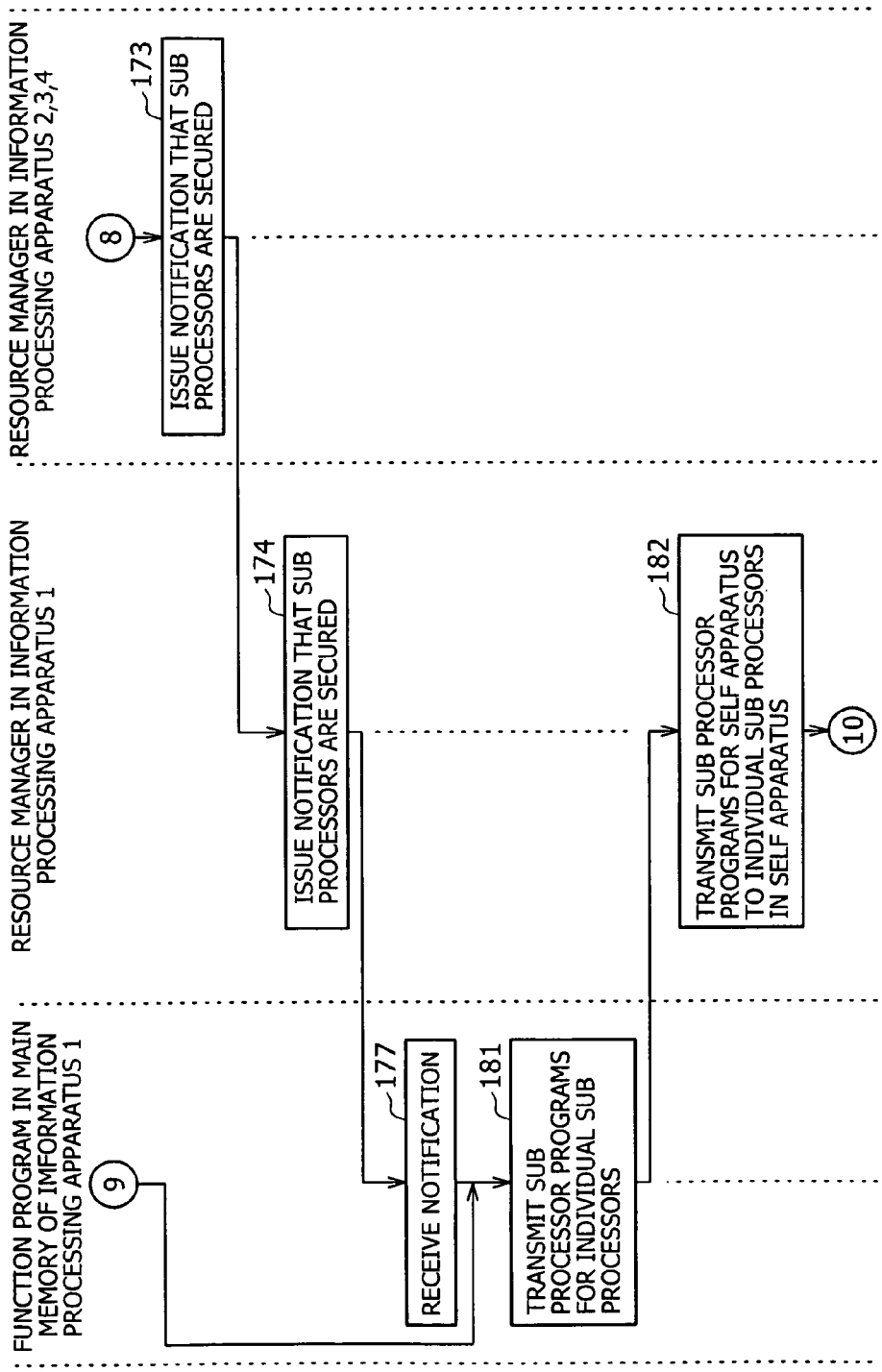

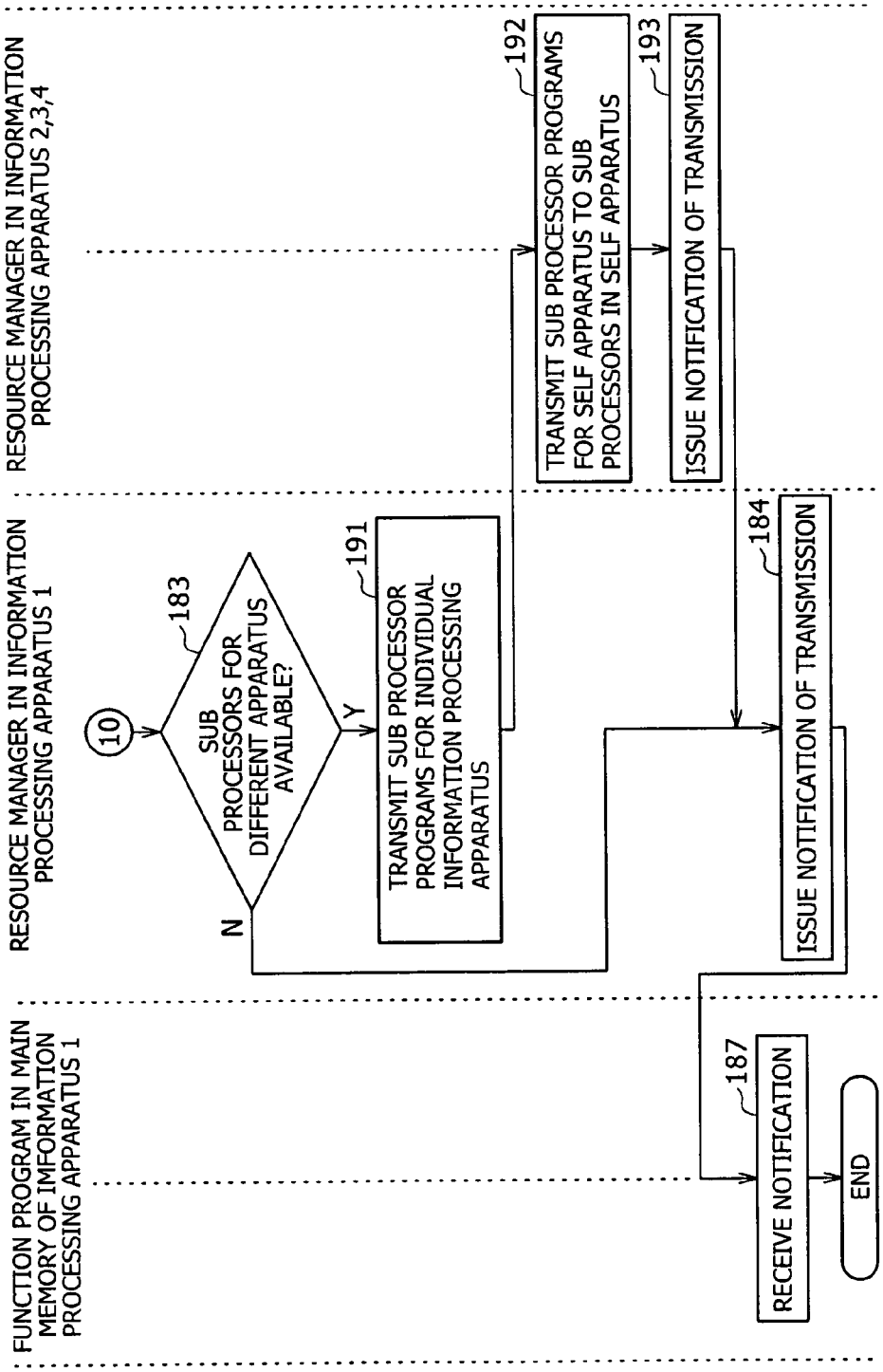

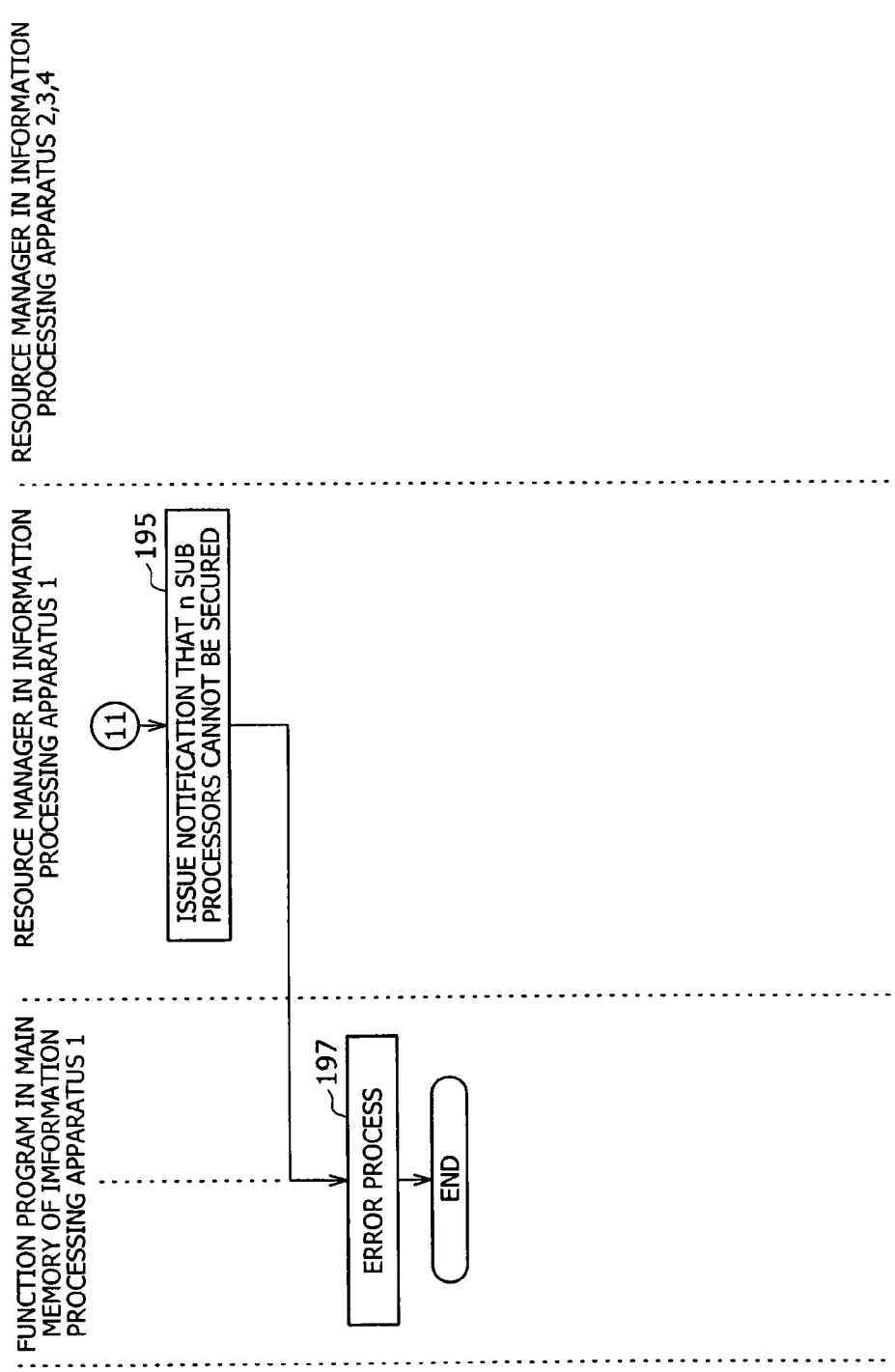

SUB PROCESSOR FREE SITUATION INQUIRY COMMAND

SUB PROCESSOR FREE SITUATION RETURN COMMAND

SUB PROCESSOR SECURING REQUEST COMMAND

SUB PROCESSOR SECURING RETURN COMMAND

FIG.42A
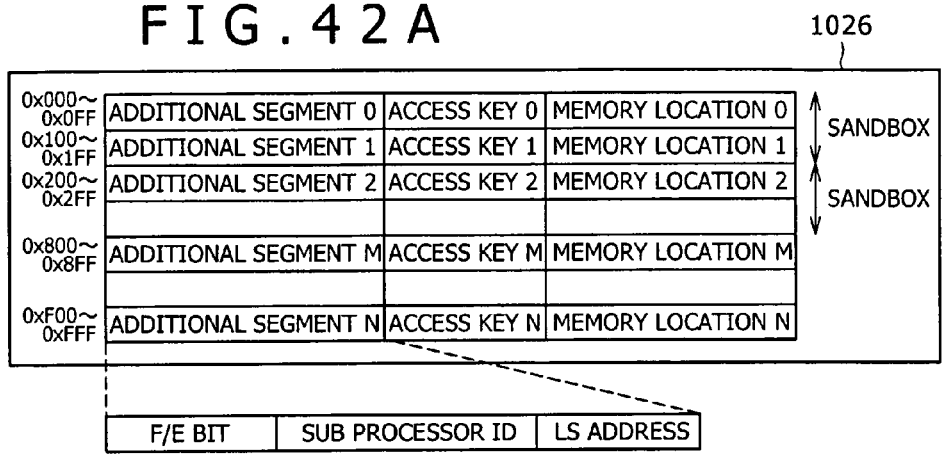
FIG.42B
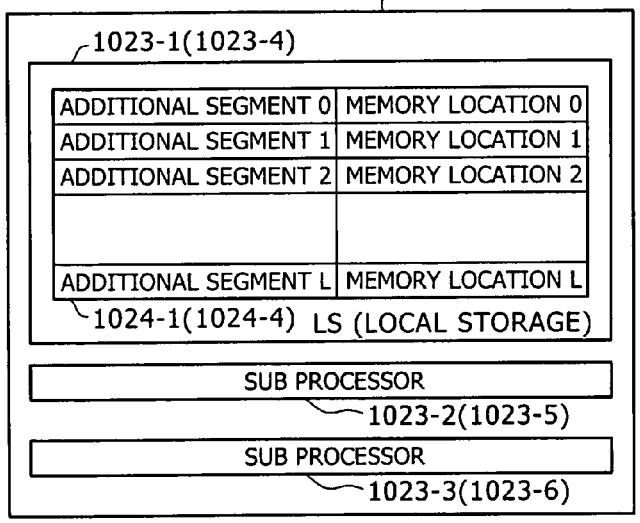
FIG.42C
KEY MANAGEMENT TABLE
| SUB PROCESSOR ID | | |
|---|---|---|
| 0 | SUB PROCESSOR KEY 0 | KEY MASK 0 |
| 1 | SUB PROCESSOR KEY 1 | KEY MASK 1 |
| 2 | SUB PROCESSOR KEY 2 | KEY MASK 2 |
| | | |
| K | SUB PROCESSOR KEY K | KEY MASK K |

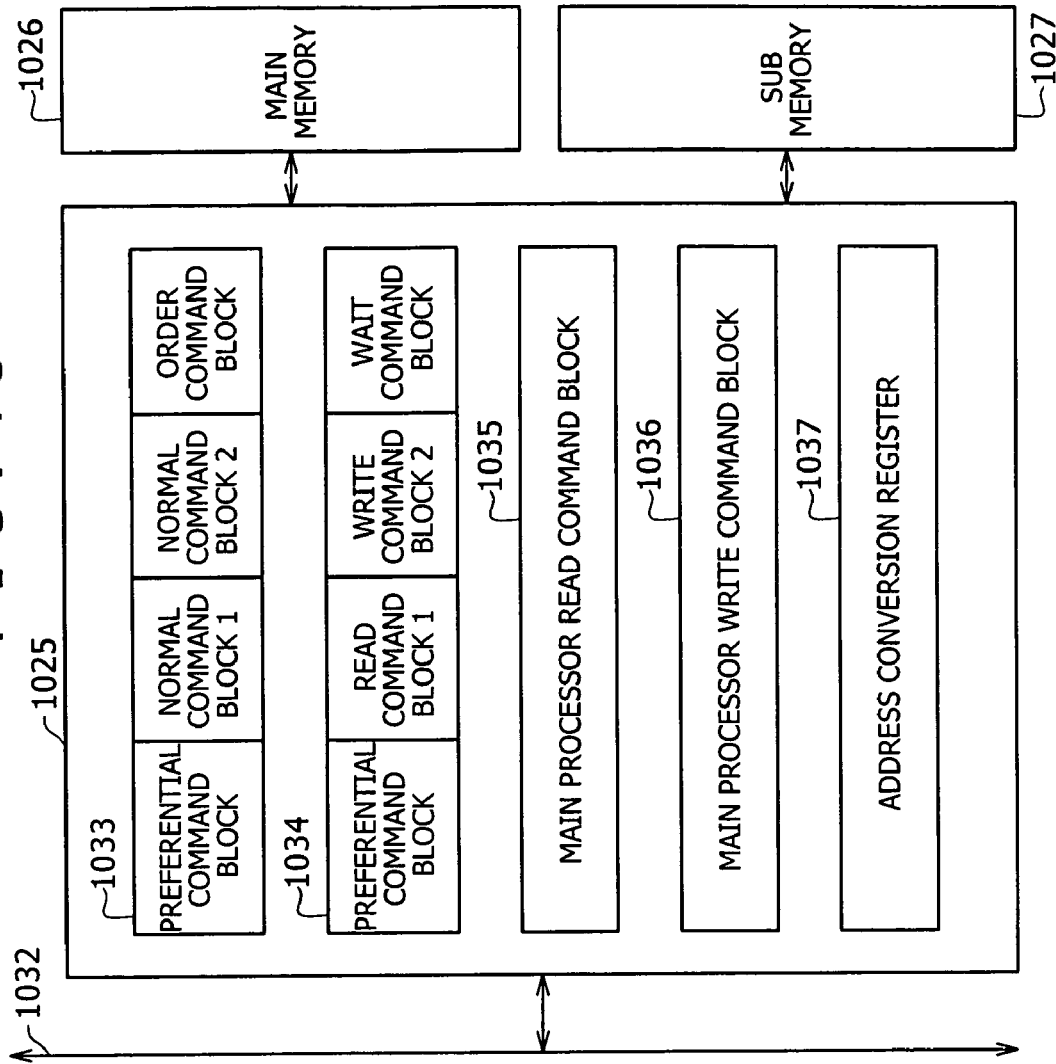
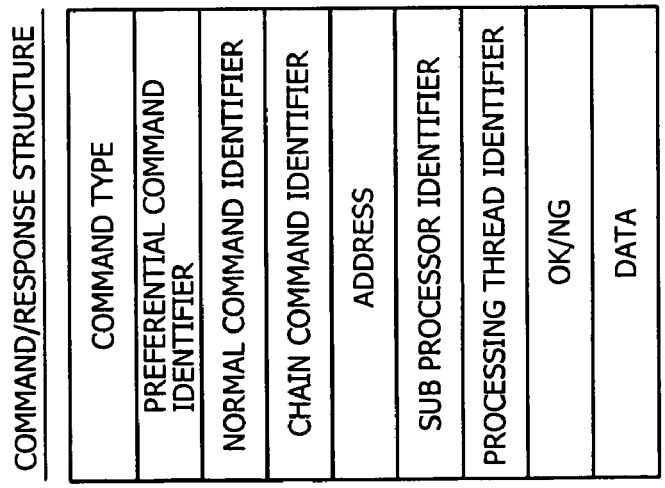

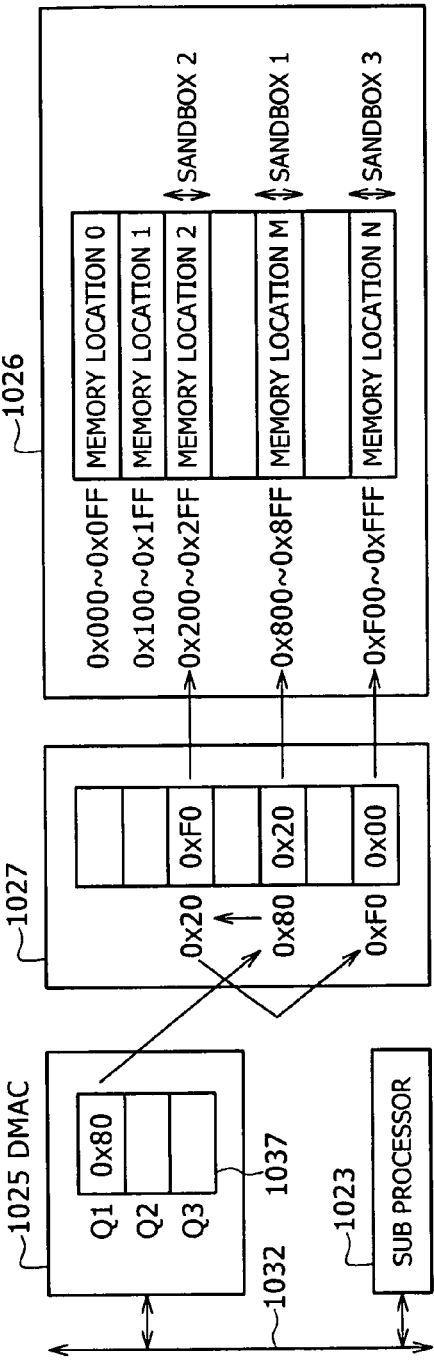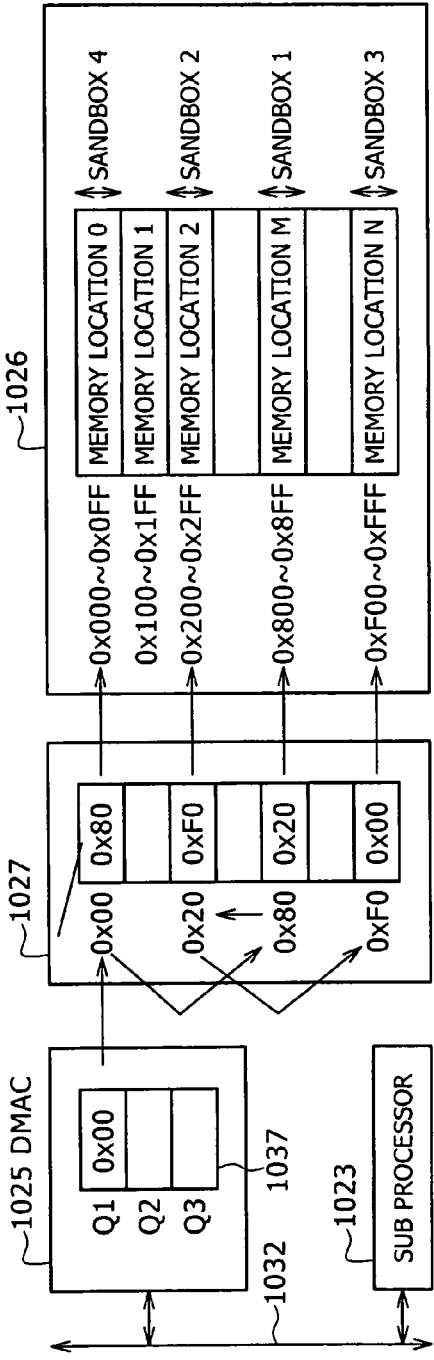

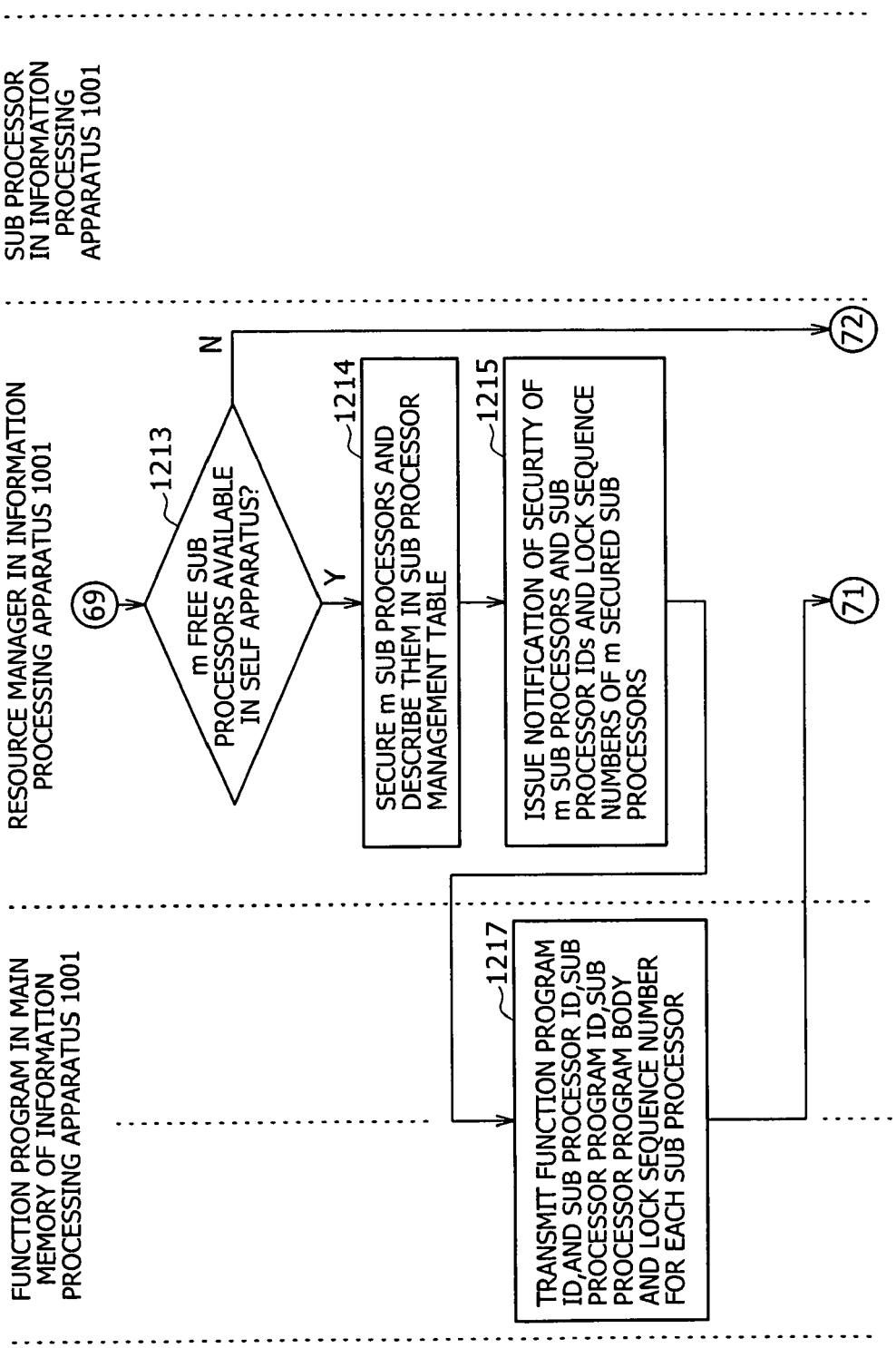

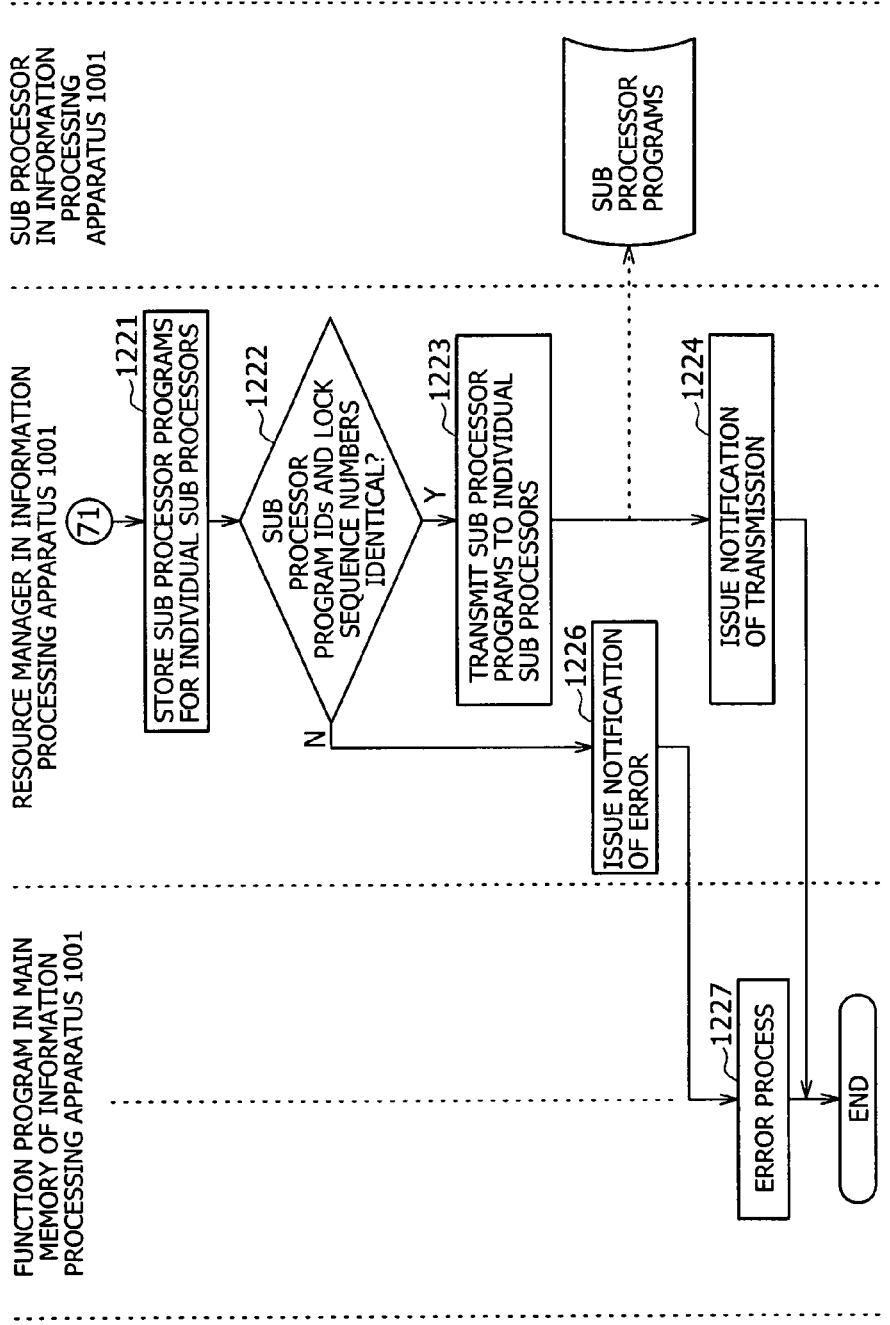

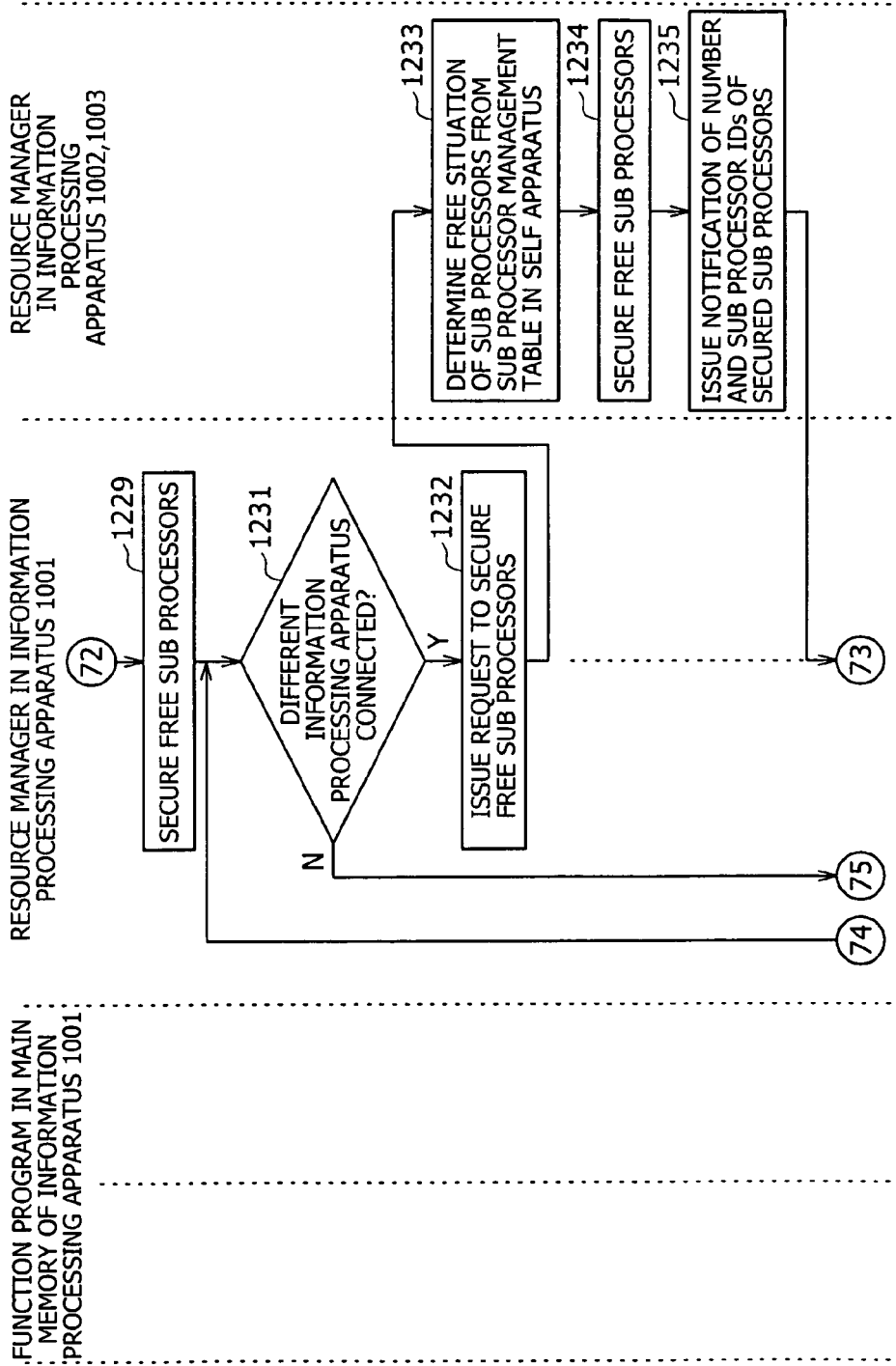

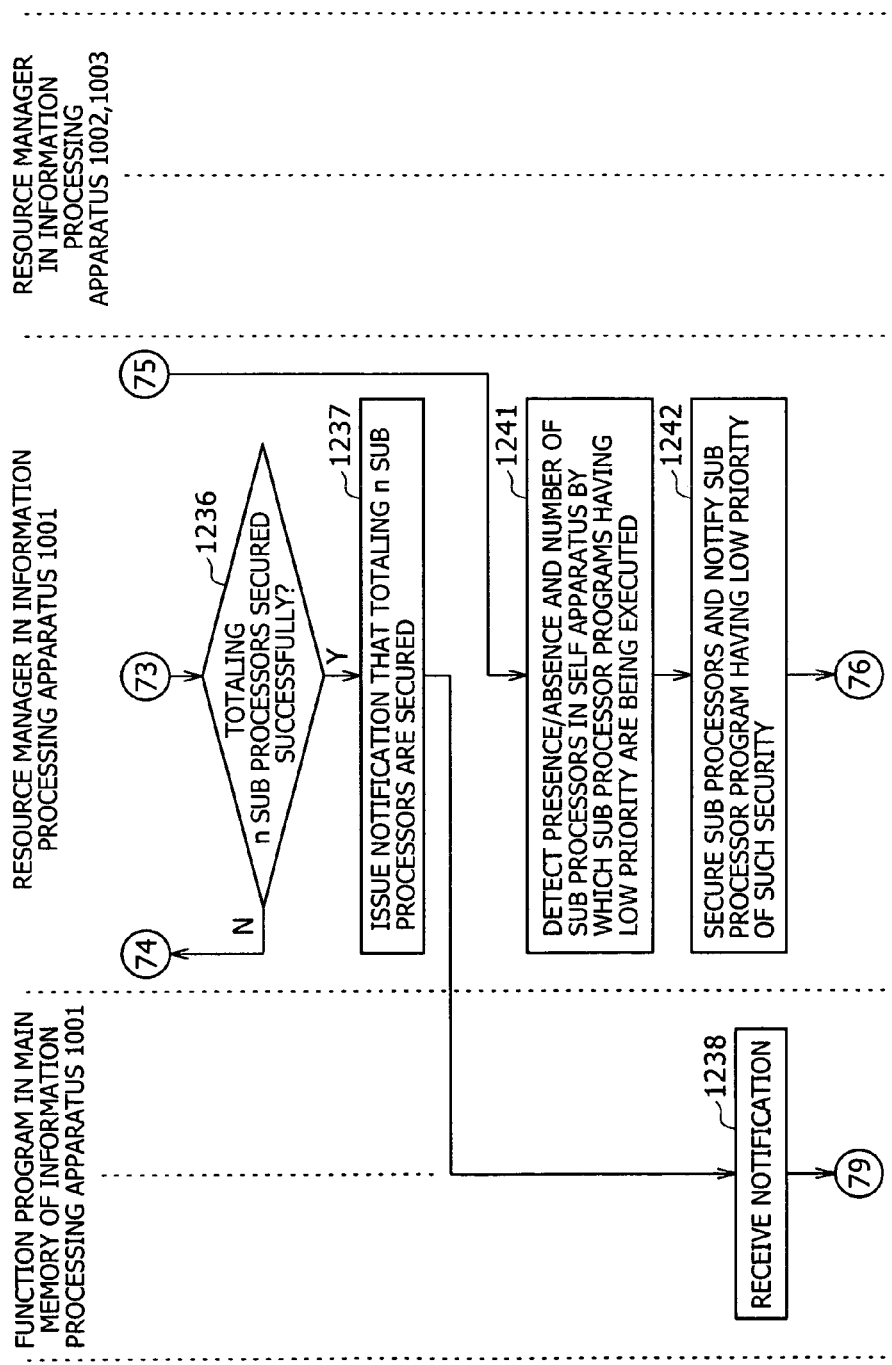

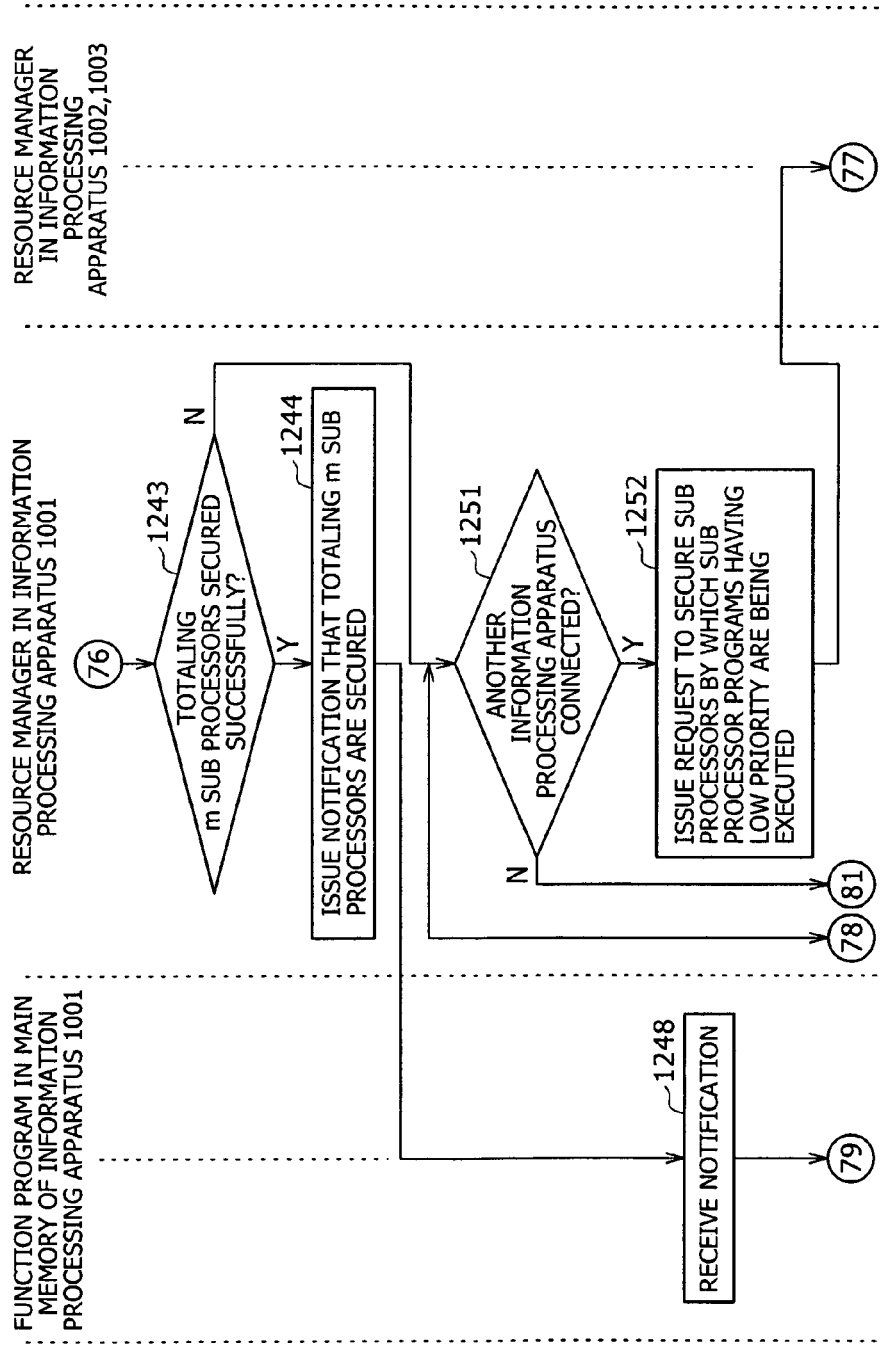

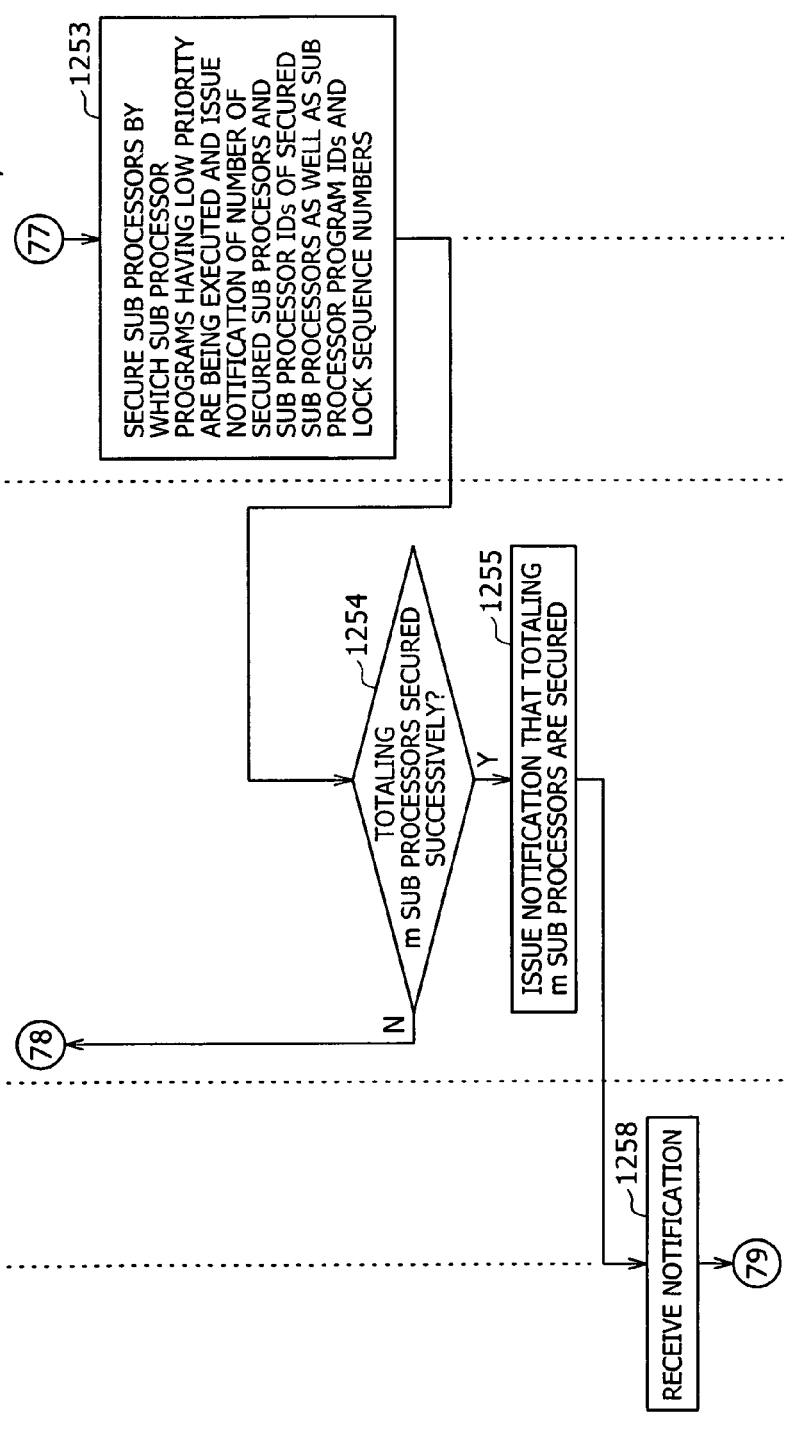

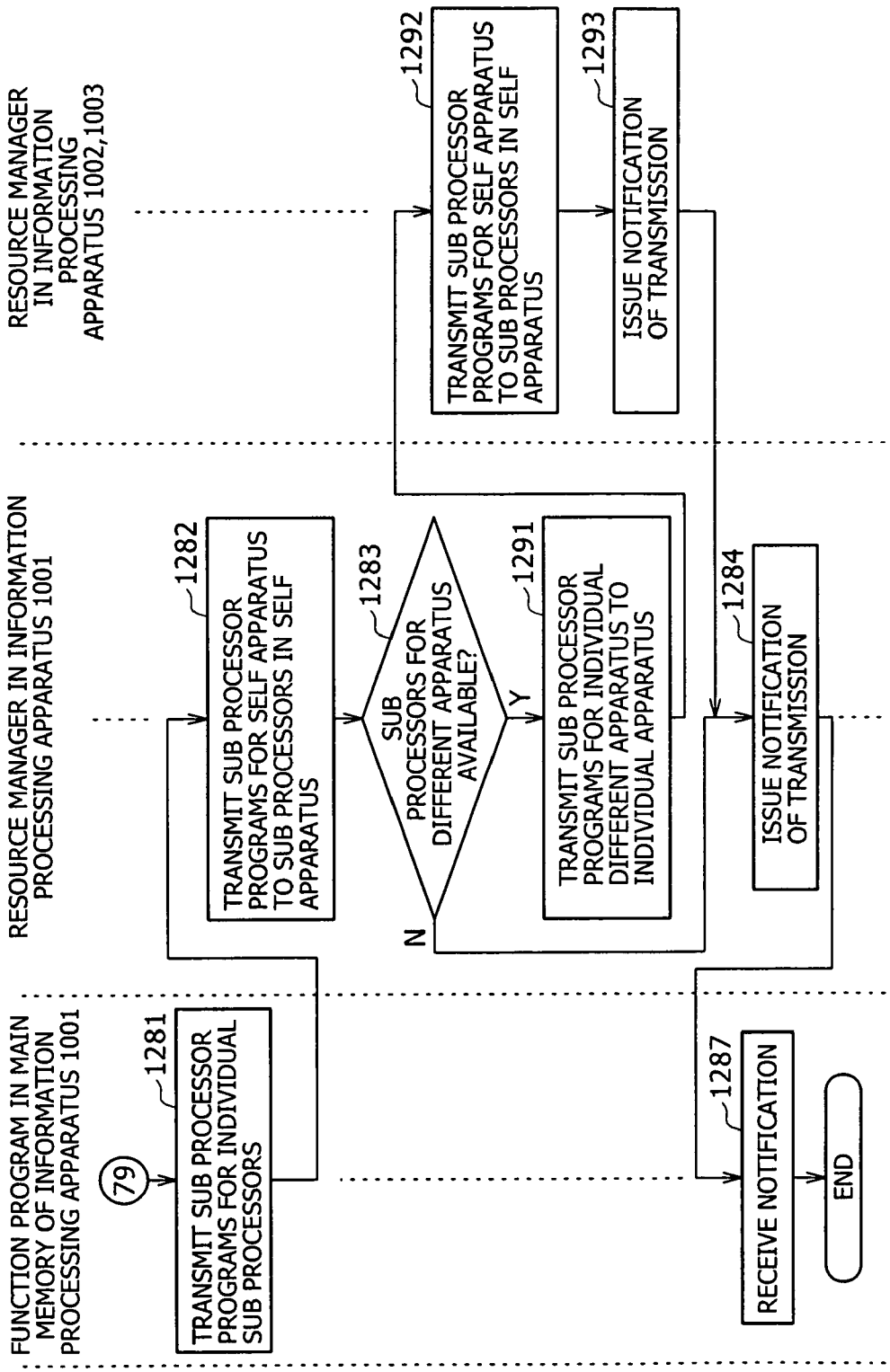

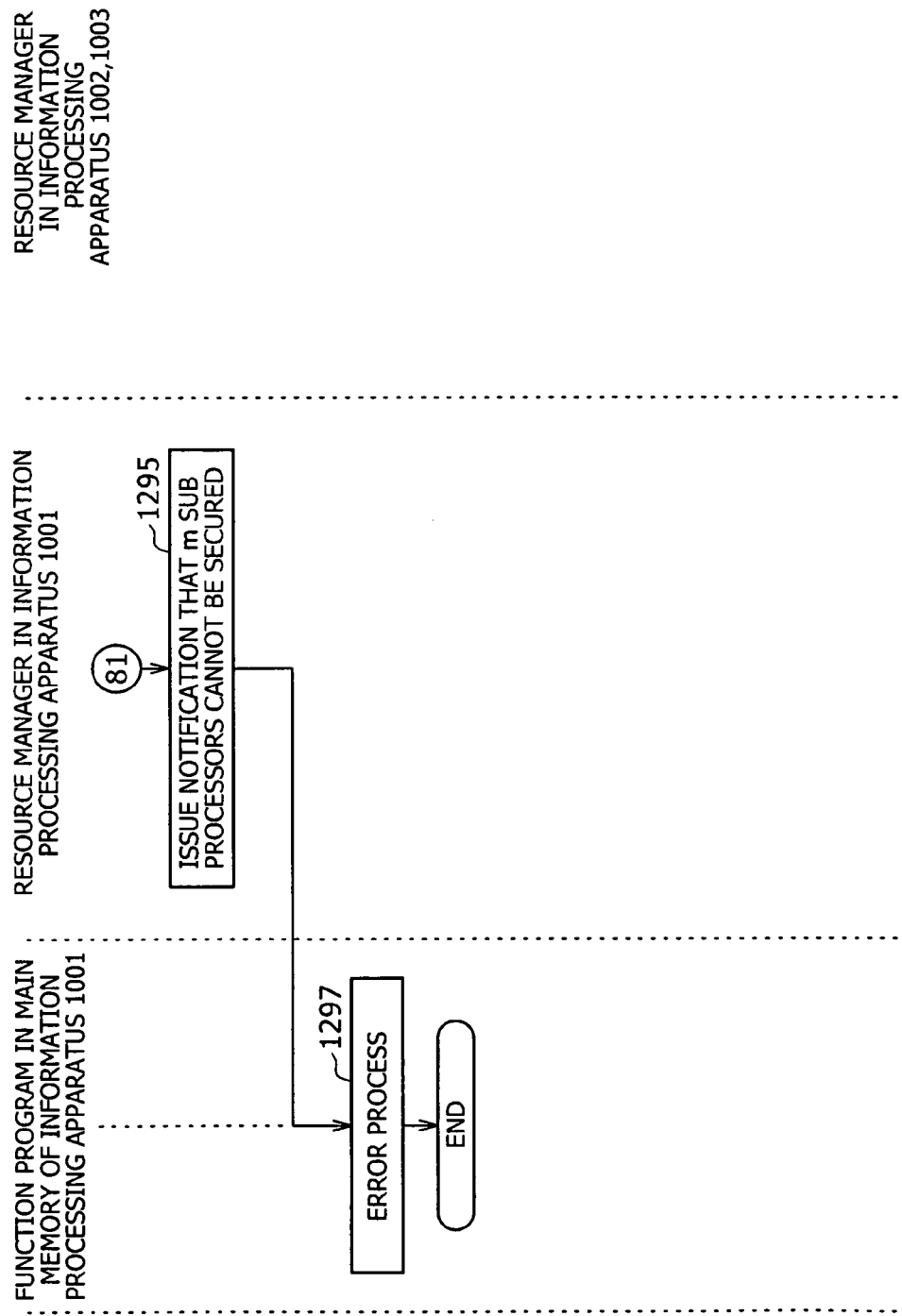

PRIORITY BASED PROCESSOR RESERVATIONS

CROSS REFERENCE TO RELATED APPLICATIONS

The present application claims priority to Japanese Patent Application No. P2004-054044 filed on Feb. 27, 2004 and Japanese Patent Application No. P2004-369157 filed on Dec. 21, 2004, the disclosures of which are herein incorporated by reference.

BACKGROUND OF THE INVENTION

The present invention relates to an information processing apparatus, an information processing method, an information processing system and an information processing program.

Recently, attention is paid to grid computing. The grid computing is a technique of allowing a plurality of information processing apparatus connected to a network to operate cooperatively to achieve a high arithmetic operation performance.

For example, Japanese Patent Laid-Open No. 2002-342165, Japanese Patent Laid-Open No. 2002-351850, Japanese Patent Document No. 2002-358289, Japanese Patent Document No. 2002-366533 and Japanese Patent Laid-Open No. 2002-366534 disclose implementation of a computer architecture for high speed processing through use of a uniform modular structure, a common computing module and a uniform software cell.

Additionally, U.S. Pat. No. 6,587,906, U.S. Pat. No. 6,667,920, U.S. Pat. No. 6,728,845, U.S. Patent Laid-Open No. 2004-0039895, U.S. Patent Laid-Open No. 2004-0054880 and U.S. Patent Laid-Open No. 2004-0098496 disclose speeding up of processing by causing a plurality of processors in an information processing apparatus to operate independently of and in parallel to each other.

However, in order to allow a network system wherein a plurality of information processing apparatus are connected to each other through a network to execute a process corresponding to an operation performed for the network system by its user in a distributed fashion over the entire network system with certainty without disturbing execution of a program being currently executed or reserved for execution as far as possible, it is necessary for each of the information processing apparatus or an information processing apparatus which manages the network system to grasp a use situation (program execution situation) of processor sections in the information processing apparatus itself or/and the other apparatus and secure processor sections necessary for execution of the intended process in the information processing apparatus itself or the other apparatus.

SUMMARY OF THE INVENTION

The present invention related to an information processing apparatus, an information processing method, an information processing system and an information processing program.

The present invention provides in an embodiment an information processing apparatus, an information processing method, an information processing system and an information processing program by which execution of programs can be allocated precisely to processor sections in each of different information processing apparatus.

The present invention provides in an embodiment an information processing apparatus, an information processing method, an information processing system and an information processing program by which distributed processing can be executed without disturbing execution of a program being currently executed or reserved for execution as far as possible.

According to an embodiment of the present invention, there is provided an information processing apparatus connected to a network, including one or a plurality of processor sections for executing a program, and a management section for managing the processor sections, the management section including a management table which in turn includes identifiers for specifying the processor sections and use situation information representative of whether or not the processor sections specified with the identifiers are executing or are reserved for execution of a program, the management section rewriting the management table when some or all of the processor sections are secured for a different information processing apparatus connected to the information processing apparatus through the network in response to a securing request from the different information processing apparatus.

According to another embodiment of the present invention, there is provided an information processing system including a plurality of information processing apparatus connected to a network, each of the information processing apparatus including one or a plurality of processor sections for executing a program and a management section for managing the processor sections, the management section of each of the information processing apparatus including a management table which in turn includes identifiers for specifying the processor sections in the information processing apparatus and use situation information representative of whether or not the processor sections specified with the identifiers are executing or are reserved for execution of a program, the management section of each of the information processing apparatus rewriting the management table when the information processing apparatus secures some or all of the processor sections for a different one of the information processing apparatus in response to a securing request from the different information processing apparatus.

According to a further embodiment of the present invention, there is provided an information processing method for a network system wherein a plurality of information processing apparatus are connected to a network, each of the information processing apparatus including one or a plurality of processor sections for executing a program and a management section for managing the processor sections, the management section of each of the information processing apparatus including a management table which in turn includes identifiers for specifying the processor sections in the information processing apparatus and use situation information representative of whether or not the processor sections specified with the identifiers are executing or are reserved for execution of a program, the information processing method including a first step, executed by the management section of a first one of the information processing apparatus, of referring to the management table in the first information processing apparatus to determine whether or not it is possible to secure a processor section or sections necessary for execution of a certain program in the first information processing apparatus, a second step, executed by the management section of the first information processing apparatus, of rewriting, when it is determined at the first step that it is possible to secure such processor section or sections in the first information processing apparatus, the processor section or sections in the first information processing apparatus and rewriting the management table in the first information processing apparatus, a third step, executed by the management section of the first information processing apparatus, of issuing, when it is determined at the first step that it is impossible to secure such processor section or sections in the first information processing apparatus, a request to secure a processor section or sections to the management section of a second one or ones of the information processing apparatus, and a fourth step, executed by the management section of the second one or ones of the information processing apparatus, of securing, in response to the securing request from the first information processing apparatus, a processing section or sections in the second information processing apparatus and rewriting the management table in the second information processing apparatus and then issuing a notification of an identifier or identifiers of the secured processor section or sections to the management section in the first information processing apparatus.

According to a still further embodiment of the present invention, there is provided an information processing program for causing a computer in an information processing apparatus including one or a plurality of processor sections and connected to a network to function, in order to secure some or all of the processor sections for a different information processing apparatus connected to the information processing apparatus through the network, as a section for producing a management table which includes identifiers for specifying the processor sections and use situation information representative of whether or not the processor sections specified with the identifiers are executing or are reserved for execution of a program, a section for referring to the management table in response to a securing request from the different information processing apparatus to determine whether or not it is possible to secure some or all of the processor sections for the different information processing apparatus, and a section for securing, when it is determined that it is possible to secure some or all of the processor sections for the different information processing apparatus, some or all of the processor sections for the different information processing apparatus and rewriting the management table.

With the information processing apparatus, system, method and program, where a plurality of such information processing apparatus are connected to a network to construct a network system, execution of a program can be allocated precisely to the processor sections of the individual information processing apparatus. Further, distributed processing of the program can be executed with certainty over the entire network system without disturbing execution of a program being currently executed or reserved for execution as far as possible.

If one of the information processing apparatus in the network system is disconnected from the network and the processor sections in the disconnected information processing apparatus are currently executing or are reserved for execution of a certain program, the processor sections in the other information processing apparatus which are not disconnected from the network execute the program in place of the processor sections in the disconnected information processing apparatus. Also in this instance, execution of the program can be allocated precisely to the processor sections in the information processing apparatus which are not disconnected. Consequently, the distributed processing of the program can be executed with certainty over the entire network system without disturbing execution of a program being currently executed or reserved for execution as far as possible.

Additional features and advantages of the present invention are described in, and will be apparent from, the following Detailed Description of the Invention and the figures.

BRIEF DESCRIPTION OF THE FIGURES

FIGS. 2A, 2B and 2C are views illustrating an example of an information processing controller included in an information processing apparatus to which the present invention is applied;

FIG. 18 is a view illustrating an example of a sub processor management table prepared in the information processing apparatus;

FIGS. 19 to 27 are flow charts illustrating an example of a sub processor allocation process;

FIGS. 42A, 42B and 42C are views illustrating an example of an information processing controller included in another information processing apparatus to which the present invention is applied;

FIG. 43 is a block diagram showing an internal structure of a direct memory access controller;

FIG. 44 is a view showing a command/response structure in the information processing apparatus;

FIGS. 45A and 45B are flow diagrams illustrating procedures upon accessing from a sub processor to a main memory;

FIGS. 70 to 78 are flow charts illustrating another example of the sub processor allocation process.

DETAILED DESCRIPTION OF THE INVENTION

Figure 1:
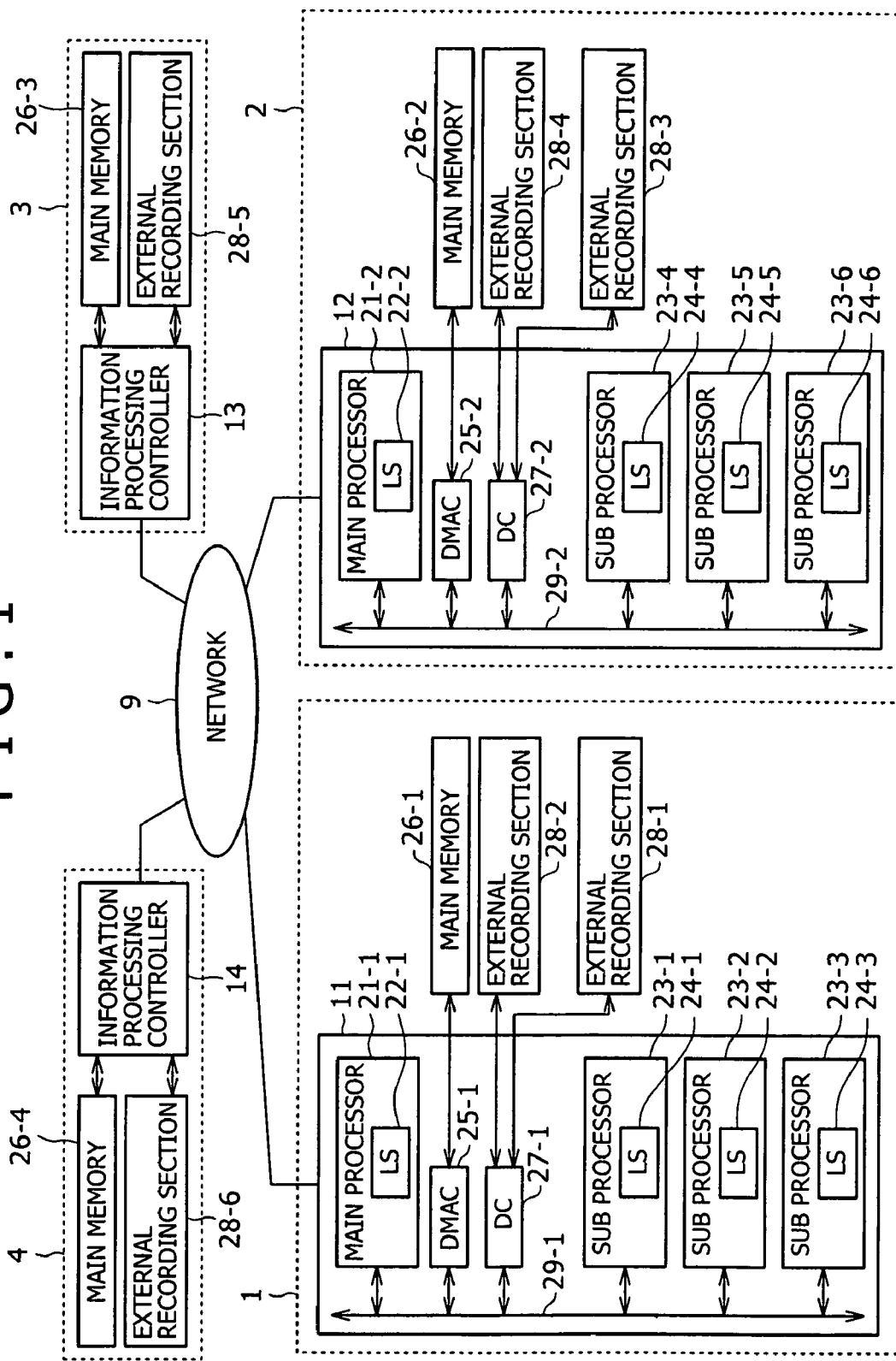
FIG. 1 is a block diagram showing a network system to which the present invention is applied.

Basic Configuration 1 of the Network System and the Information Processing Apparatus FIG. 1 shows an example of a network system to which the present invention is applied. Referring to FIG. 1, the network system shown includes a plurality of information processing apparatus 1, 2, 3 and 4 by a network 9.

(1-1. Information Processing Apparatus and Information Processing Controller)

The information processing apparatus 1, 2, 3, and 4 are such various AV (Audio and Visual) apparatus and portable apparatus as hereinafter described.

The information processing apparatus 1 is described below. The information processing apparatus 1 includes an information processing controller 11 as a computer function section. The information processing controller 11 includes a main processor 21-1, sub processors 23-1, 23-2, and 23-3, a direct memory access controller (DMAC) 25-1, and a disk controller (DC) 27-1.

The main processor 21-1 performs schedule management of execution (data processing) of sub processor programs by the sub processors 23-1, 23-2, and 23-3 and general management of the information processing controller 11 (information processing apparatus 1). However, the main processor 21-1 may be configured otherwise such that a program other than the program for performing the management operates in the main processor 21-1. In this instance, the main processor 21-1 functions also as a sub processor. The main processor 21-1 includes a local storage (LS) 22-1.

Although the number of sub processors may be only one, preferably a plurality of sub processors are involved. In the example shown in FIG. 1, the information processing apparatus includes a plurality sub processors.

The sub processors 23-1, 23-2, and 23-3 execute sub processor programs parallelly and independently of each other to process data under the control of the main processor 21-1. Further, according to circumstances, a program in the main processor 21-1 can operate in cooperation with a sub processor program in any of the sub processors 23-1, 23-2, and 23-3. Also function programs hereinafter described operate in the main processor 21-1. Also the sub processors 23-1, 23-2, and 23-3 include local storages 24-1, 24-2, and 24-3, respectively.

The DMAC 25-1 accesses programs and data stored in a main memory 26-1 connected to the information processing controller 11 and formed from a DRAM (dynamic RAM) or the like. The DC 27-1 accesses external recording sections 28-1 and 28-2 connected to the information processing controller 11.

The external recording sections 28-1 and 28-2 may have a form of any of a fixed disk (hard disk) and a removable disk. As such a removable disk as just mentioned, various recording media such as an MO (magnetic disk), an optical disk such as a CD±RW or a DVD±RW, a memory disk, an SRAM (static RAM), and a ROM can be used. The DC 27-1 is an external recording section controller although it is called disk controller.

The information processing controller 11 can be configured such that a plurality of external recording sections 28 are connected thereto as in the example shown in FIG. 1.

The main processor 21-1, sub processors 23-1, 23-2, and 23-3, DMAC 25-1, and DC 27-1 are connected to each other by a bus 29-1.

An identifier is allocated as an information processing apparatus ID to the information processing controller 11. The identifier allows identification of the information processing apparatus 1, which incorporates the information processing controller 11, uniquely over the entire network.

Also to each of the main processor 21-1 and the sub processors 23-1, 23-2, and 23-3, an identifier with which it can be identified is allocated as a main processor ID or a sub processor ID similarly.

The information processing controller 11 is preferably formed as a one-chip IC (integrated circuit).

Also the other information processing apparatus 2, 3, and 4 are configured in a similar manner. Here, it is to be noticed that those units of reference characters having the same parent number operate similarly unless otherwise specified even if they have different branch numbers. Thus, in the following description, where the branch number of reference characters is omitted, the units are same irrespective of the difference in branch number.

(1-2. Accessing from Each Sub Processor to the Main Memory)

As described hereinabove, although each of the sub processors 23 in one information processing controller executes a sub processor program independently to process data, if different sub processors perform reading out or writing at a time from or into the same area in the main memory 26, then mismatching of data may possibly occur. Therefore, accessing from the sub processors 23 to the main memory 26 is performed in accordance with the following procedure.

Referring to FIG. 2A, the main memory 26 is formed from a plurality of memory locations 0 to M with which a plurality of addresses can be designated. An additional segment 0 to M for storing information indicative of a state of data is allocated to each memory location. The additional segment includes an F/E bit, a sub processor ID, and an LS address (Local Storage address). Also an access key 0 to M hereinafter described is allocated to each memory location. The F/E bit is defined in the following manner.

The F/E bit=0 represents that the data in the corresponding memory location is data being read and processed by a sub processor 23 or invalid data which it not the latest data since the location is in a blank state and is disabled from being read out. Further, the F/E bit=0 indicates that data can be written into the corresponding memory location, and the F/E bit is set to 1 after writing into the memory location.

The F/E bit=1 represents that data of the corresponding memory location is not read out by any sub processor 23 and is the latest data not processed as yet. The data of the memory location can be read out. After the sub processor 23 reads out the data, the F/E bit is set to 0. Further, the F/E bit=1 represents that the memory location is disabled from writing of data.

Further, in the state of the F/E bit=0 (readout disabled/writing enabled), it is possible to set a readout reservation with regard to the memory location. When readout reservation is to be performed with regard to a memory location with regard to which the F/E bit=0, a sub processor 23 writes the sub processor ID and the LS address of the sub processor 23 as readout reservation information into the additional segment of the memory location with regard to which the readout reservation is performed.

Thereafter, the sub processor 23 on the data writing side writes the data into the memory location having the readout reservation, and the F/E bit is set to F/E bit=1 (readout enabled/writing disabled). Then, the sub processor ID and the LS address written as the readout reservation information in the additional segment in advance are read out.

Where there is the necessity to process data at multiple stages using a plurality of sub processors, if readout/writing of data of each memory location are controlled in such a manner as described above, then immediately after data processed by a processor 23, which performs a process at a preceding stage, is written into a predetermined address on the main memory 26, another sub processor 23, which performs a process at a succeeding stage, can read out the preprocessed data.

Referring to FIG. 2B, also the local storage 24 in each sub processor 23 is formed from a plurality of memory locations 0 to L which can be designated each by an address. An additional segment 0 to L is allocated similarly to each of the memory locations. The additional segment includes a busy bit.

When the sub processor 23 is to read out data in the main memory 26 into a memory location of the local storage 24 thereof, it sets the corresponding busy bit corresponding to the memory location of the reading out destination to 1 to make reservation. Other data cannot be stored into any memory location with regard to which the busy bit is 1. After reading out of the memory location of the local storage 24, the busy bit is changed to 0 so that the memory location can be used for an arbitrary object later.

Referring back to FIG. 2A, the main memory 26 connected to each information processing controller includes a plurality of sandboxes. The sandboxes define areas in the main memory 26, and each sandbox is allocated for each sub processor 23 and can be used exclusively by the pertaining sub processor. In other words, each of the sub processors 23 can use a sandbox allocated thereto but cannot access data exceeding the area of the sandbox.

While the main memory 26 includes a plurality of memory locations 0 to M, each sandbox is a set of memory locations. In other words, one sandbox is formed from one or a plurality of memory locations.

Further, in order to implement exclusive control of the main memory 26, such a key management table as shown in FIG. 2C is used. The key management table is stored in a comparatively high speed memory such as an SRAM in the information processing controller and is coordinated with a DMAC 25.

The key management table includes a number of entries equal to the number of sub processors in the information processing controller. Each entry includes a sub processor ID and a corresponding sub processor key and a corresponding key mask stored in a coordinated relationship with each other.

The process when the sub processor 23 uses the main memory 26 is such as described below. First, the sub processor 23 outputs a readout or writing command to the DMAC 25. This command includes the sub processor ID of the sub processor and an address of the main memory 26, which is a destination of the request for use.

Before the DMAC 25 executes this command, it refers to the key management table to detect the sub processor key of the sub processor of the source of the request for access. Then, the DMAC 25 compares the detected sub processor key of the source of the request for use with the access key allocated to the memory location shown in FIG. 2A in the main memory 26, which is the destination of the request for use. Then, only when the keys coincide with each other, the DMAC 25 executes the command described above.

The key mask on the key management table shown in FIG. 2C can set, when an arbitrary bit thereof is set to the value 1, a corresponding bit of the sub processor key coordinated with the key mask to 0 or 1.

It is assumed that, for example, the sub processor key is 1010. Usually, the sub processor key enables accessing only to a sandbox having the access key of 1010. However, if the key mask coordinated with the sub processor key is set to 0001, then the coincidence determination between a sub processor key and an access key is masked only with regard to the digit in which the bit of the key mask is set to 1. Consequently, the sub processor key of 1010 enables accessing to a sandbox having the access key of 1010 or 1011.

The exclusive property of the sandboxes of the main memory 26 is implemented in such a manner as described above. In short, where there is the necessity for a plurality of sub processors in an information processing controller to process data at multiple stages, only a sub processor performing a process at a preceding stage and another sub processor performing a process at a succeeding stage are permitted to access a predetermined address of the main memory 26. Consequently, the data can be protected.

Such exclusive control of the memory can be used, for example, in the following manner. First, immediately after the information processing apparatus is started, the values of the key masks are all zero. It is assumed that a program in the main processor is executed and operates in a cooperating relationship with programs in the sub processors. When it is intended to store processing result data outputted from a first sub processor once into the main memory 26 and then transmit the processing result data to a second sub processor, it is necessary that the pertaining main memory area can be accessed from the two sub processors. In such an instance, the program in the main processor changes the values of the key masks suitably to provide a main memory area, which can be accessed from the plurality of sub processors, to allow multi-stage processing by the sub processors.

More particularly, when multi-stage processing is to be performed in the procedure of data from a different information processing apparatus→processing by the first sub processor→first main memory area→processing by the second sub processor→second main memory area, the second processor cannot access the first main memory area if the following settings are maintained:

Sub processor key of the first sub processor, 0100;
Access key of the first main memory area, 0100;
Sub processor key of the second sub processor, 0101;
Access key of the second main memory area, 0101.

Thus, if the key mask of the second sub processor is changed to 0001, then the second sub processor is permitted to access the first main memory area.

(1-3. Production and Configuration of a Software Cell)

In the network system of FIG. 1, a software cell is transmitted between the information processing apparatus 1, 2, 3, and 4 so that distributed processing may be performed by the information processing apparatus 1, 2, 3, and 4. In particular, the main processor 21 included in the information processing controller in a certain information processing apparatus produces a software cell including a command, a program, and data and transmits the software cell to another information processing apparatus through the network 9 to achieve distribution of processing.

Figure 3:
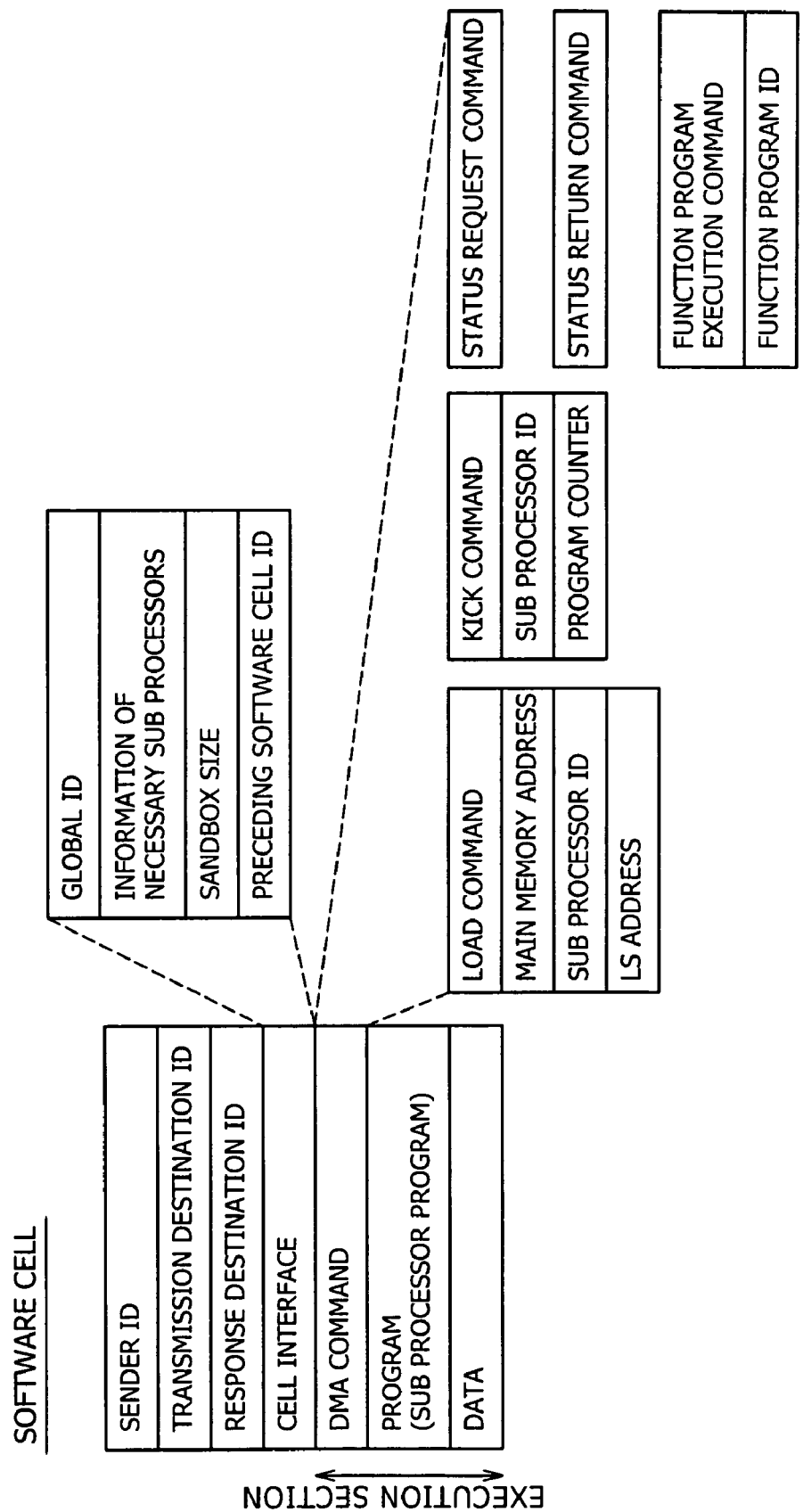
FIG. 3 is a view showing an example of a software cell.

FIG. 3 shows an example of a configuration of a software cell. Referring to FIG. 3, the software cell shown generally includes a sender ID, a transmission destination ID, a response destination ID, a cell interface, a DMA command, a program, and data.

The sender ID includes a network address and the information processing apparatus ID of an information processing apparatus of the sender of the software cell. The sender ID includes identifiers (main processor ID and sub processor IDs) of the main processor 21 and the sub processors 23 included in the information processing controller in the information processing apparatus.

The transmission destination ID and the response destination ID individually include the same information regarding an information processing apparatus of the transmission destination of the software cell and an information processing apparatus of the response destination of a result of execution of the software cell.

The cell interface is information necessary for utilization of the software cell and includes a global ID, information of necessary sub processors, a sandbox size, and a preceding software cell ID.

The global ID allows unique identification of the software cell through the entire network and is produced based on the sender ID and the date and hour of production or transmission of the software cell.

The information of necessary sub processors has set therein the number of sub processors necessary for execution of the software cell. The sandbox size has set therein the memory capacities in the main memory 26 and the local storages 24 of the sub processors 23 necessary for execution of the software cell.

The preceding software cell ID is an identifier of a preceding software cell among software cells of one group, which requires sequential execution such as streaming data.

An execution section of a software cell is formed from the DMA command, program, and data. The DMA command includes a series of DMA commands necessary to start the program, and the program includes sub processor programs to be executed by the sub processors 23. The data here is data to be processed by the program including the sub processor programs.

The DMA command further includes a load command, a kick command, a function program execution command, a status request command, and a status return command.

The load command is a command for loading information in the main memory 26 into the local storage 24 of a sub processor 23 and includes, in addition to the load command itself, a main memory address, a sub processor ID, and an LS (Local Storage) address. The main memory address indicates an address of a predetermined area in the main memory 26, which is a load source of the information. The sub process ID and the LS address indicate the identifier and the address of the local storage 24 of the sub processor 23 of a load destination of the information.

The kick command is a command for starting execution of a sub processor program and includes, in addition to the kick command, a sub processor ID and a program counter. The sub processor ID identifies a sub processor 23 of a kicking object, and the program counter provides an address for the program counter for execution of the program.

The function program execution command is a command (hereinafter described) used for a certain information processing apparatus to request another information processing apparatus for execution of a function program as hereinafter described. The information processing controller in the information processing apparatus, which receives the function program execution command, identifies a function program to be started from a function program ID.

The status request command is a command for requesting for transmission of apparatus information regarding a current operation state (situation) of an information processing apparatus indicated by the transmission destination ID to an information processing apparatus indicated by the response destination ID. While the function program is hereinafter described, it is a program categorized into a function program in FIG. 6, which illustrates a configuration of software stored in the main memory 26. The function program is loaded into the main memory 26 and executed by the main processor 21.

The status return command is a command used for an information processing apparatus, which receives the status request command, to issue a response of apparatus information of the information processing apparatus itself to an information processing apparatus indicated by the response destination ID included in the status request command. The status return command places the apparatus information into the data region of the execution section.

Figure 4:
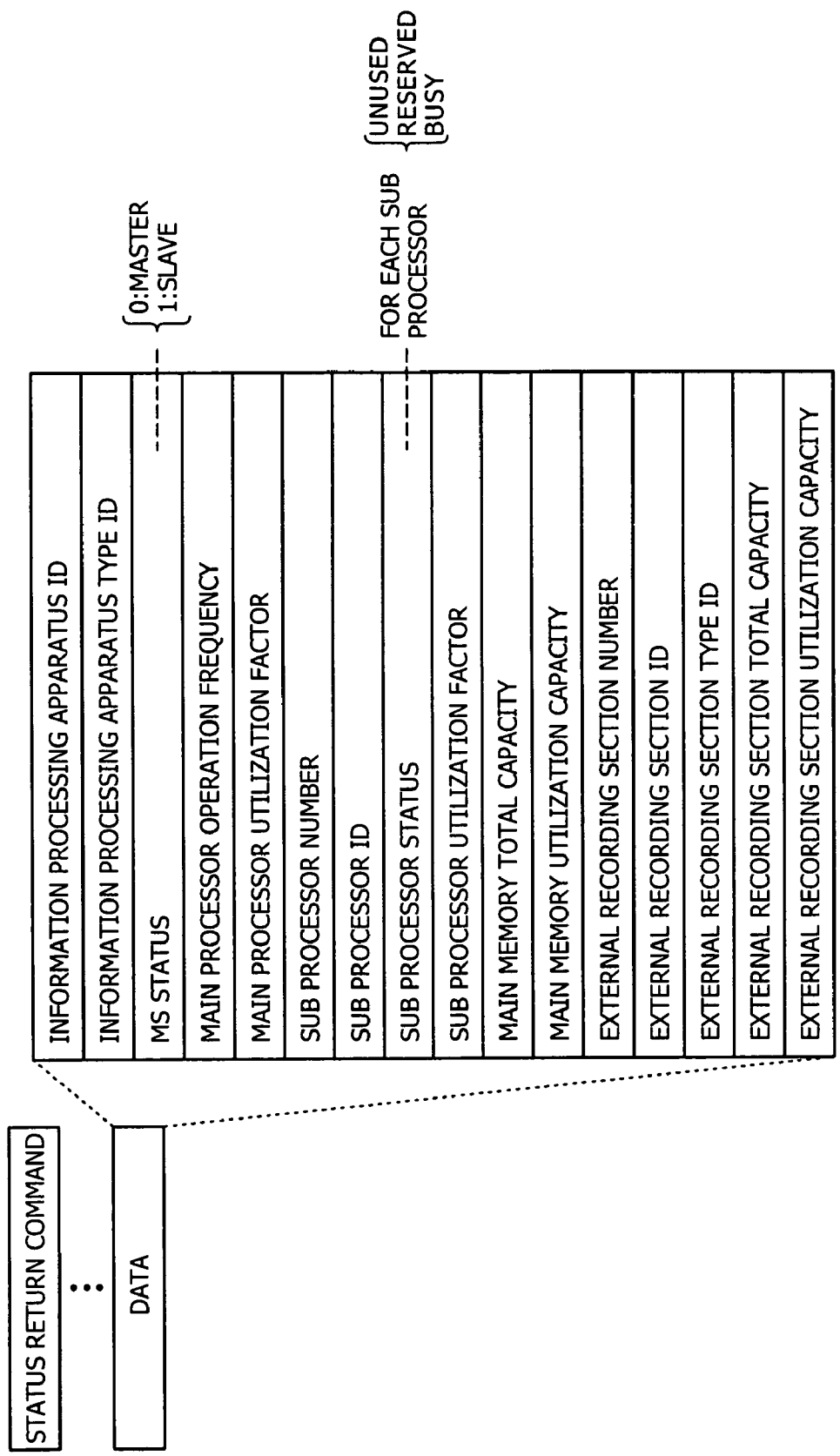
FIG. 4 is a view illustrating an example of a data area of a software cell.

FIG. 4 illustrates a structure of the data area of a software cell where the DMA command is the status return command.

Referring to FIG. 4, the information processing apparatus ID is an identifier for identifying an information processing apparatus, which includes an information processing controller, and represents the ID of an information processing apparatus that transmits the status return command. The information processing apparatus ID is produced, when the power supply is made available, based on the date and hour when the power supply is made available, the network address of the information processing apparatus, the number of sub processors 23 included in the information processing controller in the information processing apparatus, and so forth by the main processor 21 included in the information processing controller in the information processing apparatus.

The information processing apparatus type ID includes a value representative of a characteristic of the information processing apparatus. The characteristic of the information processing apparatus is, for example, a hard disk recorder, a PDA (Personal Digital Assistant), a portable CD (Compact Disc) player, or the like hereinafter described. The information processing apparatus type ID may be of the type representing a function that the information processing apparatus has such as image and sound recording or image and sound reproduction. The value representative of a characteristic or a function of an information processing apparatus is determined in advance. If the information processing apparatus type ID is recalled, then a characteristic or a function of the information processing apparatus can be grasped.

The MS (Master/Slave) status represents as which one of a master apparatus and a slave apparatus the information processing apparatus operates as hereinafter described. Where the MS status is set to 0, this represents that the information processing apparatus should operate as a master apparatus, but where the MS status is set to 1, this represents that the information processing apparatus should operate as a slave apparatus.

The main processor operation frequency represents an operation frequency of the main processor 21 in the information processing controller. The main processor utilization factor represents the utilization factor in the main processor 21 regarding all programs, which are operating in the main processor 21 at present. The main processor utilization factor is a value representing the ratio of the processing capacity being currently used to the overall processing capacity of the object main processor and is calculated, for example, in a unit of MIPS, which is a unit for evaluation of the processor processing capacity, or based on the processor utilization time per unit time. This similarly applies also to a sub processor utilization factor hereinafter described.

The sub processor number represents the number of sub processors 23 provided in the information processing controller. The sub processor ID represents an identifier for identification of a sub processor 23 in the information processing controller.

The sub processor status represents a status of the sub processor 23 and may be one of an unused status, a reserved status, a busy status, and so forth. The unused status indicates that the sub processor is not used at present and is not reserved for use either. The reserved status indicates that the sub processor is not used but is reserved for use. The busy status indicates that the sub processor is currently used.

The sub processor utilization factor represents the utilization factor in the sub processor regarding a sub processor program being executed by the sub processor or being reserved for execution in the sub processor. In other words, the sub processor utilization factor indicates the utilization factor at present where the sub processor status is busy, but indicates an estimated utilization factor with which the sub processor is planned to be used later where the sub processor status is reserved.

One set of the sub processor ID, sub processor status, and sub processor utilization factor is set for one sub processor 23. Consequently, a number of sets corresponding to the number of sub processors 23 in one information processing controller are set.

The main memory total capacity and the main memory utilization capacity represent the total capacity and the capacity being currently used of the main memory 26 connected to the information processing controller, respectively.

The external recording section number represents the number of external recording sections 28 connected to the information processing controller. The external recording section ID is information for unique identification of each of the external recording sections 28 connected to the information processing controller. The external recording section type ID represents the type of each of the external recording sections 28 (for example, a hard disk, a CD±RW, a DVD±RW, a memory disk, an SRAM, a ROM, or the like).

The external recording section total capacity and the external recording section utilization capacity represent the total capacity and the currently used capacity of an external recording section 28 identified with the external recording section ID, respectively.

A set of the external recording section ID, external recording section type ID, external recording section total capacity, and external recording section utilization capacity is set for one external recording section 28. Consequently, a number of sets corresponding to the number of external recording sections 28 connected to the information processing controller are set. In particular, where a plurality of external recording sections are connected to an information processing controller, different external recording section IDs are applied individually to the external recording sections, and also the external recording section type IDs, external recording section total capacities, and external recording section utilization capacities are managed separately from each other.

(1-4. Execution of a Software Cell)

The main processor 21 included in the information processing controller in a certain information processing apparatus produces a software cell having such a configuration as described above and transmits the software cell to a different information processing apparatus through the network 9 and also to the information processing controller in the certain information processing apparatus. The information processing apparatus of the sender, the information processing apparatus of the transmission destination, the information processing apparatus of the response destination, and the information processing controllers in the apparatus mentioned are individually identified with the sender ID, transmission destination ID, and response destination ID described hereinabove, respectively.

The main processor 21 included in the information processing controller in the information processing apparatus receiving the software cell stores the software cell into the main memory 26. Further, the main processor 21 of the transmission destination reads out the software cell and processes the DMA command included in the software cell.

In particular, the main processor 21 of the transmission destination first executes the load command. Consequently, the information is loaded from the main memory address indicated by the load command into a predetermined area of the local storage 24 in a sub processor specified by the sub processor ID and the LS address included in the load command. The information loaded here is a sub processor program or data or some other indicated data included in the received software cell.

Then, the main processor 21 outputs the kick command to a sub processor indicated by the sub processor ID included in the kick command together with a program counter included in the kick command similarly.

The indicated sub processor executes the sub processor program in accordance with the kick command and the program counter. Then, the sub processor stores a result of the execution into the main memory 26, and then notifies the main processor 21 of completion of the execution.

It is to be noted that the processor executing the software cell in the information processing controller in the information processing apparatus of the transmission destination is not limited to a sub processor 23, but it is possible to designate the main processor 21 so as to execute a main memory program such as a function program included in the software cell.

In this instance, the information processing apparatus of the sender transmits, to the information processing apparatus of the transmission destination, a software cell whose DMA command is the load command. The software cell includes a main memory program and data to be processed by the main memory program in place of the sub processor program. The main memory program and the data to be processed by the main memory program are stored into the main memory 26.

Then, the information processing apparatus of the sender transmits, to the information processing apparatus of the transmission destination, a software cell whose DMA command is the kick command or the function program execution command. The software cell includes the main processor ID and main memory address of the information processing controller in the information processing apparatus of the transmission destination, an identifier for identification of the main memory program such as a function program ID hereinafter described, and a program counter. Thus, the main processor 21 may execute the main memory program.

As described above, in the network system according to the present embodiment, an information processing apparatus of the sender transmits a sub processor program or a main memory program in the form of a software cell to an information processing apparatus of the transmission destination. Further, the information processing apparatus of the sender causes the information processing controller in the information processing apparatus of the transmission destination to load the sub processor program into a sub processor 23. Consequently, the information processing apparatus of the sender can cause the information processing apparatus of the transmission destination to execute the sub processor program or the main memory program.

Where the program included in the received software cell is a sub processor program, the information processing controller in the information processing apparatus of the transmission destination loads the sub processor program into a designated sub processor. Thus, the information processing controller causes the sub processor to execute the sub processor program or the main memory program included in the software cell.

Accordingly, even if the user does not operate the information processing apparatus of the transmission destination, the sub processor program or the main memory program can be executed automatically by the information processing controller in the information processing apparatus of the transmission destination.

In this manner, any information processing apparatus can acquire, where the information processing controller thereof does not include a sub processor program or a main memory program such as a function program, such programs from another information processing apparatus connected thereto by the network. Further, each sub processor and the main memory can transfer data therebetween in accordance with the DMA system and such sandboxes as described hereinabove are used. In such a case, even where it is necessary to process data at multiple states within one information processing controller, the processing can be executed at a high speed and with a high degree of security.

Figure 5:
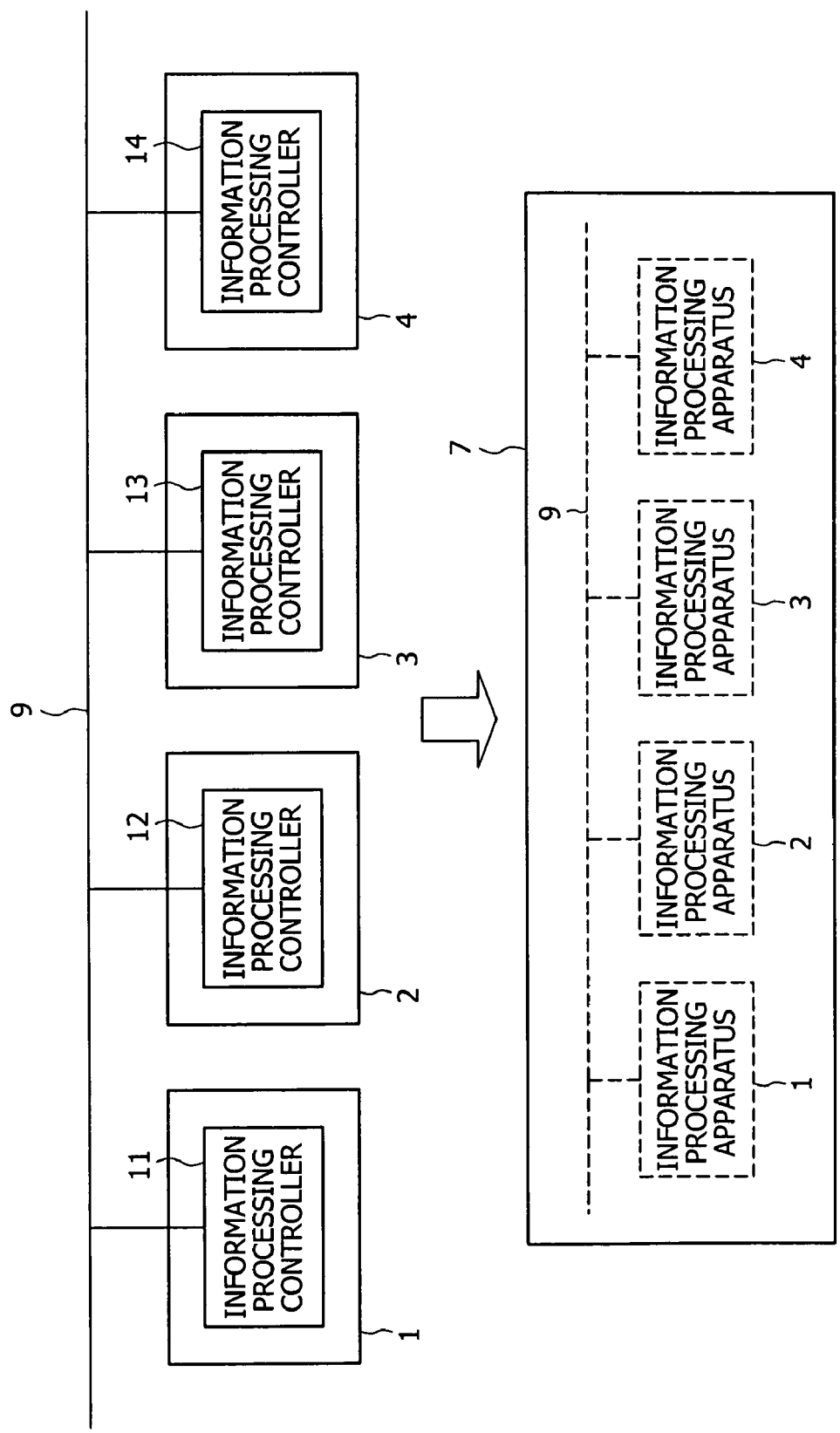
FIG. 5 is a diagrammatic view showing a plurality of information processing apparatus where they operate as a virtual single information processing apparatus.

2. Example 1 of Distributed Processing Between the Information Processing Apparatus As a result of the distributed processing through use of a software cell, the plural information processing apparatus 1, 2, 3, and 4 connected to the network 9 as seen at the upper stage in FIG. 5 operate as a virtual single information processing apparatus 7 as seen at the lower stage in FIG. 5.

However, in order to implement such virtual operation as just described, processes described below must be executed by such a configuration as described below.

2-1. Software Configuration of the System and Loading of a Program

Figure 6:
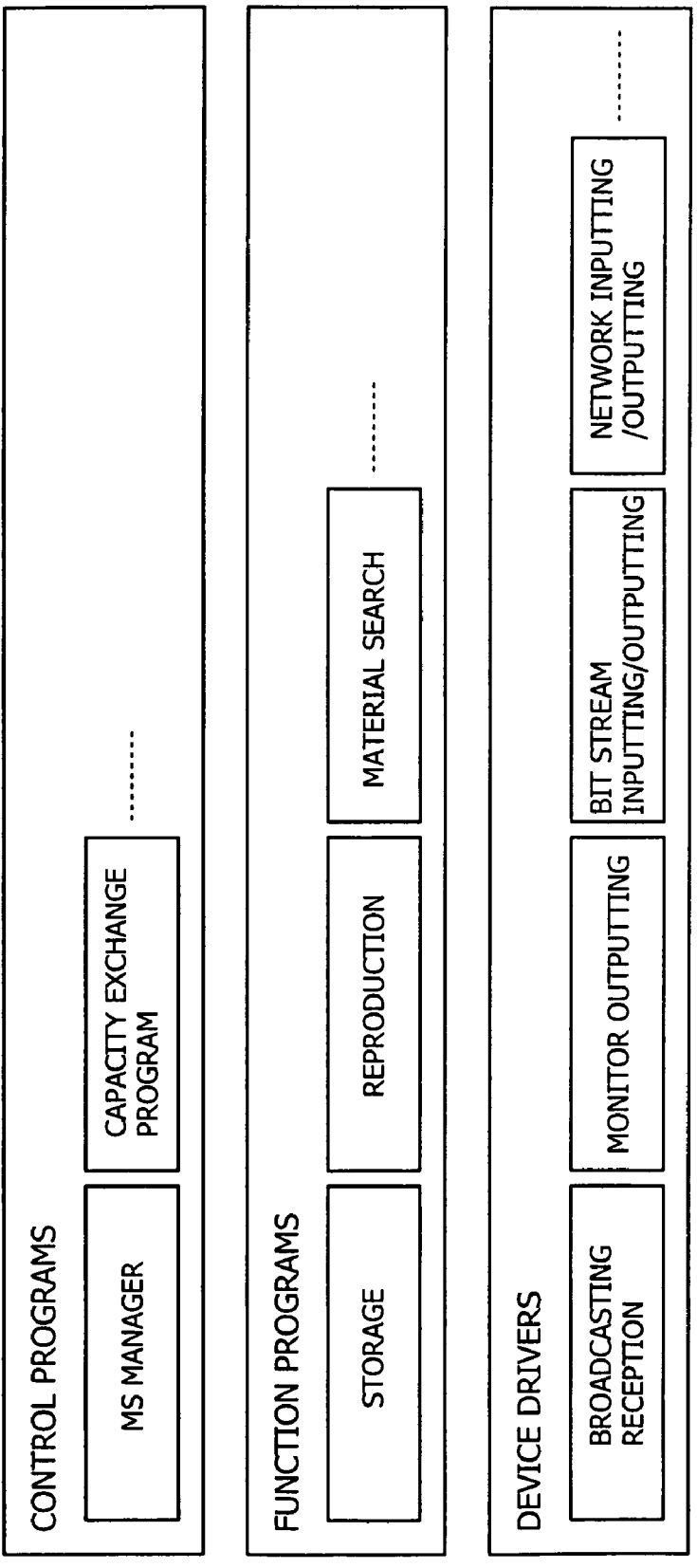
FIG. 6 is a diagrammatic view illustrating an example of a software configuration of the information processing apparatus.

FIG. 6 illustrates a configuration of software to be stored by the main memories 26 of the individual information processing controllers. Referring to FIG. 6, the pieces of software (programs) are recorded in an external recording section 28 connected to the information processing controller before the power supply is made available to the information processing apparatus.

The programs are categorized, depending upon the function or characteristic thereof, into control programs, function programs, and device drivers.

The control programs are provided commonly in the information processing controllers and executed by the main processor 21 in each of the information processing controllers. The control programs include an MS (Master/Slave) manager and a capacity exchange program hereinafter described.

The main processors 21 execute the function programs, and for each information processing apparatus, such function programs as a recording program, a reproduction program, a material search program, and so forth are provided for the information processing controller.

The device drivers are provided for inputting and outputting (transmission and reception) of each information processing controller (information processing apparatus), and such devices as those for broadcast reception, monitor outputting, bit stream inputting/outputting, network inputting/outputting, and so forth, which are suitable for each of the information processing apparatus, are provided for the information processing controller.

When the power supply is made available to an information processing apparatus in a state wherein the information processing apparatus is physically connected to the network 9 by connection of a cable or the like and consequently the information processing apparatus is connected to the network 9 also electrically and functionally, the main processor 21 of the information processing controller of the information processing apparatus loads the programs belonging to the control programs and the programs belonging to the device drivers into the main memory 26.

As a loading procedure of the programs, the main processor 21 first controls the DC 27 to execute a reading out instruction to read out the programs from the external recording section 28 and then controls the DMAC 25 to execute a writing instruction to write the programs into the main memory 26.

The programs belonging to the function programs may be handled such that only a necessary one of the programs is loaded when necessary or otherwise such that all of them are loaded immediately after the main power supply is made available similarly to the programs belonging to the other categories.

The programs belonging to the function programs need not necessarily be recorded in the external recording sections 28 of all of the information processing apparatus connected to the network. However, if they are recorded in an external recording section 28 of any one of the information processing apparatus, they can be loaded into the other information processing apparatus by the method described hereinabove. As a result, the function programs can be executed by the virtual single information processing apparatus 7 as shown at the lower stage of FIG. 5.

As described hereinabove, a function program executed by the main processor 21 sometimes operates cooperatively with a sub processor program processed by a sub processor 23. Therefore, when the main processor 21 reads out a function program from the external recording section 28 and writes the function program into the main memory 26, if any sub processor is to operate cooperatively with the object function program, then the main processor 21 writes also the sub processor program into the same main memory 26 together. In this instance, although a single sub processor program may be to operate cooperatively, a plurality of sub processor programs may possibly be to operate cooperatively. Where a plurality of sub processor programs are to operate cooperatively, all of them are written into the main memory 26.

Each sub processor program written in the main memory 26 is thereafter written into the local storage 24 in the sub processor 23 and operates cooperatively with the function program processed by the main processor 21.

As described hereinabove in connection with the software cell shown in FIG. 3, an identifier, with which a program can be identified uniquely, is allocated as a function program ID to each of the function programs. The function program ID is determined from the date and hour of production, the information processing apparatus ID, and so forth at a stage of production of the function program.

Also each sub processor program has a sub processor program ID allocated thereto so that the sub processor program can be identified uniquely. The sub processor program ID allocated in this manner may be an identifier having some relationship to the function program ID of the function program of the counterpart of the cooperative operation thereof. The example of the identifier is composed of the function program ID as a parent number and a branch number added to the tail end of the function program ID. However, the sub processor program ID may otherwise be an identifier having no relationship to the function program ID of the function program of the counterpart of the cooperative operation.

Anyway, where a function program and a sub processor program should operate cooperatively, it is necessary for each of them to store the program ID of the identifier of the counterpart therein. Also where a function program should operate cooperatively with a plurality of sub processor programs, the function program stores all of the sub processor program IDs of the plural sub processor programs.

The main processor 21 secures, in the main memory 26, an area for storing apparatus information (information relating to an operation state of the apparatus) of the information processing apparatus in which the main processor 21 operates, and records the information as an apparatus information table of the information processing apparatus itself. The apparatus information here is information of the information processing apparatus ID and so forth illustrated in FIG. 4.

2-2. Determination of the Master/Slave in the System

In the network system described above, when the main power supply to a certain information processing apparatus is made available, the main processor 21 of the information processing controller of the information processing apparatus loads a master/slave manager (hereinafter referred to as MS manager) into the main memory 26 and executes the master/slave manager.

After the MS manager detects that the information processing apparatus in which the MS manager operates is connected to the network 9, it confirms presence of the other information processing apparatus connected to the same network 9. The "connection" or "presence" here represents that the information processing apparatus is connected to the network 9 not only physically but also electrically and functionally.

The information processing apparatus in which the MS manager itself operates is hereinafter referred to as self apparatus, and any other information processing apparatus is referred to as different apparatus. Also the term pertaining apparatus represents the pertaining information processing apparatus.

A method by which the MS manager confirms presence of a different information processing apparatus connected to the same network 9 is described in the following.

The MS manager produces a software cell that designates the status request command as the DMA command and designates the pertaining information processing apparatus as the sender ID and the response destination ID but does not specify the transmission destination ID. Then, the MS manager transmits the software cell to the network to which the pertaining information processing apparatus is connected, and sets a timer for network connection confirmation. The timeout time of the timer is, for example, 10 minutes.

If a different information processing apparatus is connected to the network system, then the different apparatus receives the software cell of the status request command and transmits a software cell whose DMA command is the status return command and which includes apparatus information of the self apparatus (different apparatus) as the data to an information processing apparatus which is specified by the response destination ID of the received software cell and has issued the status request command. The software cell of the status return command at least includes information for specifying the different apparatus (information processing apparatus ID, information regarding the main processor, information regarding a sub processor, or the line) and the MS status of the different apparatus.

The MS manager of the information processing apparatus, which has issued the status request command, supervises reception of a software cell of the status return command transmitted from the different apparatus on the network until timeout occurs with the timer for network connection confirmation. As a result, if the status return command representative of the MS status=0 (master apparatus) is received, then the MS status in the apparatus information table of the self apparatus is set to 1. Consequently, the pertaining apparatus becomes a slave apparatus.

On the other hand, if no status return command is received within the time until timeout occurs with the timer for network connection confirmation, or if the status return command representative of the MS status=0 (master apparatus) is not received, then the MS status in the apparatus information table of the self apparatus is set to 0. Consequently, the pertaining apparatus becomes a master apparatus.

In short, if a new information processing apparatus is connected to the network 9 in a state wherein no apparatus is connected to the network 9 or in another state wherein a master apparatus does not exist on the network 9, then the pertaining apparatus is automatically set as a master apparatus. On the other hand, if a new information processing apparatus is connected to the network 9 in a further state wherein a master apparatus exists already on the network 9, then the pertaining apparatus is automatically set as a slave apparatus.

In any of the master apparatus and slave apparatus, the MS manager periodically transmits the status request command to the different apparatus on the network 9 to inquire about the status information to supervise the situation of the different apparatus. As a result, when the connection state of the network 9 undergoes a variation such as when the main power supply to an information processing apparatus connected to the network 9 is cut or an information processing apparatus is disconnected from the network 9 and consequently the status return command is not returned from the particular different apparatus within a predetermined period of time set for the discrimination in advance, the information is conveyed to a capacity exchange program hereinafter described.

2-3. Acquisition of Apparatus Information by the Master Apparatus and a Slave Apparatus If the main processor 21 receives, from the MS manager, a notification of an inquiry about a different apparatus on the network 9 and completion of setting of the MS status of the self apparatus, then it executes a capacity exchange program.

The capacity exchange program acquires, if the self apparatus is a master apparatus, apparatus information of all different apparatus connected to the network 9, that is, apparatus information of all slave apparatus.

The acquisition of apparatus information of a different apparatus can be performed such that the DMA command produces and transmits a software cell of the status request command to the different apparatus and then receives a software cell whose DMA command is the status return command and includes apparatus information of the different apparatus as the data from the different apparatus.

The capacity exchange program secures an area for storing apparatus information of all different apparatus (all slave apparatus) connected to the network 9 in the main memory 26 of the self apparatus and stores the information as apparatus information tables of the different apparatus (slave apparatus) similarly to the apparatus information table of the self apparatus as the master apparatus. In other words, the apparatus information of all of the information processing apparatus connected to the network 9 including the self apparatus is stored as apparatus information tables in the main memory 26 of the master apparatus.

On the other hand, if the self apparatus of the capacity exchange program is a slave apparatus, then the capacity exchange program acquires the apparatus information of all of the different apparatus connected to the network 9, that is, the apparatus information of the master apparatus and all of the slave apparatus other than the self apparatus, and records the information processing apparatus IDs and the MS statuses included in the apparatus information into the main memory 26 of the self apparatus. In other words, in the main memory 26 of each slave apparatus, the apparatus information of the self apparatus is recorded as an apparatus information table, and the information processing apparatus IDs and the MS statuses of all of the master apparatus and the slave apparatus connected to the network 9 other than the self apparatus are recorded as different apparatus information tables.

Further, in any of the master apparatus and the slave apparatus, when the capacity exchange program receives a notification that an information processing apparatus is newly connected to the network 9 from the MS manager as described above, it acquires apparatus information of the information processing apparatus and registers the apparatus information into the main memory 26 as described hereinabove.

It is to be noted that the MS manager and the capacity exchange program may be executed not by the main processor 21 but by any sub processor 23. Further, the MS manager and the capacity exchange program preferably are resident programs that operate normally while the main power supply to the information processing apparatus is available.

2-4. When an Information Processing Apparatus is Disconnected from the Network

In any of the master apparatus and the slave apparatus, if the capacity exchange program is notified from the MS manager that the main power supply to an information processing apparatus connected to the network 9 is disconnected or an information processing apparatus is disconnected from the network 9, it deletes the apparatus information table of the information processing apparatus from the main memory 26 of the self apparatus.

Further, if the information processing apparatus disconnected from the network 9 is the master apparatus, then another master apparatus is determined newly by the following method.

In particular, for example, each of those information processing apparatus that are not disconnected from the network 9 replaces the information processing apparatus IDs of the self apparatus and the different apparatus into numerical values and compares the information processing apparatus ID of the self apparatus with the information processing apparatus IDs of the different apparatus. If the information processing apparatus ID of the self apparatus exhibits the lowest value among the information processing apparatus that are not disconnected from the network 9, then the slave apparatus changes itself to the master apparatus and sets the MS status to zero. Then, it operates as the master apparatus and acquires and records the apparatus information of all of the different apparatus (slave apparatus) connected to the network 9 into the main memory 26 as described hereinabove.

2-5. Distributed Processing Between Information Processing Apparatus Based on Apparatus Information In order to allow a plurality of information processing apparatus 1, 2, 3, and 4 connected to the network 9 to operate as a virtual single information processing apparatus 7 as shown at the lower stage of FIG. 5, it is necessary for the master apparatus to grasp an operation of a user and operation states of the slave apparatus.

Figure 7:
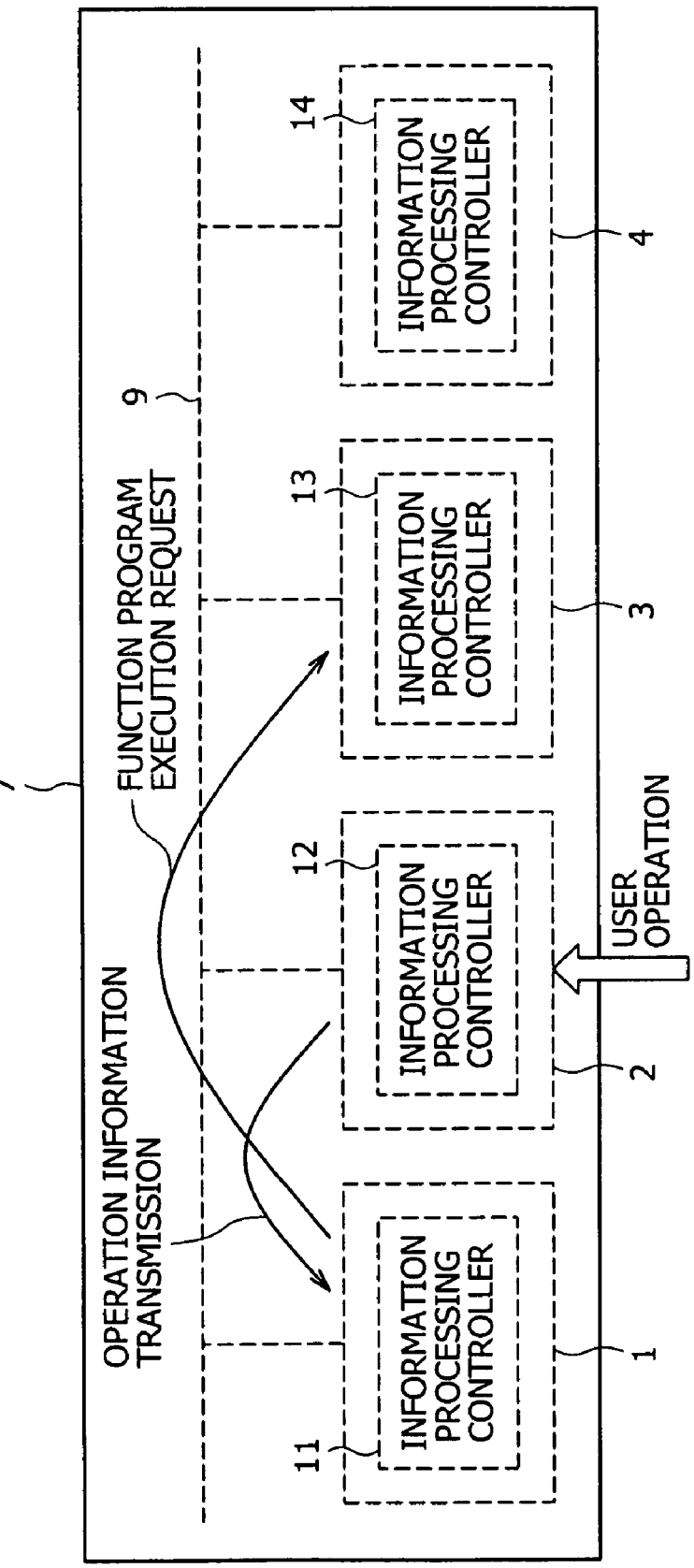
FIG. 7 is a diagrammatic view showing four information processing apparatus where they operate as a virtual single information processing apparatus.

FIG. 7 shows four information processing apparatus in a state wherein they operate as a virtual single information processing apparatus 7. It is assumed that the information processing apparatus 1 acts as the master apparatus while the information processing apparatus 2, 3, and 4 act as slave apparatus A, B, and C, respectively.

When a user operates any of the information processing apparatus connected to the network 9, if the object of the operation is the master apparatus 1, then the operation information then is grasped directly by the master apparatus 1. On the other hand, if the object of the operation is a slave apparatus, then the operation information then is transmitted from the operated slave apparatus to the master apparatus 1. In other words, irrespective of whether the object of operation of the user is the master apparatus 1 or one of the slave apparatus, the master apparatus 1 always grasps the operation information. Transmission of the operation information is performed, for example, using a software cell whose DMA command is the operation information transmission command.

Then, the main processor 21-1 included in the information processing controller 11 in the master apparatus 1 selects a function program to be executed in accordance with the operation information. In this instance, if necessary, the main processor 21-1 included in the information processing controller 11 in the master apparatus 1 loads the function program from the external recording sections 28-1 and 28-2 of the self apparatus into the main memory 26-1 using the method described hereinabove. However, the function program may otherwise be transmitted from a different information processing apparatus (slave apparatus) to the master apparatus 1.

The function program defines required specifications regarding apparatus such as an information processing apparatus type ID, a processing capacity of the main processor or a sub processor, a main memory utilization capacity, and conditions relating to an external recording section as represented as various types of information in FIG. 4, which are required for each execution unit.

The main processor 21-1 included in the information processing controller 11 in the master apparatus 1 reads out such requested specifications required by the individual function programs. Further, the main processor 21-1 refers to the apparatus information tables recorded in the main memory 26-1 by the capacity exchange program in advance to read out the apparatus information of the individual information processing apparatus. The apparatus information here signifies the items of information including the item of the information processing apparatus ID and the succeeding items illustrated in FIG. 4 and is information relating to the main processor, sub processors, main memory, and external recording sections.

The main processor 21-1 included in the information processing controller 11 in the master apparatus 1 successively compares the apparatus information of the information processing apparatus connected to the network 9 with the required specifications necessary for execution of the function program.

For example, if the function program requires a recording function, then the main processor 21-1 specifies and extracts only those information processing apparatus, which have a recording function, based on the information processing apparatus type IDs. Further, the main processor 21-1 specifies that one of the slave apparatus that can assure the processing capacity of the main processor or a sub processor necessary to execute the processing program, the main memory utilization capacity, and conditions regarding an external recording section as an execution request candidate apparatus. Here, if a plurality of execution request candidate apparatus are specified, then one of the execution request candidate apparatus is specified and selected.

After a slave apparatus to which an execution request is to be issued is specified, the main processor 21-1 included in the information processing controller 11 in the master apparatus 1 updates the apparatus information table with regard to the specified slave apparatus recorded in the main memory 26-1 included in the information processing controller 11 in the self apparatus.

Further, the main processor 21-1 included in the information processing controller 11 in the information processing apparatus 1 produces a software cell, which includes the function program execution command as the DMA commands, and sets information of a necessary sub processor and the sandbox size (refer to FIG. 3) regarding the function program to the cell interface of the software cell. Then, the main processor 21-1 transmits the resulting software cell to the slave apparatus, which is requested to execute the function program.

The slave apparatus requested to execute the function program executes the function program and updates the apparatus information table of the self apparatus. In this instance, if necessary, the main processor 21 included in the information processing controller in the slave apparatus loads the function program and a sub processor program or programs, which should operate cooperatively with the function program, from an external recording section 28 of the self apparatus into the main memory 26 using the method described hereinabove.

The system may be configured such that, if the necessary function program or a sub processor program or programs, which should operate cooperatively with the function program, is not recorded in any of the external recording sections 28 of the slave apparatus requested to execute the function program, then a different information processing apparatus transmits the function program and the sub processor program or programs to the slave apparatus requested to execute the function program.

Also it is possible for the sub processor program or programs to be executed by a different information processing apparatus making use of the load command and the kick command described hereinabove.

After the execution of the function program comes to an end, the main processor 21 included in the information processing controller in the slave apparatus having executed the function program transmits an execution end notification to the main processor 21-1 included in the information processing controller 11 in the master apparatus 1, and updates the apparatus information table of the self apparatus. The main processor 21-1 included in the information processing controller 11 in the master apparatus 1 receives the end notification and updates the apparatus information table of the slave apparatus having executed the function program.

The main processor 21-1 included in the information processing controller 11 in the master apparatus 1 may possibly select the self apparatus as an information processing apparatus, which can execute the function program, from a result of the reference to the apparatus information tables of the self apparatus and the different apparatus. In this instance, the master apparatus 1 executes the function program.

Distributed processing where a user operates, in the example illustrated in FIG. 7, the slave apparatus A (information processing apparatus 2) and the different slave apparatus B (information processing apparatus 3) executes a function program in response to the operation is described with reference to FIG. 8.

Figure 8:
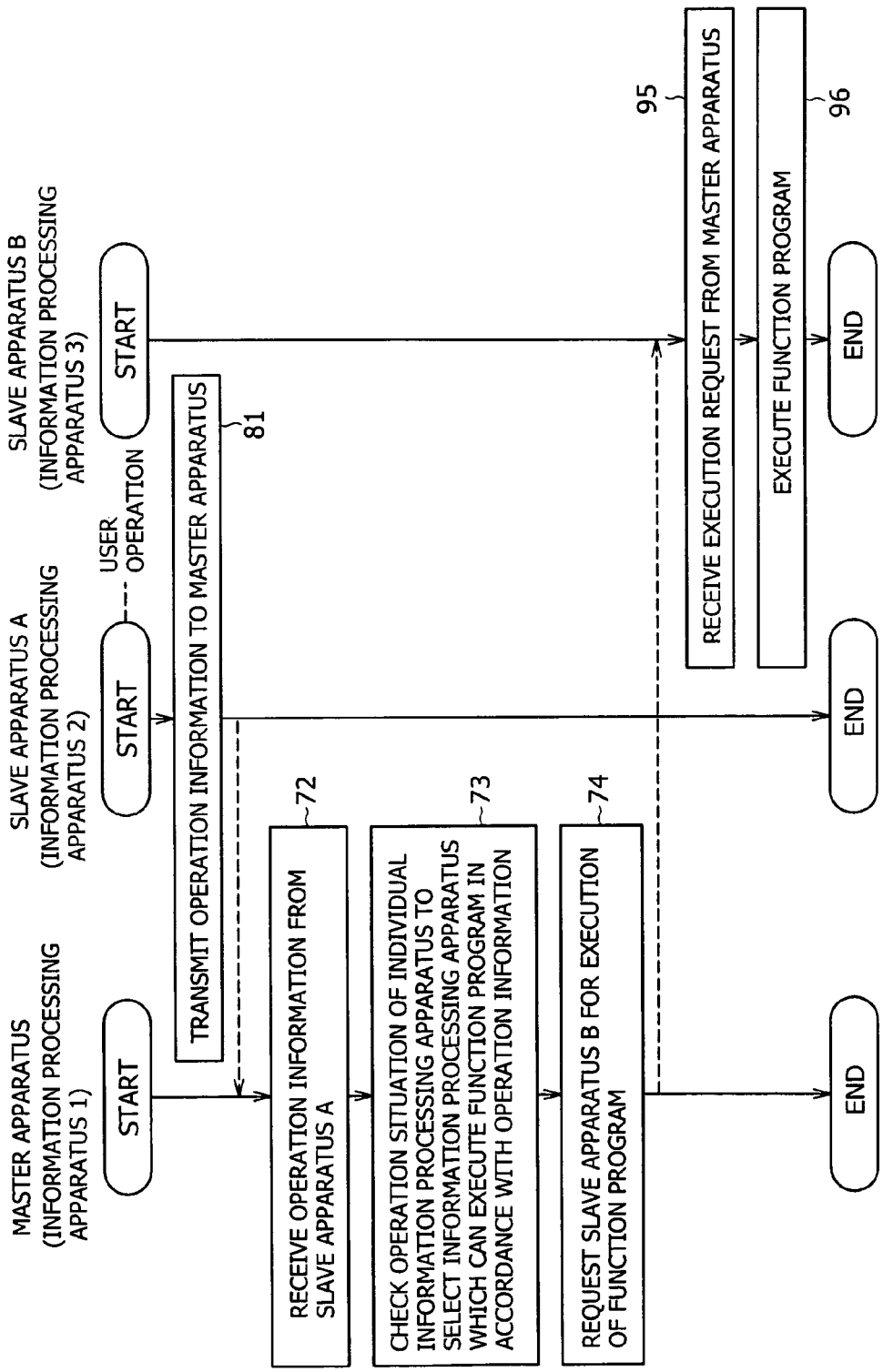
FIG. 8 is a diagrammatic view illustrating an example of distributed processing by the system shown in FIG. 7.

In the example illustrated in FIG. 8, when the user operates the slave apparatus A, distributed processing of the entire network system including the slave apparatus A is started, and the slave apparatus A first transmits operation information then to the master apparatus 1 at step 81.

The master apparatus 1 receives the operation information at step 72 and checks the operation states of the information processing apparatus from the apparatus information tables of the self apparatus and the different apparatus recorded in the main memory 26-1 of the self apparatus to select an information processing apparatus, which can execute a function program corresponding to the received operation information at step 73. In the example illustrated in FIG. 8, the slave apparatus B is selected.

Then, the master apparatus 1 issues a request for execution of the function program to the selected slave apparatus B at step 74.

The slave apparatus B receives the execution request at step 95 and executes the function program whose execution is requested at step 96.

In this manner, if a user operates only one of the information processing apparatus, then it can cause the plural information processing apparatus 1, 2, 3, and 4 to operate as a virtual single information processing apparatus 7 without operating any other one of the information processing apparatus.

2-6. Particular Examples of the Information Processing Apparatus and the System

Figure 9:
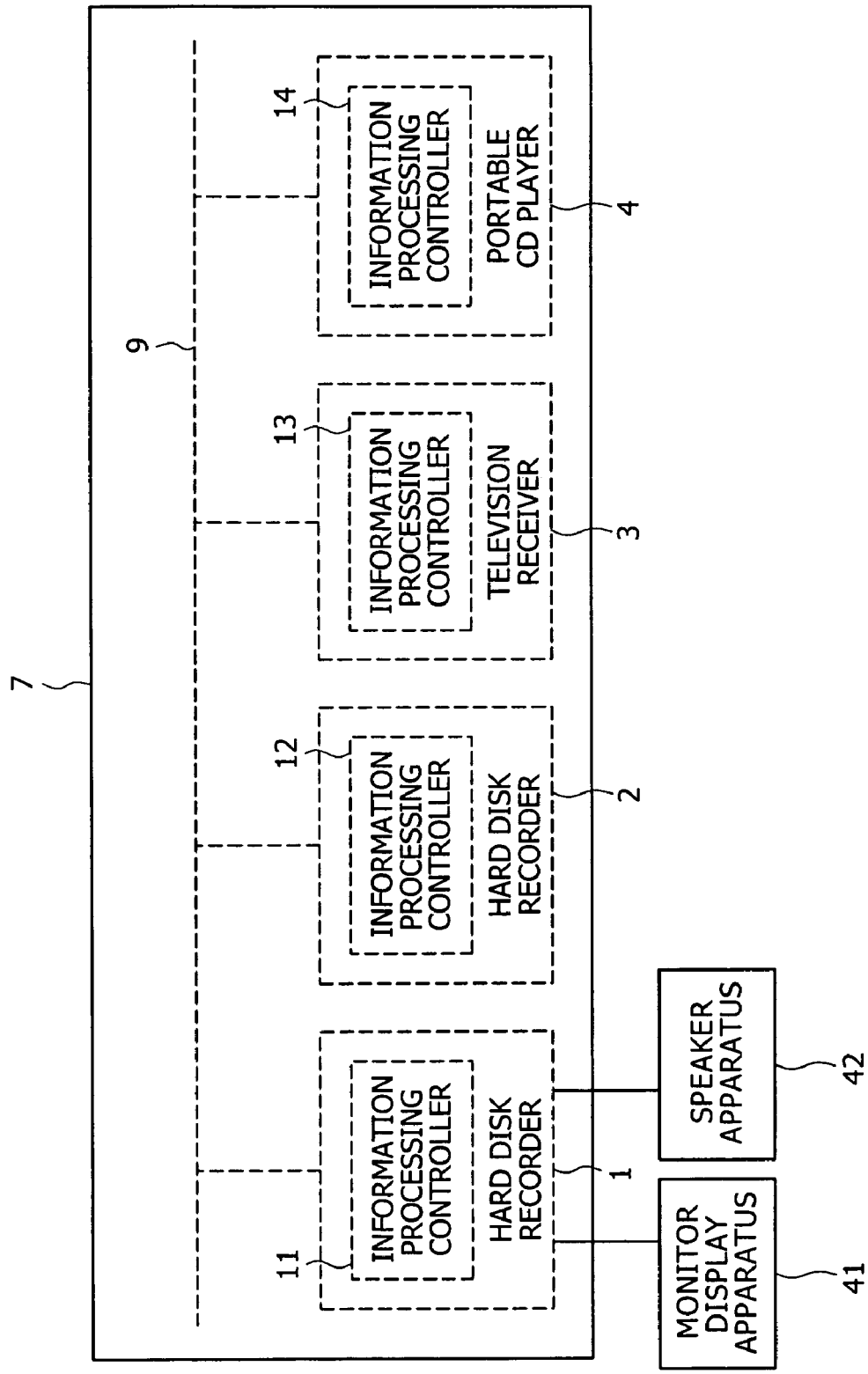
FIG. 9 is a diagrammatic view showing a particular example of information processing apparatus and a system.

Each of the information processing apparatus 1, 2, 3, and 4 connected to each other through the network 9 may basically have any configuration only if information processing is performed by such an information processing controller 11, 12, 13, or 14 as described hereinabove. FIG. 9 shows an example of a configuration of the information processing apparatus.

Figure 10:
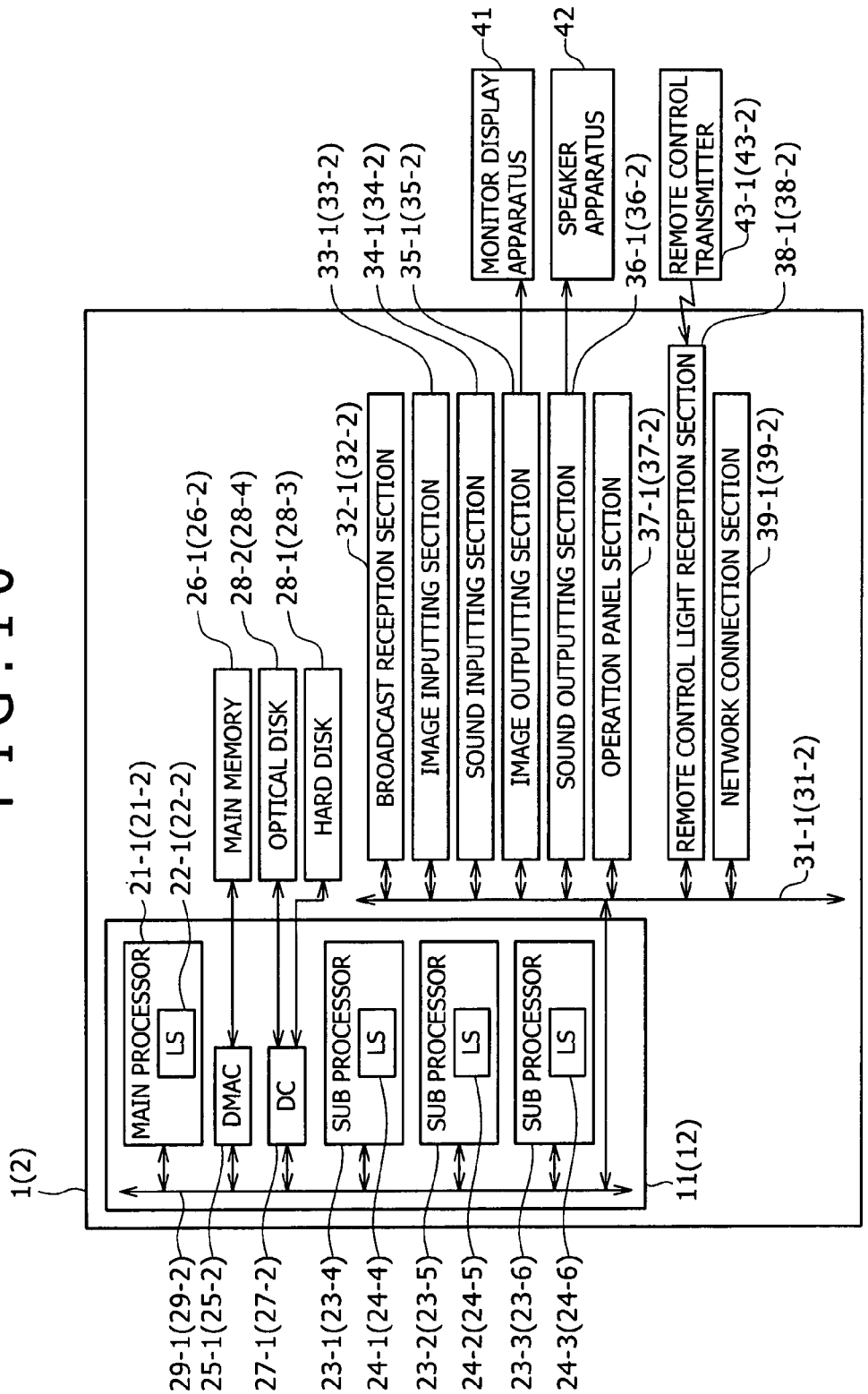
FIG. 10 is a block diagram showing a hardware configuration of a hard disk recorder shown in FIG. 9.

In the example shown, the information processing apparatus 1 which includes the information processing controller 11 is a hard disk recorder. FIG. 10 shows a hardware configuration and a software configuration of the hard disk recorder shown in FIG. 9, respectively. Referring to FIG. 10, the information processing apparatus 1 shown includes, as the hardware configuration thereof, a built-in hard disk serving as the external recording section 28-1 shown in FIG. 1. The information processing apparatus 1 further includes the external recording section 28-2 shown in FIG. 1 into which an optical disk such as DVD±R/RW, CD±R/RW, a Bluray-Disc (registered trademark) and so forth can be loaded. The information processing apparatus 1 further includes a broadcast reception section 32-1, an image inputting section 33-1, a sound inputting section 34-1, an image outputting section 35-1, a sound outputting section 36-1, an operation panel section 37-1, a remote control light reception section 38-1 and a network connection section 39-1 connected to a bus 31-1 which is in turn connected to the bus 29-1 of the information processing controller 11.

The broadcast reception section 32-1, image inputting section 33-1 and sound inputting section 34-1 receive a broadcasting signal or an image signal and a sound signal from the outside of the information processing apparatus 1, convert the received signal or signals into digital data of a predetermined format, and signals the digital data to the bus 31-1 so as to be processed by the information processing controller 11. The image outputting section 35-1 and the sound outputting section 36-1 process image data and sound data signaled from the information processing controller 11 to the bus 31-1 and signal the image data and the sound data as they are or after converted into analog signals to the outside of the information processing apparatus 1. The remote control light reception section 38-1 receives a remote control infrared signal from a remote control transmitter 43-1.

As shown in FIGS. 9 and 10, a monitor display apparatus 41 and a speaker apparatus 42 are connected to the image outputting section 35-1 and the sound outputting section 36-1 of the information processing apparatus (hard disk recorder) 1, respectively.

Also the information processing apparatus 2, which includes the information processing controller 12 shown in FIG. 9, is a hard disk recorder and is configured similarly to the information processing apparatus 1 as seen in FIG. 10 in which reference numerals are applied in parentheses. It is to be noted, however, that no monitor display apparatus and no speaker apparatus are connected to the information processing apparatus (hard disk recorder) 2, for example, as seen in FIG. 9.

Figure 11:
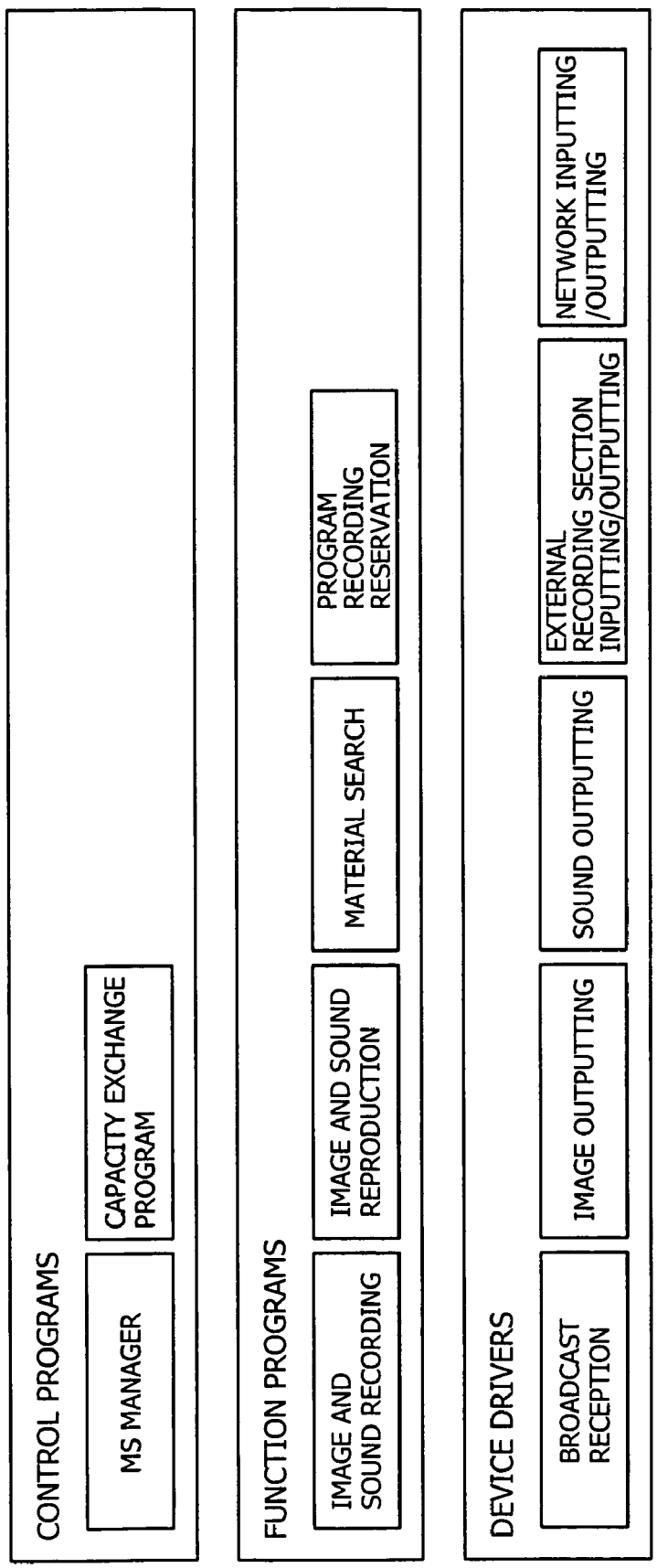
FIG. 11 is a diagrammatic view showing a software configuration of the hard disk recorder shown in FIG. 9.

The information processing apparatus (hard disk recorders) 1 and 2, that is, the information processing controllers 11 and 12, include, as the software configuration shown in FIG. 11, the MS manager and the capacity exchange program as the control programs. Further, the information processing controllers 11 and 12 include programs for image and sound recording, image and sound reproduction, material search, and program recording reservation as the function programs. Furthermore, the information processing controllers 11 and 12 include programs for broadcast reception, image outputting, sound outputting, external recording section inputting/outputting, and network inputting/outputting as the device drivers.

Figure 12:
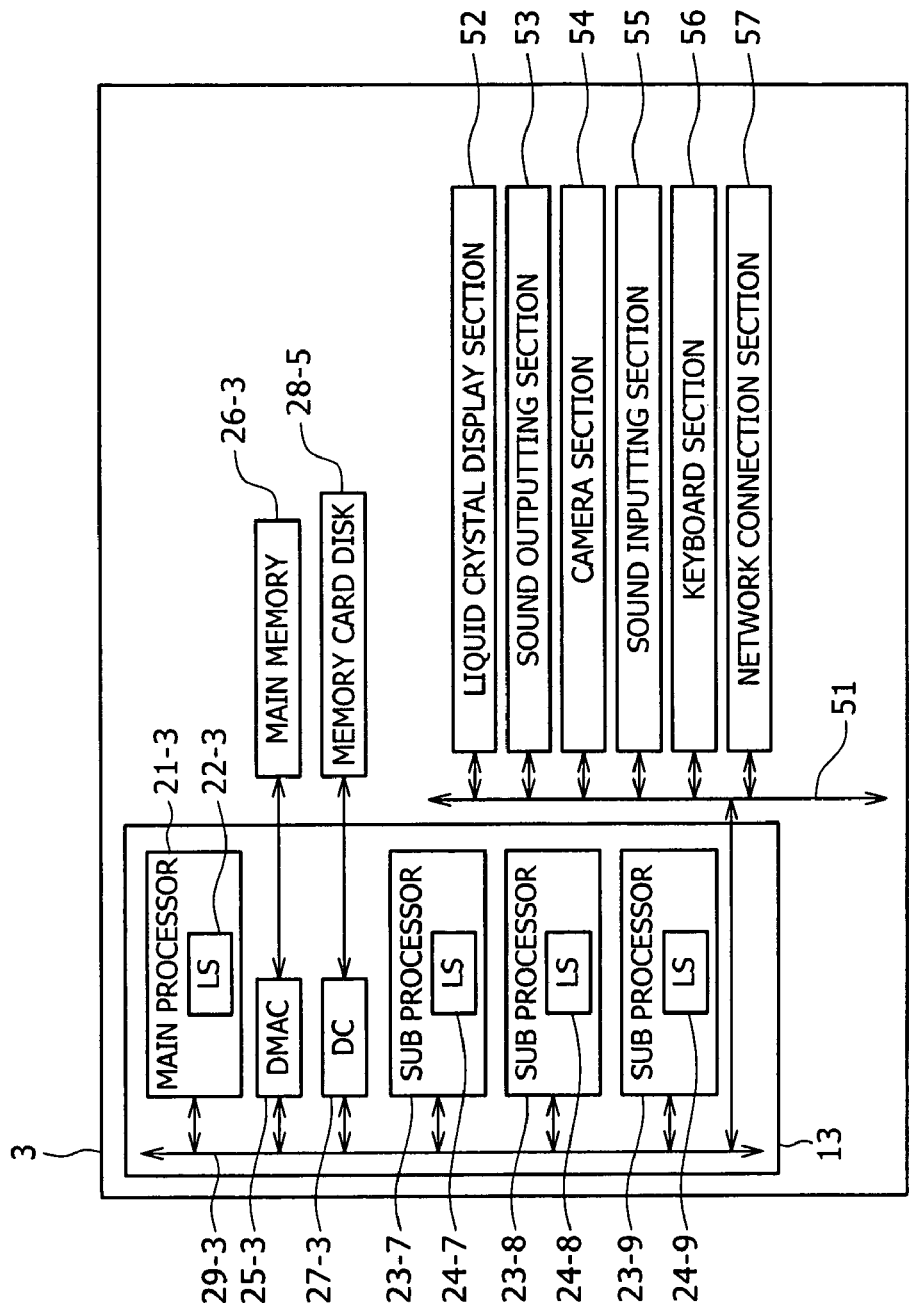
FIG. 12 is a block diagram showing a hardware configuration of a PDA shown in FIG. 9.

The information processing apparatus 3 in the example of FIG. 9, which includes the information processing controller 13, is a PDA (Personal Digital Assistant). FIG. 12 shows a hardware configuration of the information processing apparatus 3 formed as a PDA. Referring to FIG. 12, in the example shown, the information processing apparatus 3 includes the external recording section 28-5 shown in FIG. 1 into which a memory card disk can be loaded. The information processing apparatus 3 further includes a liquid crystal display section 52, a sound outputting section 53, a camera section 54, a sound inputting section 55, a keyboard section 56, and a network connection section 57 connected to a bus 51, which is in turn connected to the bus 29-3 of the information processing controller 13.

It is to be noted that the information processing controller 13 whose internal configuration is not shown in FIG. 1 includes a main processor 21-3, sub processors 23-7, 23-8, and 23-9, a direct memory access controller (DMAC) 25-3, a disk controller (DC) 27-3, and a bus 29-3. The main processor 21-3 includes a local storage (LS) 22-3, and the sub processors 23-7, 23-8, and 23-9 include local storages (LS) 27-7, 24-8, and 24-9, respectively.

Figure 13:
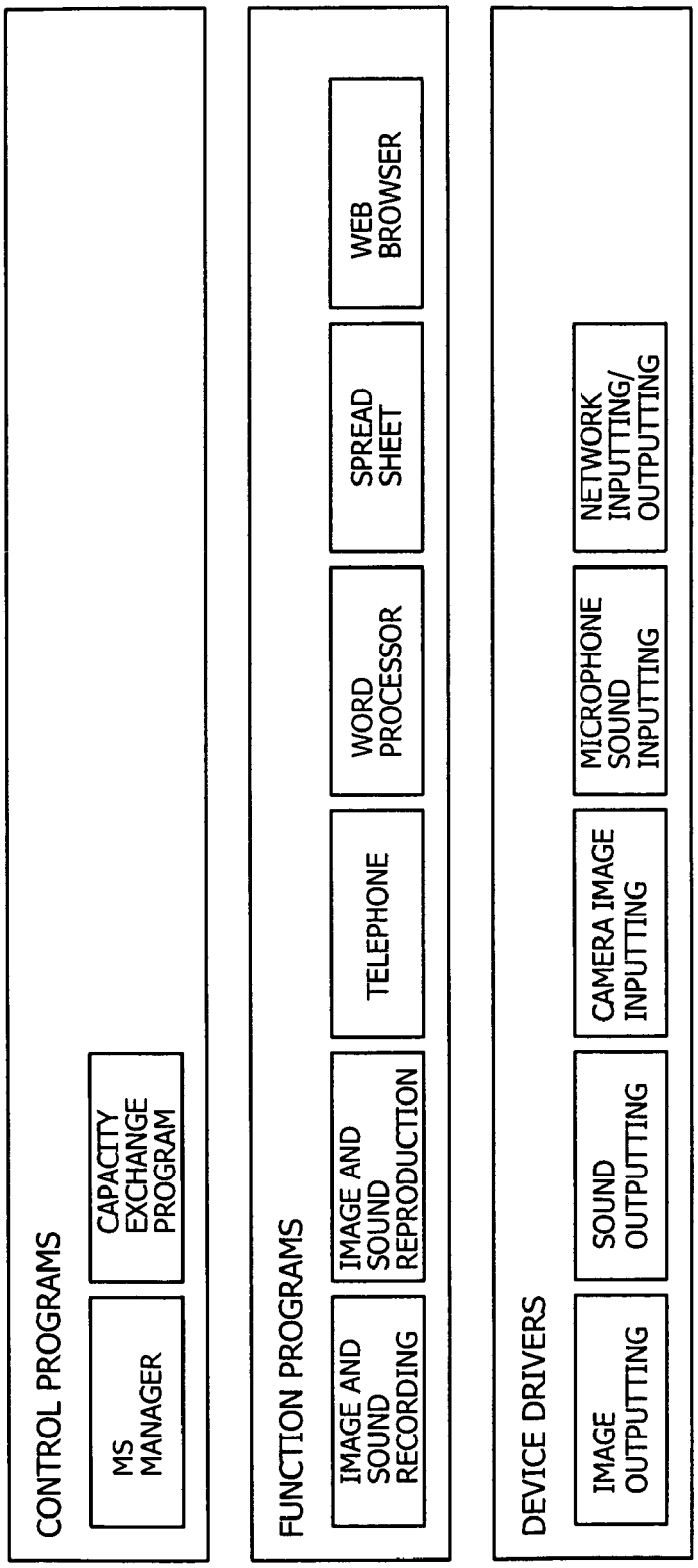
FIG. 13 is a diagrammatic view showing a software configuration of the PDA shown in FIG. 9.

FIG. 13 shows a software configuration of the information processing apparatus (PDA) 3, particularly the information processing controller 13. Referring to FIG. 13, the information processing controller 13 includes the MS manager and the capacity exchange program as the control programs. Further, the information processing controller 13 includes programs for image and sound recording, image and sound reproduction, telephone directory, word processor, and spreadsheet as the function programs, and includes a Web browser. Furthermore, the information processing controller 13 includes programs for image outputting, sound outputting, camera image inputting, microphone sound inputting, and network inputting/outputting as the device drivers.

Figure 14:
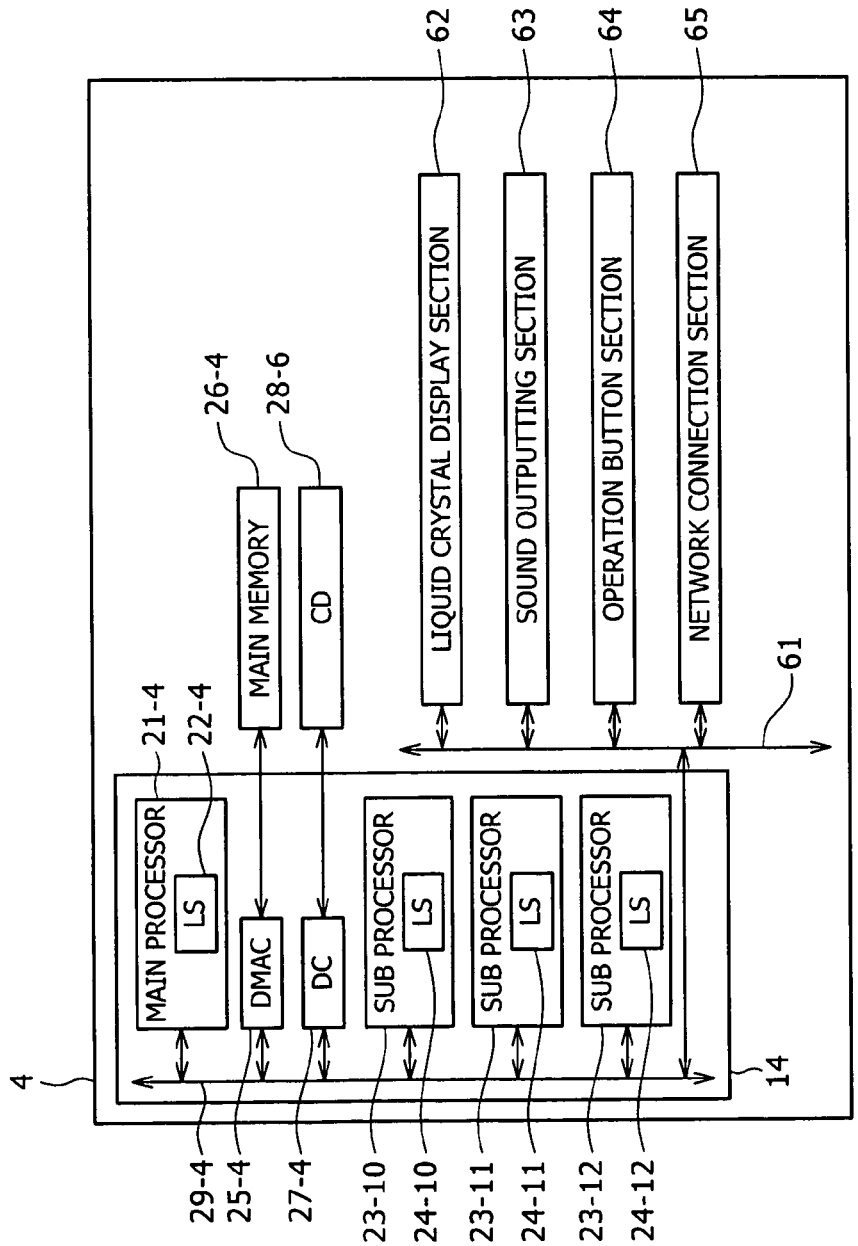
FIG. 14 is a block diagram showing a hardware configuration of a portable CD player shown in FIG. 9.

The information processing apparatus 4 shown in FIG. 9, which includes the information processing controller 14, is a portable CD player. FIG. 14 shows a hardware configuration of the information processing apparatus 4 in the form of a portable CD player. Referring to FIG. 14, the information processing apparatus 4 includes the external recording section 28-6 shown in FIG. 1 into which a CD (Compact Disc) can be loaded. The information processing apparatus 4 further includes a liquid crystal display section 62, a sound outputting section 63, an operation button section 64, and a network connection section 65 connected to a bus 61, which is in turn connected to the bus 29-4 of the information processing controller 14.

It is to be noted that the information processing controller 14 whose internal configuration is not shown in FIG. 1 includes a main processor 21-4, sub processors 23-10, 23-11, and 23-12, a direct memory access controller (DMAC) 25-4, a disk controller (DC) 27-4, and a bus 29-4. The main processor 21-4 includes a local storage 22-4, and the sub processors 23-10, 23-11, and 23-12 include local storages 24-10, 24-11, and 24-12, respectively.

Figure 15:
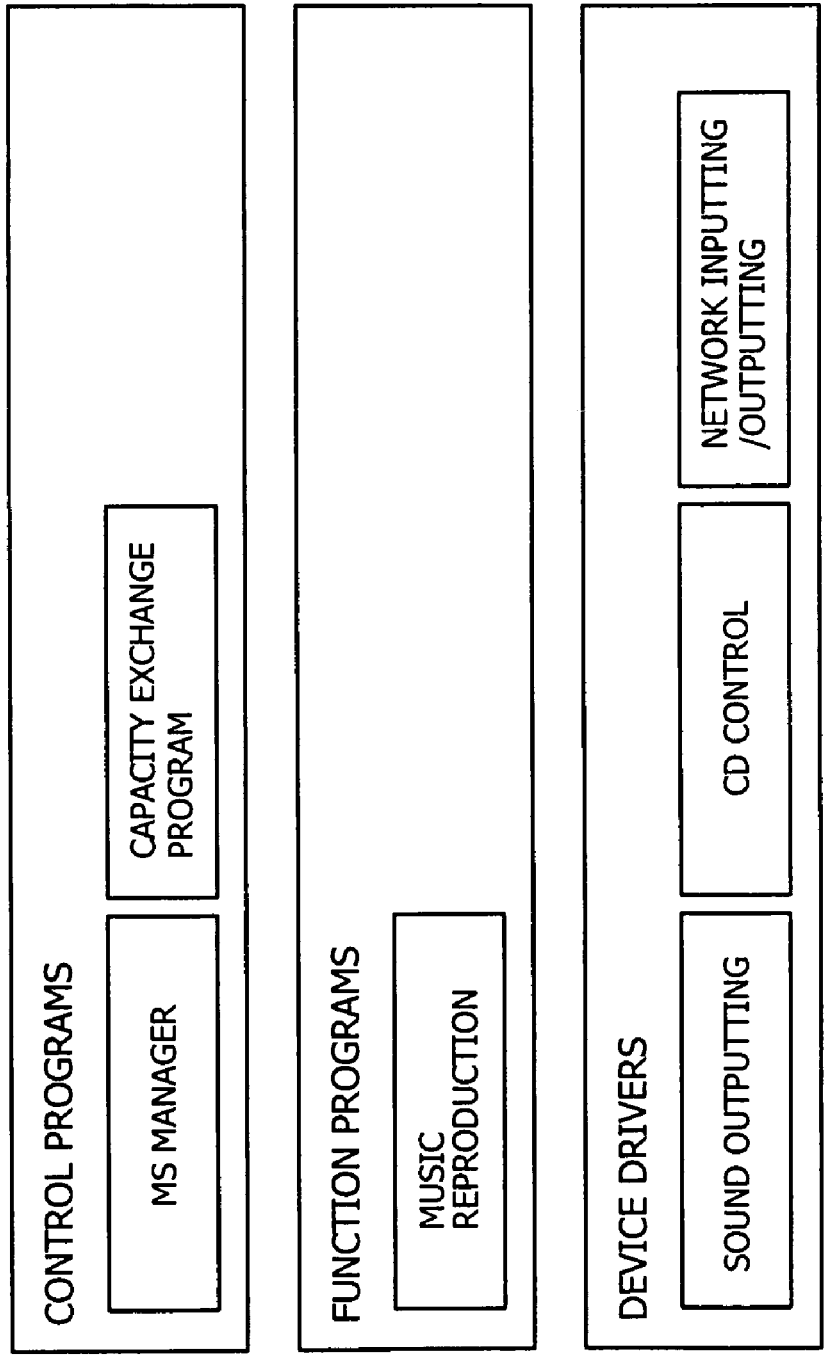
FIG. 15 is a diagrammatic view showing a software configuration of the portable CD player shown in FIG. 9.

FIG. 15 shows a software configuration of the information processing apparatus 4 in the form of a portable CD player, particularly the information processing controller 14. Referring to FIG. 15, the information processing controller 14 includes the MS manager and the capacity exchange program as the control programs. Further, the information processing controller 14 includes programs for music reproduction and so forth as the function programs and includes programs for sound outputting, CD control, and network inputting/outputting as the device drivers.

It is assumed that, in the network system shown in FIG. 9 and having such a configuration described above, the information processing apparatus 1, 3, and 4 are connected to the network 9, and the information processing apparatus 1 is set as the master apparatus (MS status=0) and the information processing apparatus 3 and 4 are set as slave apparatus (MS status=1).

If, in this state, the information processing apparatus 2 is newly connected to the network 9, then the MS manager which is executed in the main processor 21-2 included in the information processing controller 12 in the information processing apparatus 2 inquires the other information processing apparatus 1, 3 and 4 about the MS status and recognizes that the information processing apparatus 1 already exists as the master apparatus. Thus, the MS manager sets the self apparatus (information processing apparatus 2) as a slave apparatus (MS status=1). Meanwhile, the information processing apparatus 1 set as the master apparatus collects the apparatus information of the apparatus including the newly added information processing apparatus 2 and updates the apparatus information tables in the main memory 26-1 based on the collected apparatus information.

Operation of the network system of FIG. 9 when, in this state, the user operates the information processing apparatus (PDA) 3, which is a slave apparatus, for recording reservation of a broadcast program for two hours is described below.

In this instance, the information processing apparatus (PDA) 3, which is a slave apparatus, accepts inputting of recording reservation information including information of recording start time, recording end time, a recording object broadcast channel, and a recording picture quality, and produces a software cell including the recording reservation information and the recording reservation command as the DMA command. Then, the information processing apparatus 3 transmits the produced software cell to the information processing apparatus 1 which is the master apparatus.

The main processor 21-1 included in the information processing controller 11 in the information processing apparatus 1 which receives the software cell whose DMA command is the recording reservation command reads out the recording reservation command and refers to the apparatus information tables in the main memory 26-1 to specify an information processing apparatus which can execute the recording reservation command.

First, the main processor 21-1 reads out the information processing apparatus type IDs of the information processing apparatus 1, 2, 3 and 4 included in the apparatus information tables to extract those information processing apparatus which can execute a function program corresponding to the recording reservation command. Here, the information processing apparatus 1 and 2 having the information processing apparatus type ID indicative of the recording function are specified as candidate apparatus while the information processing apparatus 3 and 4 are excepted from candidate apparatus.

The main processor 21-1 included in the information processing controller 11 in the information processing apparatus 1 refers to the apparatus information tables to read out information regarding the apparatus such as the processing capacities of the main processors and sub processors and information regarding the main memories of the information processing apparatus 1 and 2, and discriminates whether or not the information processing apparatus 1 and 2 satisfy the required specifications necessary for execution of a function program corresponding to the recording reservation command. It is assumed here that both of the information processing apparatus 1 and 2 satisfy the required specifications necessary for execution of a function program corresponding to the recording reservation command.

Further, the main processor 21-1 refers to the apparatus information tables to read out the information regarding external recording sections of the information processing apparatus 1 and 2, and discriminates whether or not the free capacities of the external recording sections satisfy the capacity necessary for execution of the recording reservation command: Since the information processing apparatus 1 and 2 are hard disk recorders, the differences between the total capacities and the used capacities of the external recording sections 28-1 and 28-3 individually correspond to the free capacities.

In this instance, it is assumed that the free capacity of the external recording section 28-1 of the information processing apparatus 1 is 10 minutes when it is converted into a recording period of time and the free capacity of the hard disk 28-3 of the information processing apparatus 2 is 20 hours when it is converted into a recording period of time.

In this instance, the main processor 21-1 included in the information processing controller 11 in the information processing apparatus 1 which is the master apparatus specifies the information processing apparatus which can secure the free capacity for two hours necessary for execution of the recording reservation command as a slave apparatus of a destination of an execution request.

As a result, only the information processing apparatus 2 is selected as the execution request destination slave apparatus, and the main processor 21-1 included in the information processing controller 11 in the information processing apparatus 1 which is the master apparatus transmits the recording reservation command including the recording reservation information transmitted from the information processing apparatus 3 operated by the user to the information processing apparatus 2 to request the information processing apparatus 2 for recording reservation of the broadcast program for two hours described hereinabove.

Then, the main processor 21-2 included in the information processing controller 12 in the information processing apparatus 2 analyzes the recording reservation command and loads a function program necessary for recording from the hard disk 28-3, which is an external recording section, into the line memory 26-2. Then, the main processor 21-2 executes recording in accordance with the recording reservation information. As a result, image and sound data of the broadcast program for two hours reserved for recording are recorded on the hard disk 28-3 of the information processing apparatus 2.

In this manner, also in the network system shown in FIG. 9, the user can cause the plural information processing apparatus 1, 2, 3 and 4 to operate as a virtual single information processing apparatus 7 only by operating only one of the information processing apparatus without operating any other one of the information processing apparatus.

3. Distributed Processing 1 by Allocation of Sub Processors

In the distributed processing of the network system of FIG. 7 or 9 described above, when the information processing apparatus 1, which serves as the master apparatus, specifies information processing apparatus that can execute a function program, the network system includes an information processing apparatus satisfying all required specifications necessary to execute the function program. However, the network system may not include such information processing apparatus.

In the example of FIG. 9, the information processing apparatus 1 serving as the master apparatus finally specifies the information processing apparatus 2 as an information processing apparatus by which a function program corresponding to a recording reservation command is to be executed. However, the information processing apparatus 2 may not satisfy part of the required specifications necessary for execution of the function program. For example, the information processing apparatus 2 does not satisfy the requirement for a number of sub processors although it satisfies all of the other required specifications. Also in such an instance as just described, there is the possibility that the information processing apparatus 2 may be able to execute the function program making use of the load command or the kick command described hereinabove to utilize sub processors in a different information processing apparatus.

Thus, an example is described below wherein, when the master apparatus specifies an information processing apparatus by which a function program is to be executed, it specifies an information processing apparatus by which the function program is to be executed without taking the sub processor processing capacity of a candidate information processing apparatus into consideration.

In this instance, the function program specifies required specifications regarding an apparatus such as requirements for an information processing apparatus type ID, a processing capacity of a main processor or a sub processor, a main memory use capacity, and an external recording section, which are represented as the types of information illustrated in FIG. 4. When the master apparatus specifies an information processing apparatus by which the function program is to be executed, it specifies an information processing apparatus satisfying the required specifications other than the sub processor processing capacity. Accordingly, the information processing apparatus specified by the master apparatus and requested to execute the function program may not secure the processor processing capacity necessary to execute the function program in the information processing apparatus itself.

In the following, an example of distributed processing is described wherein the information processing apparatus requested to execute a function program in this manner utilizes sub processors of a different information processing apparatus included in the network system.

3-1. System Configuration

Figure 16:
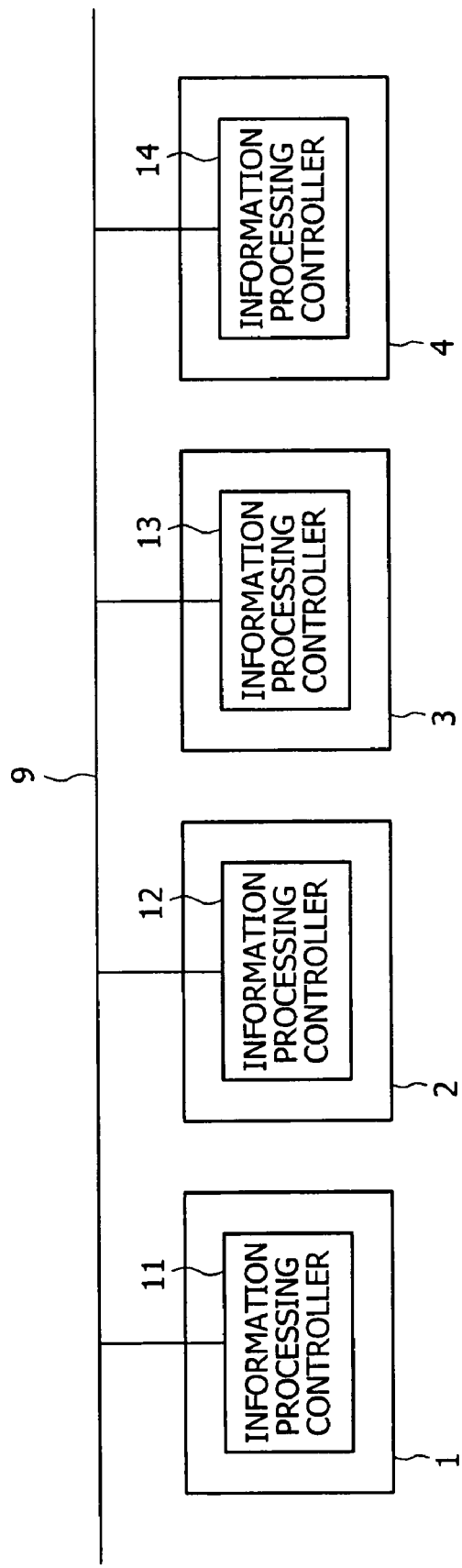
FIG. 16 is a diagrammatic view showing an example of a network system by which distributed processing by allocation of sub processors is executed.

FIG. 16 shows a network system wherein four information processing apparatus 1, 2, 3, and 4 are connected to a network 9.

The information processing apparatus 1 operates as a master apparatus while the information processing apparatus 2, 3, and 4 operate each as a slave apparatus, and it is assumed that the information processing apparatus 1 specifies the information processing apparatus 1 itself as an information processing apparatus by which a function program is to be executed.

Figure 17:
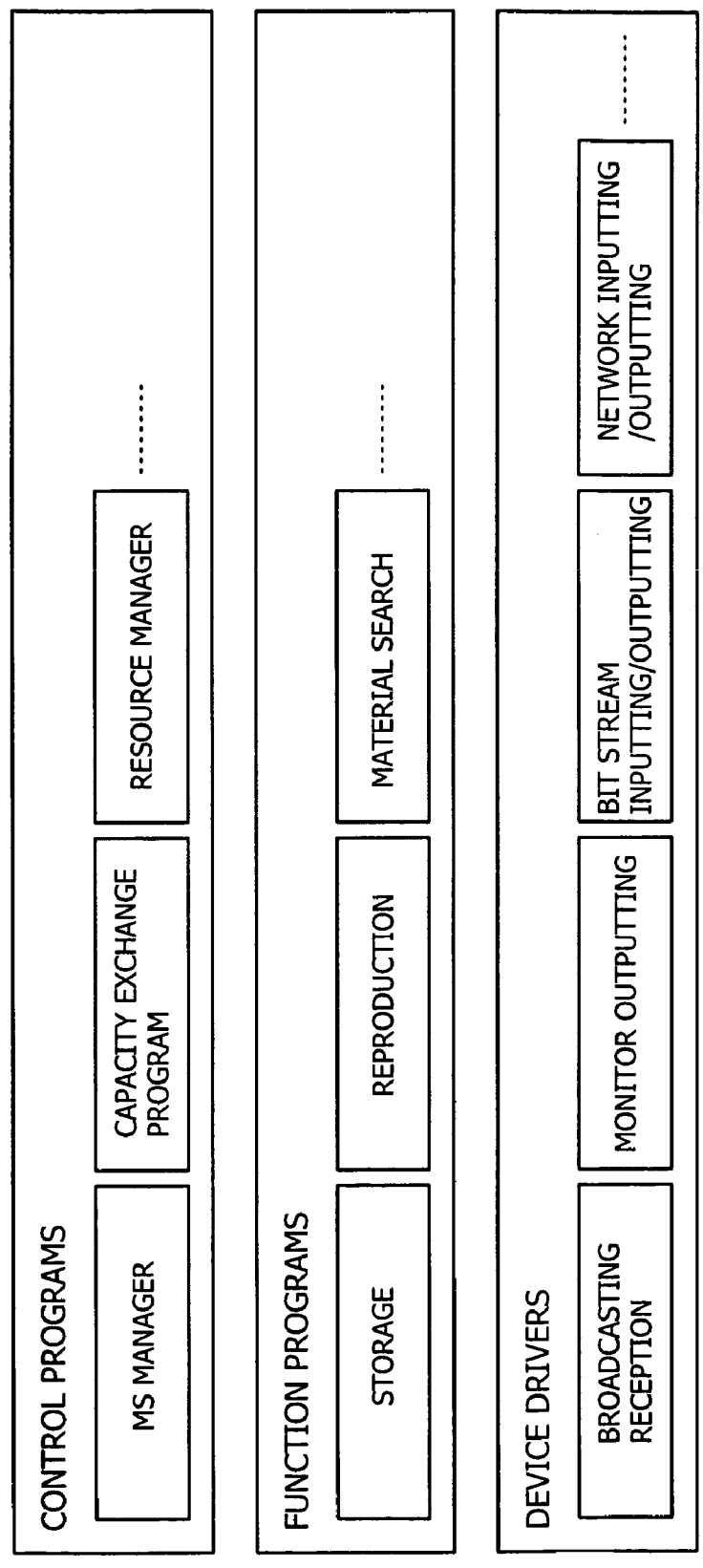
FIG. 17 is a diagrammatic view illustrating an example of a software configuration of an information processing apparatus.

The information processing apparatus 1, 2, 3, and 4 connected to the network 9 have such a software configuration as illustrated in FIG. 17. Referring to FIG. 17, each of the information processing apparatus 1, 2, 3, and 4 includes not only the MS manager and the capacity exchange program described hereinabove with reference to FIG. 6 but also a resource manager as the control programs.

The resource manager controls sub processors in the self apparatus to perform transfer of a program and data, starting and stopping of execution of a program, reception of a result of the execution of the program, and so forth.

Further, the resource manager grasps a use situation of the sub processors in the self apparatus and issues a response to an inquiry from any other information processing apparatus or issues an inquiry about a use situation of sub processors of the other information processing apparatus to them.

To this end, the resource manager prepares such a sub processor management table as illustrated in FIG. 18.

The sub processor management table of FIG. 18 is for a case wherein the information processing controller in each of the information processing apparatus includes several or more sub processors. Referring to FIG. 18, the information processing apparatus ID in the sub processor management table is an information processing apparatus ID of the self apparatus. Further, the sub processor apparatus ID is a sub processor ID of each of the sub processors in the self apparatus and the sub processor status indicates a use situation of each sub processor.

The sub processor status may be one of an unused status (status wherein the sub processor is not currently used nor is reserved for use), a reserved status (status wherein the sub processor is not currently used but is reserved for use), and a busy status (status wherein the sub processor is currently used) as described hereinabove.

As hereinafter described, the unused status is referred to as a free state, and whether a sub processor is free, that is, whether a sub processor is in the unused status, reserved status, or busy status, is referred to as a free situation.

The sub processor program ID is an identifier for identification of a sub processor program, which is being executed or is reserved for execution in the sub processor. The function program ID is an identifier for identification of a function program, which operates cooperatively with the sub processor program indicated by the sub processor program ID at the upper stage.

The sub processor program priority is a priority of the sub processor program being currently executed or reserved for execution. The sub processor program priority is determined in advance in accordance with the priority of the function program, which is to operate cooperatively with the sub processor program, and is divided, for example, into three stages of high (high priority), middle (middle priority), and low (low priority).

The lock sequence number is issued by the resource manager when a sub processor is to be secured or in a like case as hereinafter described and is described into the sub processor management table. The resource manager permits use of a sub processor only when a sub processor program ID and a lock sequence number received from a function program coincide with those described in the sub processor management table.

3-2. Sub Processor Allocation Process

It is assumed that, in the network system of FIG. 16, the information processing apparatus 1 operates as a master apparatus and the information processing apparatus 2, 3, and 4 operate each as a slave apparatus, and the information processing apparatus 1 serving as the master apparatus specifies the information processing apparatus 1 itself as an information processing apparatus by which a function program is to be executed.

In the following, an example of a sub processor allocation process executed by a function program in the main memory 26-1 of the information processing apparatus 1, the resource manager in the information processing apparatus 1 and the resource managers in the information processing apparatus 2, 3, and 4 when the information processing apparatus 1 secures sub processors in the information processing apparatus 1 itself or the other information processing apparatus 2, 3, and 4 for execution of sub processor programs, which operate cooperatively with the function program in the main memory 26-1 of the information processing apparatus 1 itself, is described with reference to FIGS. 19 to 27.

Figure 19:
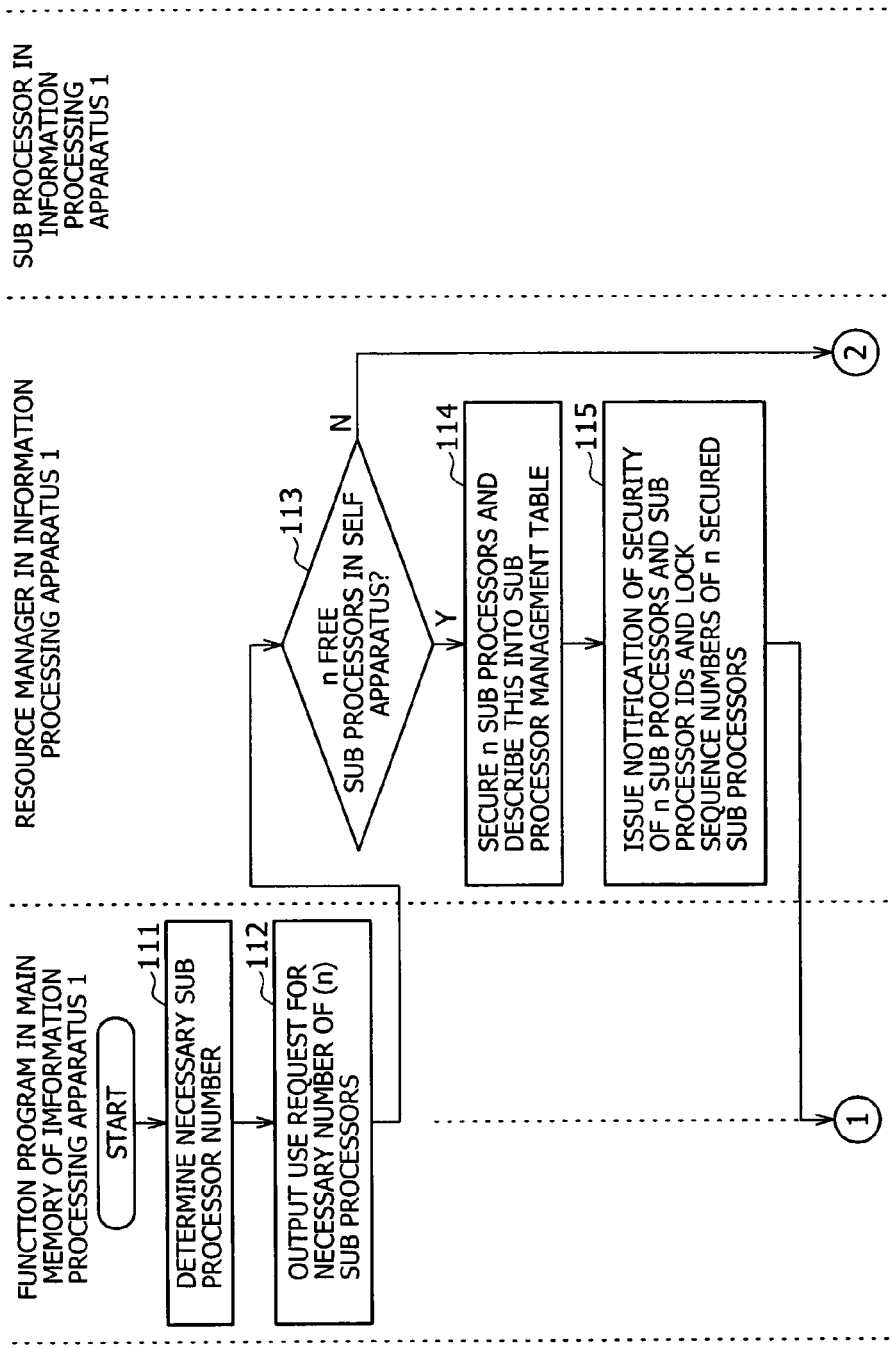

Referring first to FIG. 19, the function program in the main memory 26-1 of the information processing apparatus 1 first determines the number of sub processors necessary for execution of a sub processor program at step 111. Then at step 112, the function program outputs a request for use of the necessary number (represented by n) of sub processors to the resource manager in the self apparatus (information processing apparatus 1) attaching the function program ID of the function program and sub processor program IDs and sub processor program priorities of all of sub processor programs which are to operate cooperatively with the function program.

In response to the request, the resource manager in the information processing apparatus 1 refers, at step 113, to the sub processor management table shown in FIG. 18 of the self apparatus (information processing apparatus 1) to determine whether or not n free sub processors are available in the self apparatus. If n or more free sub processors are available in the self apparatus, then the processing advances from step 113 to step 114. At step 114, the resource manager secures n sub processors in the self apparatus and, for each of the secured sub processors, rewrites the sub processor status in the sub processor management table from unused to reserved and rewrites the sub processor program ID, function program ID, and sub processor program priority so that they coincide with those of the sub processor program to be executed by the secured sub processor. Further, the resource manager issues lock sequence numbers and describes them into the sub processor management tables.

Thereafter, the processing advances to step 115, at which the resource manager in the information processing apparatus 1 issues a notification of the fact that n sub processor programs are secured in the self apparatus and of the sub processor ID, sub processor program ID, and lock sequence number of each of the n secured sub processors to the function program.

Figure 20:
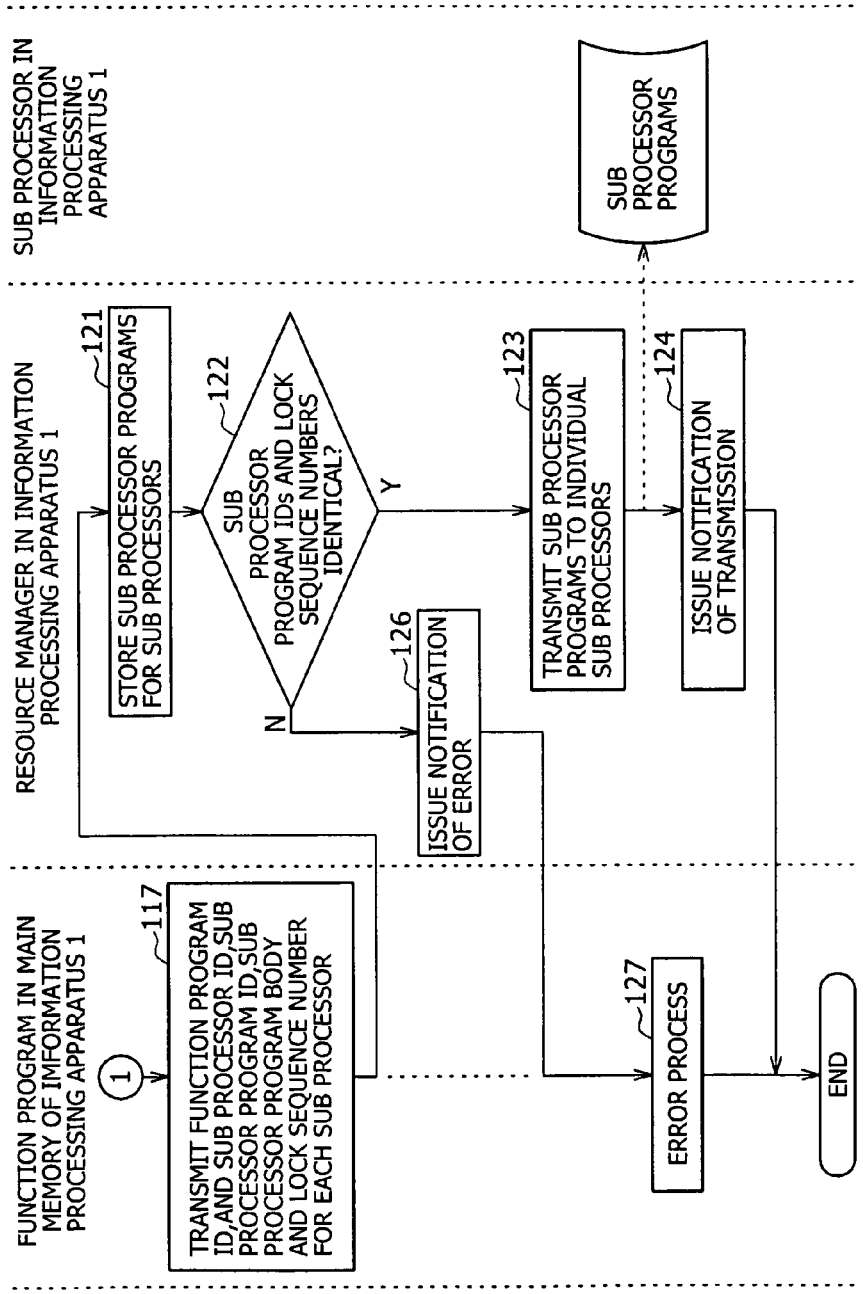

Referring now to FIG. 20, at step 117, the function program receives the notification from the resource manager and transmits a number of sub processor IDs, sub processor program IDs, sub processor program bodies, and lock sequence numbers for the secured sub processors equal to the number of secured sub processors together with the function program ID of the function program itself to the resource manager in the self apparatus (information processing apparatus 1).

At step 121, the resource manager in the information processing apparatus 1 receives the information transmitted from the function program and stores the sub processor programs for the sub processors. Then at step 122, the resource manager in the information processing apparatus 1 determines whether or not the received processor program IDs and lock sequence numbers are same as those in the sub processor management table of the self apparatus. If they are same, then the processing advances to step 123, at which the resource manager in the information processing apparatus 1 transmits the sub processor programs to the secured sub processors. Then at step 124, the resource manager in the information processing apparatus 1 issues a notification to the function program that the sub processor programs are transmitted to the sub processors.

The sub processor allocation process where a necessary number of sub processors can be secured only among free sub processors in the information processing apparatus 1 is completed thereby.

Data to be processed by each of the secured sub processors is transmitted to the secured sub processor simultaneously with the transmission of the sub processor program or after transmission of the sub processor program. Consequently, each of the secured sub processors can execute the sub processor program.

If the resource manager in the information processing apparatus 1 determines at step 122 that the sub processor program IDs or the lock sequence numbers received from the function program are different from those in the sub processor management table of the self apparatus, then the processing advances from step 122 to step 126, at which the resource manager in the information processing apparatus 1 issues a notification of an error to the function program.

In this instance, the function program executes an error process at step 127. The error process may particularly be execution of the sub processor allocation process again beginning with step 112.

Figure 21:
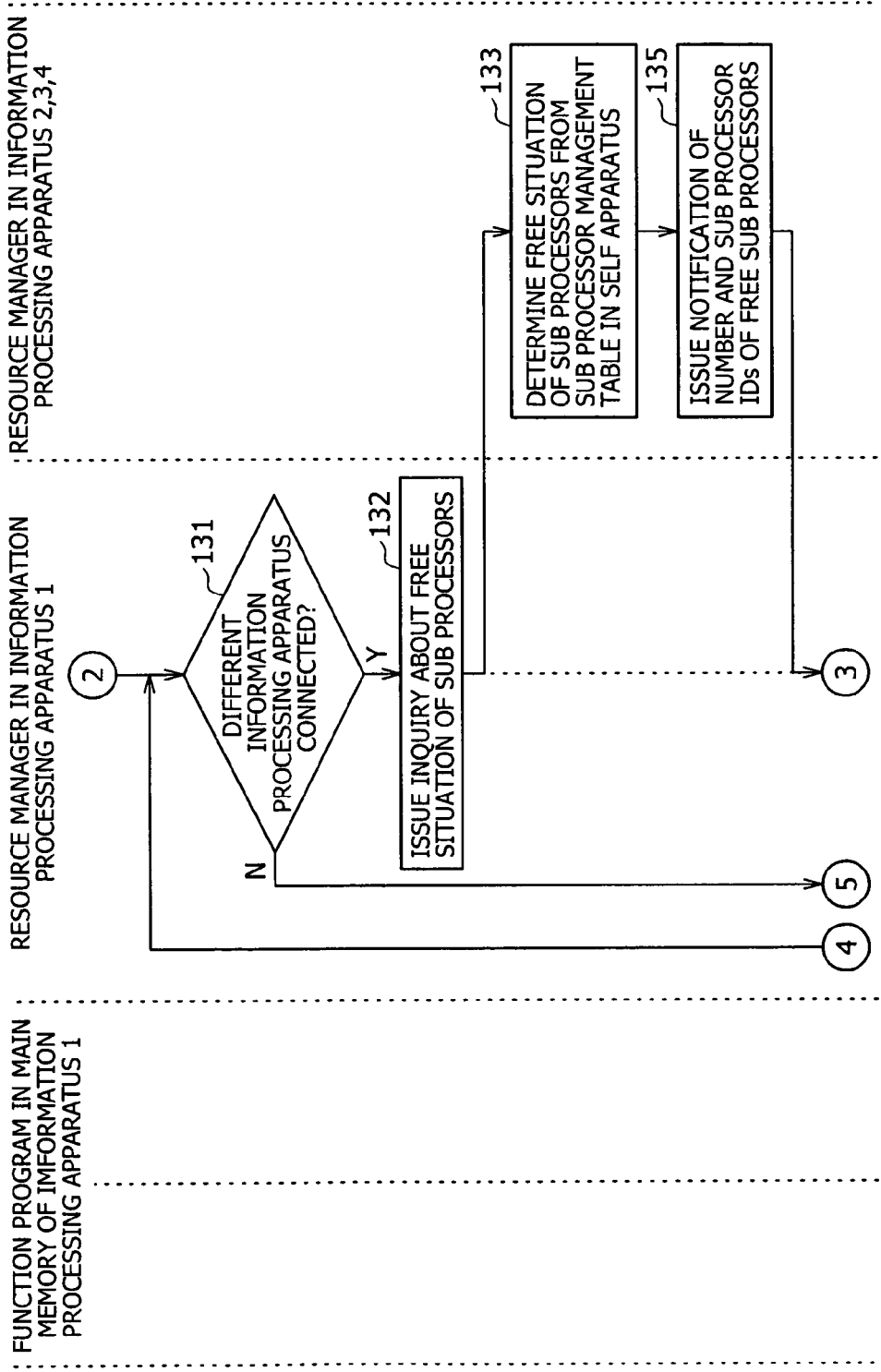

On the other hand, if the resource manager in the information processing apparatus 1 determines at step 113 of FIG. 19 that n free sub processors are not available in the self apparatus, that is, the information processing apparatus 1 includes only n−1 free sub processors or less (including zero), then the processing advances from step 113 to step 131 illustrated in FIG. 21. Referring now to FIG. 21, at step 131, the resource manager in the information processing apparatus 1 determines whether or not some different information processing apparatus is connected to the network. FIG. 16 shows that the different information processing apparatus 2, 3, and 4 are connected.

Then, if one or more different information processing apparatus are connected to the network, then the processing advances from step 131 to step 132, at which the resource manager in the information processing apparatus 1 issues an inquiry about a free situation of sub processors to the resource manager in one of the different information processing apparatus (in the present case, the information processing apparatus 2).

Figure 28A:
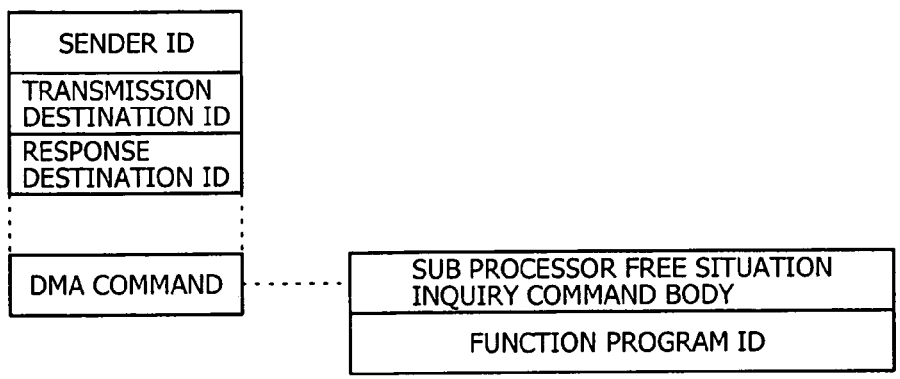
FIGS. 28A and 28B are views illustrating an example of a sub processor free situation inquiry command and a sub processor free situation return command, respectively.

The inquiry is conveyed using such a sub processor free situation inquiry command as illustrated in FIG. 28A. Referring to FIG. 28A, the sub processor free situation inquiry command includes a sender ID (in this instance, the information processing apparatus ID of the information processing apparatus 1), a transmission destination ID (in this instance, the information processing apparatus ID of the information processing apparatus 2), and a response destination ID (in this instance, the information processing apparatus ID of the information processing apparatus 1). The sub processor free situation inquiry command further includes, as a DMA command, a sub processor free situation inquiry command body and a function program ID.

Referring back to FIG. 21, in response to the inquiry from the resource manager in the information processing apparatus 1, the resource manager in the different information processing apparatus (in this instance, the information processing apparatus 2) determines a free situation of the sub processors in the self apparatus from the sub processor management table in the self apparatus at step 133. Then at step 135, if free sub processors are available in the self apparatus, then the resource manager in the different information processing apparatus issues a notification of the number and the sub processor IDs of the free sub processors to the resource manager in the information processing apparatus 1. However, if no free sub processors are available in the self apparatus, then the resource manager in the different information processing apparatus issues a notification of this to the resource manager in the information processing apparatus 1.

Figure 28B:
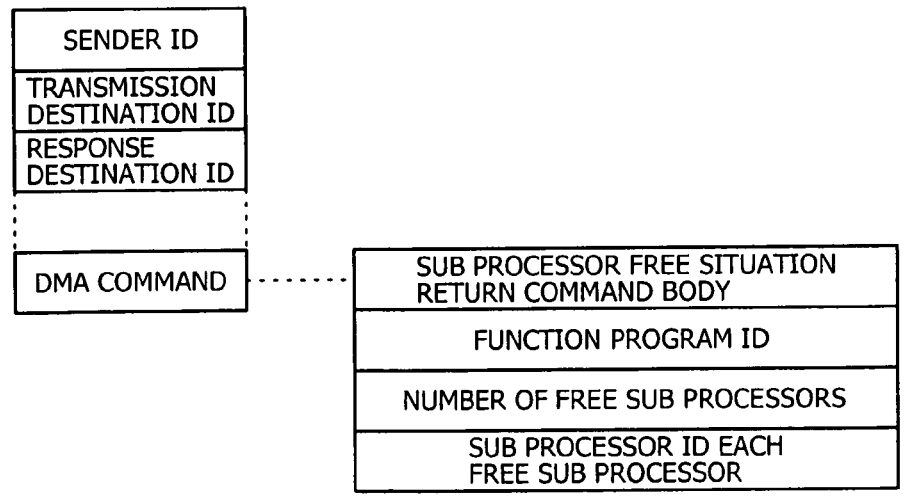

The notification is conveyed using such a sub processor free situation return command as illustrated in FIG. 28B. Referring to FIG. 28B, the sub processor free situation return command includes a sender ID (in this instance, the information processing apparatus ID of the information processing apparatus 2), a transmission destination ID (in this instance, the information processing apparatus ID of the information processing apparatus 1), and a response destination ID (in this instance, the information processing apparatus ID of the information processing apparatus 1). The sub processor free situation return command further includes, as a DMA command, a sub processor free situation return command body, a function program ID, the number of free sub processors, and the sub processor IDs of the free sub processors.

Figure 22:
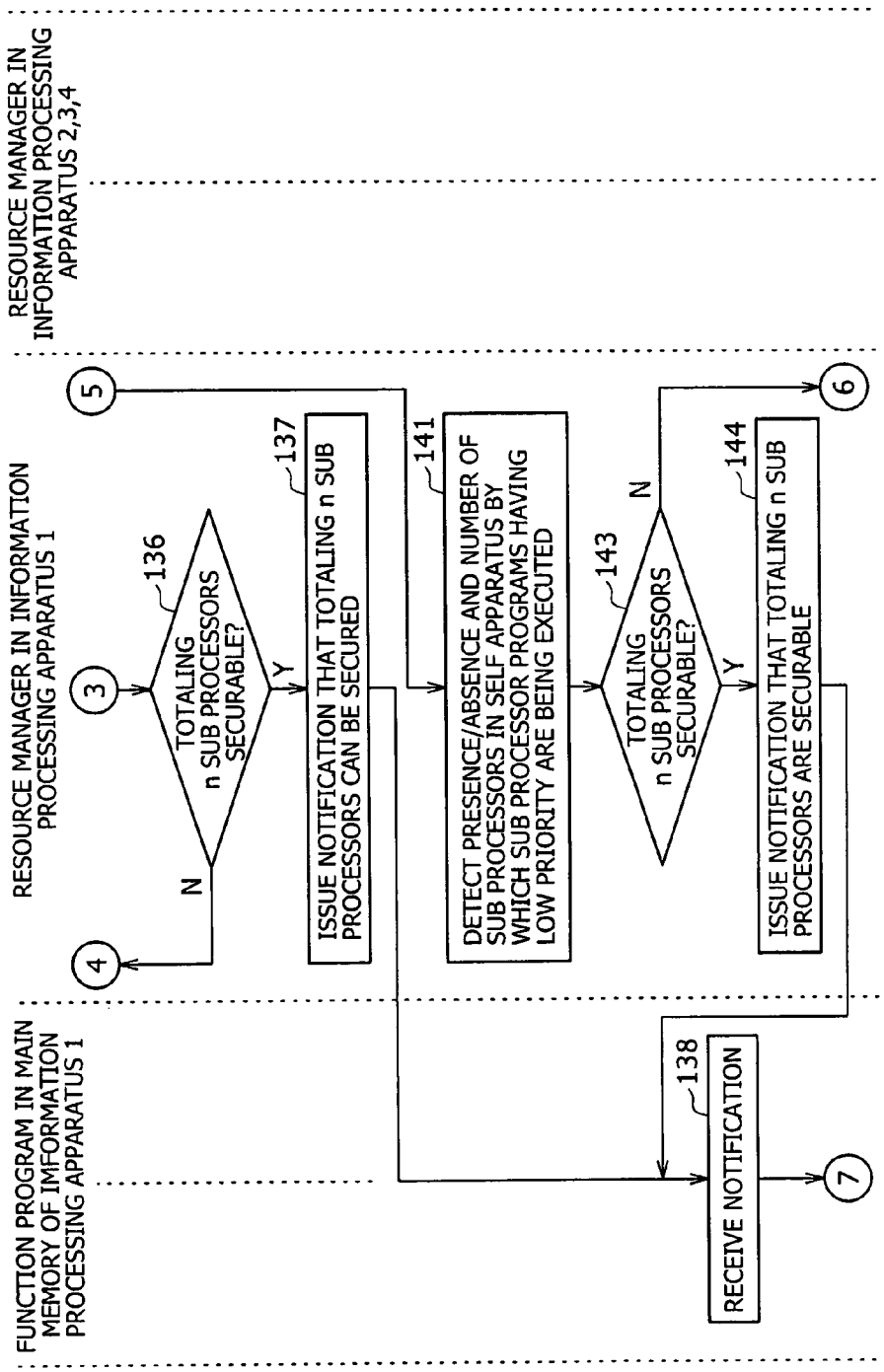

The resource manager in the information processing apparatus 1 receives the notification and determines at step 136 illustrated in FIG. 22 whether or not totaling n sub processors can be secured including the free sub processors in the self apparatus (information processing apparatus 1) and the free sub processors in the different apparatus (information processing apparatus 2).

Where n is such a comparatively great number as, for example, 8, 9, or 10, if only one sub processor can be secured in the information processing apparatus 1 and only n–2 sub processors can be secured in the information processing apparatus 2, then totaling n sub processors cannot be secured.

If totaling n sub processors cannot be secured in this manner, then the resource manager in the information processing apparatus 1 advances (returns) the processing from step 136 to step 131 in FIG. 21, at which it determines whether or not another different information processing apparatus is connected to the network. FIG. 16 shows that the different information processing apparatus 3 and 4 are connected to the network.

Thereafter, the processes at steps 132, 133, 135, 136, and 131 are repeated similarly as in the case of the information processing apparatus 2 described above until after n sub processors are secured successfully over the entire network system or until after it is detected that any more information processing apparatus is not connected to the network.

Where a plurality of information processing apparatus are connected to the network in addition to the information processing apparatus 1, the order in which the resource manager in the information processing apparatus 1 issues an inquiry about a free situation of sub processors to the different information processing apparatus may be determined, for example, in a similar manner as in the determination method of a master apparatus described hereinabove. In particular, it is a possible idea to replace the information processing apparatus IDs of the individual information processing apparatus on the network with numerical values and issue an inquiry about a free situation of sub processors in the ascending order of the numerical value to the information processing apparatus.

Then, if n sub processors can be secured from among free sub processors over the entire network system, then the processing advances from step 136 to step 137 as seen in FIG. 22. At step 137, the resource manager in the information processing apparatus 1 issues a notification to the function program that n sub processors can be secured.

At step 138, the function program receives the notification and outputs a sub processor securing request to the resource manager in the self apparatus (information processing apparatus 1) as hereinafter described.

On the other hand, if the resource manager in the information processing apparatus 1 determines at step 131 of FIG. 21 that no more information processing apparatus is connected to the network, that is, if it determines that n sub processors cannot be secured from among free sub processors in the entire network system (where only the information processing apparatus 1 is connected to the network, only in the information processing apparatus 1), then the processing advances from step 131 to step 141 illustrated in FIG. 22. Referring to FIG. 22, at step 141, the resource manager in the information processing apparatus 1 determines whether or not the apparatus itself (information processing apparatus 1) includes those sub processors executing sub processor programs which have a priority lower than that of the function program and, if such sub processors exist, detects the number of such sub processors.

The "executing" in this instance includes not only a case wherein sub processors are busy (currently used) but also another case wherein sub processors are reserved (although the sub processors are not used at present, they are reserved for use). In the following description, a sub processor program having a priority lower than that of the function program is referred to simply as "sub processor program having a lower priority".

Then at step 143, the resource manager in the information processing apparatus 1 determines whether or not totaling n sub processors can be secured including the free sub processors in the entire network system and the sub processors executing sub processor programs having a lower priority in the self apparatus (information processing apparatus 1). If such n sub processors can be secured, then the processing advances from step 143 to step 144, at which the resource manager in the information processing apparatus 1 issues a notification to the function program that n sub processors can be secured.

At step 138, the function program receives the notification and outputs a sub processor securing request to the resource manager in the self apparatus (information processing apparatus 1) as hereinafter described.

Figure 23:
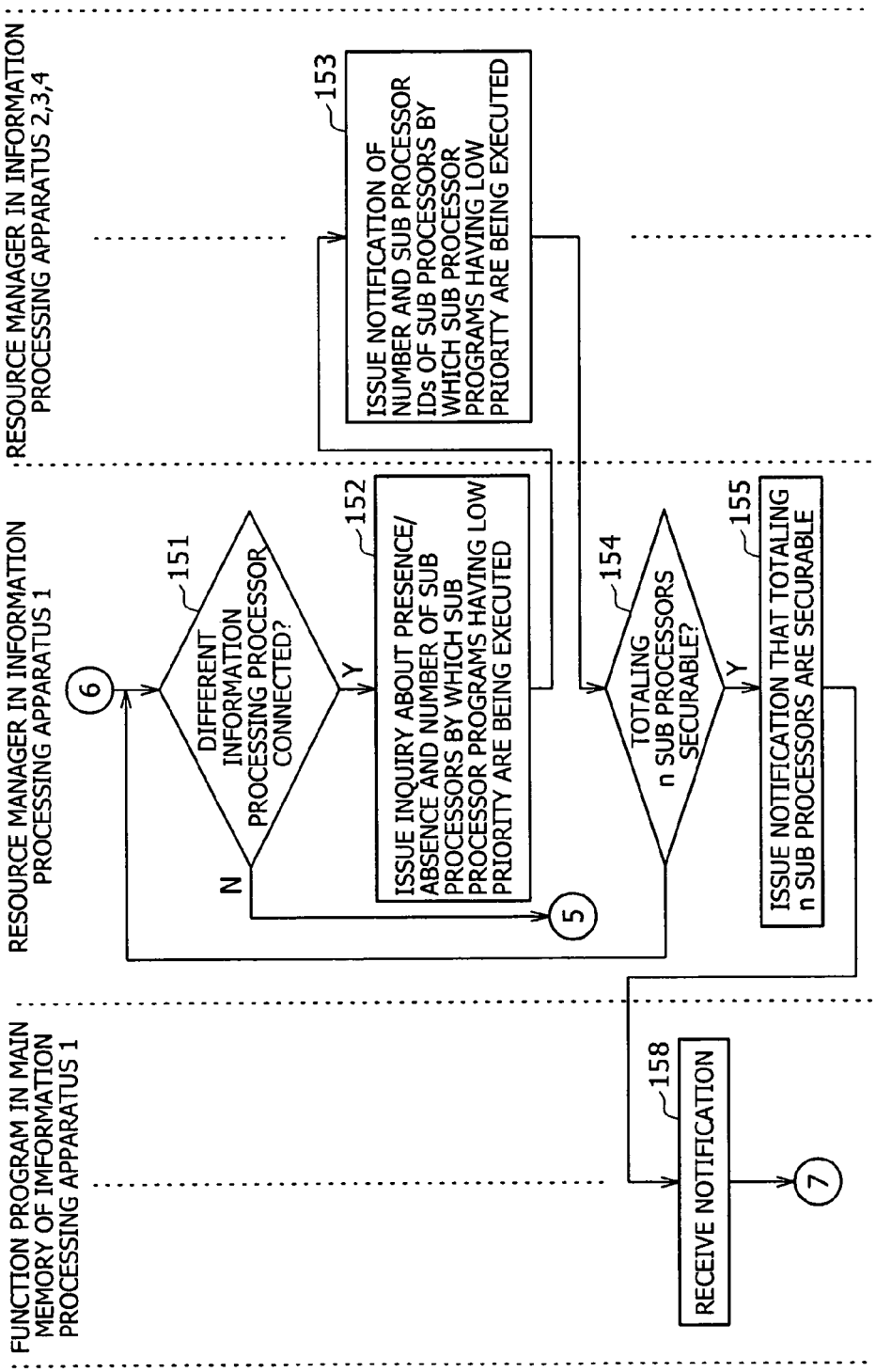

On the other hand, if the resource manager in the information processing apparatus 1 determines at step 143 that totaling n sub processors cannot be secured including the free sub processors in the entire network system and the sub processors executing sub processor programs having a lower priority in the self apparatus (information processing apparatus 1), then the processing advances from step 143 to step 151 illustrated in FIG. 23. Referring to FIG. 23, at step 151, the resource manager in the information processing apparatus 1 determines whether or not a different information processing apparatus is connected to the network.

If a different information processing apparatus is connected to the network, then the processing advances from step 151 to step 152, at which the resource manager in the information processing apparatus 1 issues an inquiry about presence or absence of those sub processors, which are executing sub processor programs having a lower priority, and the number of such sub processors to the resource manager in the different information processing apparatus (in this instance, the information processing apparatus 2). Also the "executing" in this instance includes not only the busy status but also the reserved status.

The inquiry is conveyed using a command which includes such a sub processor free situation inquiry command as described hereinabove with reference to FIG. 28A and the sub processor program priority of the sub processor program which is to operate cooperatively with the function program.

In response to the inquiry, the resource manager in the different information processing apparatus (in this instance, the information processing apparatus 2) determines at step 153 whether or not the self apparatus includes those sub processors which are executing sub processor programs having a lower priority from the sub processor management table in the self apparatus. If such sub processors are present, then the resource manager in the different information processing apparatus issues a notification of the number and the sub processor IDs of the sub processors to the resource manager in the information processing apparatus 1. However, if the self apparatus does not include those sub processors which are executing sub processor programs having a lower priority, then the resource manager in the different information processing apparatus issues a notification of this to the resource manager in the information processing apparatus 1.

The notification is conveyed using a command which includes such a sub processor free situation return command as described hereinabove with reference to FIG. 28B but describes the number and the sub processor IDs of sub processors which are each executing a sub processor program having a lower priority in place of the number and the sub processor IDs of free sub processors.

In response to the notification, the resource manager in the information processing apparatus 1 determines at step 154 in FIG. 23 whether or not n sub processors can be secured including the free sub processors in the entire network system and the sub processors which are executing sub processor programs having a lower priority in the self apparatus (information processing apparatus 1) and the different apparatus (in this instance, the information processing apparatus 2).

For example, where n=7, if the entire network system includes only two free sub processors and the information processing apparatus 1 includes only two sub processors which are executing sub processor programs having a lower priority while the information processing apparatus 2 includes only two sub processor which are executing sub processor programs having a lower priority, then the totaling n sub processors cannot be secured.

If totaling n sub processors cannot be secured in this manner, then the resource manager in the information processing apparatus 1 advances (returns) the processing from step 154 to step 151, at which it is determined whether or not a further different information processing apparatus is connected to the network.

Thereafter, the processes at steps 152, 153, 154 and 151 are repeated similarly as in the case of the information processing apparatus 2 described above until after n sub processors are secured successfully over the entire network system or until after it is detected that any more information processing apparatus is not connected to the network.

Then, if n sub processors can be secured in the entire network system including free sub processors and those sub processors which are executing sub processor programs having a lower priority, then the processing advances from step 154 to step 155. At step 155, the resource manager in the information processing apparatus 1 issues a notification that n sub processors can be secured to the function program.

At step 158, the function program receives the notification and outputs a sub processor securing request to the resource manager in the self apparatus (information processing apparatus 1) in the following manner.

In particular, if the function program receives, at step 138 of FIG. 22 or step 158 of FIG. 23, the notification that n sub processors can be secured from the resource manager in the information processing apparatus 1, then it outputs a request to secure n sub processors to the resource manager in the self apparatus (information processing apparatus 1) at step 161 as seen in FIG. 24.

Referring now to FIG. 24, in response to the securing request, the resource manager in the information processing apparatus 1 secures, if the self apparatus (information processing apparatus 1) includes sub processors to be secured, such sub processors in the self apparatus at step 162. Then at step 163, the resource manager in the information processing apparatus 1 determines whether or not some sub processors should be secured in a different information processing apparatus. If no sub processor should be secured in a different information processing apparatus, then the processing advances from step 163 to step 164, at which the resource manager in the information processing apparatus 1 issues a notification to the function program that n sub processors are secured.

Where n sub processors can be secured if, although n sub processors cannot be secured only from free sub processors in the information processing apparatus 1 and no other information processing apparatus than the information processing apparatus 1 is connected to the network, those sub processors which are executing sub processor programs having a lower priority in the information processing apparatus 1 are included, n sub processors are secured only in the information processing apparatus 1.

In this instance, the resource manager in the information processing apparatus 1 rewrites, for those of the sub processors secured in the self apparatus whose sub processor status in the sub processor management table of the self apparatus is the unused, the sub processor status from the unused to the reserved. Further, the resource manager in the information processing apparatus 1 rewrites, for each of the sub processors secured in the self apparatus, the sub processor program ID, function program ID and sub processor program priority in the sub processor management table of the self apparatus so as to coincide with those of the sub processor program to be executed by the secured sub processor. Furthermore, the resource manager in the information processing apparatus 1 issues, for each of the sub processors secured in the self apparatus, a lock sequence number and describes the lock sequence number in the sub processor management table. Then at step 164, the resource manager in the information processing apparatus 1 transmits the information mentioned to the function program.

The information to be transmitted at step 164 particularly includes the number of secured sub processors and the sub processor IDs and the lock sequence numbers of the secured sub processors.

As seen in FIG. 24, at step 167, the function program receives the sub processor securing notification and transmits sub processor programs for the sub processors to the resource manager in the self apparatus (information processing apparatus 1) as hereinafter described.

It is to be noted that, if sub processors which are executing sub processor programs having a lower priority in the self apparatus are secured as sub processors for execution of sub processor programs for operating cooperatively with the function program at step 162, then the resource manager in the information processing apparatus 1 issues a notification to the sub processor programs having a lower priority and a function program or programs which operate cooperatively with the sub processor programs having a lower priority that the sub processors have been taken away.

On the other hand, if n sub processors to be secured include those sub processors which are to be secured in a different information processing apparatus, then the processing advances from step 163 to step 171. At step 171, the resource manager in the information processing apparatus 1 issues a request to secure sub processors to the resource managers in the information processing apparatus 2, 3 and 4. At step 172, each of the resource managers in the information processing apparatus 2, 3 and 4 secures sub processors required for the self apparatus in the self apparatus.

Figure 29A:
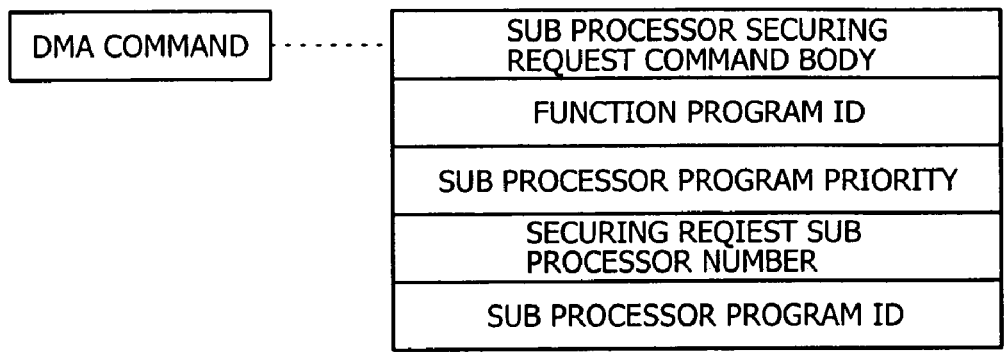
FIGS. 29A and 29B are views illustrating an example of a sub processor securing request command and a sub processor securing return command, respectively.

The request to secure sub processors to any different information processing apparatus is conveyed using such a software cell which includes a sub processor securing request command as the DMA command as seen in FIG. 29A. In particular, referring to FIG. 29A, the sub processor securing request command includes a sub processor securing request command body, a function program ID, a sub processor program priority, a securing request sub processor number and a number of sub processor program IDs equal to the number of sub processors requested to secure.

Where n sub processors can be secured if, although n sub processors cannot be secured only from free sub processors in the information processing apparatus 1, one or more different information processing apparatus are connected to the network in addition to the information processing apparatus 1 and only free sub processors in the entire network system are included or sub processors which are executing sub processor programs having a lower priority in the entire network system are included, then n sub processors are secured in the entire network system including the one or more different information processing apparatus in this manner.

In this instance, the resource manager in each of the information processing apparatus 2, 3 and 4 rewrites, for those of the sub processors secured in the self apparatus whose sub processor status in the sub processor management table of the self apparatus is the unused, the sub processor status from the unused to the reserved. Further, the resource manager in each of the information processing apparatus 2, 3 and 4 rewrites, for each of the sub processors secured in the self apparatus, the sub processor program ID, function program ID and sub processor program priority in the sub processor management table of the self apparatus so as to coincide with those of the sub processor program to be executed by the secured sub processor. Furthermore, the resource manager in each of the information processing apparatus 2, 3 and 4 issues, for each of the sub processors secured in the self apparatus, a lock sequence number and describes the lock sequence number in the sub processor management table.

Further, if sub processors which are executing sub processor programs having a lower priority in the self apparatus are secured as sub processors for execution of sub processor programs for operating cooperatively with the function program at step 172, then the resource manager in each of the information processing apparatus 2, 3 and 4 issues a notification to the sub processor programs having a lower priority and a function program or programs which operate cooperatively with the sub processor programs having a lower priority that the sub processors have been taken away.

Further, the resource managers in the information processing apparatus 2, 3 and 4 issue, at step 173 in FIG. 25, a notification to the resource manager in the information processing apparatus 1 that sub processors requested to the self apparatus have been secured in the self apparatus.

Figure 29B:
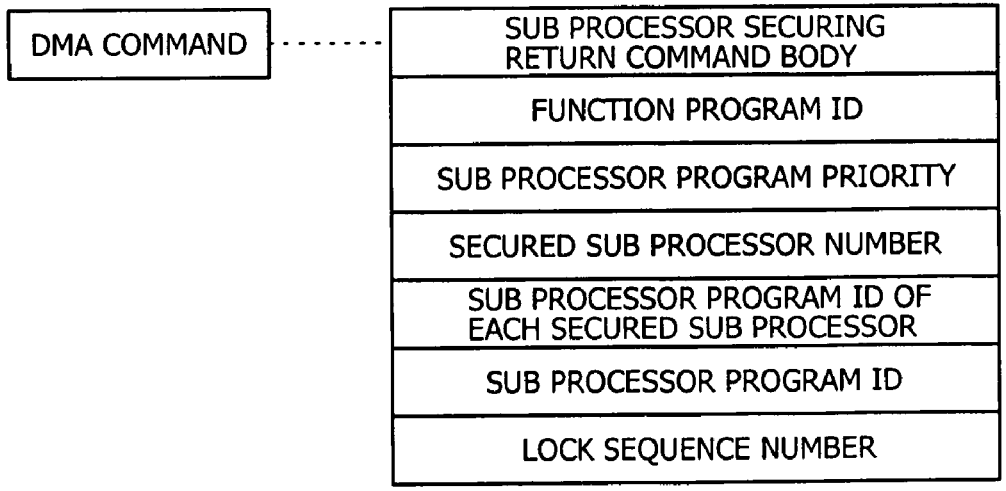

The notification is conveyed using such a software cell which includes a sub processor securing return command as the DMA command as seen in FIG. 29B. In particular, referring to FIG. 29B, the sub processor securing return command includes a sub processor securing return command body, a function program ID, a sub processor program priority, the number of secured sub processors, and a sub processor ID, a sub processor program ID and a lock sequence number of each of the secured sub processors.

Referring to FIG. 25, after the resource manager in the information processing apparatus 1 receives the sub processor securing notifications from the resource managers in the different information processing apparatus 2, 3 and 4, it issues a notification to the function program at step 174 that n sub processors are secured.

At step 177, the function program receives the sub processor securing notification and transmits the sub processor programs for the sub processors to the resource manager in the self apparatus (information processing apparatus 1).

In particular, if the function program receives, at step 167 of FIG. 24 or step 177 of FIG. 25, the notification that n sub processors are secured from the resource manager in the information processing apparatus 1, then it transmits, at step 181 in FIG. 25, the sub processor programs for the secured sub processors together with the sub processor program ID, sub processor ID and lock sequence number corresponding to each of the secured sub processors and the information processing apparatus IDs of those information processing apparatus in which the sub processors are secured.

Referring to FIGS. 25 and 26, the resource manager in the information processing apparatus 1 receives, at step 182, the sub processor programs transmitted from the function program and transmits, if some of the sub processor programs are for the self apparatus (information processing apparatus 1), the pertaining sub processor programs to the sub processors secured in the self apparatus. Then at step 183, the resource manager in the information processing apparatus 1 determines whether or not some of the sub processor programs are for one or more different information processing apparatus. If no sub processor program is for any different information processing apparatus, then the processing advances from step 183 to step 184, at which the resource manager in the information processing apparatus 1 transmits a notification to the function program that the sub processor programs are transmitted to the secured sub processors.

On the other hand, if the sub processor programs transmitted from the function program include those sub processor programs for one or more different information processing apparatus, then the processing advances from step 183 to step 191. At step 191, the resource manager in the information processing apparatus 1 transmits the sub processor programs for the respective information processing apparatus 2, 3 and 4 to the resource managers in the information processing apparatus 2, 3 and 4, respectively.

Figure 30:
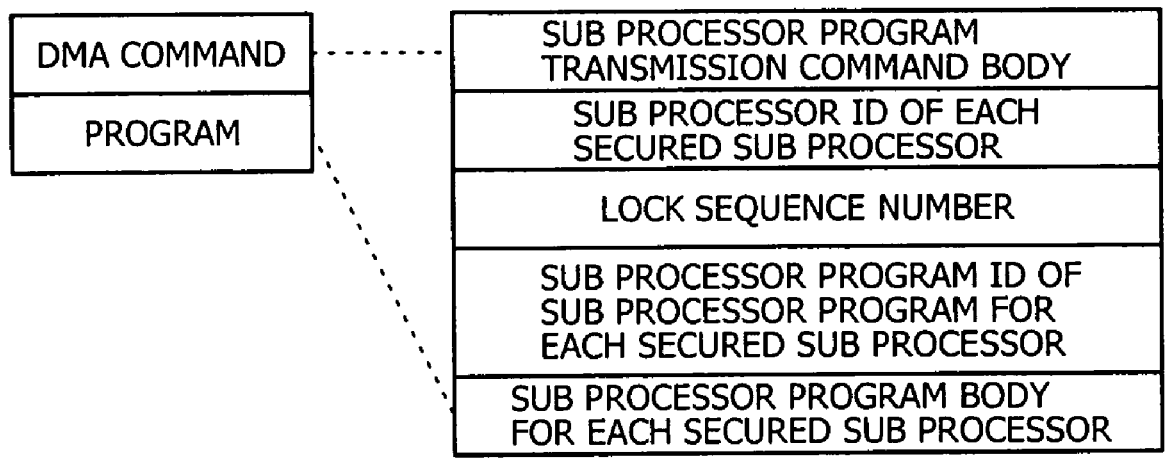
FIG. 30 is a view illustrating an example of a sub processor program transmission command for transmission of a sub processor program.

For the transmission, such a software cell which includes a sub processor program transmission command as the DMA command as illustrated in FIG. 30 is used. In particular, referring to FIG. 30, the sub processor program transmission command includes, as a DMA command, a sub processor program transmission command body, a sub processor ID of each secured sub processor, a lock sequence number, a sub processor program ID of a sub processor program for each secured sub processor, and a sub processor program body for each secured sub processor.

At step 192, the resource manager in each of the different information processing apparatus 2, 3 and 4 transmits the sub processor programs for the self apparatus to the sub processors secured in the self apparatus. Then at step 193, the resource manager in each of the information processing apparatus 2, 3 and 4 issues a notification to the resource manager in the information processing apparatus 1 that the sub processor programs are transmitted to the secured sub processors. At step 184, the resource manager in the information processing apparatus 1 receives the notifications from the information processing apparatus 2, 3 and 4 and issues a notification to the function program that the sub processor programs are transmitted to the secured sub processor programs.

It is to be noted that each of the resource manager in the information processing apparatus 1 and the resource managers in the information processing apparatus 2, 3 and 4 determines, at step 182 of FIG. 25 or step 192 of FIG. 26, whether or not the sub processor program IDs and the lock sequence numbers of the sub processor programs for the secured sub processors received from the function program are same as those in the sub processor management table in the self apparatus. Then, if they are different, then the resource manager in the information processing apparatus 1 issues directly, or the resource managers in the information processing apparatus 2, 3 and 4 issue through the resource manager in the information processing apparatus 1, a notification of an error to the function program. However, in FIGS. 25 and 26, this is omitted, but only a case is illustrated wherein no error is involved.

Referring to FIG. 26, the function program receives, at step 187, the notification from the resource manager in the information processing apparatus 1 that the sub processor programs are transmitted to the secured sub processors.

The sub processor allocation process is performed in such a manner as described above in a case wherein n sub processors cannot be secured only from free sub processors in the information processing apparatus 1 but can be secured only in the information processing apparatus 1 if sub processors which are executing sub processor programs having a lower priority in the information processing apparatus 1 are included, or another case wherein n sub processors cannot be secured only from free sub processors in the information processing apparatus 1 but if one or more different information processing apparatus are connected to the network in addition to the information processing apparatus 1 and n sub processors can be secured only from free processors in the entire network system or including sub processors which are executing sub processor programs having a lower priority in the entire network system.

Data to be processed by the secured sub processors are transmitted to the secured sub processors simultaneously with the transmission of the sub processor programs or after the transmission of the sub processor programs. Consequently, the secured sub processors can individually execute the sub processor programs.

On the other hand, if the resource manager in the information processing apparatus 1 determines at step 151 of FIG. 23 that no different information processing apparatus is connected to the network, that is, if the resource manager in the information processing apparatus 1 determines that n sub processors cannot be secured including free sub processors in the entire network system and sub processors which are executing sub processor programs having a lower priority, the processing advances from step 151 to step 195 illustrated in FIG. 27. Referring to FIG. 27, at step 195, the resource manager in the information processing apparatus 1 issues a notification to the function program that n sub processors cannot be secured.

The function program receives the notification and executes an error process at step 197. The error process in this instance may be to issue a notification to the user that the process cannot be executed immediately and execute the sub processor allocation process beginning with step 112 of FIG. 19 again after lapse of time or to urge the user to perform an operation.

It is to be noted that, if a notification that a sub processor has been taken away is issued to a sub processor program having a lower priority, then a different process corresponding to the sub processor program is executed.

In the example described above, an inquiry about a free situation of sub processors and a request to secure sub processors are issued in an ascending order of the replaced numerical value of the information processing apparatus ID, that is, in the order of the information processing apparatus 1→information processing apparatus 2→information processing apparatus 3→information processing apparatus 4. However, the system may be configured otherwise such that, for example, the resource manager in each information processing apparatus determines, when the priority of a sub processor program to be executed is high, the operation frequency of each of the information processing apparatus connected to the network 9 from the main processor operation frequency of each information processing apparatus which is part of the apparatus information described hereinabove and issues an inquiry about a free situation of sub processors and a request to secure sub processors in a descending order of the operation frequency to the information processing apparatus.

Alternatively, the system may be configured such that the type of each of the information processing apparatus connected to the network 9 is determined from the information processing apparatus type ID which is part of the apparatus information and an inquiry about a free situation of sub processors and a request to secure sub processors are issued in order from an information processing apparatus which is disconnected with a low possibility from the network 9 like a hard disk recorder to another information processing apparatus which is disconnected with a high possibility from the network 9 like a PDA or a portable CD player.

Further, in the example described above, when a necessary number of sub processors cannot be secured from free sub processors in the information processing apparatus 1, the resource manager in the information processing apparatus 1 first issues an inquiry about a free situation of sub processors to the resource manager in a different information processing apparatus and then issues, when the necessary number of sub processors can be secured in the entire network system, a request to secure sub processors. However, the system may be configured otherwise such that the resource manager in the information processing apparatus 1 issues a request to secure sub processors to the resource manager in a different information processing apparatus without issuing an inquiry about a free situation of sub processors.

Furthermore, in the example described above, the information processing apparatus 1 operates as a master apparatus, and the sub processor allocation process is executed using the master apparatus as a starting point. However, the system may be configured otherwise such that, for example, when an information processing apparatus which operates as a slave apparatus is operated by the user, the sub processor allocation process is executed using the operated slave apparatus as a starting point.

4. Distributed Process 1 by Allocation of Sub Processors When an Information Processing Apparatus is Disconnected from the Network When a user disconnects, while a plurality of information processing apparatus 1, 2, 3 and 4 are connected to the network 9 as seen in FIG. 16, one of the information processing apparatus from the network 9 (when an information processing apparatus is disconnected physically from the network 9 or the main power supply to an information processing apparatus is cut), or a certain information processing apparatus is disconnected from the network 9 by some external factor such as strong vibration, if sub processors in the disconnected information processing apparatus are executing or reserved for execution of sub processor programs included in another information processing apparatus which is not disconnected from the network 9, then preferably the sub processors in the information processing apparatus which is not disconnected execute the sub processor programs in place of the sub processors in the disconnected information processing apparatus.

Therefore, in such an instance, the sub processors in the information processing apparatus which is not disconnected are allocated for execution of the sub processor programs which are being executed or reserved for execution by the sub processors in the disconnected information processing apparatus in the following manner.

4-1. System Configuration

Figure 31:
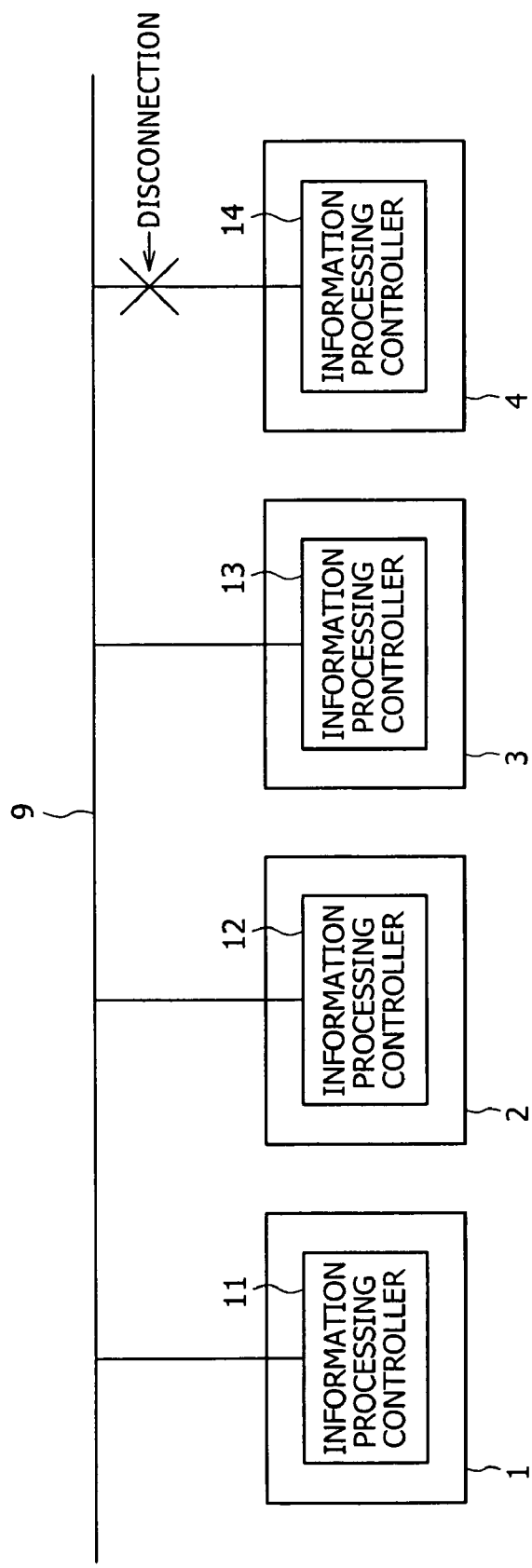
FIG. 31 is a diagrammatic view illustrating disconnection of an information processing apparatus in the network system shown in FIG. 16.

FIG. 31 shows that, while the four information processing apparatus 1, 2, 3 and 4 are connected to the network 9 as shown in FIG. 16, the information processing apparatus 4 is disconnected from the network 9.

Each of the information processing apparatus includes, as a software configuration thereof, the resource manager as the control program as seen in FIG. 17 and prepares such a sub processor management table as described hereinabove with reference to FIG. 18 in the resource manager. The sub processor management table has such contents as described hereinabove.

4-2. Sub Processor Allocation Process

FIGS. 32 to 40 illustrate an example of the sub processor allocation process executed by a master/slave (MS) manager in the information processing apparatus 1, a function program in the main memory 26-1 of the information processing apparatus 1, the resource manager in the information processing apparatus 1 and the resource managers in the different information processing apparatus 2 and 3 when the information processing apparatus 1 secures, in case, while the information processing apparatus 1, 2, 3 and 4 are connected to the network 9 as shown in FIG. 31, the information processing apparatus 4 is disconnected from the network 9, sub processors in the information processing apparatus 1 or the different information processing apparatus 2 and 3 for execution of sub processor programs which are to operate cooperatively with a function program in the main memory 26-1 in the information processing apparatus 1.

It is detected by the MS managers in the information processing apparatus 1, 2 and 3 that the information processing apparatus 4 has been disconnected from the network 9.

Figure 32:
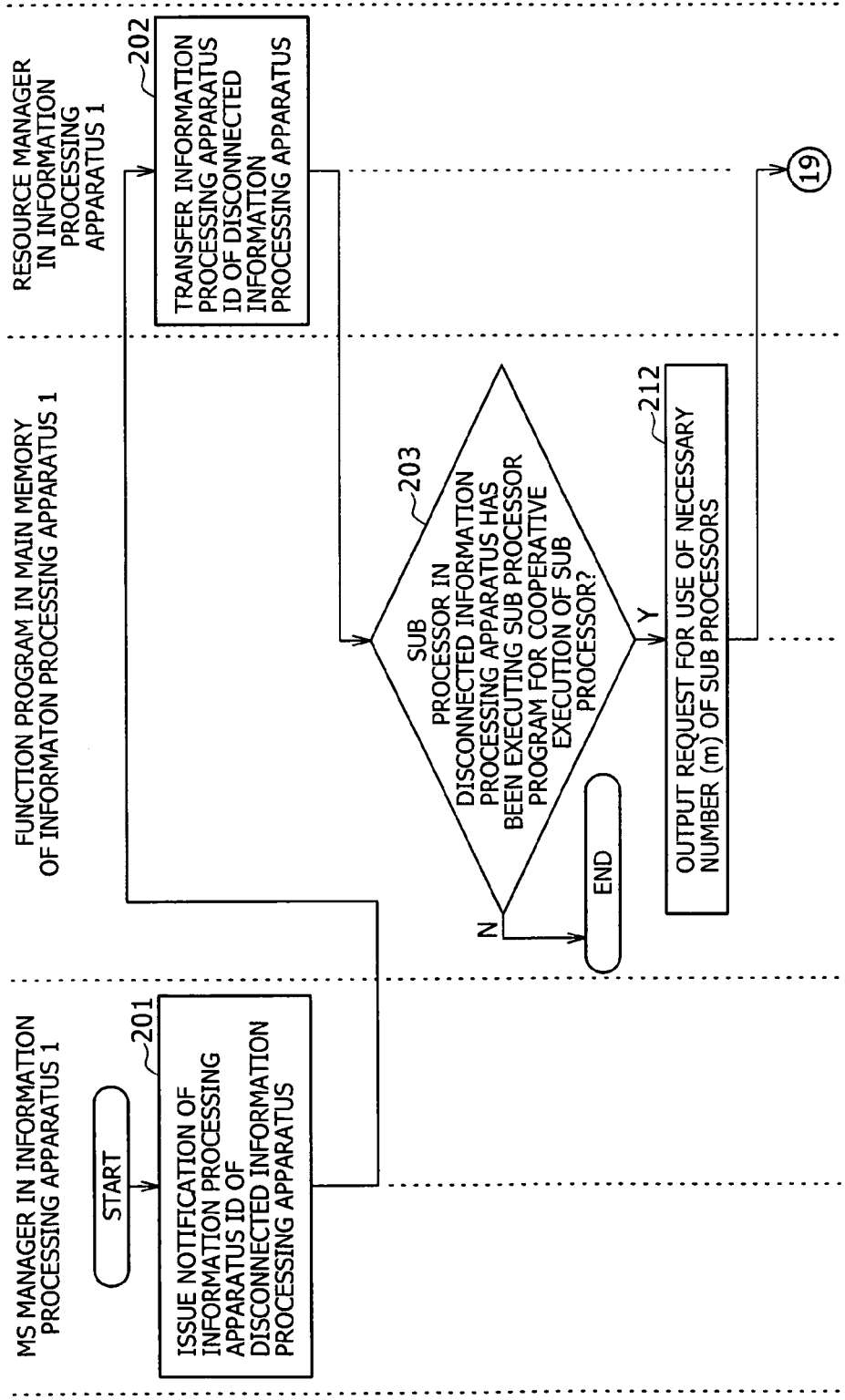
FIGS. 32 to 40 are flow charts illustrating another example of the sub processor allocation process.

Then, after the MS manager in the information processing apparatus 1 detects the disconnection of the information processing apparatus 4 from the network 9, it issues a notification of the information processing apparatus ID of the disconnected information processing apparatus 4 to the resource manager in the self apparatus (information processing apparatus 1) at step 201 as seen in FIG. 32. Then at step 202, the resource manager in the information processing apparatus 1 transfers the information processing apparatus ID to the function program in the main memory 26-1 of the self apparatus.

The function program in the main memory 26-1 of the information processing apparatus 1 receives the information processing apparatus ID and determines from a result of such a sub processor allocation process as described hereinabove with reference to FIGS. 19 to 30 whether or not the sub processors in the disconnected information processing apparatus 4 have been executing sub processor programs which operate cooperatively with the function program itself.

Also the "executing" in this instance includes not only the busy status (status wherein the sub processor programs are currently used) but also the reserved status (status where the sub processor programs are not currently used but are reserved for use).

Then, if none of the sub processors in the disconnected information processing apparatus 4 have been executing sub processor programs which operate cooperatively with the function program, then since later processing is unnecessary, the sub processor allocation process is ended immediately.

On the other hand, if some or all of the sub processors in the disconnected information processing apparatus 4 have been executing sub processor programs which operate cooperatively with the function program, then the processing advances from step 203 to step 212. At step 212, the function program outputs a request for use of a number (represented by m) of sub processors necessary to execute sub processor programs which are to operate cooperatively with the function program in place of the sub processor programs in the disconnected information processing apparatus 4 to the resource manager in the self apparatus (information processing apparatus 1) attaching the function program ID of the function program and the sub processor program IDs of the sub processor programs having been executed (including reserved for execution as described hereinabove) by the sub processors in the disconnected information processing apparatus 4 which are to operate cooperatively with the function program.

Figure 33:
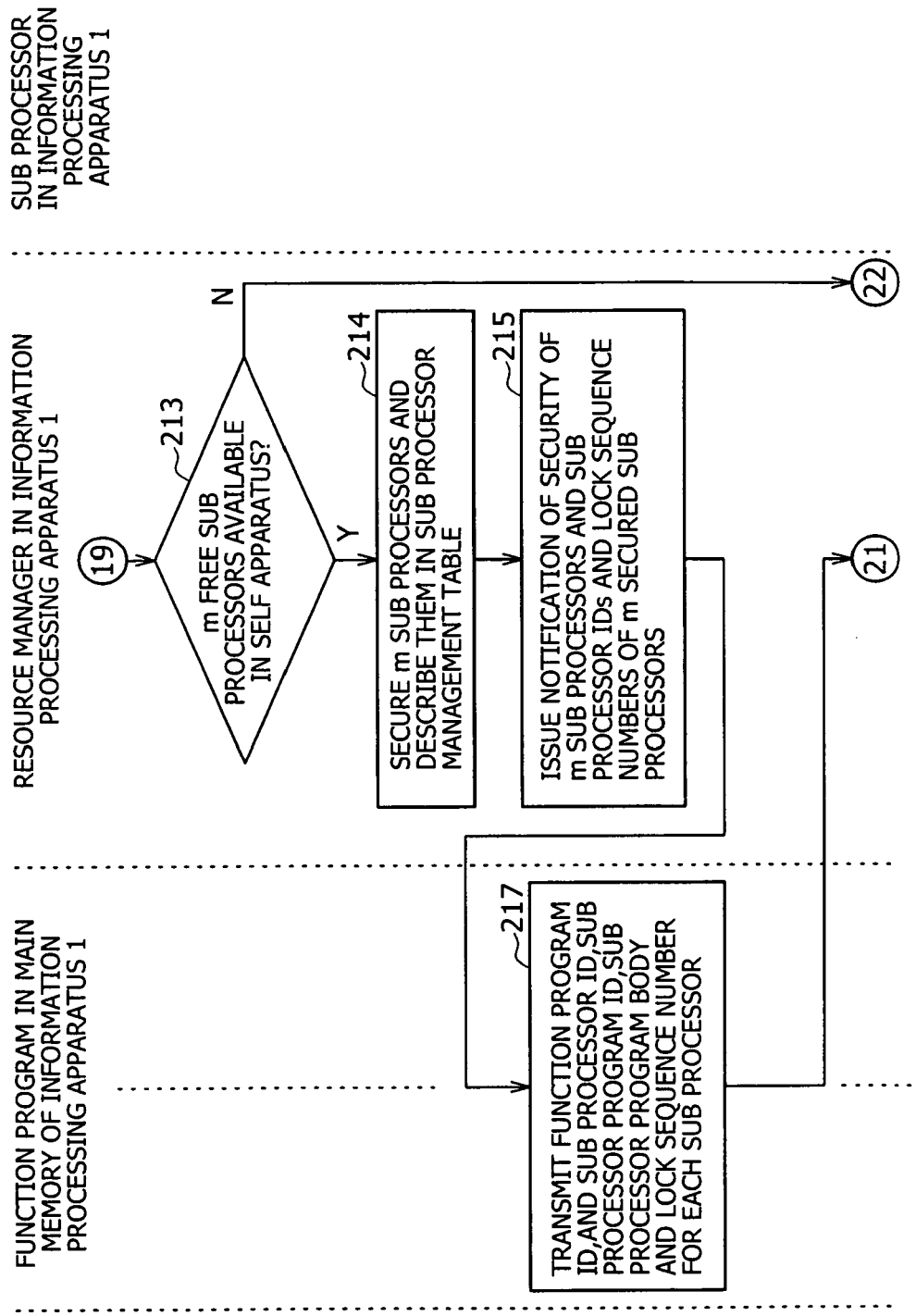

In response to the request, the resource manager in the information processing apparatus 1 refers, at step 213 illustrated in FIG. 33, to the sub processor management table shown in FIG. 18 of the self apparatus (information processing apparatus 1) to determine whether or not m free sub processors are available in the self apparatus. If m or more free sub processors are available in the self apparatus, then the processing advances from step 213 to step 214. At step 214, the resource manager in the information processing apparatus 1 secures m sub processors in the self apparatus and, for each of the secured sub processors, rewrites the sub processor status in the sub processor management table from unused to reserved and rewrites the sub processor program ID, function program ID and sub processor program priority so that they coincide with those of the sub processor program to be executed by the secured sub processor program. Further, the resource manager issues lock sequence numbers and describes them into the sub processor management table.

Thereafter, the processing advances to step 215, at which the resource manager in the information processing apparatus 1 issues a notification of the fact that m sub processor programs are secured in the self apparatus and of the sub processor ID and lock sequence number of each of the m secured sub processors to the function program.

At step 217, the function program receives the notification from the resource manager and transmits a number of sub processor IDs, sub processor program IDs, sub processor program bodies and lock sequence numbers for the secured sub processors equal to the number of secured sub processors together with the function program ID of the function program itself to the resource manager in the self apparatus (information processing apparatus 1).

Figure 34:
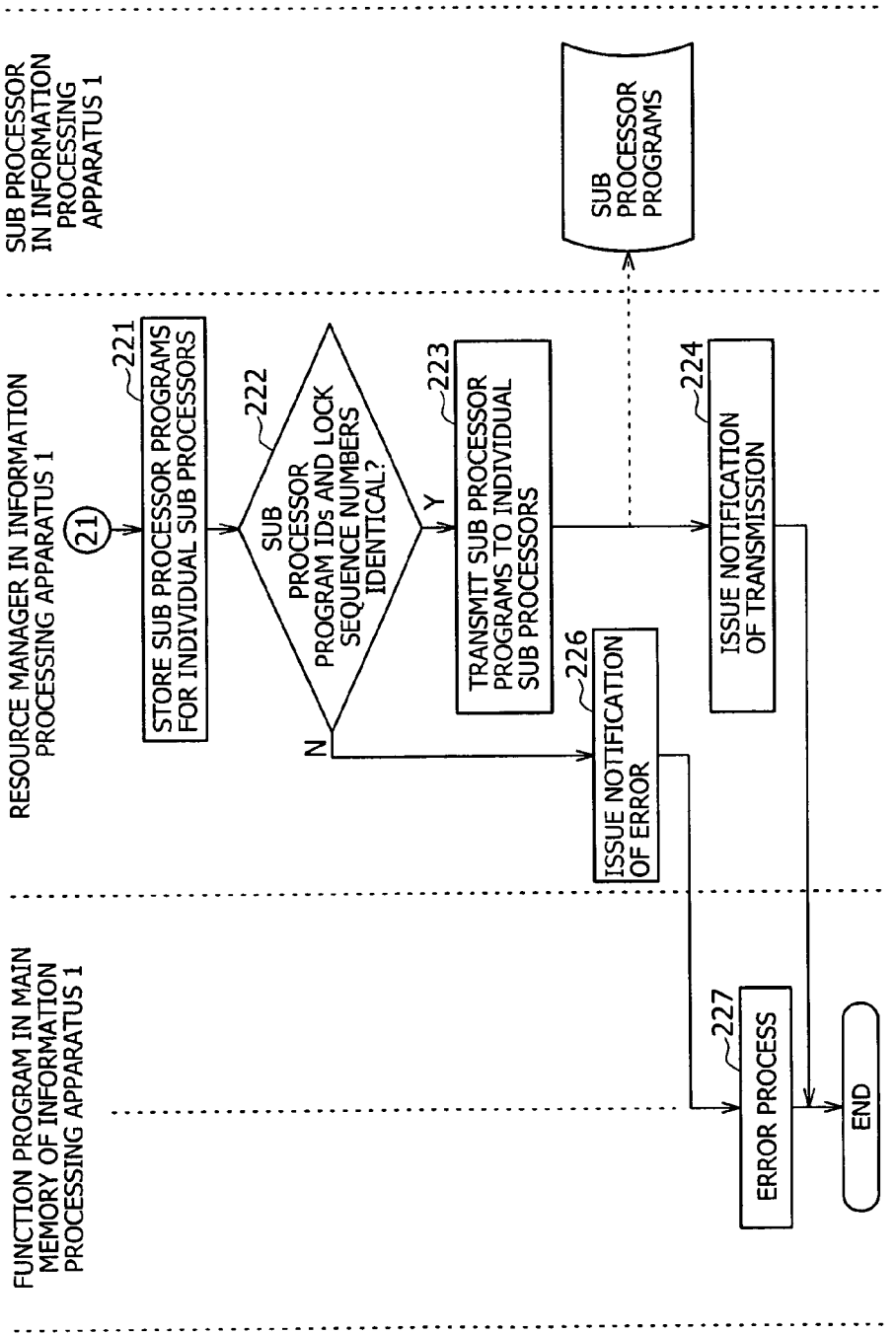

Referring now to FIG. 34, at step 221, the resource manager in the information processing apparatus 1 receives the information transmitted from the function program and stores the sub processor programs for the sub processors. Then at step 222, the resource manager in the information processing apparatus 1 determines whether or not the received processor program IDs and lock sequence numbers are same as those in the sub processor management table of the self apparatus. If they are same, then the processing advances to step 223, at which the resource manager in the information processing apparatus 1 transmits the sub processor programs to the secured sub processors. Then at step 224, the resource manager in the information processing apparatus 1 issues a notification to the function program that the sub processor programs are transmitted to the sub processors.

The sub processor allocation process where a necessary number of sub processors can be secured only among free sub processors in the information processing apparatus 1 is completed thereby.

Data to be processed by the secured sub processors are transmitted to the secured sub processors simultaneously with the transmission of the sub processor programs or after the transmission of the sub processor programs. Consequently, the secured sub processors can execute the respective sub processor programs.

If the resource manager in the information processing apparatus 1 determines at step 222 that the sub processor program IDs or the lock sequence numbers received from the function program are different from those in the sub processor management table of the self apparatus, then the processing advances from step 222 to step 226, at which the resource manager in the information processing apparatus 1 issues a notification of an error to the function program. In this instance, the function program executes an error process at step 227.

Figure 35:
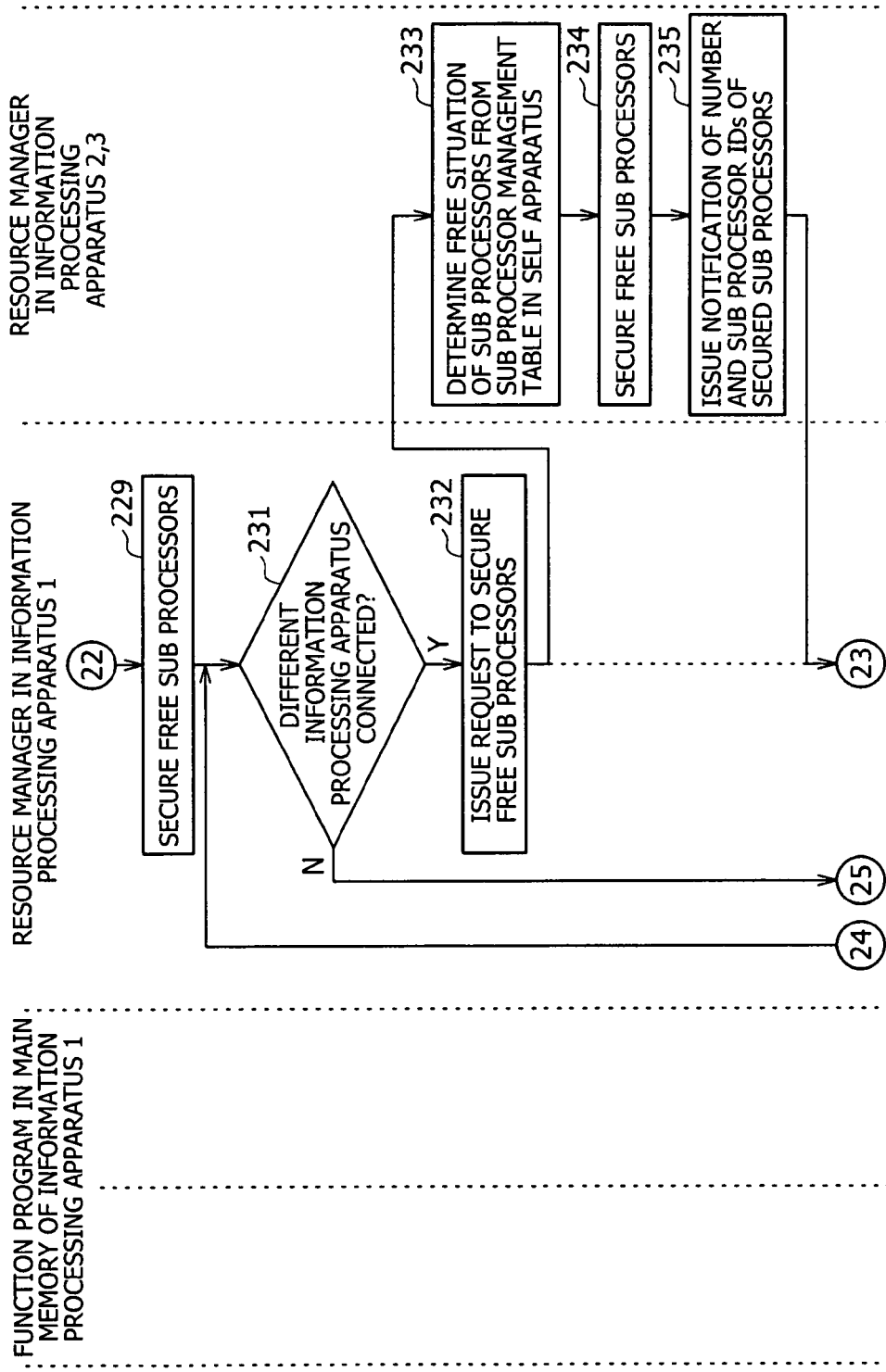

On the other hand, if the resource manager in the information processing apparatus 1 determines at step 213 of FIG. 33 that m free sub processors are not available in the self apparatus, that is, the information processing apparatus 1 includes only m−1 free sub processors or less (including zero), then the processing advances from step 213 to step 229 illustrated in FIG. 35. Referring now to FIG. 35, at step 229, if some free sub processors are included in the self apparatus, then the sub processors are secured as sub processors for the self apparatus.

Then, the processing advances to step 231, at which the resource manager in the information processing apparatus 1 determines whether or not some different information processing apparatus is connected to the network. FIG. 31 shows that the different information processing apparatus 2 and 3 are connected.

Then, if one or more different information processing apparatus are connected to the network, then the processing advances from step 231 to step 232, at which the resource manager in the information processing apparatus 1 issues a request to secure free sub processors to the resource manager in one of the different information processing apparatus (in the present case, the information processing apparatus 2).

The securing request is conveyed using such a sub processor securing request command as illustrated in FIG. 29A. The number of sub processors of the securing request is represented by m−a where a is the number of sub processors secured in the information processing apparatus 1 at step 229 and 0≦a<m.

Referring to FIG. 35, in response to the securing request from the resource manager in the information processing apparatus 1, the resource manager in the different information processing apparatus (in this instance, the information processing apparatus 2) determines a free situation of the sub processors in the self apparatus from the sub processor management table in the self apparatus at step 233. Then at step 234, if free sub processors are available in the self apparatus, then the resource manager in the different information processing apparatus secures a number of sub processors equal to or smaller than m−a in the self apparatus. Then at step 235, if sub processors are secured in the self apparatus, then the resource manager in the different information processing apparatus issues a notification of the number of secured sub processors and the sub processor ID, sub processor program ID and lock sequence number of each of the secured sub processors to the resource manager in the information processing apparatus 1. However, if no free sub processors can be secured in the self apparatus, then the resource manager in the different information processing apparatus issues a notification of this to the resource manager in the information processing apparatus 1. This notification is conveyed using such a sub processor securing return command as described hereinabove with reference to FIG. 29B.

Figure 36:
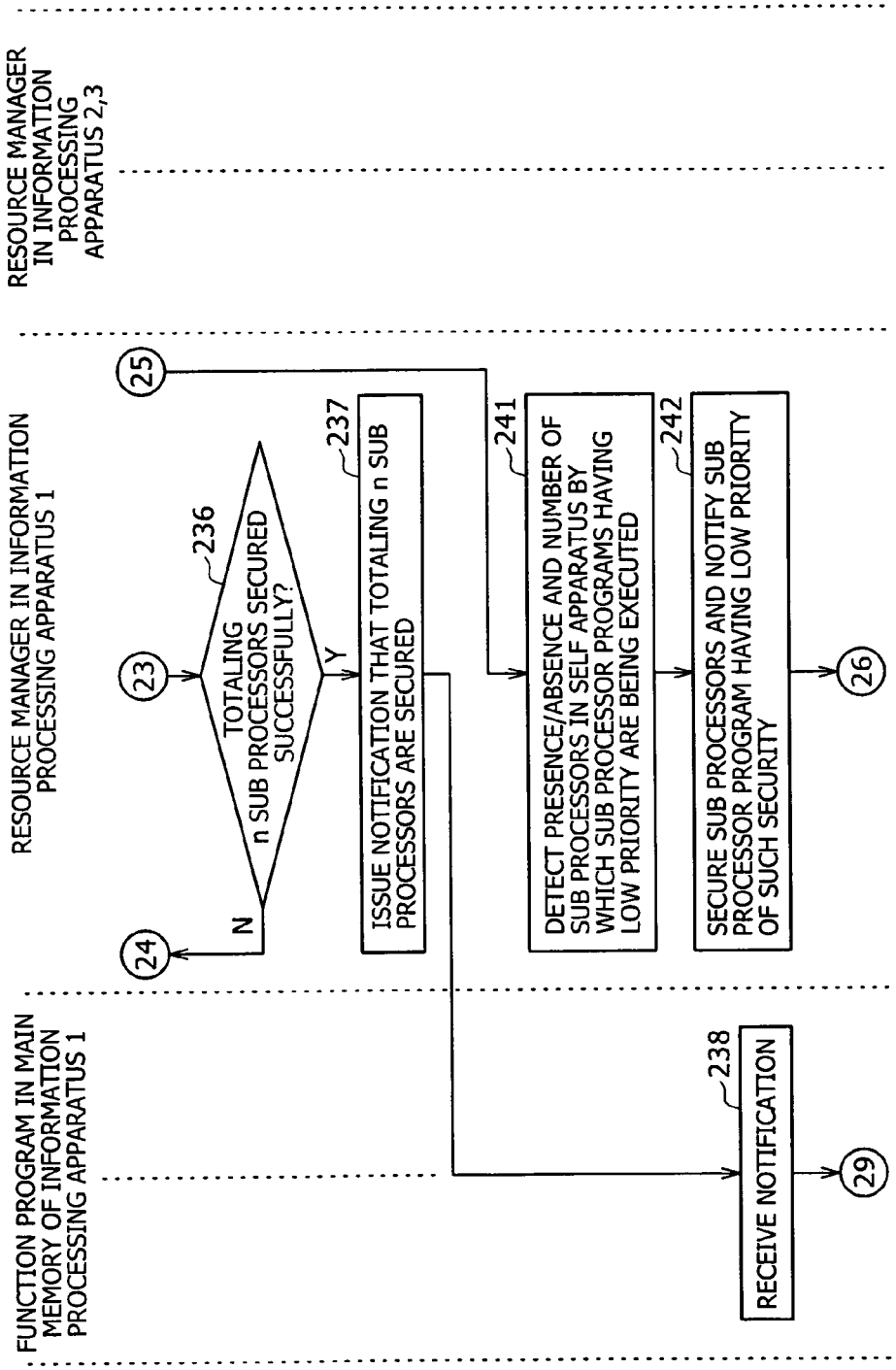

The resource manager in the information processing apparatus 1 receives the notification and determines at step 236 illustrated in FIG. 36 whether or not totaling m sub processors are secured successfully including the secured sub processors in the self apparatus (information processing apparatus 1) and the secured sub processors in the different apparatus (information processing apparatus 2).

Then, if totaling m sub processors cannot be secured, then the resource manager in the information processing apparatus 1 advances (returns) the processing from step 236 to step 231 illustrated in FIG. 35. At step 231, the resource manager in the information processing apparatus 1 determines whether or not a further different information processing apparatus is connected to the network. FIG. 31 shows that the different information processing apparatus 3 is connected to the network 9 in addition to the information processing apparatus 2.

Thereafter, the processes at steps 232, 233, 234, 235, 236 and 231 are repeated similarly as in the case of the information processing apparatus 2 described above until after m sub processors are secured successfully over the entire network system or until after it is detected that any more information processing apparatus is not connected to the network.

Then, if m sub processors are secured successfully among free sub processors in the entire network system, then the processing advances from step 236 to step 237 illustrated in FIG. 36. At step 237, the resource manager in the information processing apparatus 1 issues a notification that m sub processors are secured to the function program.

At step 238, the function program receives the sub processor securing notification and transmits the sub processor programs for the sub processors to the resource manager in the self apparatus (information processing apparatus 1) as hereinafter described.

On the other hand, if the resource manager in the information processing apparatus 1 determines at step 231 of FIG. 35 that no more information processing apparatus is connected to the network, that is, if it determines that m sub processors cannot be secured from among free sub processors in the entire network system (where only the information processing apparatus 1 is connected to the network, only in the information processing apparatus 1), then the processing advances from step 231 to step 241 illustrated in FIG. 36. Referring to FIG. 36, at step 241, the resource manager in the information processing apparatus 1 determines whether or not the apparatus itself (information processing apparatus 1) includes those sub processors which are executing sub processor programs having a priority lower than that of the function program and, if such sub processors exist, detects the number of such sub processors.

Also the "executing" in this instance includes not only a case wherein sub processors are busy (currently used) but also another case wherein sub processors are reserved (although the sub processors are not used at present, they are reserved for use). In the following description, a sub processor program having a priority lower than that of the function program is referred to simply as "sub processor program having a lower priority".

Then at step 242, if some of the sub processors in the information processing apparatus 1 are executing sub processor programs having a lower priority, then the resource manager in the information processing apparatus 1 secures those of the sub processors executing sub processor programs having a lower priority within a range within which m sub processors can be secured including the free sub processors in the entire network system. Further, the resource manager in the information processing apparatus 1 issues a notification to the sub processor programs having a lower priority that the sub processors have been taken away.

Figure 37:
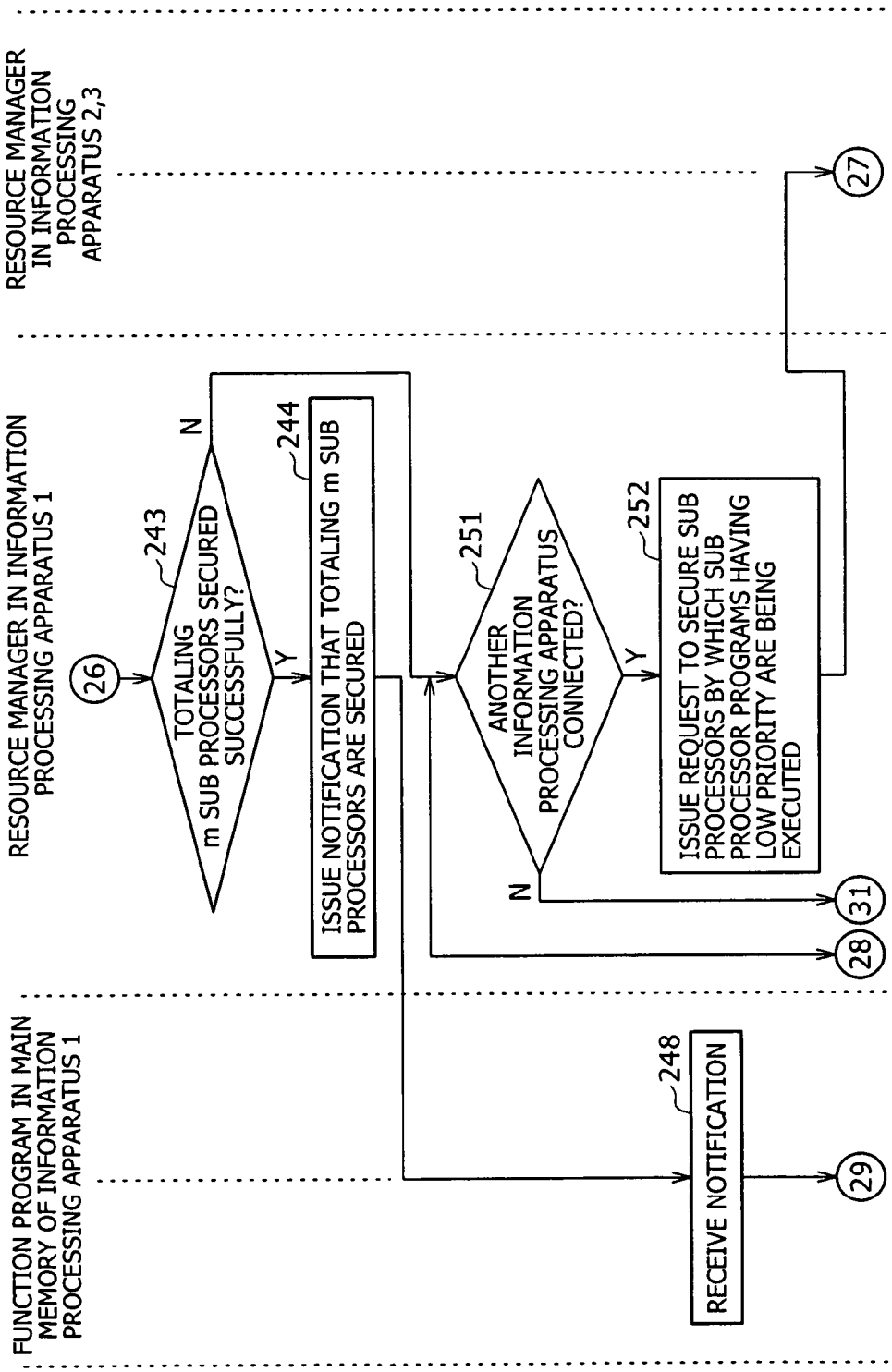

Thereafter, the processing advances to step 243 illustrated in FIG. 37. Referring to FIG. 37, at step 243, the resource manager in the information processing apparatus 1 determines where or not totaling m sub processors are secured successfully including the free sub processors in the entire network system and the sub processors which are executing sub processor programs having a lower priority in the self apparatus (information processing apparatus 1). If m sub processors are secured successfully, then the processing advances from step 243 to step 244, at which the resource manager in the information processing apparatus 1 issues a notification to the function program that m sub programs are secured successfully.

At step 248, the function program receives the sub processor securing notification and transmits the sub processor programs for the sub processors to the resource manager in the self apparatus (information processing apparatus 1) as hereinafter described.

On the other hand, if the resource manager in the information processing apparatus 1 determines at step 243 that totaling m sub processors cannot be secured including the free sub processors in the entire network system and the sub processors, which are executing sub processor programs having a lower priority in the self apparatus, then the processing advances from step 243 to step 251. At step 251, the resource manager in the information processing apparatus 1 determines whether or not a different information processing apparatus is connected to the network.

If a different information processing apparatus is connected to the network, then the processing advances from step 251 to step 252, at which the resource manager in the information processing apparatus 1 issues a request to secure those sub processors, which are executing sub processor programs having a lower priority, to the resource manager in a different information processing apparatus (in this instance, the information processing apparatus 2). The securing request is conveyed using such a sub processor securing request command as described hereinabove with reference to FIG. 29A.

Figure 38:
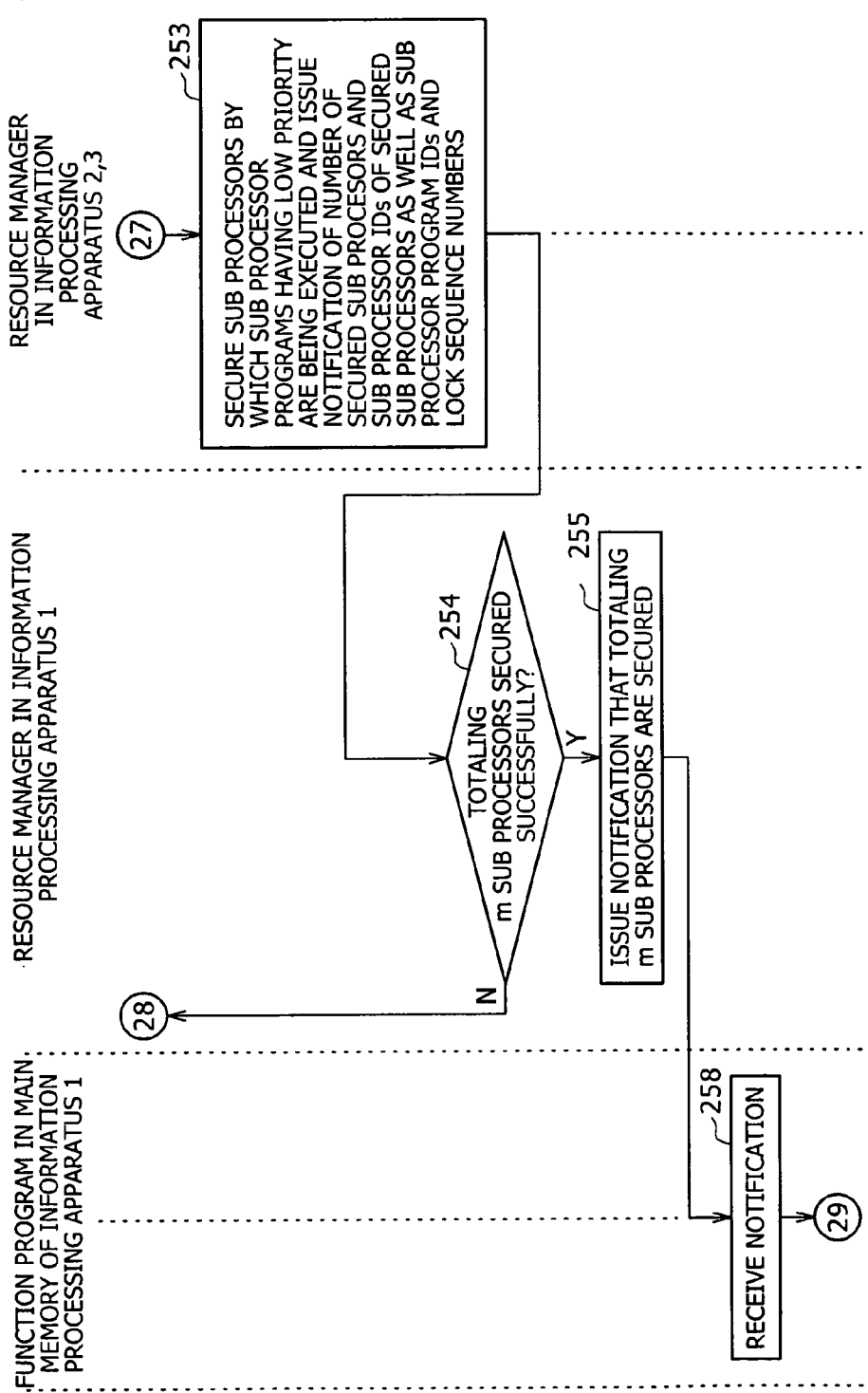

Referring now to FIG. 38, in response to the securing request, the resource manager in the different information processing apparatus (in this instance, the information processing apparatus 2) determines at step 253 whether or not the self apparatus includes those sub processors, which are executing sub processor programs having a lower priority, from the sub processor management table in the self apparatus. If such sub processors are present, then the resource manager in the different information processing apparatus secures the sub processors, which are executing the sub processor programs having a lower priority, and issues a notification of the number of the secured sub processors and the sub processor ID, sub processor program ID, and issued lock sequence number of each of the secured sub processors to the resource manager in the information processing apparatus 1. However, if the self apparatus does not include those sub processors, which are executing sub processor programs having a lower priority, then the resource manager in the different information processing apparatus issues a notification of this to the resource manager in the information processing apparatus 1. The notification is conveyed using such a sub processor securing return command as described hereinabove with reference to FIG. 29B.

It is to be noted that, if sub processors, which are executing sub processor programs having a lower priority in the different information processing apparatus (in this instance, the information processing apparatus 2) are secured at step 253, then the resource manager in the different information processing apparatus issues a notification to the function program, which operates cooperatively with the sub processor programs, that the sub processors have been taken away.

In response to the securing notification from the resource manager in the different information processing apparatus (information processing apparatus 2), the resource manager in the information processing apparatus 1 determines at step 254 in FIG. 38 whether or not m sub processors are secured successfully including the free sub processors in the entire network system and the sub processors, which are executing sub processor programs having a lower priority in the self apparatus (information processing apparatus 1) and the different apparatus (in this instance, the information processing apparatus 2). However, if totaling m sub processors cannot be secured, then the processing advances (returns) from step 254 to step 251 illustrated in FIG. 37, at which the resource manager in the information processing apparatus 1 determines whether or not a further different information processing apparatus is connected to the network.

Thereafter, the processes at steps 252, 253, 254, and 251 are repeated similarly as in the case of the information processing apparatus 2 described above until after m sub processors are secured successfully over the entire network system or until after it is detected that any more information processing apparatus is not connected to the network.

Then, if m sub processors are secured successfully in the entire network system including the free sub processors and those sub processors, which are executing sub processor programs having a lower priority, then the processing advances from step 254 to step 255. At step 255, the resource manager in the information processing apparatus 1 issues a notification to the function program that m sub processors are secured successfully.

At step 258, the function program receives the processor securing notification and transmits the sub processor programs for the sub processors to the resource manager in the self apparatus (information processing apparatus 1) in the following manner.

Figure 39:
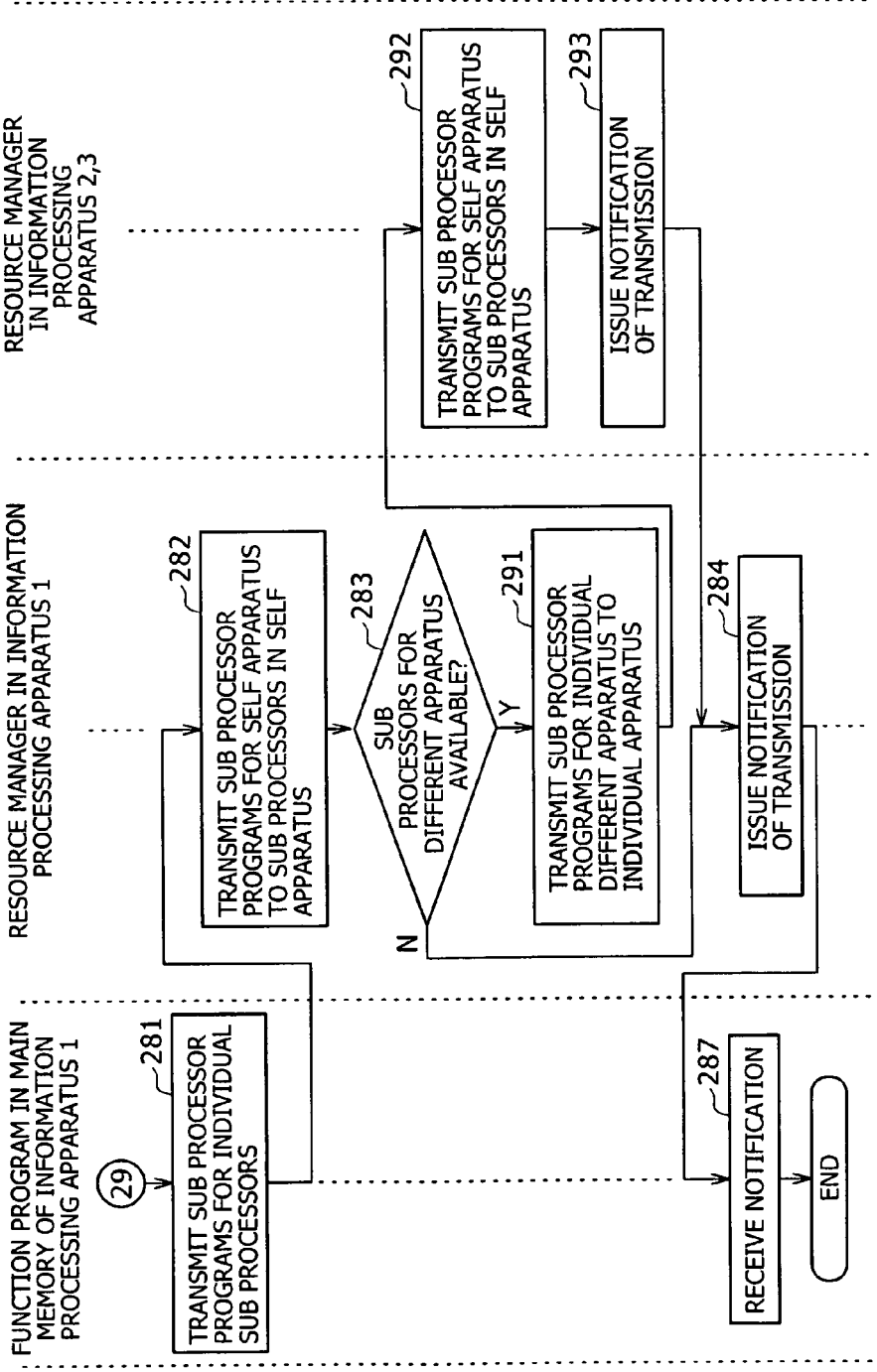

In particular, if the function program receives, at step 238 of FIG. 36, step 248 of FIG. 37, or step 258 of FIG. 38, the notification that m sub processors are secured successfully from the resource manager in the information processing apparatus 1, then it transmits the sub processor programs for the secured sub processors to the resource manager in the information processing apparatus 1 at step 281 illustrated in FIG. 39.

Referring to FIG. 39, the resource manager in the information processing apparatus 1 receives, at step 282, the sub processor programs transmitted from the function program and transmits, if some of the sub processor programs are for the self apparatus (information processing apparatus 1), the pertaining sub processor programs to the sub processors secured in the self apparatus. Then at step 283, the resource manager in the information processing apparatus 1 determines whether or not some of the sub processor programs are for one or more different information processing apparatus. If no sub processor program is for any different information apparatus, then the processing advances from step 283 to step 284, at which the resource manager in the information processing apparatus 1 transmits a notification to the function program that the sub processor programs are transmitted to the secured sub processors.

On the other hand, if the sub processor programs transmitted from the function program include those sub processor programs for one or more different information processing apparatus, then the processing advances from step 283 to step 291. At step 291, the resource manager in the information processing apparatus 1 transmits the sub processor programs for the respective information processing apparatus 2 and 3 to the resource managers in the information processing apparatus 2 and 3, respectively.

At step 292, the resource manager in each of the different information processing apparatus 2 and 3 transmits the sub processor programs for the self apparatus to the sub processors secured in the self apparatus. Then at step 293, the resource manager in each of the information processing apparatus 2 and 3 issues a notification to the resource manager in the information processing apparatus 1 that the sub processor programs are transmitted to the secured sub processors. At step 284, the resource manager in the information processing apparatus 1 receives the notifications from the information processing apparatus 2 and 3 and issues a notification to the function program that the sub processor programs are transmitted to the secured sub processors.

It is to be noted that, if each of the resource manager in the information processing apparatus 1 and the resource managers in the information processing apparatus 2 and 3 secures sub processors in the self apparatus at step 229 or 234 of FIG. 35, step 242 of FIG. 36, or step 253 of FIG. 38, then it rewrites the sub processor management table in the self apparatus and describes lock sequence numbers issued by the resource manager in the information processing apparatus 1, 2, or 3 into the sub processor management table with regard to the secured sub processors. Further, at step 282 or 292 of FIG. 39, each of the resource manager in the information processing apparatus 1 and the resource managers in the information processing apparatus 2 and 3 determines whether or not the sub processor program IDs and the lock sequence numbers received from the function program are same as those in the sub processor management table in the self apparatus. Then, if they are different, then the resource manager in the information processing apparatus 1 issues directly, or the resource manager in each of the information processing apparatus 2 and 3 issues through the resource manager in the information processing apparatus 1, a notification of an error to the function program. However, in FIGS. 36 to 39, this is omitted, but only a case is illustrated wherein no error is involved.

Referring to FIG. 39, the function program receives the notification that the sub processor programs are transmitted to the secured sub processors from the resource manager in the information processing apparatus 1 at step 287.

The sub processor allocation process is performed in such a manner as described above. m sub processors cannot be secured only from free sub processors in the information processing apparatus 1 but can be secured only in the information processing apparatus 1 if sub processors, which are executing sub processor programs having a lower priority in the information processing apparatus 1, are included. Alternatively, m sub processors cannot be secured only from free sub processors in the information processing apparatus 1 but if one or more different information processing apparatus are connected to the network in addition to the information processing apparatus 1 and m sub processors can be secured only from free processors in the entire network system or including sub processors, which are executing sub processor programs having a lower priority in the entire network system.

Data to be processed by the secured sub processors are transmitted to the secured sub processors simultaneously with the transmission of the sub processor programs or after the transmission of the sub processor programs. Consequently, the secured sub processors can individually execute the sub processor programs.

Figure 40:
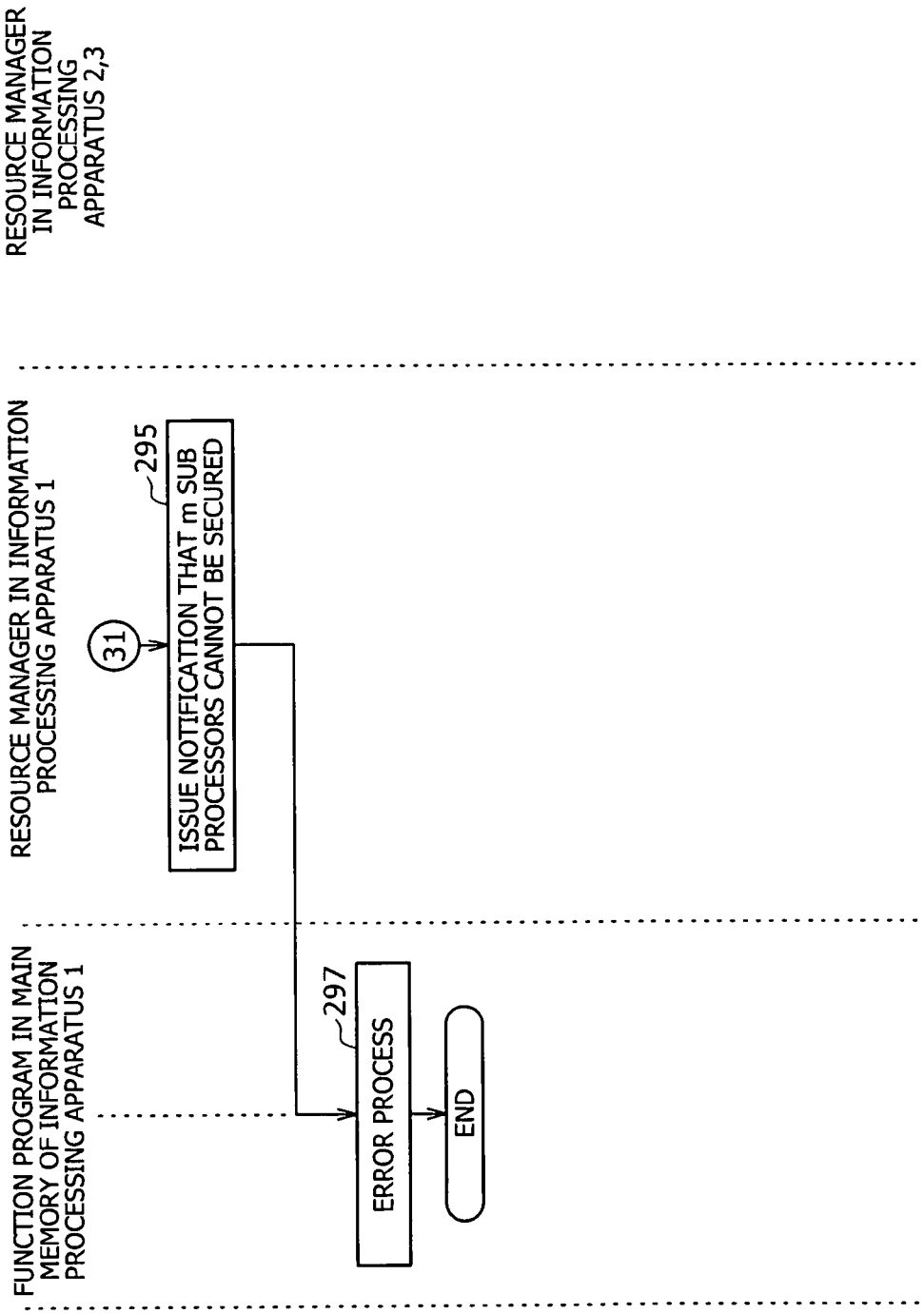

On the other hand, if the resource manager in the information processing apparatus 1 determines at step 251 of FIG. 37 that no different information processing apparatus is connected to the network, that is, if the resource manager in the information processing apparatus 1 determines that m sub processors cannot be secured including the free sub processors in the entire network system and sub processors, which are executing sub processor programs having a lower priority, the processing advances from step 251 to step 295 illustrated in FIG. 40. Referring to FIG. 40, at step 295, the resource manager in the information processing apparatus 1 issues a notification to the function program that m sub processors cannot be secured. The function program receives the notification and executes an error process at step 297.

In the example described above, a request to secure sub processors is issued in an ascending order of the replaced numerical value of the information processing apparatus ID, that is, in the order of the information processing apparatus 1→information processing apparatus 2→information processing apparatus 3→information processing apparatus 4. However, the system may be configured otherwise such that, for example, the resource manager in each information processing apparatus determines, when the priority of a sub processor program to be executed is high, the operation frequency of each of the information processing apparatus connected to the network 9 from the main processor operation frequency of each information processing apparatus, which is part of the apparatus information described hereinabove, and issues a request to secure sub processors in a descending order of the operation frequency to the information processing apparatus.

Alternatively, the system may be configured such that the type of each of the information processing apparatus connected to the network 9 is determined from the information processing apparatus type ID, which is part of the apparatus information, and a request to secure sub processors is issued in order from an information processing apparatus disconnected with a low possibility from the network 9 like a hard disk recorder to another information processing apparatus disconnected with a high possibility from the network 9 like a PDA or a portable CD player.

Further, in the example described above, when a necessary number of sub processors cannot be secured from free sub processors in the information processing apparatus 1, the resource manager in the information processing apparatus 1 issues a request to secure sub processors immediately to the resource manager in a different information processing apparatus. However, the system may be configured otherwise such that the resource manager in the information processing apparatus 1 first issues a free situation of sub processors to the resource manager in a different information processing apparatus and then issues, when the necessary number of sub processors can be secured in the entire network system, a request to secure sub processors to the different information processing apparatus.

Figure 41:
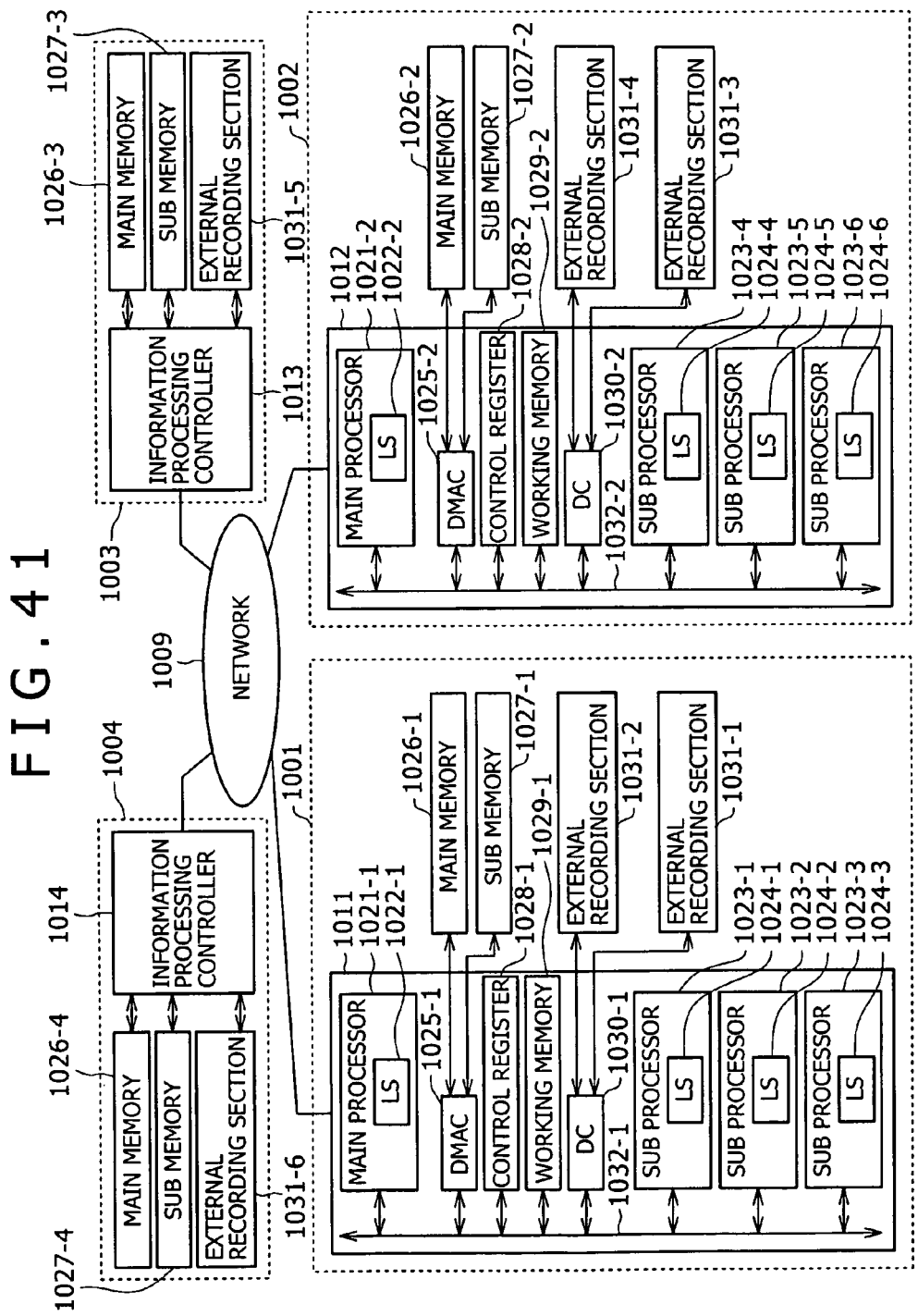
FIG. 41 is a block diagram showing another network system to which the present invention is applied.

5. Basic Configuration 2 of the Network System and the Information Processing Apparatus FIG. 41 shows another example of the network system according to the present invention. Referring to FIG. 41, the network system shown includes a plurality of information processing apparatus 1001, 1002, 1003, and 1004 by a network 1009.

5-1. Information Processing Apparatus and Information Processing Controller

The information processing apparatus 1001, 1002, 1003, and 1004 are such various AV (Audio and Visual) apparatus and portable apparatus as hereinafter described.

The information processing apparatus 1001 is described below.

The information processing apparatus 1001 includes an information processing controller 1011 as a computer function section. The information processing controller 1011 includes a main processor 1021-1, sub processors 1023-1, 1023-2, and 1023-3, a direct memory access controller (DMAC) 1025-1, a control register 1028-1, a working memory 1029-1, and a disk controller (DC) 1030-1.

The main processor 1021-1 performs schedule management of execution (data processing) of sub processor programs by the sub processors 1023-1, 1023-2, and 1023-3 and general management of the information processing controller 1011 (information processing apparatus 1001). However, the main processor 1021-1 may be configured otherwise such that a program other than the program for performing the management operates in the main processor 1021-1. In this instance, the main processor 1021-1 functions also as a sub processor. The main processor 1021-1 includes a local storage (LS) 1022-1.

Although the number of sub processors may be only one, preferably a plurality of sub processors are involved. In the example shown in FIG. 41, the information processing apparatus includes a plurality sub processors.

The sub processors 1023-1, 1023-2, and 1023-3 execute sub processor programs parallelly and independently of each other to process data under the control of the main processor 1021-1. Further, according to circumstances, a program in the main processor 1021-1 can operate in cooperation with a sub processor program in any of the sub processors 1023-1, 1023-2, and 1023-3. Also function programs hereinafter described operate in the main processor 1021-1. Also the sub processors 1023-1, 1023-2, and 1023-3 include local storages (LS) 1024-1, 1024-2, and 1024-3, respectively.

The DMAC 1025-1 accesses programs and data stored in a main memory 1026-1 connected to the information processing controller 1011 and formed from a DRAM (dynamic RAM) or the like and a sub memory 1027-1 connected to the information processing controller and formed from an SRAM (static RAM) or the like. Since the DMAC 1025-1 is interposed, data can be transferred in accordance with the DMA method between each of the sub processors 1023-1, 1023-2, and 1023-3 and the main memory 1026-1. Consequently, high speed data transfer can be anticipated.

The control register 1028-1 determines which one of the sub processors and which one of a plurality of processing threads (hereinafter described) included in the sub processor should process a sub processor program to be processed in the information processing controller 1011. The control register 1028-1 is further used to manage the progress of execution of the sub processor program by the sub processor.

The working memory 1029-1 is a working storage formed from an SRAM included in the information processing controller 1011 and is accessed by the main processor 1021-1 and the sub processors 1023-1, 1023-2, and 1023-3.

The DC 1030-1 accesses external recording sections 1031-1 and 1031-2 connected to the information processing controller 1011.

The external recording sections 1031-1 and 1031-2 may have a form of any of a fixed disk (hard disk) and a removable disk. As such a removable disk as just mentioned, various recording media such as an MO (magnetic disk), an optical disk such as a CD±RW or a DVD±RW, a memory disk, an SRAM (static RAM), and a ROM can be used. The DC 1030-1 is an external recording section controller although it is called disk controller.

The information processing controller 1011 can be configured such that a plurality of external recording sections 1031 can be connected thereto as in the example shown in FIG. 41.

The main processor 1021-1, sub processors 1023-1, 1023-2, and 1023-3, DMAC 1025-1, control register 1028-1, working memory 1029-1, and DC 1030-1 are connected to each other by a bus 1032-1.

An identifier is allocated as an information processing apparatus ID to the information processing controller 1011. The identifier allows identification of the information processing apparatus 1001, which incorporates the information processing controller 1011, uniquely over the entire network.

Also to each of the main processor 1021-1 and the sub processors 1023-1, 1023-2, and 1023-3, an identifier with which it can be identified is allocated as a main processor ID or a sub processor ID similarly.

The information processing controller 1011 is preferably formed as a one-chip IC (Integrated Circuit).

Also the other information processing apparatus 1002, 1003, and 1004 are configured in a similar manner. Here, it is to be noticed that those units of reference characters having the same parent number operate similarly unless otherwise specified even if they have different branch numbers. Thus, in the following description, where the branch number of reference characters is omitted, the units are same irrespective of the difference in branch number.

5-2. Accessing from Each Sub Processor to the Main Memory

As described hereinabove, although each of the sub processors 1023 in one information processing controller executes a sub processor program independently to process data, if different sub processors perform reading out or writing at a time from or into same areas in the main memory 1026, then mismatching of data may possibly occur. Therefore, accessing from the sub processors 1023 to the main memory 1026 is performed in accordance with the following procedure.

Although the same region of each sub memory 1027 or the working memory 1029 may possibly be accessed simultaneously by different ones of the sub processors, description is given here only of the main memory 1026.

Referring to FIG. 42A, the main memory 1026 is formed from a plurality of memory locations 0 to N with which a plurality of addresses can be designated. An additional segment 0 to N for storing information indicative of a state of data is allocated to each memory location. The additional segment includes an F/E bit, a sub processor ID, and an LS address (Local Storage address). Also an access key 0 to N hereinafter described is allocated to each memory location. The F/E bit is defined in the following manner.

The F/E bit=0 represents that the data is data being read and processed by a sub processor 1023 or invalid data, which it not the latest data since the location is in a blank state, and is disabled from being read out. Further, the F/E bit=0 indicates that data can be written into the corresponding memory location, and the F/E bit is set to 1 after writing into the memory location.

The F/E bit=1 represents that data of the corresponding memory location is not read out by any sub processor 1023 and is the latest data not processed as yet. The data of the memory location can be read out. After a sub processor 1023 reads out the data, the F/E bit is set to 0. Further, the F/E bit=1 represents that the memory location is disabled from writing of data.

Further, in the state of the F/E bit=0 (readout disabled/writing enabled), it is possible to set a readout reservation with regard to the memory location. When readout reservation is to be performed with regard to a memory location with regard to which the F/E bit=0, a sub processor 1023 writes the sub processor ID and the LS address of the sub processor 1023 as readout reservation information into the additional segment of the memory location with regard to which the readout reservation is performed.

Thereafter, the sub processor 1023 on the data writing side writes the data into the memory location having the readout reservation, and the F/E bit is set to F/E bit=1 (readout enabled/writing disabled). Then, the sub processor ID and the LS address written as the readout reservation information in the additional segment in advance are read out.

Where there is the necessity to process data at multiple stages using a plurality of sub processors, if readout/writing of data of each memory location are controlled in such a manner as described above, then immediately after data processed by a processor 1023, which performs a process at a preceding stage, is written into a predetermined address in the main memory 1026, another sub processor 1023, which performs a process at a succeeding stage, can read out the preprocessed data.

Referring to FIG. 42B, also the local storage 1024 in each sub processor 1023 is formed from a plurality of memory locations 0 to L which can be designated each by an address. An additional segment 0 to L is allocated similarly to each of the memory locations. The additional segment includes a busy bit.

When the sub processor 1023 is to read out data in the main memory 1026 into a memory location of the local storage 1024 thereof, it sets the corresponding busy bit corresponding to the memory location of the reading out destination to 1 to make reservation. Other data cannot be stored into any memory location with regard to which the busy bit is 1. After reading out of the memory location of the local storage 1024, the busy bit is changed to 0 so that the memory location can be used for an arbitrary object later.

Referring back to FIG. 42A, the main memory 1026 connected to each information processing controller includes a plurality of sandboxes. The sandboxes define areas in the main memory 1026, and each sandbox is allocated for each sub processor 1023 and can be used exclusively by the pertaining sub processor. In other words, each of the sub processors 1023 can use a sandbox allocated thereto but cannot access data exceeding the area of the sandbox.

While the main memory 1026 includes a plurality of memory locations 0 to N, each sandbox is a set of memory locations. In other words, one sandbox is formed from one or a plurality of memory locations.

Further, in order to implement exclusive control of the main memory 1026, such a key management table as shown in FIG. 42C is used. The key management table is stored in a comparatively high speed memory such as an SRAM in the information processing controller and is coordinated with a DMAC 1025. However, the key management table may otherwise be stored in the working memory 1092.

The key management table includes a number of entries equal to the number of sub processors in the information processing controller. Each entry includes a sub processor ID and a corresponding sub processor key and a corresponding key mask stored in a coordinated relationship with each other.

The process when the sub processor 1023 uses the main memory 1026 is such as described below. First, the sub processor 1023 outputs a readout or writing command to the DMAC 1025. This command includes the sub processor ID of the sub processor and an address of the main memory 1026, which is a destination of the request for use.

Before the DMAC 1025 executes this command, it refers to the key management table to detect the sub processor key of the sub processor 1023 of the source of the request for access. Then, the DMAC 1025 compares the detected sub processor key of the source of the request for access with the access key allocated to the memory location shown in FIG. 42A in the main memory 1026, which is the destination of the request for access. Then, only when the keys coincide with each other, the DMAC 1025 executes the command described above.

The key mask on the key management table shown in FIG. 42C can set, when an arbitrary bit thereof is set to the value 1, a corresponding bit of the sub processor key coordinated with the key mask to 0 or 1.

It is assumed that, for example, the sub processor key is 1010. Usually, the sub processor key enables accessing only to a sandbox having the access key of 1010. However, if the key mask coordinated with the sub processor key is set to 0001, then the coincidence determination between a sub processor key and an access key is masked only with regard to the digit in which the bit of the key mask is set to 1. Consequently, the sub processor key of 1010 enables accessing to a sandbox having the access key of 1010 or 1011.

The exclusive property of the sandboxes of the main memory 1026 is implemented in such a manner as described above. In short, where there is the necessity for a plurality of sub processors in an information processing controller to process data at multiple stages, only a sub processor performing a process at a preceding stage and another sub processor performing a process at a succeeding stage are permitted to access a predetermined address of the main memory 1026. Consequently, the data can be protected.

Such exclusive control of the memory can be used, for example, in the following manner. First, immediately after the information processing apparatus is started, the values of the key masks are all zero. It is assumed that a program in the main processor is executed and operates in a cooperating relationship with programs in the sub processors. When it is intended to store processing result data outputted from a first sub processor once into the main memory 1026 and then transmit the processing result data to a second sub processor, it is naturally necessary that the pertaining main memory area can be accessed from the two sub processors. In such an instance, the program in the main processor changes the values of the key masks suitably to provide a main memory area, which can be accessed from the plurality of sub processors, to allow multi-stage processing by the sub processors.

More particularly, when multi-stage processing is to be performed in the procedure of data from a different information processing apparatus→processing by the first sub processor→first main memory area→processing by the second sub processor→second main memory area, the second processor cannot access the first main memory area if the following settings are maintained:

Sub processor key of the first sub processor, 0100;
Access key of the first main memory area, 0100;
Sub processor key of the second sub processor, 0101;
Access key of the second main memory area, 0101.

Thus, if the key mask of the second sub processor is changed to 0001, then the second sub processor is permitted to access the first main memory area.

5-3. Accessing from Each Sub Processor to the Main Memory and the Sub Memories

Each of the sub processors 1023 in one information processing controller can perform reading out from and writing into the sub memory 1027 similarly to the main memory 1026. However, several different commands may be applicable to such accessing and may be different in priority. Therefore, a configuration and a procedure allowing each sub processor 1023 to use the main memory 1026 and the sub memory 1027 accurately are described below.

Referring to FIG. 43, a direct memory access controller (DMAC) 1025 includes a main memory control register 1033 and a sub memory control register 1034 provided in the inside thereof. The main memory control register 1033 is provided to access the main memory 1026 while the sub memory control register 1034 is provided to access the sub memory 1027.

The main memory control register 1033 includes four blocks described below, each of which stores commands for accessing the main memory 1026.

A preferential command block stores a plurality of commands having a high priority. The commands are processed preferentially.

A normal command block 1 stores a plurality of normal commands therein, and also a normal command block 2 stores a plurality of normal commands therein. The normal command block 1 and the normal command block 2 do not have any functional difference. However, if commands before execution of accessing to the main memory 1026 are stored in one of the blocks while commands after the execution are stored in the other block, then the commands before the execution and after the execution can be processed continuously in a concentrated manner.

An order command block stores a plurality of commands, which must be processed in a correct order. In particular, commands from the sub processors 1023 are stored in a received order thereof together with sub processor IDs of the sub processors of the command senders. Consequently, the commands can be processed in the received order thereof, and results of execution of the commands can be returned in the same order to the sub processors of the command senders.

Also the sub memory control register 1034 includes four blocks described below, each of which stores commands for accessing the sub memory 1027.

A preferential command block stores a plurality of commands having a high priority. The commands are processed preferentially.

A read command block stores a plurality of read commands therein, and also a write command block stores a plurality of write commands therein.

A wait command block stores a plurality of commands whose accessing to an arbitrary region in the sub memory 1027 has been attempted but has resulted in failure because the object region is locked. When the object region is unlocked, the command is moved to the preferential command block.

Each of the sub processors 1023 accesses the main memory 1026 or the sub memory 1027 using a command having, for example, such a structure as illustrated in FIG. 44. Also a response of an execution result from the main memory 1026 or the sub memory 1027 after execution of the accessing has the same structure.

Referring to FIG. 44, in the command/response structure illustrated, reading and writing commands are available for a command type. A preferential command identifier indicates that the command has a high priority. An ordinary command identifier is used upon accessing to the main memory 1026 and indicates that the command is to be stored into the normal command block 1 or the normal command block 2.

Also a chain command identifier is used upon accessing to the main memory 1026 and indicates that the command requires successive accessing together with another command immediately preceding or following the command. The chain command identifier may alternatively indicate a consecutive number of a train of successive commands. Although a command in which the chain command identifier is set is placed into the order command block, the priority of the command in processing is higher than commands in the preferential command block.

An address in the command/response structure indicates an address in the main memory 1026 or the sub memory 1027 when the command is executed or may alternatively indicate an address in the working memory 1029.

A sub processor identifier is a sub processor ID of a sub processor of the command sender. A processing thread identifier is an identifier of a processing thread hereinafter described of the command sender.

An OK/NG indicates success/failure of the command. Data here is read out data included in a response upon execution of the read command or data to be written which is included in the write command upon execution of the command.

Referring back to FIG. 43, the DMAC 1025 may include, in addition to the main memory control register 1033, which allows the sub processors 1023 to accurately access the main memory 1026, and the sub memory control register 1034, which allows the sub processors 1023 to accurately access the sub memory 1027, a main processor read command block 1035 and a main processor write command block 1036. The command blocks 1035 and 1036 are capable of storing a plurality of read commands and a plurality of write commands for allowing the main processor 1021 to access the main memory 1026 or the sub memory 1027, respectively. An address conversion register 1037 is hereinafter described.

If a plurality of sub processors transmit memory access commands having the same priority at the same timing to the DMAC 1025, then the following procedure is taken. In particular, the DMAC 1025 has a pointer provided therein indicative of a sub processor which has succeeded last in the memory accessing. When the DMAC 1025 receives a plurality of memory access commands having the same priority at the same timing from different sub processors, it gives priority to that one of the commands which has a value higher than the pointer and has the smallest difference from the pointer. In this instance, the highest pointer value is followed by the lowest pointer value.

5-4. Accessing to the Sub Memory for Accessing Accurately to the Main Memory from Each Sub Processor Since the main memory 1026 formed from a DRAM or the like and the sub memory 1027 formed from an SRAM or the like are naturally different in structure of the individual sections, also the objects of use thereof are different from each other.

Therefore, as an example of a method of using the main memory 1026 and the sub memory 1027 in combination, it is a possible idea for the sub memory 1027 to take charge of address conversion when each sub processor 1023 tries to access the main memory 1026. A structure and a procedure for the method are described with reference to FIGS. 26A and 26B.

As described hereinabove, the main memory 1026 includes a plurality of memory locations, and one sandbox is formed from one or a plurality of memory locations. Each sub processor 1023 can exclusively use a sandbox allocated thereto.

It is assumed that, for example, sandboxes 1, 2, and 3 in the main memory 1026 are allocated to a certain one of the sub processors 1023 as seen in FIG. 45A. The sandbox 1 has addresses 0x800 to 0x8FF; the sandbox 2 has addresses 0x200 to 0x2FF; and the sandbox 3 has addresses 0xF00 to 0xFFF, and each of the sandboxes is identified with the top address thereof. In other words, the addresses of the sandboxes allocated need not be consecutive to each other.

When the sub processor 1023 tries to read out data from any of the sandboxes 1, 2, and 3, it first accesses the address conversion register 1037 in the DMAC 1025.

The address conversion register 1037 is a register for coordinating the sub processor 1023 and the sandboxes allocated to the sub processor 1023 and includes a number of entries equal to the number of the sub processors 1023. Here, it is assumed that the entry denoted by Q1 is coordinated with the sub processor 1023.

At this time, the sub processor 1023 reads out the value of the entry Q1 coordinated therewith. Further, the sub processor 1023 reads out data (0x20) from the first address in the sub memory 1027 indicated by the read out value (0x80) of the entry Q1.

The region of the sandbox 1 is specified based on the value of the entry Q1. For example, a value obtained by multiplying the value of the entry Q1 by 16 indicates the top address of the sandbox 1, and another value obtained by adding 255 to the top address indicates the end address of the sandbox 1. Accordingly, when the value of the entry Q1 is 0x80 as described above, the region of the sandbox 1 ranges from 0x800 to 0x8FF.

Further, the sub processor 1023 reads out data (0xF0) from the second address in the sub memory 1027 indicated by the data (0x20) read out from the first address mentioned above.

The region of the sandbox 2 is specified based on the data read out from the second address. More particularly, similarly as in the sandbox 1, a value obtained by multiplying the data read out from the second address by 16 indicates the top address of the sandbox 2, and a value obtained by adding 255 to the top address indicates the end address of the sandbox 2. Accordingly, when the data read out from the second address is 0xF0 as described hereinabove, the region of the sandbox 2 ranges from 0x200 to 0x2FF.

Furthermore, the sub processor 1023 reads out data (0x00) from the third address in the same sub memory 1027 indicated by the data (0xF0) read out from the second address mentioned above. The data 0x00 indicates the end of the allocated sandboxes.

The region of the sandbox 3 is specified based on the data read out from the third address. More particularly, similarly as in the sandboxes 1 and 2, a value obtained by multiplying the data read out from the third address by 16 indicates the top address of the sandbox 3, and a value obtained by adding 255 to the top address indicates the end address of the sandbox 3. Accordingly, when the data read out from the third address is 0x00 as described hereinabove, the region of the sandbox 3 ranges from 0xF00 to 0xFFF.

Thus, even if the addresses of sandboxes allocated to each of the sub processors 1023 are not successive, the sub processor 1023 can accurately access the sandboxes allocated thereto and can read out data with certainty from the sandboxes allocated thereto.

Now, a procedure for allowing the same sub processor 1023 to write data into a new sandbox in the main memory 1026 and then add the sandbox to a sandbox group managed with an entry in the address conversion register 1037, which corresponds to the sub processor 1023, is described with reference to FIG. 45B.

It is assumed that the sub processor 1023 writes data into a sandbox 4 of a region from 0x000 to 0x0FF in the main memory 1026. In this instance, the sub processor 1023 first reads out the value of the entry Q1 (initial value of the entry Q1, for example, 0x80 as described hereinabove).

Then, the sub processor 1023 writes the value (0x80) of the entry Q1 read out as above into an address in the sub memory 1027 with which the sandbox 4 into which the data has been written newly can be specified. For example, since the data has been written into the region from 0x000 to 0x0FF in the present cycle, the value (0x80) of the entry Q1 is written into an address in the sub memory 1027 indicated by 0x00 obtained by dividing the top address 0x000 by 16. Further, the sub processor 1023 writes the address (0x00) in the sub memory 1027, into which the value (0x80) of the entry Q1 has been written, as a new value of the entry Q1 into the entry Q1 in the address conversion register 1037.

Each sub processor 1023 can add a new sandbox to an existing sandbox group in such a manner as described above. Also in this instance, the addresses of the sandboxes may not be successive. Further, also where no existing sandbox group is found and the first sandbox is to be coordinated with the sub memory 1027 and the address conversion register 1037, the method described above can be used.

5-5. Accessing from the Main Processor and Each Sub Processor to the Working Memory Since the main memory 1026 is formed from a DRAM or the like and data is transferred in accordance with the DMA method as described hereinabove, each of the sub processors 1023 can use the main memory 1026 of a great capacity at a high speed. Further, the sub memory 1027 is formed from an SRAM or the like and can be used at a high speed similarly.

Further, if the main processor 1021 and the sub processors 1023 can commonly use the working memory 1029 included in the information processing controller as a working memory together with the main memory 1026 and the sub memory 1027 connected to the information processing controller, then higher speed operation can be anticipated.

Further, if the working memory 1029 can be used for simple numerical arithmetic operation, then the efficiency further enhances. Since the working memory 1029 is formed from an SRAM or the like as described above, although such a great capacity as can be achieved by a DRAM cannot be anticipated, the operation speed is very high.

In the following, a configuration and a procedure where the main processor 1021 and the sub processors 1023 access the working memory 1029 are described.

Figure 46:
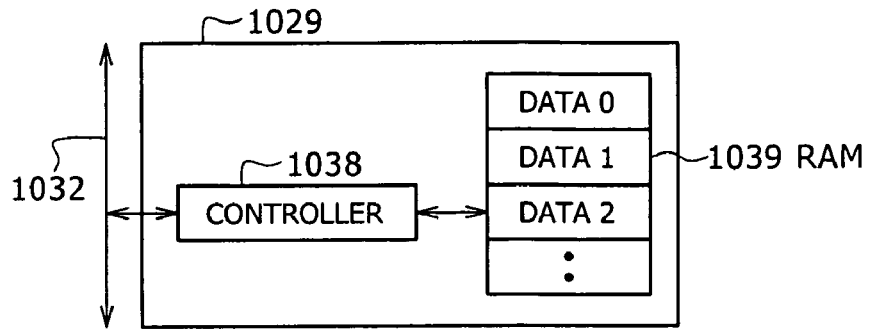
FIG. 46 is a block diagram showing an internal structure of a working memory.

Referring to FIG. 46, the working memory 1029 includes a controller 1038 and a RAM 1039. Although an SRAM can be used for the RAM 1039, the RAM 1039 is not limited to this. The RAM 1039 is formed from a plurality of blocks. Each of the blocks has an address allocated thereto and stores data therein.

The main processor 1021 and the sub processors 1023 access the RAM 1039 through the controller 1038. More particularly, each of the main processor 1021 and the sub processors 1023 transmits a command, an address, or data to the controller 1038, and the controller 1038 accesses the RAM 1039 in accordance with the received command, address, or data.

After the process is executed, the controller 1038 returns a command execution result to the main processor 1021 or the sub processor 1023 of the command sender.

The commands used when the sub processors 1023 access the working memory 1029 are, for example, same as such commands used for accessing to the main memory 1026 or the sub memory 1027 as illustrated in FIG. 44. Also the response of the execution result from the working memory 1029 after execution of the process has the same structure.

However, when the working memory 1029 is to be accessed, the preferential command identifier, normal command identifier, chain command identifier, and processing thread identifier among the commands illustrated in FIG. 44 are not used basically. However, if the working memory 1029 is ready for the identifiers mentioned, then the identifiers may be used. Such several command types as described below are available.

The first command is a read command. The read command is used to read out data in the working memory 1029. The main processor 1021 and the sub processors 1023 transmit an address of a block in the RAM 1039, into which desired data is to be stored, together with the read command. As an execution result, the OK/NG representative of the success/failure of the read command and read out data are transmitted back from the controller 1038.

The second command is a write command. The write command is used to write data into the working memory 1029. The main processor 1021 and the sub processors 1023 transmit the write command, data, and an address of a block in the RAM 1039 into which the data is to be stored. As an execution result, the OK/NG representative of the success/failure of the write command is transmitted back from the controller 1038.

The third command is an addition command. The addition command is used to add data in the working memory 1029. The main processor 1021 and the sub processors 1023 transmit the addition command and an address of a block in the RAM 1039 into which data to be added is stored. The controller 1038 adds 1 to the data in the block of the received address and overwrites the data with a result of the addition. As an execution result, the OK/NG representative of the success/failure of the addition command is transmitted back from the controller 1038.

The fourth command is a set command. The set command is used to operate data in the working memory 1029 in a unit of a bit. The main processor 1021 and the sub processors 1023 transmit the set command, an address of a block in the RAM 1039 into which data to be operated is stored, and mask data.

In response to the set command received, the controller 1038 compares the received mask data and the data in the block of the received address to set the value of the bit of the data at a position same as each of those bits of the mask data, which have the value of 1, to 1. As an execution result, "Completed" indicative of completion of the set command is transmitted back from the controller 1038. At this time, also the data before execution of the set command may be transmitted so that success/failure of the command can be confirmed.

The fifth command is a clear command. Also the clear command is used to operate data in the working memory 1029 in a unit of a bit. The main processor 1021 and the sub processors 1023 transmit the clear command, an address of a block in the RAM 1039 into which data to be operated is stored, and mask data.

In response to the clear command received, the controller 1038 compares the received mask data and the data in the block of the received address to clear the value of the bit of the data at a position same as each of those bits of the mask data, which have the value of 1, to 0. As an execution result, "Completed" indicative of completion of the clear command is transmitted back from the controller 1038. At this time, also the data before execution of the clear command may be transmitted so that success/failure of the command can be confirmed.

As described above, the main processor 1021 and the sub processors 1023 can use the working memory 1029 commonly in addition to the main memory 1026 of a large capacity and the sub memory 1027 of high speed operation. Further, if the working memory 1029 is utilized as a cache for the sub memory 1027, then further high speed operation can be anticipated.

5-6. Processing Threads in the Sub Processors)

As described hereinabove, the sub processors 1023 in one information processing controller are structurally independent of each other. Accordingly, each of the sub processors 1023 can execute a sub process program and process data independently. Further, it is a possible idea to provide a plurality of processing threads virtually independent of each other in each of the sub processors 1023. The structure of the sub processors 1023 is shown in FIG. 47.

Figure 47:
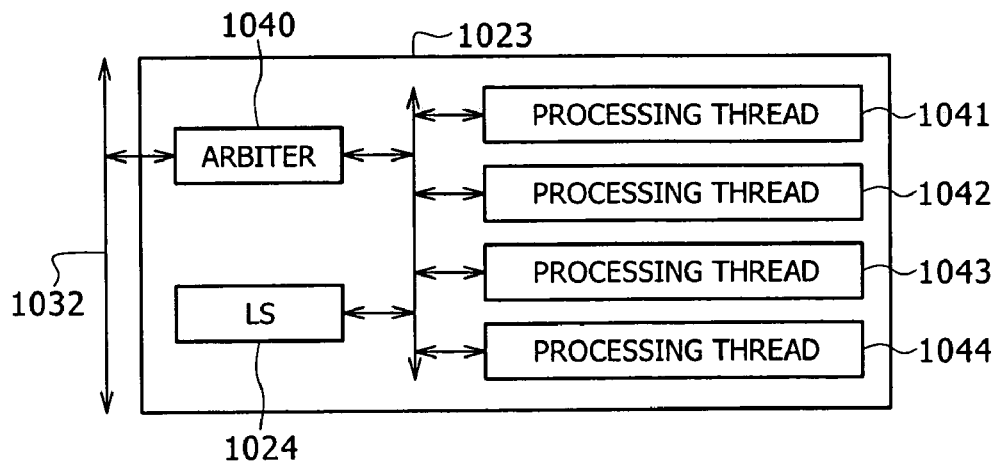
FIG. 47 is a block diagram showing an internal structure of the sub processor.

Referring to FIG. 47, each of the sub processors 1023 is connected to a bus 1032 through an arbiter 1040 provided in the inside thereof. The sub processor 1023 includes a local storage (LS) 1024, and processing threads 1041, 1042, 1043, and 1044. The arbiter 1040 takes charge of notifying an appropriate processing thread of a signal received from the outside.

Although the processing threads 1041, 1042, 1043, and 1044 are shown independently of each other in FIG. 47, they actually are virtually independent of each other. The processing threads 1041, 1042, 1043, and 1044 have processing thread identifiers allocated thereto individually and can operate independently of and in parallel to each other.

Since the processing threads 1041, 1042, 1043, and 1044 access the main memory 1026, sub memory 1027, or working memory 1029 independently of each other, a response must be returned with certainty to a processing thread of the source of transmission of the command. A procedure for this is described below.

The commands used to access the memories by the processing threads 1041, 1042, 1043, and 1044 are, for example, same as those commands used when the sub processors 1023 access the memories as illustrated in FIG. 44. Also responses of a result of execution from the memories after the process have the same structure.

Although the command/response structure of FIG. 44 is described hereinabove, the sub processor identifier is a sub processor ID of the sub processor of the sender of the command. Further, the processing thread identifier is used to identify which one of processing threads in the sub processor is the sender of the command.

A response from the main memory 1026, sub memory 1027, or working memory 1029 is transmitted first back to the sub processor 1023 of the sender of the command based on the sub processor identifier. Further, the response is transmitted to the processing thread of the sender of the command by the arbiter 1040 in the sub processor 1023 based on the processing thread identifier.

However, where any one of a plurality of processing threads in a sub processor may be used such as where the same process is performed, the response may be transmitted to that one of the processing threads to which the load is light without depending upon the processing thread identifier. Further, every time a response is received from the main memory 1026, sub memory 1027, or working memory 1029, one of a plurality of processing threads may be selected in order such that the response is transmitted back to the selected processing thread.

In this manner, even where a plurality of processing threads in each of the sub processors 1023 access the main memory 1026, sub memory 1027, or working memory 1029 independently of each other, a response can be transmitted back to a processing thread of the sender of the command with certainty.

5-7. Management of Sub Processor Programs by the Control Register

Where a plurality of sub processors 1023 are included in one information processing controller and each of the sub processors 1023 includes a plurality of processing threads, it is significant for implementation of high speed operation of the information processing controller to determine which one of the processing threads should be used to process a sub processor program which is to be processed in the information processing controller.

Therefore, a configuration and a procedure, which use the control register 1028 shown in FIG. 41, to allocate processes of sub processor programs appropriately to individual processing threads so that the information processing controller may operate efficiently are described below.

Figure 48:
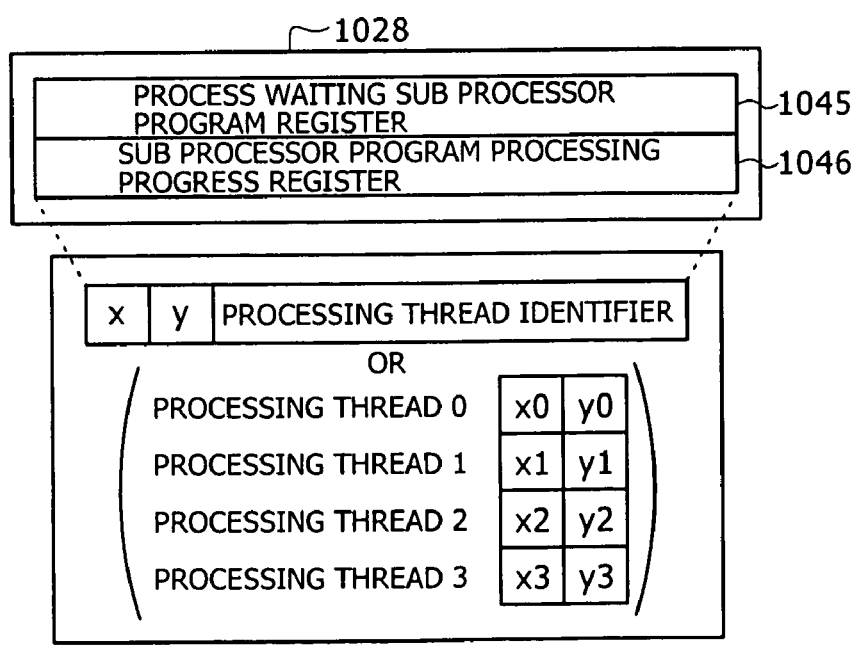
FIG. 48 is a block diagram showing an internal structure of a control register.

Referring to FIG. 48, the control register 1028 includes a process waiting sub processor program register 1045 and a sub processor program processing progress register 1046.

The process waiting sub processor program register 1045 is described. If a sub processor program to be processed in the information processing controller appears, then the main processor 1021 writes an address of the main memory 1026, sub memory 1027, working memory 1029, or local storage (LS) 1022 or 1024 in which the sub processor program or data relating to the sub processor program is stored into the process waiting sub processor program register 1045.

In a state wherein a sub processor program to be executed does not exist, the value of the process waiting sub processor program register 1045 is zero. All processing threads read out, while they themselves execute no sub processor program, the value of the process waiting sub processor program register 1045 periodically or non-periodically, and that one of the processing threads that has read out a value other than zero executes the process.

Further, the processing thread writes the value of zero into the process waiting sub processor program register 1045. The processing thread, which is to perform the process, reads out and processes the sub processor program of an object of the process or relating data based on the read out value of the process waiting sub processor program register 1045. At this time, the sub processor program may have been read out already by the sub processor 1023, which has the processing thread, and may not have to be read out any more.

In this manner, the process of the sub processor program can be allocated rapidly to a processing thread, which is not executing any sub processor program and hence has a sufficient processing capacity. The information processing controller can operate efficiently.

The sub processor program processing progress register 1046 is a 2-bit (x, y) register into which a processing thread to which a process of a sub process program is allocated is to write a progressing situation of the process. For example, (0, 0) represents that the process is not executed as yet; (0, 1) represents that the process is being executed at a stage 1; (1, 0) represents that the process is being executed at another stage 2; and (1, 1) represents completion of the process. Further, the processing thread identifier may be written together with the 2 bits so that the processing thread to which the process is allocated may be represented.

Further, as indicated as processing threads 0, 1, 2, and 3 in FIG. 48, a register into which a progressing situation of a process of a sub processor program may be provided for each of processing threads in the information processing controller.

The sub processor program processing progress register 1046 can be accessed by the main processor 1021, all of the sub processors 1023, and all of the processing threads in the information processing controller. Consequently, the progressing situation of the process of the sub processor program can be grasped precisely. Further where a process progressing register is provided for each processing thread, the process progressing situation can be grasped also when a plurality of sub processor programs are executed simultaneously.

The example of the processing thread management method where each of the sub processors 1023 has a plurality of processing threads virtually independent of each other is such as described above.

It is to be noted that, in the following description, where a sub processor performs some process, any one of the processing threads in the sub processor may be performed and no difference appears between results of execution by different processing threads. Therefore, description of how a plurality of processing threads in a sub processor take charge of contents of a process is omitted herein.

5-8. Production and Configuration of a Software Cell

In the network system of FIG. 41, a software cell is transmitted between the information processing apparatus 1001, 1002, 1003, and 1004 so that distributed processing may be performed by the information processing apparatus 1001, 1002, 1003, and 1004. In particular, the main processor 1021 included in the information processing controller in a certain information processing apparatus produces a software cell including a command, a program, and data and transmits the software cell to another information processing apparatus through the network 1009 to achieve distribution of processing.

FIG. 3 shows an example of a configuration of a software cell. Referring to FIG. 3, the software cell shown generally includes a sender ID, a transmission destination ID, a response destination ID, a cell interface, a DMA command, a program, and data.

The sender ID includes a network address and the information processing apparatus ID of an information processing apparatus of the sender of the software cell. The sender ID includes identifiers (main processor ID and sub processor IDs) of the main processor 1021 and the sub processors 1023 included in the information processing controller in the information processing apparatus.

The transmission destination ID and the response destination ID individually include the same information regarding an information processing apparatus of the transmission destination of the software cell and an information processing apparatus of the response destination of a result of execution of the software cell.

The cell interface is information necessary for utilization of the software cell and includes a global ID, information of necessary sub processors, a sandbox size, and a preceding software cell ID.

The global ID allows unique identification of the software cell through the entire network and is produced based on the sender ID and the date and hour of production or transmission of the software cell.

The information of necessary sub processors has set therein the number of sub processors necessary for execution of the software cell. The sandbox size has set therein the memory capacities in the main memory 1026 and the local storages 1024 of the sub processors 1023 necessary for execution of the software cell.

The preceding software cell ID is an identifier of a preceding software cell among software cells of one group, which requires sequential execution such as streaming data.

An execution section of a software cell is formed from the DMA command, program, and data. The DMA command includes a series of DMA commands necessary to start the program, and the program includes sub processor programs to be executed by the sub processors 1023. The data here is data to be processed by the program including the sub processor programs.

The DMA command further includes a load command, a kick command, a function program execution command, a status request command, and a status return command.

The load command is a command for loading information in the main memory 1026 into the local storage 1024 of a sub processor 1023 and includes, in addition to the load command itself, a main memory address, a sub processor ID, and an LS (Local Storage) address. The main memory address indicates an address of a predetermined area in the main memory 1026, which is a load source of the information. The sub process ID and the LS address indicate the identifier and the address of the local storage 1024 of the sub processor 1023 of a load destination of the information.

The kick command is a command for starting execution of a sub processor program and includes, in addition to the kick command, a sub processor ID and a program counter. The sub processor ID identifies a sub processor 1023 of a kicking object, and the program counter provides an address for the program counter for execution of the program.

The function program execution command is a command used by a certain information processing apparatus to request another information processing apparatus for execution of a function program as hereinafter described. The information processing controller in the information processing apparatus, which receives the function program execution command, identifies a function program to be started from a function program ID hereinafter described.

The status request command is a command for requesting for transmission of apparatus information regarding a current operation state (situation) of an information processing apparatus indicated by the transmission destination ID to an information processing apparatus indicated by the response destination ID. While the function program is hereinafter described, it is a program categorized into a function program in FIG. 6, which illustrates a configuration of software stored in the main memory 1026 of the information processing apparatus. The function program is loaded into the main memory 1026 and executed by the main processor 1021.

The status return command is a command used by an information processing apparatus, which receives the status request command, to issue a response of apparatus information of the information processing apparatus itself to an information processing apparatus indicated by the response destination ID included in the status request command. The status return command places the apparatus information into the data region of the execution section.

FIG. 4 illustrates a structure of the data area of a software cell where the DMA command is the status return command.

Referring to FIG. 4, the information processing apparatus ID is an identifier for identifying an information processing apparatus, which includes an information processing controller, and represents the ID of an information processing apparatus that transmits the status return command. The information processing apparatus ID is produced, when the power supply is made available, based on the date and hour when the power supply is made available, the network address of the information processing apparatus, the number of sub processors 1023 included in the information processing controller in the information processing apparatus, and so forth by the main processor 1021 included in the information processing controller in the information processing apparatus.

The information processing apparatus type ID includes a value representative of a characteristic of the information processing apparatus. The characteristic of the information processing apparatus is, for example, a hard disk recorder, a PDA (Personal Digital Assistant), a portable CD (Compact Disc) player, or the like hereinafter described. The information processing apparatus type ID may be of the type representing a function of the information processing apparatus such as image and sound recording or image and sound reproduction. The value representative of a characteristic or a function of an information processing apparatus is determined in advance. If the information processing apparatus type ID is read out, then a characteristic or a function of the information processing apparatus can be grasped.

The MS (Master/Slave) status represents as which one of a master apparatus and a slave apparatus the information processing apparatus operates as hereinafter described. Where the MS status is set to 0, this represents that the information processing apparatus should operate as a master apparatus, but where the MS status is set to 1, this represents that the information processing apparatus should operate as a slave apparatus.

The main processor operation frequency represents an operation frequency of the main processor 1021 in the information processing controller. The main processor utilization factor represents the utilization factor in the main processor 1021 regarding all programs, which are operating in the main processor 1021 at present. The main processor utilization factor is a value representing the ratio of the processing capacity being currently used to the overall processing capacity of the object main processor and is calculated, for example, in a unit of MIPS, which is a unit for evaluation of the processor processing capacity, or based on the processor utilization time per unit time. This similarly applies also to a sub processor utilization factor hereinafter described.

The sub processor number represents the number of sub processors 1023 provided in the information processing controller. The sub processor ID represents an identifier for identification of a sub processor 1023 in the information processing controller.

The sub processor status represents a status of each sub processor 1023 and may be one of an unused status, a reserved status, a busy status, and so forth. The unused status indicates that the sub processor is not used at present and is not reserved for use either. The reserved status indicates that the sub processor is not used but is reserved for use. The busy status indicates that the sub processor is currently used.

The sub processor utilization factor represents the utilization factor in the sub processor regarding a sub processor program being executed by the sub processor or being reserved for execution in the sub processor. In other words, the sub processor utilization factor indicates the utilization factor at present where the sub processor status is busy, but indicates an estimated utilization factor with which the sub processor is planned to be used later where the sub processor status is reserved.

One set of the sub processor ID, sub processor status, and sub processor utilization factor is set for one sub processor 1023. Consequently, a number of sets corresponding to the number of sub processors 1023 in one information processing controller are set.

The main memory total capacity and the main memory utilization capacity represent the total capacity and the capacity being currently used of the main memory 1026 connected to the information processing controller, respectively.

The external recording section number represents the number of external recording sections 1031 connected to the information processing controller. The external recording section ID is information for unique identification of each of the external recording sections 1031 connected to the information processing controller. The external recording section type ID represents the type of each of the external recording sections 1031 (for example, a hard disk, a CD±RW, a DVD±RW, a memory disk, an SRAM, a ROM, or the like).

The external recording section total capacity and the external recording section utilization capacity represent the total capacity and the currently used capacity of an external recording section 1031 identified with the external recording section ID, respectively.

A set of the external recording section ID, external recording section type ID, external recording section total capacity, and external recording section utilization capacity is set for one external recording section 1031. Consequently, a number of sets corresponding to the number of external recording sections 1031 connected to the information processing controller are set. In particular, where a plurality of external recording sections are connected to an information processing controller, different external recording section IDs are applied individually to the external recording sections, and also the external recording section type IDs, external recording section total capacities, and external recording section utilization capacities are managed separately from each other.

5-9. Execution of a Software Cell)

The main processor 1021 included in the information processing controller in a certain information processing apparatus produces a software cell having such a configuration as described above and transmits the software cell to a different information processing apparatus through the network 9 and also to the information processing controller in the certain information processing apparatus. The information processing apparatus of the sender, the information processing apparatus of the transmission destination, the information processing apparatus of the response destination, and the information processing controllers in the apparatus mentioned are individually identified with the sender ID, transmission destination ID, and response destination ID described hereinabove, respectively.

The main processor 1021 included in the information processing controller in the information processing apparatus receiving the software cell stores the software cell into the main memory 1026. Further, the main processor 1021 of the transmission destination reads out the software cell and processes the DMA command included in the software cell.

In particular, the main processor 1021 of the transmission destination first executes the load command. Consequently, the information is loaded from the main memory address indicated by the load command into a predetermined area of the local storage 1024 in a sub processor specified by the sub processor ID and the LS address included in the load command. The information loaded here is a sub processor program or data or some other indicated data included in the received software cell.

Then, the main processor 1021 outputs the kick command to a sub processor indicated by the sub processor ID included in the kick command together with a program counter included in the kick command similarly.

The indicated sub processor executes the sub processor program in accordance with the kick command and the program counter. Then, the sub processor stores a result of the execution into the main memory 1026, and then notifies the main processor 1021 of completion of the execution.

It is to be noted that the processor executing the software cell in the information processing controller in the information processing apparatus of the transmission destination is not limited to a sub processor 1023, but it is possible to designate the main processor 1021 so as to execute a main memory program such as a function program included in the software cell.

In this instance, the information processing apparatus of the sender transmits, to the information processing apparatus of the transmission destination, a software cell whose DMA command is the load command. The software cell includes a main memory program and data to be processed by the main memory program in place of the sub processor program. The main memory program and the data to be processed by the main memory program are stored into the main memory 1026.

Then, the information processing apparatus of the sender transmits, to the information processing apparatus of the transmission destination, a software cell whose DMA command is the kick command or the function program execution command. The software cell includes the main processor ID and main memory address of the information processing controller in the information processing apparatus of the transmission destination, an identifier for identification of the main memory program such as a function program ID hereinafter described, and a program counter. Thus, the main processor 1021 may execute the main memory program.

As described above, in the network system according to the present embodiment, an information processing apparatus of the sender transmits a sub processor program or a main memory program in the form of a software cell to an information processing apparatus of the transmission destination. Further, the information processing apparatus of the sender causes the information processing controller in the information processing apparatus of the transmission destination to load the sub processor program into a sub processor 1023. Consequently, the information processing apparatus of the sender can cause the information processing apparatus of the transmission destination to execute the sub processor program or the main memory program.

Where the program included in the received software cell is a sub processor program, the information processing controller in the information processing apparatus of the transmission destination loads the sub processor program into a designated sub processor. Thus, the information processing controller causes the sub processor to execute the sub processor program or the main memory program included in the software cell.

Accordingly, even if the user does not operate the information processing apparatus of the transmission destination, the sub processor program or the main memory program can be executed automatically by the information processing controller in the information processing apparatus of the transmission destination.

In this manner, any information processing apparatus can acquire, where the information processing controller thereof does not include a sub processor program or a main memory program such as a function program, such programs from another information processing apparatus connected thereto by the network. Further, each sub processor and the main memory can transfer data therebetween in accordance with the DMA system and such sandboxes as described hereinabove are used. In such a case, even where it is necessary to process data at multiple states within one information processing controller, the processing can be executed at a high speed and with a high degree of security.

6. Distributed Processing 2 of the Network System

Figure 49:
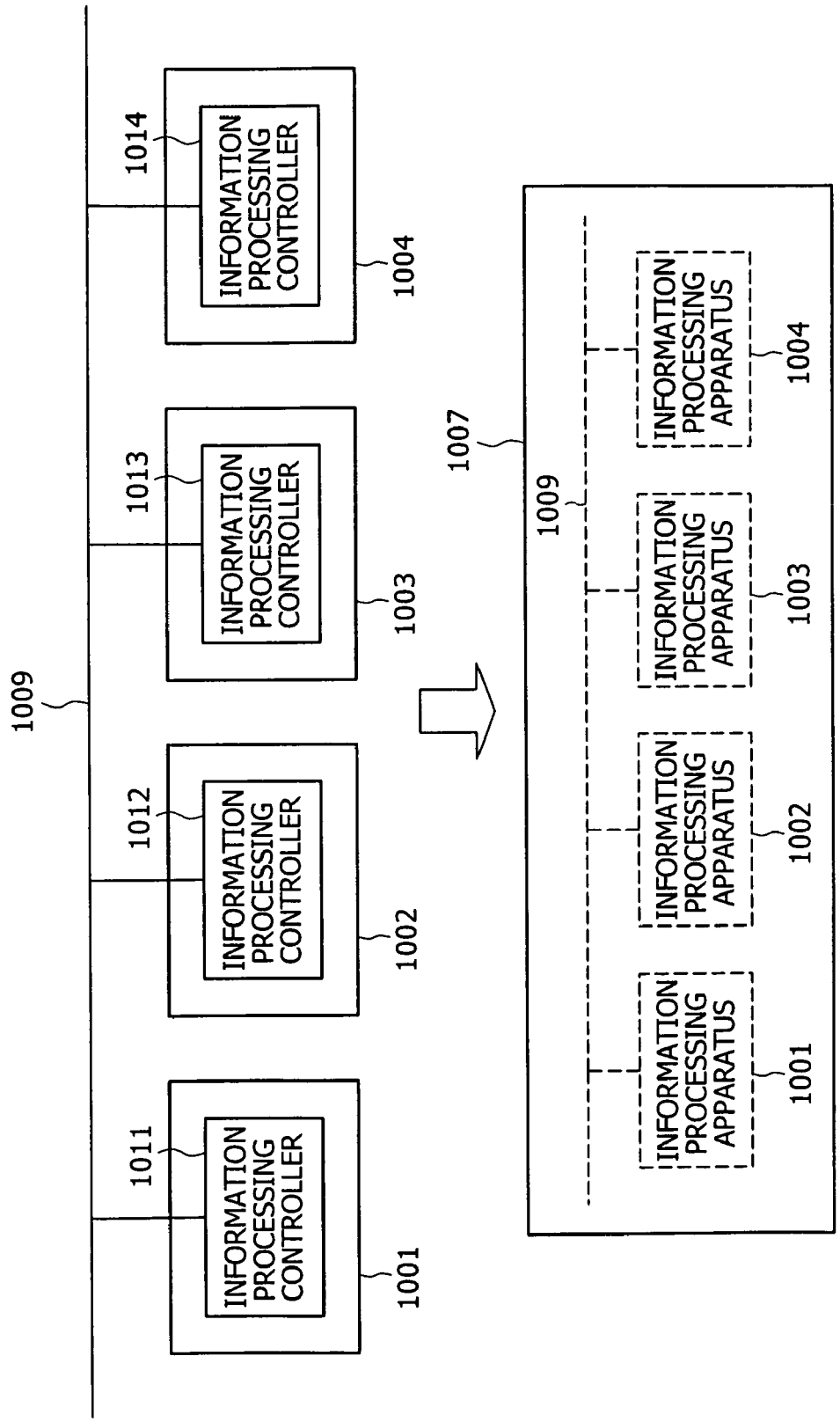
FIG. 49 is a diagrammatic view showing a plurality of information processing apparatus where they operate as a virtual single information processing apparatus.

As a result of the distributed processing through use of a software cell, the plural information processing apparatus 1001, 1002, 1003 and 1004 connected to the network 1009 as seen at the upper stage in FIG. 49 operate as a virtual single information processing apparatus 1007 as seen at the lower stage in FIG. 49. However, in order to implement such virtual operation as just described, processes described below must be executed by such a configuration as described below.

6-1. Software Configuration of the System and Loading of a Program

FIG. 6 illustrates a configuration of software to be stored by the main memories 1026 of the individual information processing controllers. Referring to FIG. 6, the pieces of software (programs) are recorded in an external recording section 1031 connected to the information processing controller before the power supply is made available to the information processing apparatus.

The programs are categorized, depending upon the function or characteristic thereof, into control programs, function programs, and device drivers.

The control programs are provided commonly in the information processing controllers and executed by the main processor 1021 in each of the information processing controllers. The control programs include an MS (Master/Slave) manager and a capacity exchange program hereinafter described.

The function programs are executed by the main processors 1021, and for each information processing apparatus, such function programs as a recording program, a reproduction program, a material search program, and so forth are provided for the information processing controller.

The device drivers are provided for inputting and outputting (transmission and reception) of each information processing controller (information processing apparatus), and such devices as those for broadcast reception, monitor outputting, bit stream inputting/outputting, network inputting/outputting, and so forth, which are suitable for each of the information processing apparatus, are provided for the information processing controller.

When the power supply is made available to an information processing apparatus in a state wherein the information processing apparatus is physically connected to the network 1009 by connection of a cable or the like and consequently the information processing apparatus is connected to the network 1009 also electrically and functionally, the main processor 1021 of the information processing controller of the information processing apparatus loads the programs belonging to the control programs and the programs belonging to the device drivers into the main memory 1026.

As a loading procedure of the programs, the main processor 1021 first controls the DC 1030 to execute a reading out instruction to read out the programs from the external recording section 1031 and then controls the DMAC 1025 to execute a writing instruction to write the programs into the main memory 1026.

The programs belonging to the function programs may be handled such that only a necessary one of the programs is loaded when necessary or otherwise such that all of them are loaded immediately after the main power supply is made available similarly to the programs belonging to the other categories.

The programs belonging to the function programs need not necessarily be recorded in the external recording sections 1031 of all of the information processing apparatus connected to the network, but if they are recorded in an external recording section 1031 of any one of the information processing apparatus, they can be loaded into the other information processing apparatus by the method described hereinabove. As a result, the function programs can be executed by the virtual single information processing apparatus 1007 as shown at the lower stage of FIG. 49.

As described hereinabove, a function program executed by the main processor 1021 sometimes operates cooperatively with a sub processor program processed by a sub processor 1023. Therefore, when the main processor 1021 reads out a function program from the external recording section 1031 and writes the function program into the main memory 1026, if any sub processor is to operate cooperatively with the object function program, then the main processor 1021 writes also the sub processor program into the same main memory 1026 together. In this instance, although a single sub processor program may be to operate cooperatively, a plurality of sub processor programs may possibly be to operate cooperatively. Where a plurality of sub processor programs are to operate cooperatively, all of them are written into the main memory 1026.

Each sub processor program written in the main memory 1026 is thereafter written into the local storage 1024 in the sub processor 1023 and operates cooperatively with the function program processed by the main processor 1021.

As described hereinabove in connection with the software cell shown in FIG. 3, an identifier, with which a program can be identified uniquely, is allocated as a function program ID to each of the function programs. The function program ID is determined from the date and hour of production, the information processing apparatus ID, and so forth at a stage of production of the function program.

Also each sub processor program has a sub processor program ID allocated thereto so that the sub processor program can be identified uniquely. The sub processor program ID allocated in this manner may be an identifier which has some relationship to the function program ID of the function program of the counterpart of the cooperative operation thereof such as, for example, an identifier which is composed of the function program ID as a parent number and a branch number added to the tail end of the function program ID. However, the sub processor program ID may otherwise be an identifier having no relationship to the function program ID of the function program of the counterpart of the cooperative operation.

Anyway, where a function program and a sub processor program should operate cooperatively, it is necessary for each of them to store the program ID of the identifier of the counterpart therein. Also where a function program should operate cooperatively with a plurality of sub processor programs, the function program stores all of the sub processor program IDs of the plural sub processor programs.

The main processor 1021 secures, in the main memory 1026, an area for storing apparatus information (information relating to the apparatus such as a type, a capacity and an operation state of the apparatus, resources owned by the apparatus and so forth) of the information processing apparatus in which the main processor 1021 operates, and records the information as an apparatus information table of the information processing apparatus itself. The apparatus information here is information of the information processing apparatus ID and so forth illustrated in FIG. 4.

6-2. Determination of the Master/Slave in the System

In the network system described above, when the main power supply to a certain information processing apparatus is made available, the main processor 1021 of the information processing controller of the information processing apparatus loads a master/slave manager (hereinafter referred to as MS manager) into the main memory 1026 and executes the master/slave manager.

After the MS manager detects that the information processing apparatus in which the MS manager operates is connected to the network 1009, it confirms presence of the other information processing apparatus connected to the same network 1009. The "connection" or "presence" here represents that the information processing apparatus is connected to the network 1009 not only physically but also electrically and functionally.

The information processing apparatus in which the MS manager itself operates is hereinafter referred to as self apparatus, and any other information processing apparatus is referred to as different apparatus. Also the term pertaining apparatus represents the pertaining information processing apparatus.

A method by which the MS manager confirms presence of a different information processing apparatus connected to the same network 1009 is described in the following.

The MS manager produces a software cell that designates the status request command as the DMA command and designates the pertaining information processing apparatus as the sender ID and the response destination ID but does not specify the transmission destination ID. Then, the MS manager transmits the software cell to the network to which the pertaining information processing apparatus is connected, and sets a timer for network connection confirmation. The timeout time of the timer is, for example, 10 minutes.

If a different information processing apparatus is connected to the network system, then the different apparatus receives the software cell of the status request command and transmits a software cell whose DMA command is the status return command and which includes apparatus information of the self apparatus (different apparatus) as the data to an information processing apparatus which is specified by the response destination ID of the received software cell and has issued the status request command. The software cell of the status return command at least includes information for specifying the different apparatus (information processing apparatus ID, information regarding the main processor, information regarding a sub processor, or the line) and the MS status of the different apparatus.

The MS manager of the information processing apparatus, which has issued the status request command, supervises reception of a software cell of the status return command transmitted from the different apparatus on the network until timeout occurs with the timer for network connection confirmation. As a result, if the status return command representative of the MS status=0 (master apparatus) is received, then the MS status in the apparatus information table of the self apparatus is set to 1. Consequently, the pertaining apparatus becomes a slave apparatus.

On the other hand, if no status return command is received within the time until timeout occurs with the timer for network connection confirmation, or if the status return command representative of the MS status=0 (master apparatus) is not received, then the MS status in the apparatus information table of the self apparatus is set to 0. Consequently, the pertaining apparatus becomes a master apparatus.

In short, if a new information processing apparatus is connected to the network 1009 in a state wherein no apparatus is connected to the network 1009 or in another state wherein a master apparatus does not exist on the network 1009, then the pertaining apparatus is automatically set as a master apparatus. On the other hand, if a new information processing apparatus is connected to the network 1009 in a further state wherein a master apparatus exists already on the network 1009, then the pertaining apparatus is automatically set as a slave apparatus.

In any of the master apparatus and slave apparatus, the MS manager periodically transmits the status request command to the different apparatus on the network 1009 to inquire about the status information to supervise the situation of the different apparatus. As a result, when the connection state of the network 1009 undergoes a variation such as when the main power supply to an information processing apparatus connected to the network 1009 is cut or an information processing apparatus is disconnected from the network 1009 and consequently the status return command is not returned from the particular different apparatus within a predetermined period of time set for the discrimination in advance, the information is conveyed to a capacity exchange program hereinafter described.

6-3. Acquisition of Apparatus Information Between the Master Apparatus and a Slave Apparatus If the main processor 1021 receives, from the MS manager, a notification of an inquiry about a different apparatus on the network 1009 and completion of setting of the MS status of the self apparatus, then it executes a capacity exchange program.

The capacity exchange program acquires, if the self apparatus is a master apparatus, apparatus information of all different apparatus connected to the network 1009, that is, apparatus information of all slave apparatus.

The acquisition of apparatus information of a different apparatus can be performed such that the DMA command produces and transmits a software cell of the status request command to the different apparatus and then receives a software cell whose DMA command is the status return command and includes apparatus information of the different apparatus as the data from the different apparatus.

The capacity exchange program secures an area for storing apparatus information of all different apparatus (all slave apparatus) connected to the network 1009 in the main memory 1026 of the self apparatus and stores the information as apparatus information tables of the different apparatus (slave apparatus) similarly to the apparatus information table of the self apparatus as the master apparatus.

In other words, the apparatus information of all of the information processing apparatus connected to the network 1009 including the self apparatus is stored as apparatus information tables in the main memory 1026 of the master apparatus.

On the other hand, if the self apparatus of the capacity exchange program is a slave apparatus, then the capacity exchange program acquires the apparatus information of all of the different apparatus connected to the network 1009, that is, the apparatus information of the master apparatus and all of the slave apparatus other than the self apparatus, and records the information processing apparatus IDs and the MS statuses included in the apparatus information into the main memory 1026 of the self apparatus.

In other words, in the main memory 1026 of each slave apparatus, the apparatus information of the self apparatus is recorded as an apparatus information table, and the information processing apparatus IDs and the MS statuses of all of the master apparatus and the slave apparatus connected to the network 1009 other than the self apparatus are recorded as different apparatus information tables.

Further, in any of the master apparatus and the slave apparatus, when the capacity exchange program receives a notification that an information processing apparatus is newly connected to the network 1009 from the MS manager as described above, it acquires apparatus information of the information processing apparatus and registers the apparatus information into the main memory 1026 in such a manner as described hereinabove.

It is to be noted that the MS manager and the capacity exchange program may be executed not by the main processor 1021 but by any sub processor 1023. Further, the MS manager and the capacity exchange program preferably are resident programs that operate normally while the main power supply to the information processing apparatus is available.

6-4. When an Information Processing Apparatus is Disconnected from the Network

In any of the master apparatus and the slave apparatus, if the capacity exchange program is notified from the MS manager that the main power supply to an information processing apparatus connected to the network 1009 is disconnected or an information processing apparatus is disconnected from the network 1009, it deletes the apparatus information table of the information processing apparatus from the main memory 1026 of the self apparatus.

Further, if the information processing apparatus disconnected from the network 1009 is the master apparatus, then another master apparatus is determined newly by the following method.

In particular, for example, each of those information processing apparatus that are not disconnected from the network 1009 replaces the information processing apparatus IDs of the self apparatus and the different apparatus into numerical values and compares the information processing apparatus ID of the self apparatus with the information processing apparatus IDs of the different apparatus. If the information processing apparatus ID of the self apparatus exhibits the lowest value among the information processing apparatus that are not disconnected from the network 1009, then the slave apparatus changes itself to the master apparatus and sets the MS status to zero. Then, it operates as the master apparatus and acquires and records the apparatus information of all of the different apparatus (slave apparatus) connected to the network 1009 into the main memory 1026 as described hereinabove.

6-5. Distributed Processing Between Information Processing Apparatus Based on Apparatus Information In order to allow a plurality of information processing apparatus 1001, 1002, 1003 and 1004 connected to the network 1009 to operate as a virtual single information processing apparatus 1007 as shown at the lower stage of FIG. 49, it is necessary for the master apparatus to grasp an operation of a user and operation states of the slave apparatus.

Figure 50:
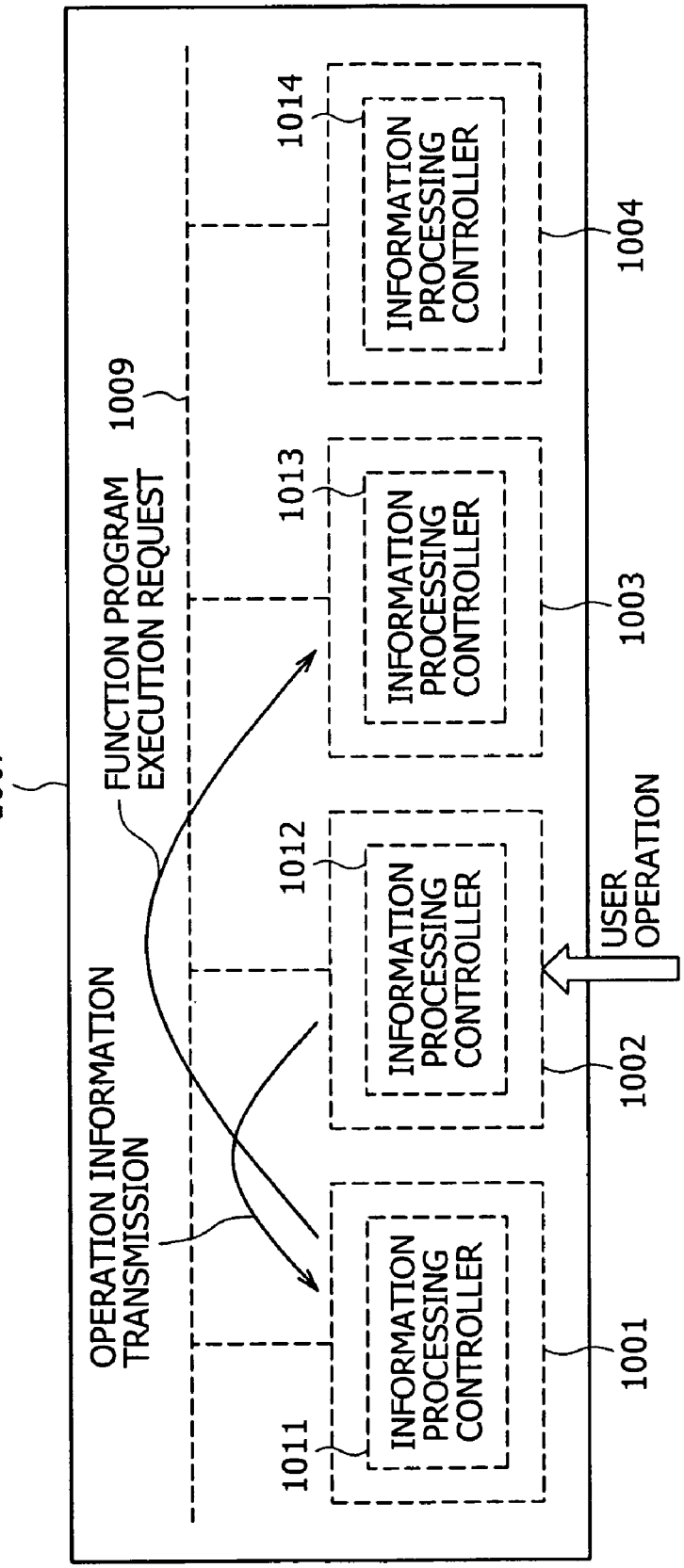
FIG. 50 is a diagrammatic view showing four information processing apparatus where wherein they operate as a virtual single information processing apparatus.

FIG. 50 shows four information processing apparatus in a state wherein they operate as a virtual single information processing apparatus 1007. It is assumed that the information processing apparatus 1001 acts as the master apparatus while the information processing apparatus 1002, 1003 and 1004 act as slave apparatus A, B, and C, respectively.

When a user operates any of the information processing apparatus connected to the network 1009, if the object of the operation is the master apparatus 1001, then the operation information then is grasped directly by the master apparatus 1001. On the other hand, if the object of the operation is a slave apparatus, then the operation information then is transmitted from the operated slave apparatus to the master apparatus 1001. In other words, irrespective of whether the object of operation of the user is the master apparatus 1001 or one of the slave apparatus, the master apparatus 1001 always grasps the operation information. Transmission of the operation information is performed, for example, using a software cell whose DMA command is the operation information transmission command.

Then, the main processor 1021-1 included in the information processing controller 1011 in the master apparatus 1001 selects a function program to be executed in accordance with the operation information. In this instance, if necessary, the main processor 1021-1 included in the information processing controller 1011 in the master apparatus 1001 loads the function program from the external recording section 1031-1 or 1031-2 of the self apparatus into the main memory 1026-1 using the method described hereinabove. However, the function program may otherwise be transmitted from a different information processing apparatus (slave apparatus) to the master apparatus 1001.

The function program defines required specifications regarding apparatus such as an information processing apparatus type ID, a processing capacity of the main processor or a sub processor, a main memory utilization capacity, and conditions relating to an external recording section as represented as various types of information in FIG. 4, which are required for each execution unit.

The main processor 1021-1 included in the information processing controller 1011 in the master apparatus 1001 reads out such requested specifications required by the individual function programs. Further, the main processor 1021-1 refers to the apparatus information tables recorded in the main memory 1026-1 by the capacity exchange program in advance to read out the apparatus information of the individual information processing apparatus. The apparatus information here signifies the items of information including the item of the information processing apparatus ID and the succeeding items illustrated in FIG. 4 and is information relating to the main processor, sub processors, main memory, and external recording sections.

The main processor 1021-1 included in the information processing controller 1011 in the master apparatus 1001 successively compares the apparatus information of the information processing apparatus connected to the network 1009 with the required specifications necessary for execution of the function program.

For example, if the function program requires a recording function, then the main processor 1021-1 specifies and extracts only those information processing apparatus, which have a recording function, based on the information processing apparatus type IDs. Further, the main processor 1021-1 specifies that one of the slave apparatus which can assure the processing capacity of the main processor or a sub processor necessary to execute the processing program, the main memory utilization capacity, and conditions regarding an external recording section as an execution request candidate apparatus. Here, if a plurality of execution request candidate apparatus are specified, then one of the execution request candidate apparatus is specified and selected.

After a slave apparatus to which an execution request is to be issued is specified, the main processor 1021-1 included in the information processing controller 1011 in the master apparatus 1001 updates the apparatus information table with regard to the specified slave apparatus recorded in the main memory 1026-1 included in the information processing controller 1011 in the self apparatus.

Further, the main processor 1021-1 included in the information processing controller 1011 in the information processing apparatus 1001 produces a software cell, which includes the function program execution command as the DMA command, and sets information of a necessary sub processor and the sandbox size (refer to FIG. 17) regarding the function program to the cell interface of the software cell. Then, the main processor 1021-1 transmits the resulting software cell to the slave apparatus, which is requested to execute the function program.

The slave apparatus requested to execute the function program executes the function program and updates the apparatus information table of the self apparatus. In this instance, if necessary, the main processor 1021 included in the information processing controller in the slave apparatus loads the function program and a sub processor program or programs, which should operate cooperatively with the function program, from an external recording section 1031 of the self apparatus into the main memory 1026 using the method described hereinabove.

The system may be configured such that, if the necessary function program or a sub processor program or programs which should operate cooperatively with the function program is not recorded in any of the external recording sections 1031 of the slave apparatus requested to execute the function program, then a different information processing apparatus transmits the function program and the sub processor program or programs to the slave apparatus requested to execute the function program.

Also it is possible for the sub processor program or programs to be executed by a different information processing apparatus making use of the load command and the kick command described hereinabove.

After the execution of the function program comes to an end, the main processor 1021 included in the information processing controller in the slave apparatus having executed the function program transmits an execution end notification to the main processor 1021-1 included in the information processing controller 1011 in the master apparatus 1001, and updates the apparatus information table of the self apparatus. The main processor 1021-1 included in the information processing controller 1011 in the master apparatus 1001 receives the end notification and updates the apparatus information table of the slave apparatus having executed the function program.

The main processor 1021-1 included in the information processing controller 1011 in the master apparatus 1001 may possibly select the self apparatus as an information processing apparatus, which can execute the function program, from a result of the reference to the apparatus information tables of the self apparatus and the different apparatus. In this instance, the master apparatus 1001 executes the function program.

An example of distributed processing where a user operates, in the example illustrated in FIG. 50, the slave apparatus A (information processing apparatus 1002) and the different slave apparatus B (information processing apparatus 1003) executes a function program in response to the operation is described with reference to FIG. 51.

Figure 51:
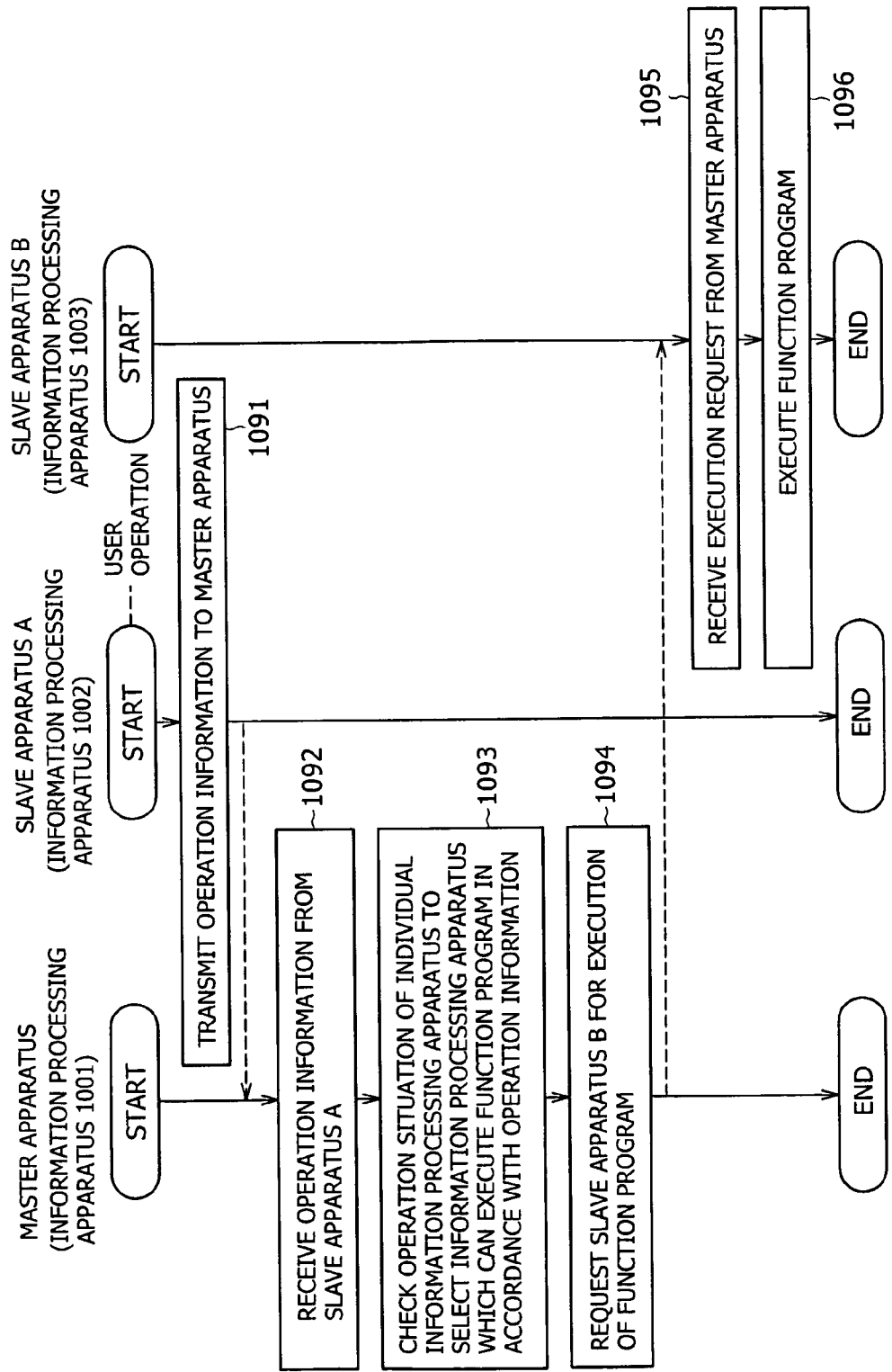
FIG. 51 is a flow chart illustrating an example of distributed processing by the system shown in FIG. 50.

In the example illustrated in FIG. 51, when the user operates the slave apparatus A, distributed processing of the entire network system including the slave apparatus A is started, and the slave apparatus A first transmits operation information then to the master apparatus 1001 at step 1091.

The master apparatus 1001 receives the operation information at step 1092 and checks the operation states of the information processing apparatus from the apparatus information tables of the self apparatus and the different apparatus recorded in the main memory 1026-1 of the self apparatus to select an information processing apparatus, which can execute a function program corresponding to the received operation information at step 1093. In the example illustrated in FIG. 51, the slave apparatus B is selected.

Then, the master apparatus 1001 issues a request for execution of the function program to the selected slave apparatus B at step 1094.

The slave apparatus B receives the execution request at step 1095 and executes the function program whose execution is requested at step 1096.

In this manner, if a user operates only one of the information processing apparatus, then it can cause the plural information processing apparatus 1001, 1002, 1003 and 1004 to operate as a virtual single information processing apparatus 1007 without operating any other one of the information processing apparatus.

6-6. Particular Examples of the Information Processing Apparatus and the System

Figure 52:
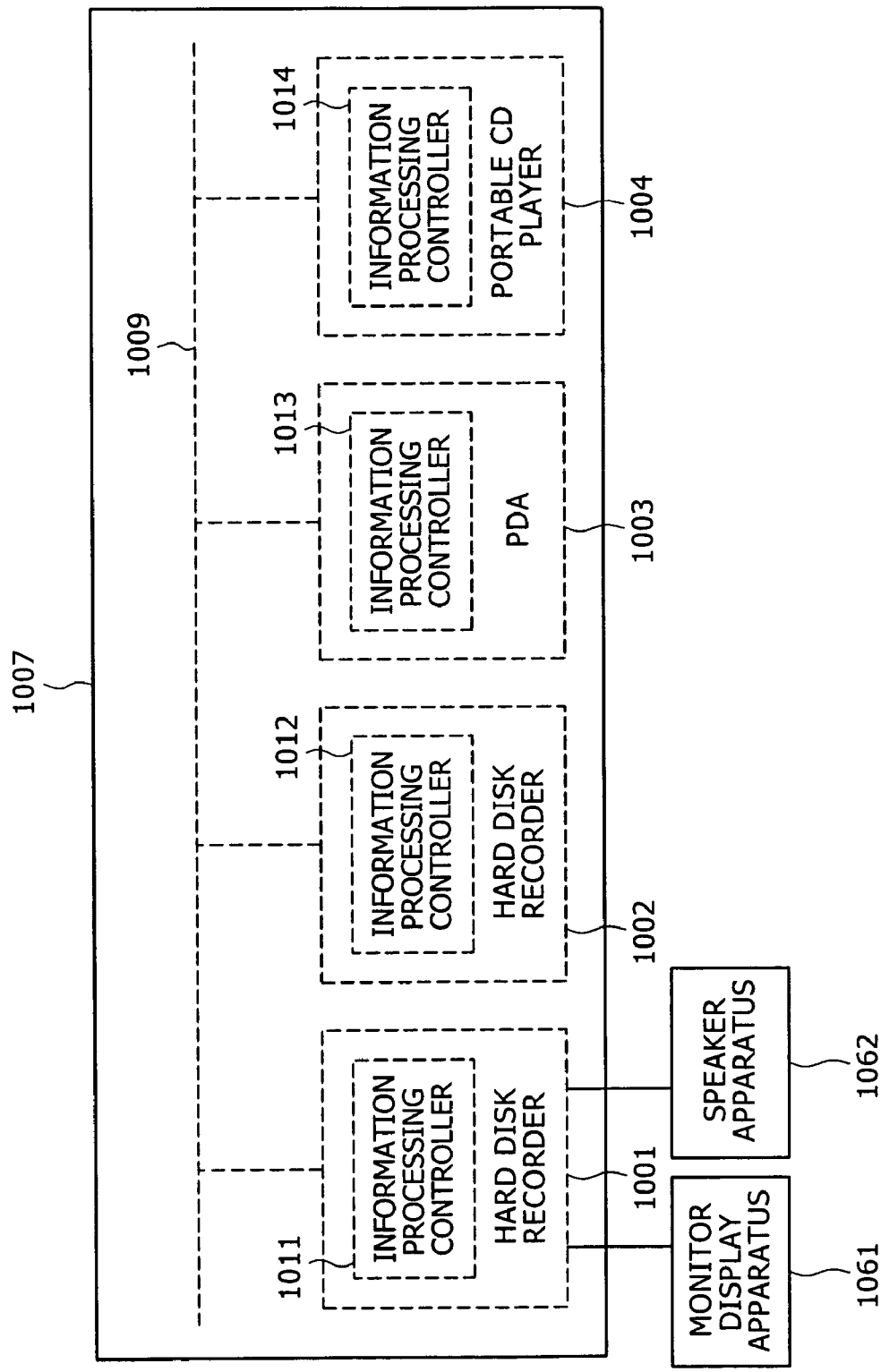
FIG. 52 is a diagrammatic view showing another example of information processing apparatus and a system.

Each of the information processing apparatus 1001, 1002, 1003 and 1004 connected to each other through the network 1009 may basically have any configuration only if information processing is performed by such an information processing controller 1011, 1012, 1013 or 1014 as described hereinabove. FIG. 52 shows an example of a configuration of the information processing apparatus.

Figure 53:
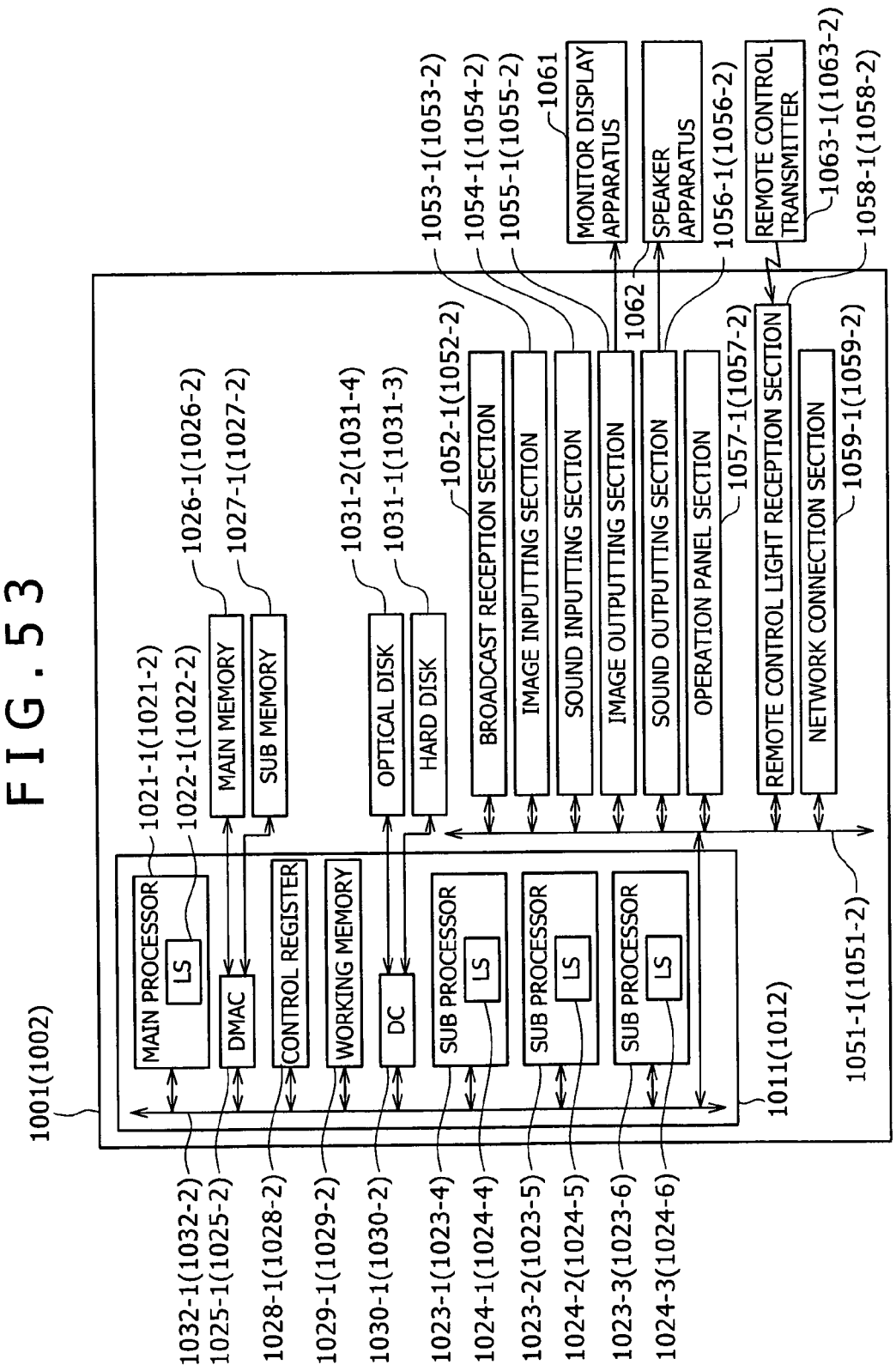
FIG. 53 is a block diagram showing a hardware configuration of a hard disk recorder shown in FIG. 52.

In the example shown, the information processing apparatus 1001 which includes the information processing controller 1011 is a hard disk recorder. FIG. 53 shows a hardware configuration of the hard disk recorder shown in FIG. 41. Referring to FIG. 41, the information processing apparatus 1001 shown includes, as the hardware configuration thereof, a built-in hard disk serving as the external recording section 1031-1 shown in FIG. 41. The information processing apparatus 1001 further includes the external recording section 1031-2 shown in FIG. 41 into which an optical disk such as a DVD±R/RW, a CD±R/RW, a Blu-rayDisc (registered trademark) and so forth can be loaded. The information processing apparatus 1001 further includes a broadcast reception section 1052-1, an image inputting section 1053-1, a sound inputting section 1054-1, an image outputting section 1055-1, a sound outputting section 1056-1, an operation panel section 1057-1, a remote control light reception section 1058-1, a network connection section 1059-1 and a display driving section 1061-1 connected to a bus 1051-1 which is in turn connected to the bus 1032-1 of the information processing controller 1011. A liquid crystal display section 1062-1 is connected to the display driving section 1061-1.

The broadcast reception section 1052-1, image inputting section 1053-1 and sound inputting section 1054-1 receive a broadcasting signal or receive an image signal and a sound signal from the outside of the information processing apparatus 1001, convert the received signal or signals into digital data of a predetermined format, and signals the digital data to the bus 1051-1 so as to be processed by the information processing controller 1011. The image outputting section 1055-1 and the sound outputting section 1056-1 process image data and sound data signaled from the information processing controller 1011 to the bus 1051-1 and signal the image data and the sound data as they are or after converted into analog signals to the outside of the information processing apparatus 1001. The remote control light reception section 1058-1 receives a remote control infrared signal from a remote control transmitter 1063-1.

As shown in FIGS. 52 and 53, a monitor display apparatus 1061 and a speaker apparatus 1062 are connected to the image outputting section 1055-1 and the sound outputting section 1056-1 of the information processing apparatus (hard disk recorder) 1001, respectively.

Also the information processing apparatus 1002, which includes the information processing controller 1012, shown in FIG. 52 is a hard disk recorder and is configured similarly to the information processing apparatus 1001 as seen in FIG. 53 in which reference numerals are applied in parentheses. It is to be noted, however, that no monitor display apparatus and no speaker apparatus are connected to the information processing apparatus (hard disk recorder) 1002, for example, as seen in FIG. 52.

Figure 54:
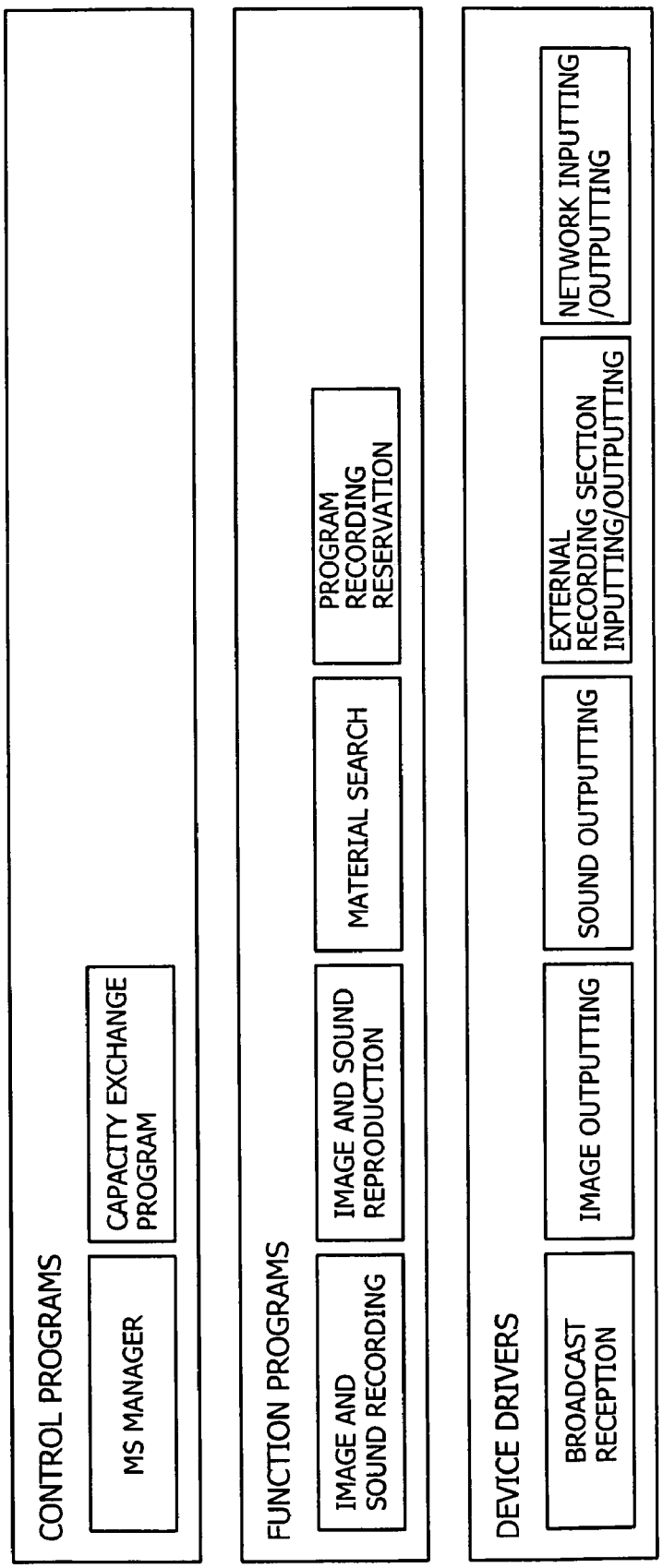
FIG. 54 is a view showing a software configuration of the hard disk recorder shown in FIG. 52.

The information processing apparatus (hard disk recorders) 1001 and 1002, that is, the information processing controllers 1011 and 1012, include, as the software configuration shown in FIG. 54, the MS manager and the capacity exchange program as the control programs. Further, the information processing controllers 1011 and 1012 include programs for image and sound recording, image and sound reproduction, material search, and program recording reservation as the function programs. Furthermore, the information processing controllers 1011 and 1012 include programs for broadcast reception, image outputting, sound outputting, external recording section inputting/outputting, and network inputting/outputting as the device drivers.

Figure 55:
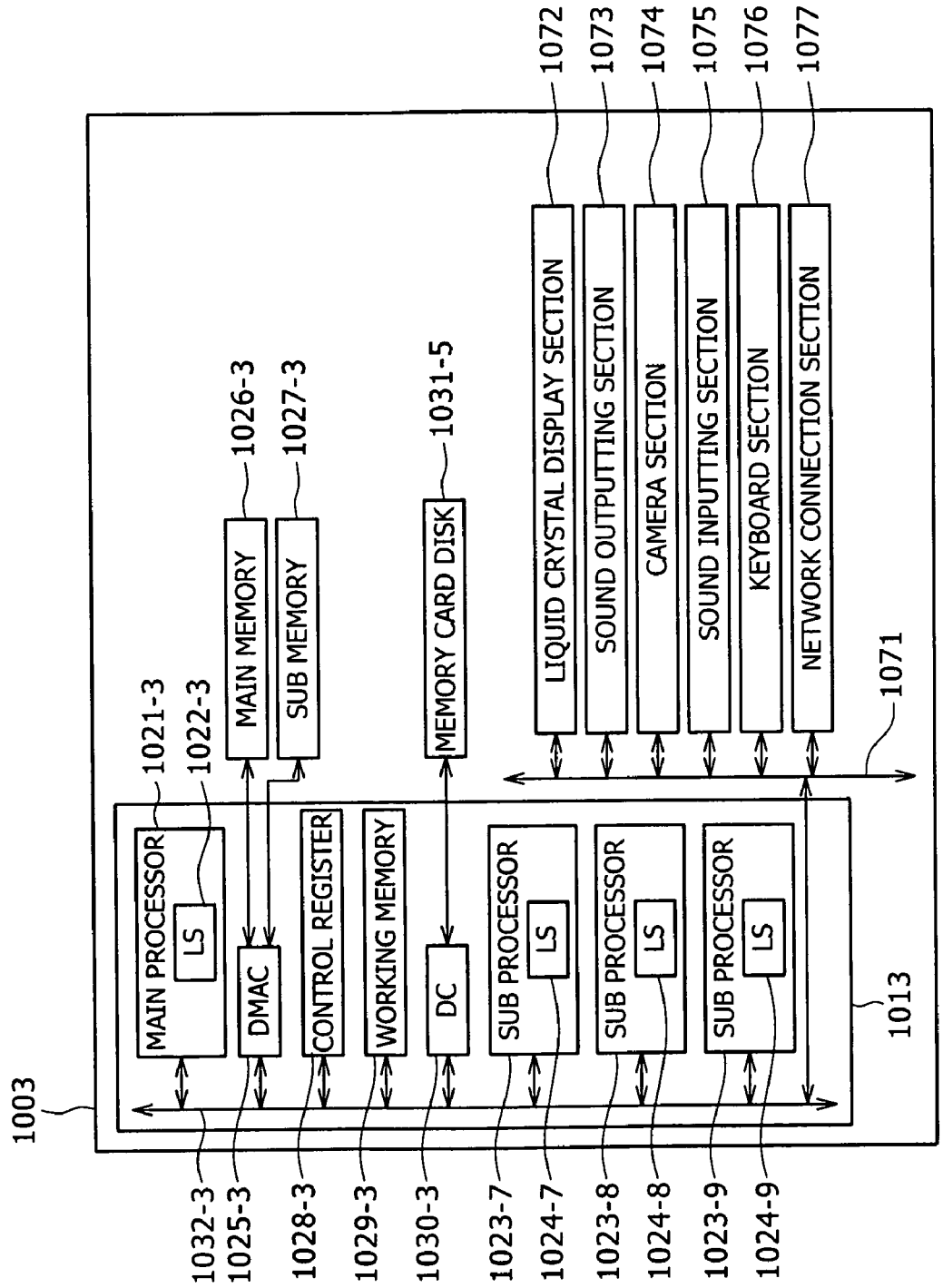
FIG. 55 is a block diagram showing a hardware configuration of a PDA shown in FIG. 52.

The information processing apparatus 1003 in the example of FIG. 52, which includes the information processing controller 1013, is a PDA (Personal Digital Assistant). FIG. 55 shows a hardware configuration of the information processing apparatus 1003 formed as a PDA. Referring to FIG. 55, in the example shown, the information processing apparatus 1003 includes the external recording section 1031-5 shown in FIG. 41 into which a memory card disk can be loaded. The information processing apparatus 1003 further includes a liquid crystal display section 1072, a sound outputting section 1073, a camera section 1074, a sound inputting section 1075, a keyboard section 1076, and a network connection section 1077 connected to a bus 1071, which is in turn connected to the bus 1032-3 of the information processing controller 1013.

It is to be noted that the information processing controller 1013 whose internal configuration is not shown in FIG. 41 includes a main processor 1021-3, sub processors 1023-7, 1023-8, and 1023-9, a direct memory access controller (DMAC) 1025-3, a control register 1028-3, a working memory 1029-3, a disk controller (DC) 1030-3, and a bus 1032-3. The main processor 1021-3 includes a local storage (LS) 1022-3, and the sub processors 1023-7, 1023-8, and 1023-9 include local storages (LS) 1024-7, 1024-8, and 1024-9, respectively.

Figure 56:
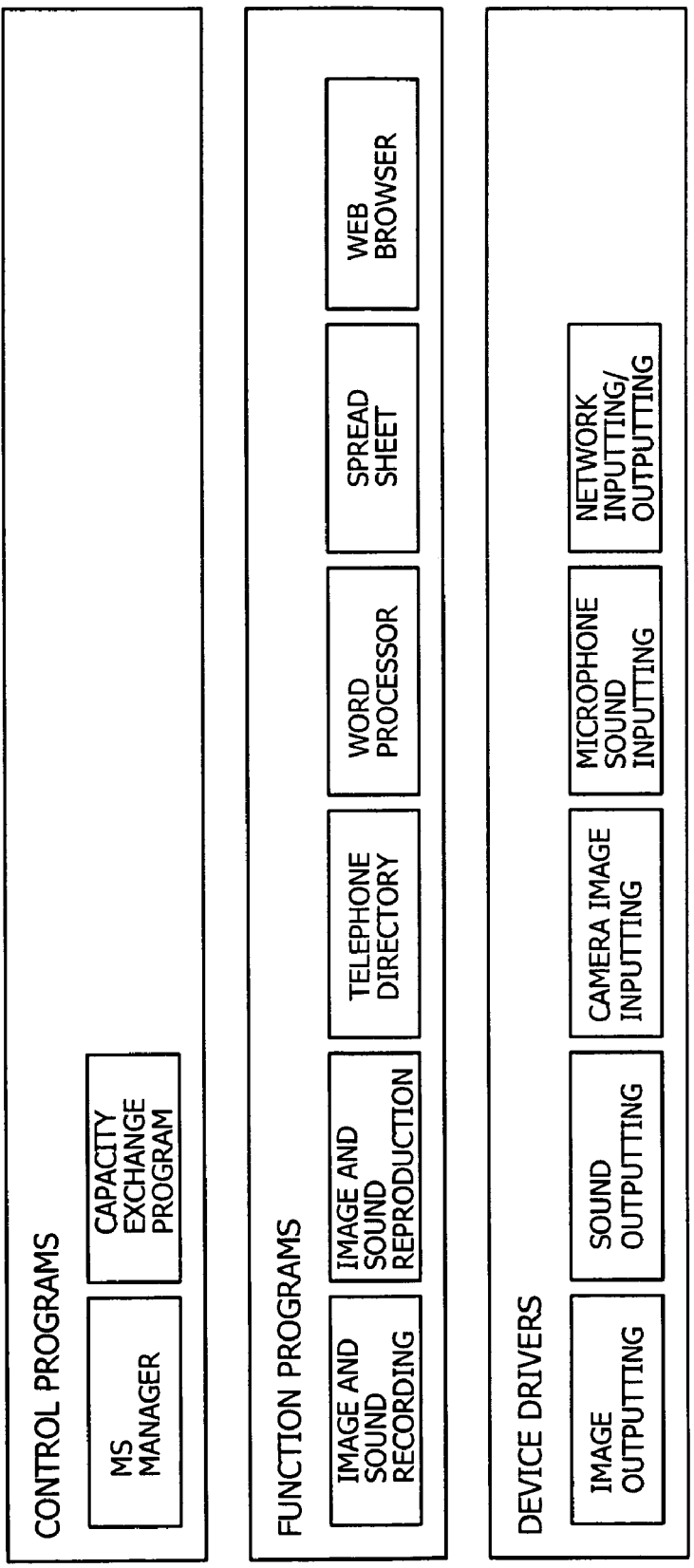
FIG. 56 is a view showing a software configuration of the PDA shown in FIG. 52.

FIG. 56 shows a software configuration of the information processing apparatus (PDA) 1003, particularly the information processing controller 1013. Referring to FIG. 56, the information processing controller 1013 includes the MS manager and the capacity exchange program as the control programs. Further, the information processing controller 1013 includes programs for image and sound recording, image and sound reproduction, telephone directory, word processor, and spreadsheet as the function programs, and includes a Web browser. Furthermore, the information processing controller 1013 includes programs for image outputting, sound outputting, camera image inputting, microphone sound inputting, and network inputting/outputting as the device drivers.

Figure 57:
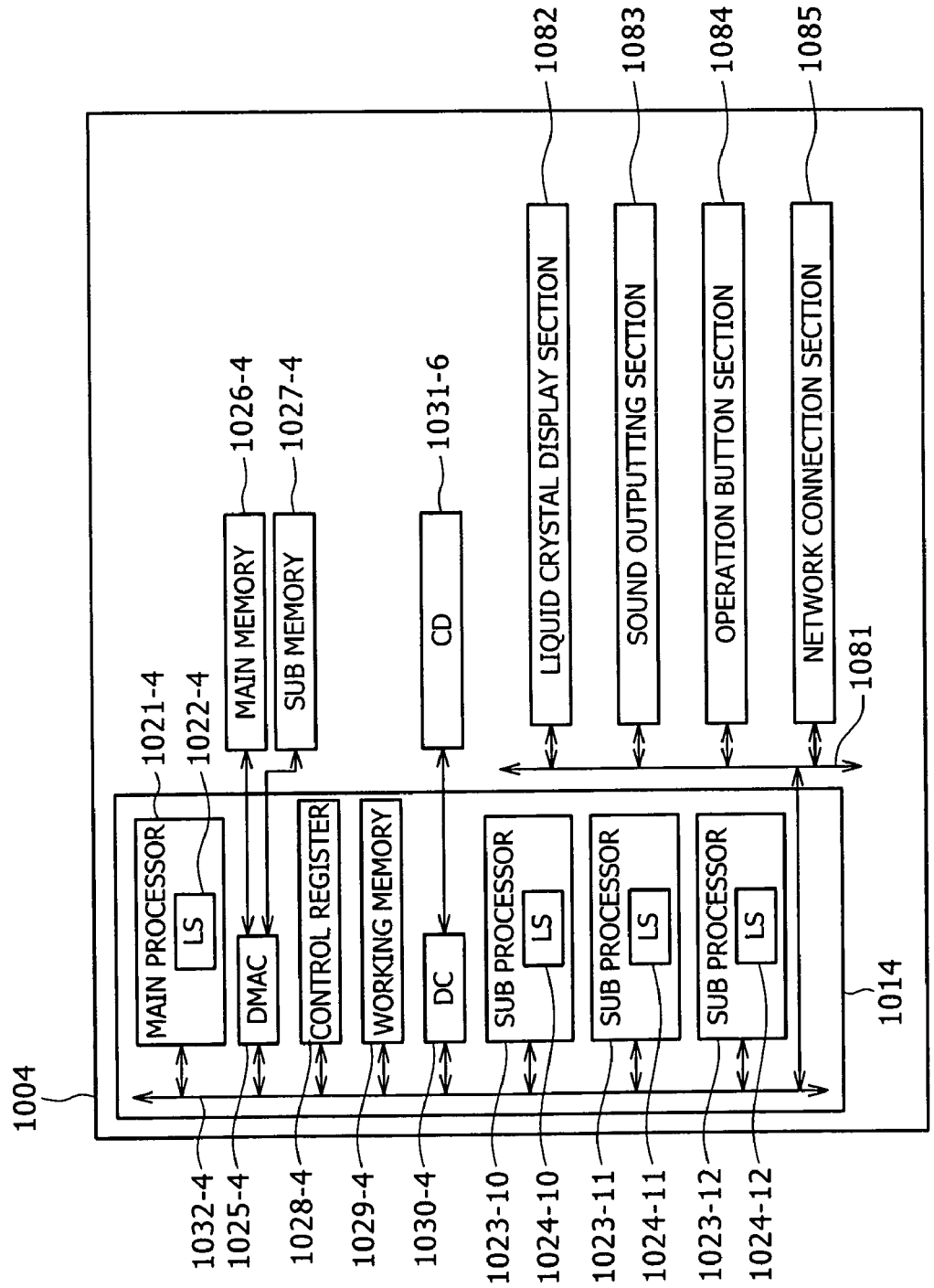
FIG. 57 is a block diagram showing a hardware configuration of a portable CD player shown in FIG. 52.

The information processing apparatus 1004 shown in FIG. 52, which includes the information processing controller 1014, is a portable CD player. FIG. 57 shows a hardware configuration of the information processing apparatus 1004 in the form of a portable CD player. Referring to FIG. 57, the information processing apparatus 1004 includes the external recording section 1031-6 shown in FIG. 41 into which a CD (Compact Disc) can be loaded. The information processing apparatus 1004 further includes a liquid crystal display section 1082, a sound outputting section 1083, an operation button section 1084, and a network connection section 1085 connected to a bus 1081, which is in turn connected to the bus 1032-4 of the information processing controller 1014.

It is to be noted that the information processing controller 1014 whose internal configuration is not shown in FIG. 41 includes a main processor 1021-4, sub processors 1023-10, 1023-11, and 1023-12, a direct memory access controller (DMAC) 1025-4, a control register 1028-4, a working memory 1029-4, a disk controller (DC) 1030-4, and a bus 1032-4. The main processor 1021-4 includes a local storage 1022-4, and the sub processors 1023-10, 1023-11, and 1023-12 include local storages 1024-10, 1024-11, and 1024-12, respectively.

Figure 58:
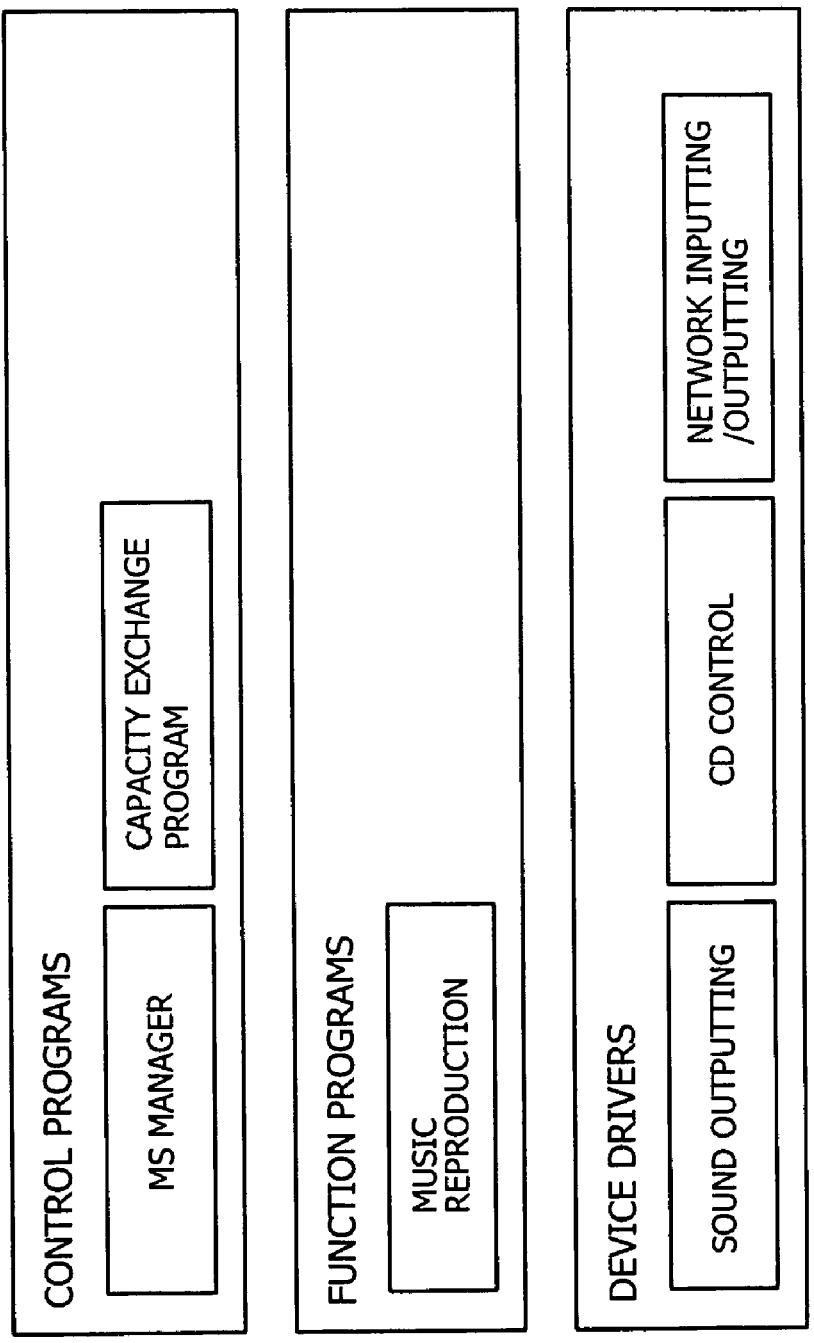
FIG. 58 is a view showing a software configuration of the portable CD player shown in FIG. 52.

FIG. 58 shows a software configuration of the information processing apparatus 1004 in the form of a portable CD player, particularly the information processing controller 1014. Referring to FIG. 58, the information processing controller 1014 includes the MS manager and the capacity exchange program as the control programs. Further, the information processing controller 1014 includes programs for music reproduction and so forth as the function programs and includes programs for sound outputting, CD control, and network inputting/outputting as the device drivers.

It is assumed that, in the network system shown in FIG. 52 and having such a configuration described above, the information processing apparatus 1001, 1003, and 1004 are connected to the network 1009, and the information processing apparatus 1001 is set as the master apparatus (MS status=0) and the information processing apparatus 1003 and 1004 are set as slave apparatus (MS status=1).

If, in this state, the information processing apparatus 1002 is newly connected to the network 1009, then the MS manager, which is executed in the main processor 1021-2 included in the information processing controller 1012 in the information processing apparatus 1002, inquires the other information processing apparatus 1001, 1003, and 1004 about the MS status and recognizes that the information processing apparatus 1001 already exists as the master apparatus. Thus, the MS manager sets the self apparatus (information processing apparatus 1002) as a slave apparatus (MS status=1). Meanwhile, the information processing apparatus 1001 set as the master apparatus collects the apparatus information of the apparatus including the newly added information processing apparatus 1002 and updates the apparatus information tables in the main memory 1026-1 based on the collected apparatus information.

Operation of the network system of FIG. 52 when, in this state, the user operates the information processing apparatus (PDA) 1003, which is a slave apparatus, for recording reservation of a broadcast program for two hours is described below.

In this instance, the information processing apparatus (PDA) 1003, which is a slave apparatus, accepts inputting of recording reservation information including information of recording start time, recording end time, a recording object broadcast channel, and a recording picture quality, and produces a software cell including the recording reservation information and the recording reservation command as the DMA command. Then, the information processing apparatus 1003 transmits the produced software cell to the information processing apparatus 1001, which is the master apparatus.

The main processor 1021-1 included in the information processing controller 1011 in the information processing apparatus 1001, which receives the software cell whose DMA command is the recording reservation command, reads out the recording reservation command and refers to the apparatus information tables in the main memory 1026-1 to specify an information processing apparatus, which can execute the recording reservation command.

First, the main processor 1021-1 reads out the information processing apparatus type IDs of the information processing apparatus 1001, 1002, 1003, and 1004 included in the apparatus information tables to extract those information processing apparatus that can execute a function program corresponding to the recording reservation command. Here, the information processing apparatus 1001 and 1002 having the information processing apparatus type ID indicative of the recording function are specified as candidate apparatus while the information processing apparatus 1003 and 1004 are excepted from candidate apparatus.

The main processor 1021-1 included in the information processing controller 1011 in the information processing apparatus 1001 as the master apparatus refers to the apparatus information tables to read out information regarding the apparatus such as the processing capacities of the main processors and sub processors and information regarding the main memories of the information processing apparatus 1001 and 1002, and discriminates whether or not the information processing apparatus 1001 and 1002 satisfy the required specifications necessary for execution of a function program corresponding to the recording reservation command. It is assumed here that both of the information processing apparatus 1001 and 1002 satisfy the required specifications necessary for execution of a function program corresponding to the recording reservation command.

Further, the main processor 1021-1 refers to the apparatus information tables to read out the information regarding external recording sections of the information processing apparatus 1001 and 1002, and discriminates whether or not the free capacities of the external recording sections satisfy the capacity necessary for execution of the recording reservation command. Since the information processing apparatus 1001 and 1002 are hard disk recorders, the differences between the total capacities and the used capacities of the hard disks 1031-1 and 1031-3 individually correspond to the free capacities.

In this instance, it is assumed that the free capacity of the hard disk 1031-1 of the information processing apparatus 1001 is 10 minutes when it is converted into a recording period of time and the free capacity of the hard disk 1031-3 of the information processing apparatus 1002 is 20 hours when it is converted into a recording period of time.

In this instance, the main processor 1021-1 included in the information processing controller 1011 in the information processing apparatus 1001, which is the master apparatus, specifies the information processing apparatus which can secure the free capacity for two hours necessary for execution of the recording reservation command as a slave apparatus of a destination of an execution request.

As a result, only the information processing apparatus 1002 is selected as the execution request destination slave apparatus, and the main processor 1021-1 included in the information processing controller 1011 in the information processing apparatus 1001, which is the master apparatus, transmits the recording reservation command including the recording reservation information transmitted from the information processing apparatus 1003 operated by the user to the information processing apparatus 1002 to request the information processing apparatus 1002 for recording reservation of the broadcast program for two hours described hereinabove.

Then, the main processor 1021-2 included in the information processing controller 1012 in the information processing apparatus 1002 analyzes the recording reservation command and loads a function program necessary for recording from the hard disk 1031-3, which is an external recording section, into the line memory 1026-2. Then, the main processor 1021-2 executes recording in accordance with the recording reservation information. As a result, image and sound data of the broadcast program for two hours reserved for recording are recorded on the hard disk 1031-3 of the information processing apparatus 1002.

In this manner, also in the network system shown in FIG. 52, the user can cause the plural information processing apparatus 1001, 1002, 1003, and 1004 to operate as a virtual single information processing apparatus 1007 only by operating only one of the information processing apparatus without operating any other one of the information processing apparatus.

7. Distributed Processing 2 by Allocation of Sub Processors

In the distributed processing of the network system of FIG. 50 or 52 described above, when the information processing apparatus 1001, which serves as the master apparatus, specifies information processing apparatus that can execute a function program, the network system includes an information processing apparatus satisfying all required specifications necessary to execute the function program. However, the network system may not include such information processing apparatus.

In the example of FIG. 52, the information processing apparatus 1001 serving as the master apparatus finally specifies the information processing apparatus 1002 as an information processing apparatus by which a function program corresponding to a recording reservation command is to be executed. However, the information processing apparatus 1002 may not satisfy part of the required specifications necessary for execution of the function program. For example, the information processing apparatus 1002 does satisfy the requirement for a number of sub processors although it satisfies all of the other required specifications. Also in such an instance as just described, there is the possibility that the information processing apparatus 1002 may be able to execute the function program making use of the load command or the kick command described hereinabove to utilize sub processors in a different information processing apparatus.

Thus, an example is described below wherein, when the master apparatus specifies an information processing apparatus by which a function program is to be executed, it specifies an information processing apparatus by which the function program is to be executed without taking the sub processor processing capacity of a candidate information processing apparatus into consideration.

In this instance, the function program specifies required specifications regarding an apparatus such as requirements for an information processing apparatus type ID, a processing capacity of a main processor or a sub processor, a main memory use capacity, and an external recording section, which are represented as the types of information illustrated in FIG. 4. When the master apparatus specifies an information processing apparatus by which the function program is to be executed, it specifies an information processing apparatus satisfying the required specifications other than the sub processor processing capacity. Accordingly, naturally the information processing apparatus specified by the master apparatus and requested to execute the function program may not secure the processor processing capacity necessary to execute the function program in the information processing apparatus itself.

In the following, an example of distributed processing is described wherein the information processing apparatus requested to execute a function program in this manner utilizes sub processors of a different information processing apparatus included in the network system.

7-1. System Configuration

Figure 59:
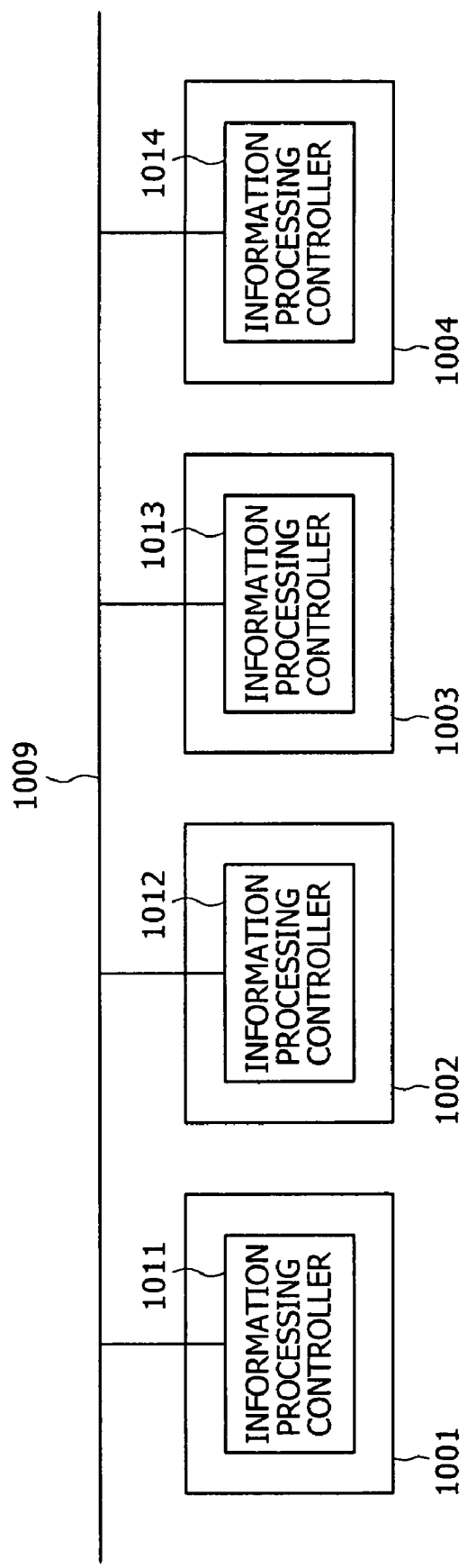
FIG. 59 is a block diagram showing another example of a network system by which distributed processing by allocation of sub processors is executed.

FIG. 59 shows a network system wherein four information processing apparatus 1001, 1002, 1003, and 1004 are connected to a network 1009.

It is assumed that the information processing apparatus 1001 operates as a master apparatus while the information processing apparatus 1002, 1003, and 1004 operate each as a slave apparatus, and the information processing apparatus 1001 specifies the information processing apparatus 1001 itself as an information processing apparatus by which a function program is to be executed.

The information processing apparatus 1001, 1002, 1003, and 1004 connected to the network 1009 have such a software configuration as illustrated in FIG. 17. Referring to FIG. 17, each of the information processing apparatus 1001, 1002, 1003, and 1004 includes not only the MS manager and the capacity exchange program described hereinabove with reference to FIG. 6 and so forth but also a resource manager as the control programs.

The resource manager controls sub processors in the self apparatus to perform transfer of a program and data, starting and stopping of execution of a program, reception of a result of the execution of the program, and so forth.

Further, the resource manager grasps a use situation of the sub processors in the self apparatus and issues a response to an inquiry from any other information processing apparatus or issues an inquiry about a use situation of sub processors of the other information processing apparatus to them.

To this end, the resource manager prepares such a sub processor management table as illustrated in FIG. 18.

The sub processor management table of FIG. 18 is for a case wherein the information processing controller in each of the information processing apparatus includes several or more sub processors. Referring to FIG. 18, the information processing apparatus ID in the sub processor management table is an information processing apparatus ID of the self apparatus. Further, the sub processor apparatus ID is a sub processor ID of each of the sub processors in the self apparatus and the sub processor status indicates a use situation of each sub processor.

The sub processor status may be one of an unused status (status wherein the sub processor is not currently used nor is reserved for use), a reserved status (status wherein the sub processor is not currently used but is reserved for use), and a busy status (status wherein the sub processor is currently used) as described hereinabove.

As hereinafter described, the unused status is referred to as a free state, and whether a sub processor is free, that is, whether a sub processor is in the unused status, reserved status, or busy status, is referred to as a free situation.

The sub processor program ID is an identifier for identification of a sub processor program, which is being executed or is reserved for execution in the sub processor. The function program ID is an identifier for identification of a function program operating cooperatively with the sub processor program indicated by the sub processor program ID at the upper stage.

The sub processor program priority is a priority of the sub processor program being currently executed or reserved for execution. The sub processor program priority is determined in advance in accordance with the priority of the function program, which is to operate cooperatively with the sub processor program, and is divided, for example, into three stages of high (high priority), middle (middle priority), and low (low priority).

The lock sequence number is issued by the resource manager when a sub processor is to be secured or in a like case as hereinafter described and is described into the sub processor management table. The resource manager permits use of a sub processor only when a sub processor program ID and a lock sequence number received from a function program coincide with those described in the sub processor management table.

7-2. Sub Processor Allocation Process

It is assumed that, in the network system of FIG. 59, the information processing apparatus 1001 operates as a master apparatus and the information processing apparatus 1002, 1003, and 1004 operate each as a slave apparatus, and the information processing apparatus 1001 serving as the master apparatus specifies the information processing apparatus 1001 itself as an information processing apparatus by which a function program is to be executed.

In the following, an example of a sub processor allocation process is described with reference to FIGS. 60 to 68. The process is executed by a function program in the main memory 1026-1 of the information processing apparatus 1001, the resource manager in the information processing apparatus 1001, and the resource managers in the information processing apparatus 1002, 1003, and 1004 when the information processing apparatus 1001 secures sub processors in the information processing apparatus 1001 itself or the other information processing apparatus 1002, 1003, and 1004 for execution of sub processor programs, which operate cooperatively with the function program in the main memory 1026-1 of the information processing apparatus 1001 itself.

Figure 60:
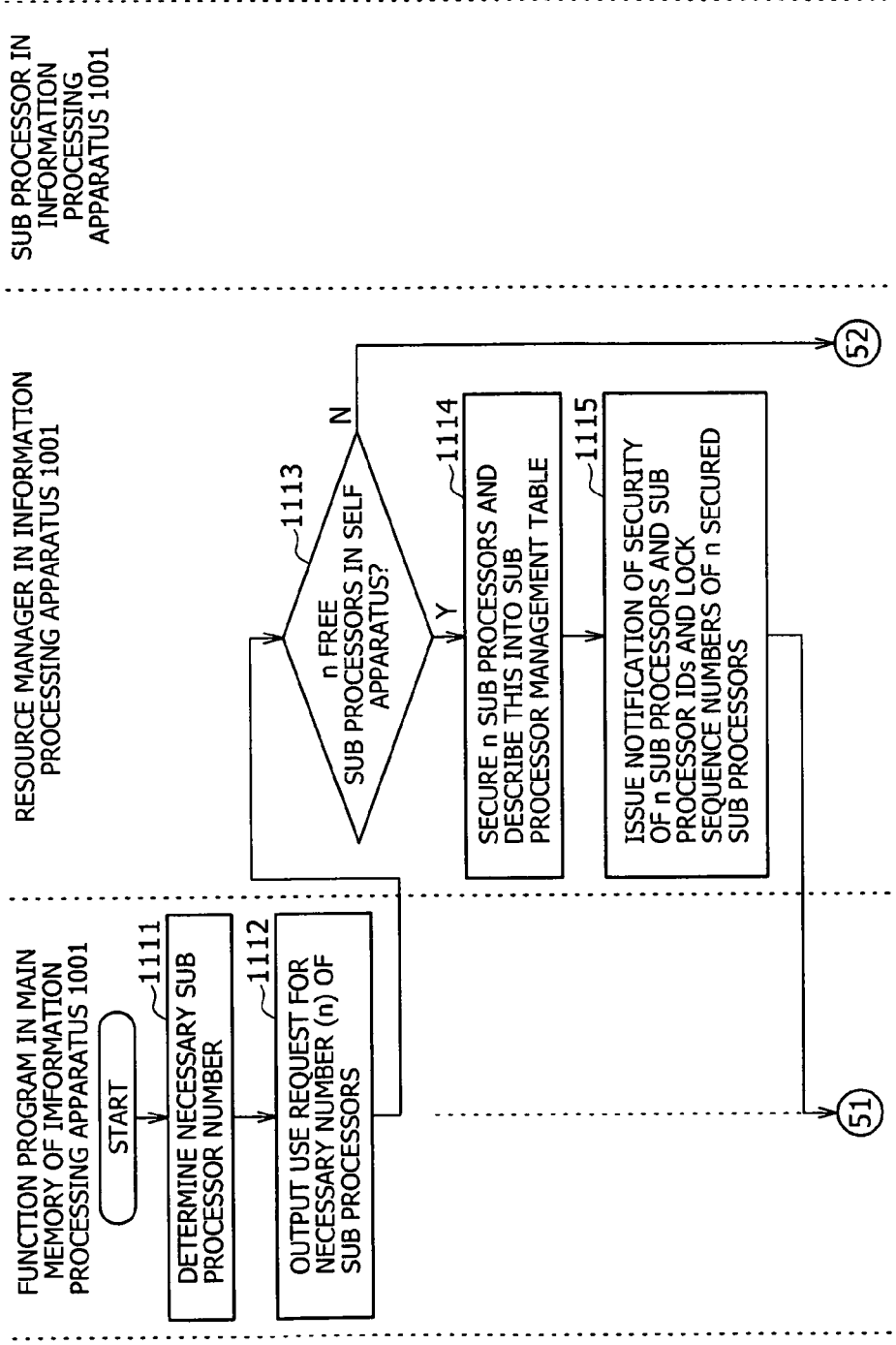
FIGS. 60 to 68 are flow charts illustrating a further example of the sub processor allocation process.

Referring first to FIG. 60, the function program in the main memory 1026-1 of the information processing apparatus 1001 first determines the number of sub processors necessary for execution of sub processor programs at step 1111. Then at step 1112, the function program outputs a request for use of the necessary number (represented by n) of sub processors to the resource manager in the self apparatus (information processing apparatus 1001). The request attaches the function program ID of the function program and sub processor program IDs and sub processor program priorities of all of sub processor programs, which are to operate cooperatively with the function program.

In response to the request, the resource manager in the information processing apparatus 1001 refers, at step 1113, to the sub processor management table shown in FIG. 18 of the self apparatus (information processing apparatus 1001) to determine whether or not n free sub processors are available in the self apparatus. If n or more free sub processors are available in the self apparatus, then the processing advances from step 1113 to step 1114. At step 1114, the resource manager secures n sub processors in the self apparatus and, for each of the secured sub processors, rewrites the sub processor status in the sub processor management table from unused to reserved and rewrites the sub processor program ID, function program ID, and sub processor program priority so that they coincide with those of the sub processor program to be executed by the secured sub processor. Further, the resource manager issues lock sequence numbers and describes them into the sub processor management table.

After step 1114, the processing advances to step 1115, at which the resource manager in the information processing apparatus 1001 issues a notification of the fact that n sub processors are secured in the self apparatus and of the sub processor ID, sub processor program ID, and lock sequence number of each of the n secured sub processors to the function program.

Figure 61:
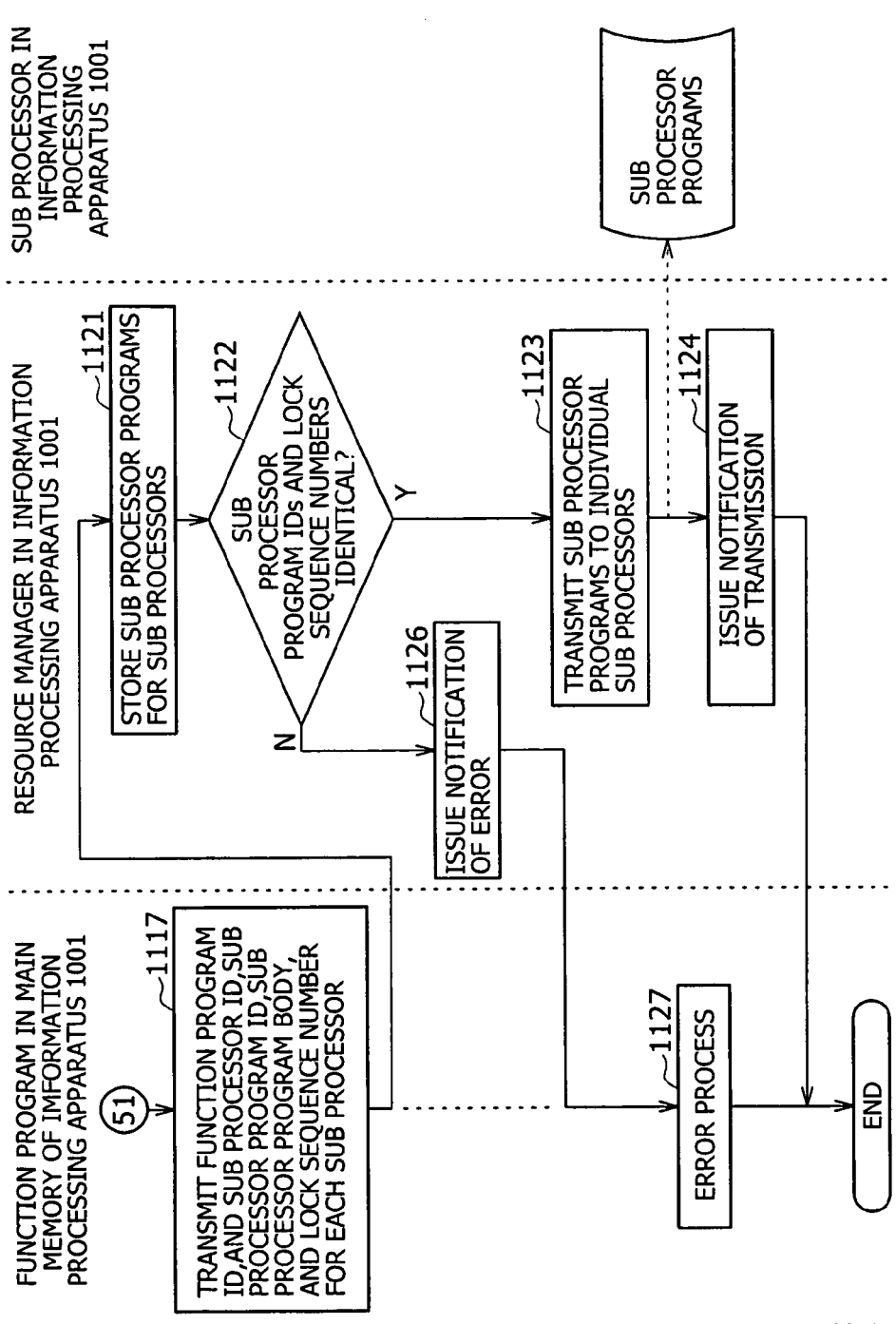

Referring now to FIG. 61, at step 1117, the function program receives the notification from the resource manager and transmits a number of sub processor IDs, sub processor program IDs, sub processor program bodies, and lock sequence numbers for the secured sub processors equal to the number of secured sub processors together with the function program ID of the function program itself to the resource manager in the self apparatus (information processing apparatus 1001).

At step 1121, the resource manager in the information processing apparatus 1001 receives the information transmitted from the function program and stores the sub processor programs for the sub processors. Then at step 1122, the resource manager in the information processing apparatus 1001 determines whether or not the received processor program IDs and lock sequence numbers are same as those in the sub processor management table of the self apparatus. If they are same, then the processing advances to step 1123, at which the resource manager in the information processing apparatus 1001 transmits the sub processor programs to the secured sub processors. Then at step 1124, the resource manager in the information processing apparatus 1001 issues a notification to the function program that the sub processor programs are transmitted to the sub processors.

The sub processor allocation process where a necessary number of sub processors can be secured only among free sub processors in the information processing apparatus 1001 is completed thereby.

Data to be processed by the secured sub processors are transmitted to the secured sub processors simultaneously with the transmission of the sub processor programs or after transmission of the sub processor programs. Consequently, each of the secured sub processors can execute the sub processor program.

If the resource manager in the information processing apparatus 1001 determines at step 1122 that the sub processor program IDs or the lock sequence numbers received from the function program are different from those in the sub processor management table of the self apparatus, then the processing advances from step 1122 to step 1126, at which the resource manager in the information processing apparatus 1001 issues a notification of an error to the function program.

In this instance, the function program executes an error process at step 1127. The error process may particularly be execution of the sub processor allocation process again beginning with step 1112.

Figure 62:
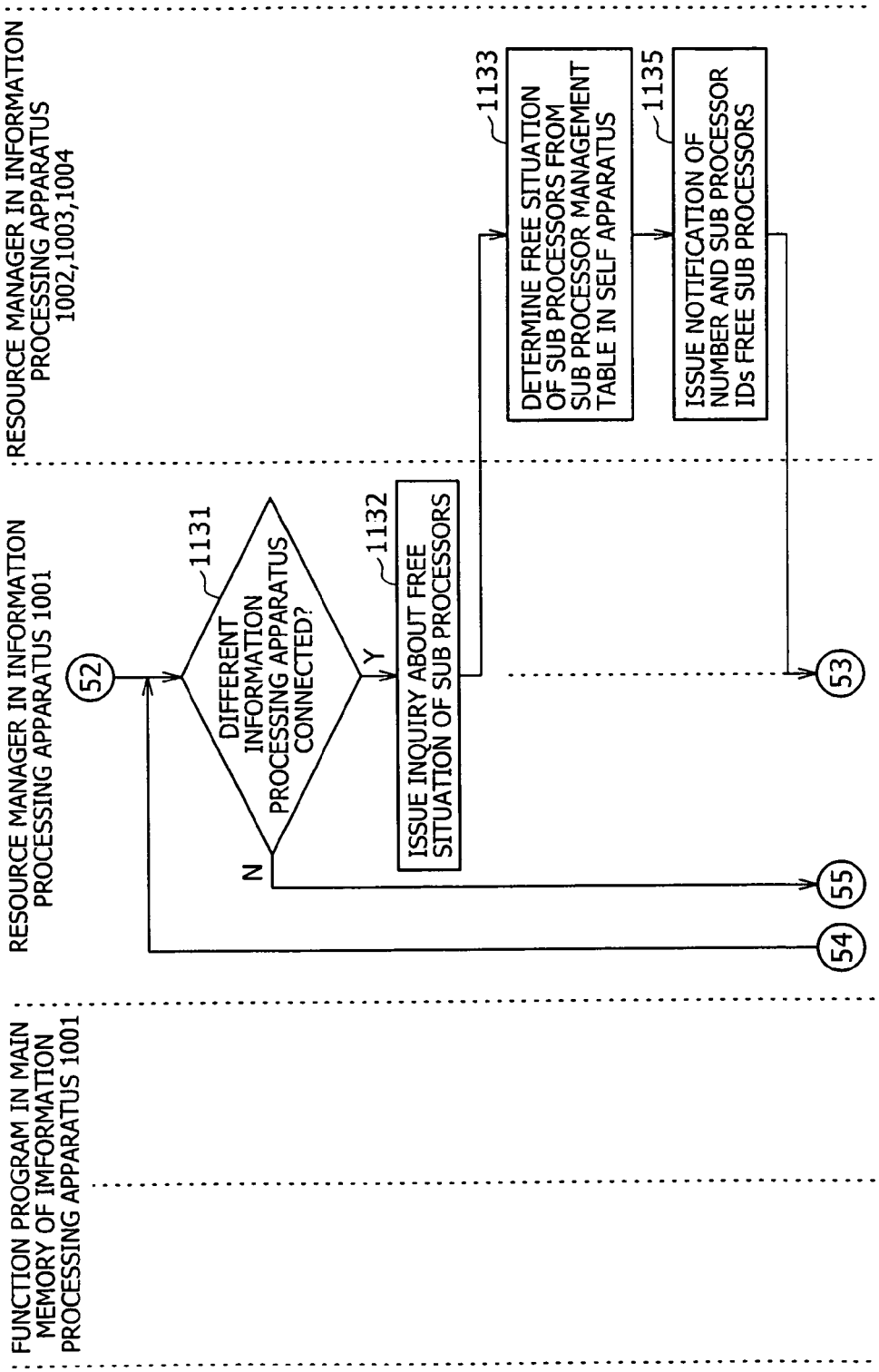

On the other hand, if the resource manager in the information processing apparatus 1001 determines at step 1113 of FIG. 60 that n free sub processors are not available in the self apparatus, that is, the information processing apparatus 1001 includes only n−1 free sub processors or less (including zero), then the processing advances from step 1113 to step 1131 illustrated in FIG. 62. Referring now to FIG. 62, at step 1131, the resource manager in the information processing apparatus 1001 determines whether or not some different information processing apparatus is connected to the network. FIG. 59 shows that the different information processing apparatus 1002, 1003, and 1004 are connected.

Then, if one or more different information processing apparatus are connected to the network, then the processing advances from step 1131 to step 1132, at which the resource manager in the information processing apparatus 1001 issues an inquiry about a free situation of sub processors to the resource manager in one of the different information processing apparatus (in the present case, the information processing apparatus 1002).

The inquiry is conveyed using such a sub processor free situation inquiry command as illustrated in FIG. 28A. Referring to FIG. 28A, the sub processor free situation inquiry command includes a sender ID (in this instance, the information processing apparatus ID of the information processing apparatus 1001), a transmission destination ID (in this instance, the information processing apparatus ID of the information processing apparatus 1002), and a response destination ID (in this instance, the information processing apparatus ID of the information processing apparatus 1001). The sub processor free situation inquiry command further includes, as a DMA command, a sub processor free situation inquiry command body and a function program ID.

Referring back to FIG. 62, in response to the inquiry from the resource manager in the information processing apparatus 1001, the resource manager in the different information processing apparatus (in this instance, the information processing apparatus 1002) determines a free situation of the sub processors in the self apparatus from the sub processor management table in the self apparatus at step 1133. Then at step 1135, if free sub processors are available in the self apparatus, then the resource manager in the different information processing apparatus issues a notification of the number and the sub processor IDs of the free sub processors to the resource manager in the information processing apparatus 1001. However, if no free sub processors are available in the self apparatus, then the resource manager in the different information processing apparatus issues a notification of this to the resource manager in the information processing apparatus 1001.

The notification is conveyed using such a sub processor free situation return command as illustrated in FIG. 28B. Referring to FIG. 28B, the sub processor free situation return command includes a sender ID (in this instance, the information processing apparatus ID of the information processing apparatus 1002), a transmission destination ID (in this instance, the information processing apparatus ID of the information processing apparatus 1001), and a response destination ID (in this instance, the information processing apparatus ID of the information processing apparatus 1001). The sub processor free situation return command further includes, as a DMA command, a sub processor free situation return command body, a function program ID, the number of free sub processors, and the sub processor IDs of the free sub processors.

Figure 63:
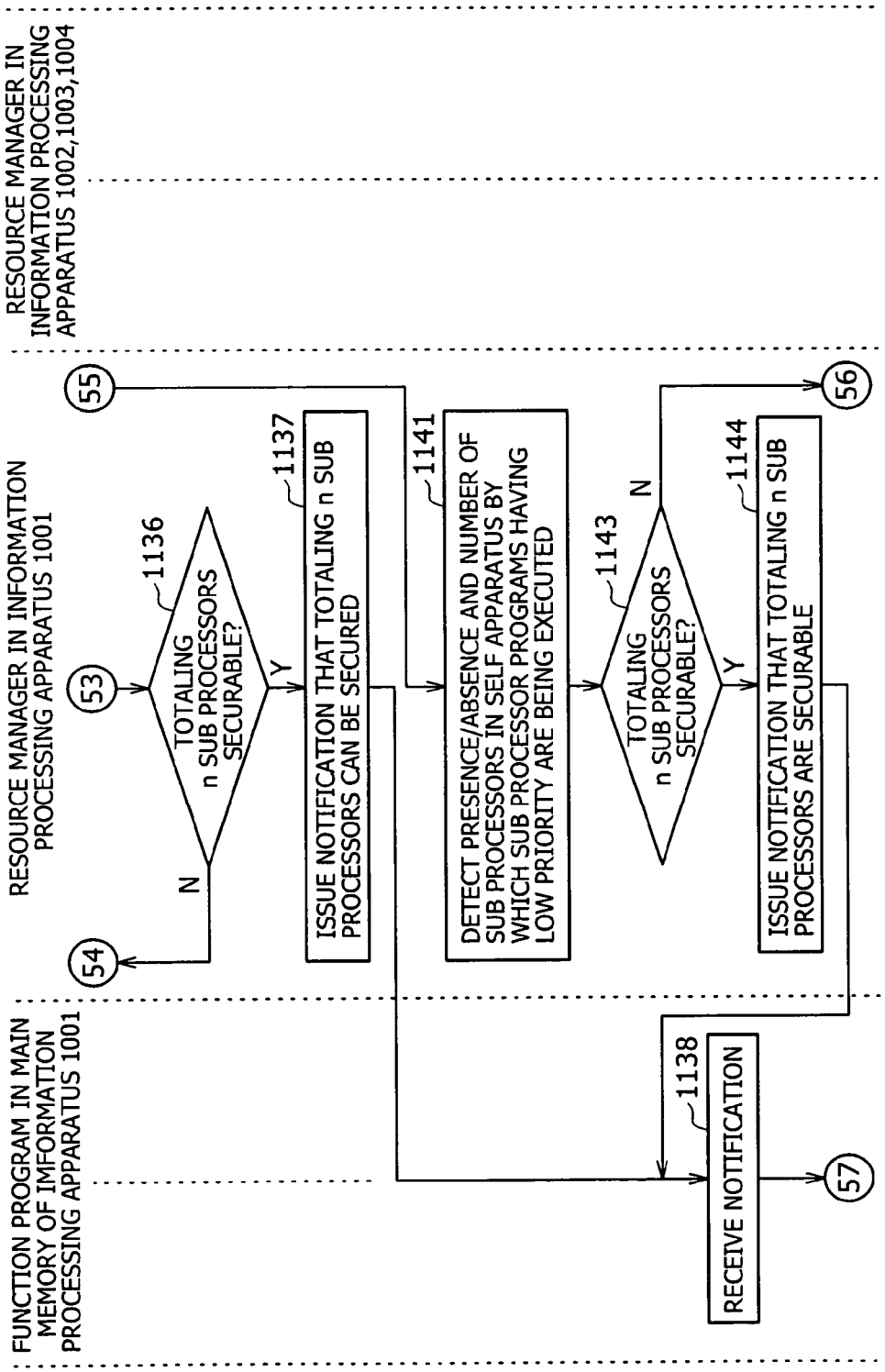

The resource manager in the information processing apparatus 1001 receives the notification and determines at step 1136 illustrated in FIG. 63 whether or not totaling n sub processors can be secured including the free sub processors in the self apparatus (information processing apparatus 1001) and the free sub processors in the different apparatus (information processing apparatus 1002).

Where n is such a comparatively great number as, for example, 8, 9 or 10, if only one sub processor can be secured in the information processing apparatus 1001 and only n−2 sub processors can be secured in the information processing apparatus 1002, then totaling n sub processors cannot be secured.

If totaling n sub processors cannot be secured in this manner, then the resource manager in the information processing apparatus 1001 advances (returns) the processing from step 1136 to step 1131 in FIG. 62, at which it determines whether or not another different information processing apparatus is connected to the network. FIG. 59 shows that the different information processing apparatus 1003 and 1004 are connected to the network.

Thereafter, the processes at steps 1132, 1133, 1135, 1136, and 1131 are repeated similarly as in the case of the information processing apparatus 1002 described above until after n sub processors are secured successfully over the entire network system or until after it is detected that any more information processing apparatus is not connected to the network.

Where a plurality of information processing apparatus are connected to the network in addition to the information processing apparatus 1001, the order in which the resource manager in the information processing apparatus 1001 issues an inquiry about a free situation of sub processors to the different information processing apparatus may be determined, for example, in a similar manner as in the determination method of a master apparatus described hereinabove. In particular, it is a possible idea to replace the information processing apparatus IDs of the individual information processing apparatus on the network with numerical values and issue an inquiry about a free situation of sub processors in the ascending order of the numerical value to the information processing apparatus.

Then, if n sub processors can be secured from among free sub processors over the entire network system, then the processing advances from step 1136 to step 1137 as seen in FIG. 63. At step 1137, the resource manager in the information processing apparatus 1001 issues a notification to the function program that n sub processors can be secured.

At step 1138, the function program receives the notification and outputs a sub processor securing request to the resource manager in the self apparatus (information processing apparatus 1001) as hereinafter described.

On the other hand, if the resource manager in the information processing apparatus 1001 determines at step 1131 of FIG. 62 that no more information processing apparatus is connected to the network, that is, if it determines that n sub processors cannot be secured from among free sub processors in the entire network system (where only the information processing apparatus 1001 is connected to the network, only in the information processing apparatus 1001), then the processing advances from step 1131 to step 1141 illustrated in FIG. 63. Referring to FIG. 63, at step 1141, the resource manager in the information processing apparatus 1001 determines whether or not the apparatus itself (information processing apparatus 1001) includes those sub processors executing sub processor programs, which have a priority lower than that of the function program, and if such sub processors exist, detects the number of such sub processors.

The "executing" in this instance includes not only a case wherein sub processors are busy (currently used) but also another case wherein sub processors are reserved (although the sub processors are not used at present, they are reserved for use). In the following description, a sub processor program having a priority lower than that of the function program is referred to simply as "sub processor program having a lower priority".

Then at step 1143, the resource manager in the information processing apparatus 1001 determines whether or not totaling n sub processors can be secured including the free sub processors in the entire network system and the sub processors, which are executing sub processor programs having a lower priority in the self apparatus (information processing apparatus 1001). If such n sub processors can be secured, then the processing advances from step 1143 to step 1144, at which the resource manager in the information processing apparatus 1001 issues a notification to the function program that n sub processors can be secured.

At step 1138, the function program receives the notification and outputs a sub processor securing request to the resource manager in the self apparatus (information processing apparatus 1001) as hereinafter described.

Figure 64:
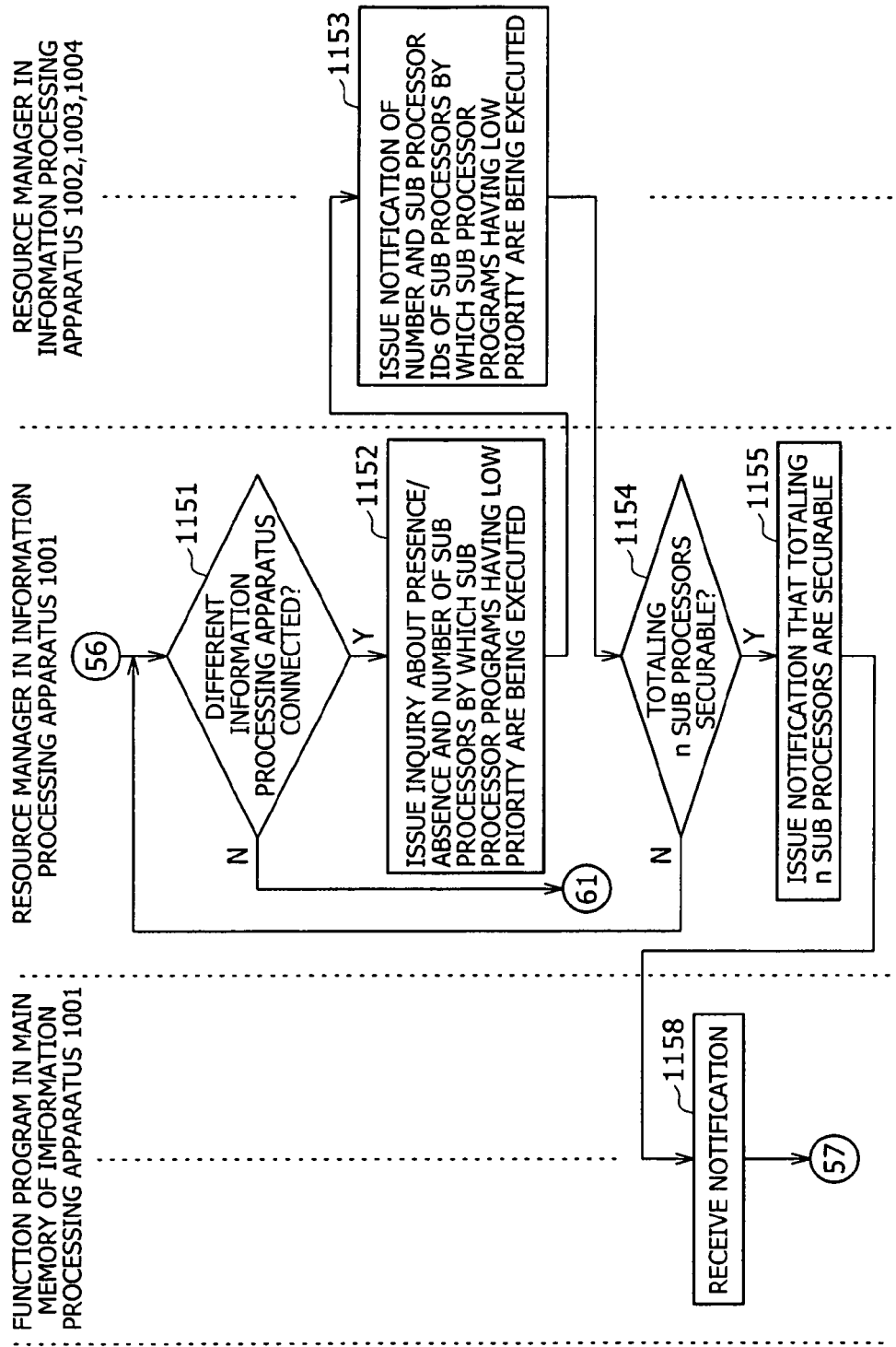

On the other hand, if the resource manager in the information processing apparatus 1001 determines at step 1143 that totaling n sub processors cannot be secured including the free sub processors in the entire network system and the sub processors, which are executing sub processor programs having a lower priority in the self apparatus (information processing apparatus 1001), then the processing advances from step 1143 to step 1151 illustrated in FIG. 64. Referring to FIG. 64, at step 1151, the resource manager in the information processing apparatus 1001 determines whether or not a different information processing apparatus is connected to the network.

If a different information processing apparatus is connected to the network, then the processing advances from step 1151 to step 1152, at which the resource manager in the information processing apparatus 1001 issues an inquiry about presence or absence of those sub processors, which are executing sub processor programs having a lower priority, and the number of such sub processors to the resource manager in the different information processing apparatus (in this instance, the information processing apparatus 1002). Also the "executing" in this instance includes not only the busy status but also the reserved status.

The inquiry is conveyed using a command including such a sub processor free situation inquiry command as described hereinabove with reference to FIG. 28A and the sub processor program priority of the sub processor program, which is to operate cooperatively with the function program.

In response to the inquiry, the resource manager in the different information processing apparatus (in this instance, the information processing apparatus 1002) determines at step 1153 in FIG. 64 whether or not the self apparatus includes those sub processors, which are executing sub processor programs having a lower priority, from the sub processor management table in the self apparatus. If such sub processors are present, then the resource manager in the different information processing apparatus issues a notification of the number and the sub processor IDs of the sub processors to the resource manager in the information processing apparatus 1001. However, if the self apparatus does not include those sub processors, which are executing sub processor programs having a lower priority, then the resource manager in the different information processing apparatus issues a notification of this to the resource manager in the information processing apparatus 1001.

The notification is conveyed using a command which includes such a sub processor free situation return command as described hereinabove with reference to FIG. 28B but describes the number and the sub processor IDs of sub processors, which are each executing a sub processor program having a lower priority, in place of the number and the sub processor IDs of free sub processors.

In response to the notification, the resource manager in the information processing apparatus 1001 determines at step 1154 in FIG. 64 whether or not n sub processors can be secured including the free sub processors in the entire network system and the sub processors executing sub processor programs having a lower priority in the self apparatus (information processing apparatus 1001) and the different apparatus (in this instance, the information processing apparatus 1002).

For example, where n=7, if the entire network system includes only two free sub processors and the information processing apparatus 1001 includes only two sub processors, which are executing sub processor programs having a lower priority, while the information processing apparatus 1002 includes only two sub processor, which are executing sub processor programs having a lower priority, then the totaling n sub processors cannot be secured.

If totaling n sub processors cannot be secured in this manner, then the resource manager in the information processing apparatus 1001 advances (returns) the processing from step 1154 to step 1151, at which it is determined whether or not a further different information processing apparatus is connected to the network.

Thereafter, the processes at steps 1152, 1153, 1154, and 1151 are repeated similarly as in the case of the information processing apparatus 1002 described above until after n sub processors are secured successfully over the entire network system or until after it is detected that any more information processing apparatus is not connected to the network.

Then, if n sub processors can be secured in the entire network system including free sub processors and those sub processors executing sub processor programs having a lower priority, then the processing advances from step 1154 to step 1155. At step 1155, the resource manager in the information processing apparatus 1001 issues a notification to the function program that n sub processors can be secured.

At step 1158, the function program receives the notification and outputs a sub processor securing request to the resource manager in the self apparatus (information processing apparatus 1001) in the following manner.

Figure 65:
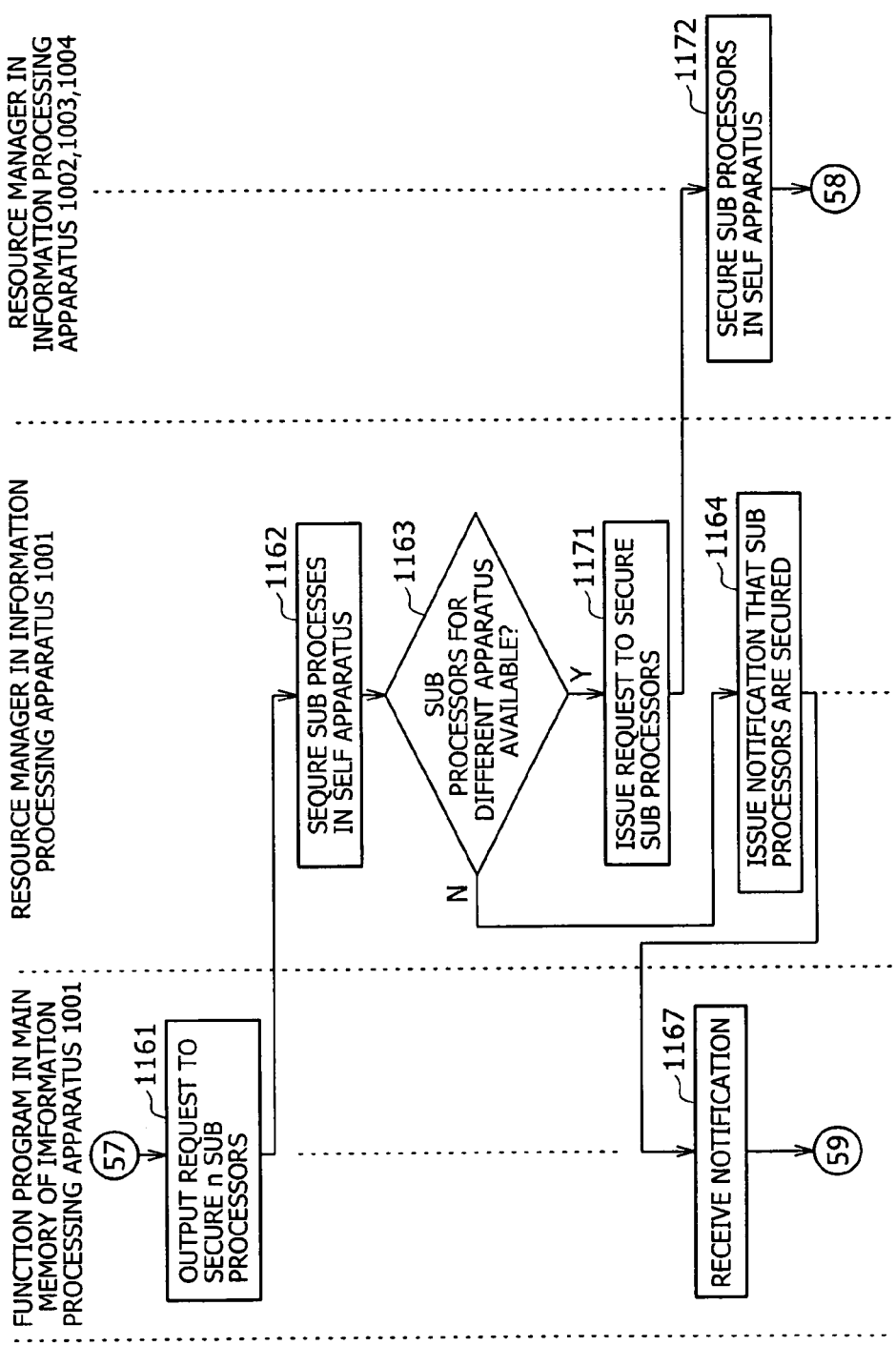

In particular, if the function program receives, at step 1138 of FIG. 63 or step 1158 of FIG. 64, the notification that n sub processors can be secured from the resource manager in the information processing apparatus 1001, then it outputs a request to secure n sub processors to the resource manager in the self apparatus (information processing apparatus 1001) at step 1161 as seen in FIG. 65.

Referring now to FIG. 65, in response to the securing request, the resource manager in the information processing apparatus 1001 secures, if the self apparatus (information processing apparatus 1001) includes sub processors to be secured, such sub processors in the self apparatus at step 1162. Then at step 1163, the resource manager in the information processing apparatus 1001 determines whether or not some sub processors should be secured in a different information processing apparatus. If no sub processor should be secured in a different information processing apparatus, then the processing advances from step 1163 to step 1164, at which the resource manager in the information processing apparatus 1001 issues a notification to the function program that n sub processors are secured.

n sub processors cannot be secured only from free sub processors in the information processing apparatus 1001, and no other information processing apparatus than the information processing apparatus 1001 is connected to the network. However, where n sub processors can be secured if those sub processors executing sub processor programs having a lower priority in the information processing apparatus 1001 are included, n sub processors are secured only in the information processing apparatus 1001.

In this instance, the resource manager in the information processing apparatus 1001 rewrites, for those of the sub processors secured in the self apparatus whose sub processor status in the sub processor management table of the self apparatus is the unused, the sub processor status from the unused to the reserved. Further, the resource manager in the information processing apparatus 1001 rewrites, for each of the sub processors secured in the self apparatus, the sub processor program ID, function program ID, and sub processor program priority in the sub processor management table of the self apparatus so as to coincide with those of the sub processor program to be executed by the secured sub processor. Furthermore, the resource manager in the information processing apparatus 1001 issues, for each of the sub processors secured in the self apparatus, a lock sequence number and describes the lock sequence number in the sub processor management table. Then at step 1164, the resource manager in the information processing apparatus 1001 transmits the information mentioned to the function program.

The information to be transmitted at step 1164 particularly includes the number of secured sub processors and the sub processor IDs and the lock sequence numbers of the secured sub processors.

As seen in FIG. 65, at step 1167, the function program receives the sub processor securing notification and transmits sub processor programs for the sub processors to the resource manager in the self apparatus (information processing apparatus 1001) as hereinafter described.

It is to be noted that, if sub processors, which are executing sub processor programs having a lower priority in the self apparatus, are secured as sub processors for execution of sub processor programs for operating cooperatively with the function program at step 1162, then the resource manager in the information processing apparatus 1001 issues a notification to the sub processor programs having a lower priority and a function program or programs, which operate cooperatively with the sub processor programs having a lower priority, that the sub processors have been taken away.

On the other hand, if n sub processors to be secured include those sub processors to be secured in a different information processing apparatus, then the processing advances from step 1163 to step 1171. At step 1171, the resource manager in the information processing apparatus 1001 issues a request to secure sub processors to the resource managers in the information processing apparatus 1002, 1003, and 1004. At step 1172, each of the resource managers in the information processing apparatus 1002, 1003, and 1004 secures sub processors required for the self apparatus in the self apparatus.

The request to secure sub processors to any different information processing apparatus is conveyed using such a software cell, which includes a sub processor securing request command as the DMA command, as seen in FIG. 29A. In particular, referring to FIG. 29A, the sub processor securing command includes, as the DMA command, a sub processor securing request command body, a function program ID, a sub processor program priority, a securing request sub processor number, and a number of sub processor program IDs equal to the number of sub processors requested to secure.

n sub processors cannot be secured only from free sub processors in the information processing apparatus 1001. Where n sub processors can be secured if one or more different information processing apparatus are connected to the network in addition to the information processing apparatus 1001 and only free sub processors in the entire network system are included or sub processors, which are executing sub processor programs having a lower priority in the entire network system, are included, then n sub processors are secured in the entire network system including the one or more different information processing apparatus in this manner.

In this instance, the resource manager in each of the information processing apparatus 1002, 1003, and 1004 rewrites, for those of the sub processors secured in the self apparatus whose sub processor status in the sub processor management table of the self apparatus is the unused, the sub processor status from the unused to the reserved. Further, the resource manager in each of the information processing apparatus 1002, 1003 and 1004 rewrites, for each of the sub processors secured in the self apparatus, the sub processor program ID, function program ID, and sub processor program priority in the sub processor management table of the self apparatus so as to coincide with those of the sub processor program to be executed by the secured sub processor. Furthermore, the resource manager in each of the information processing apparatus 1002, 1003, and 1004 issues, for each of the sub processors secured in the self apparatus, a lock sequence number and describes the lock sequence number in the sub processor management table.

Further, if sub processors, which are executing sub processor programs having a lower priority in the self apparatus, are secured as sub processors for execution of sub processor programs for operating operatively with the function program at step 1172, then the resource manager in each of the information processing apparatus 1002, 1003, and 1004 issues a notification to the sub processor programs having a lower priority and a function program or programs, which operate cooperatively with the sub processor programs having a lower priority, that the sub processors have been taken away.

Figure 66:
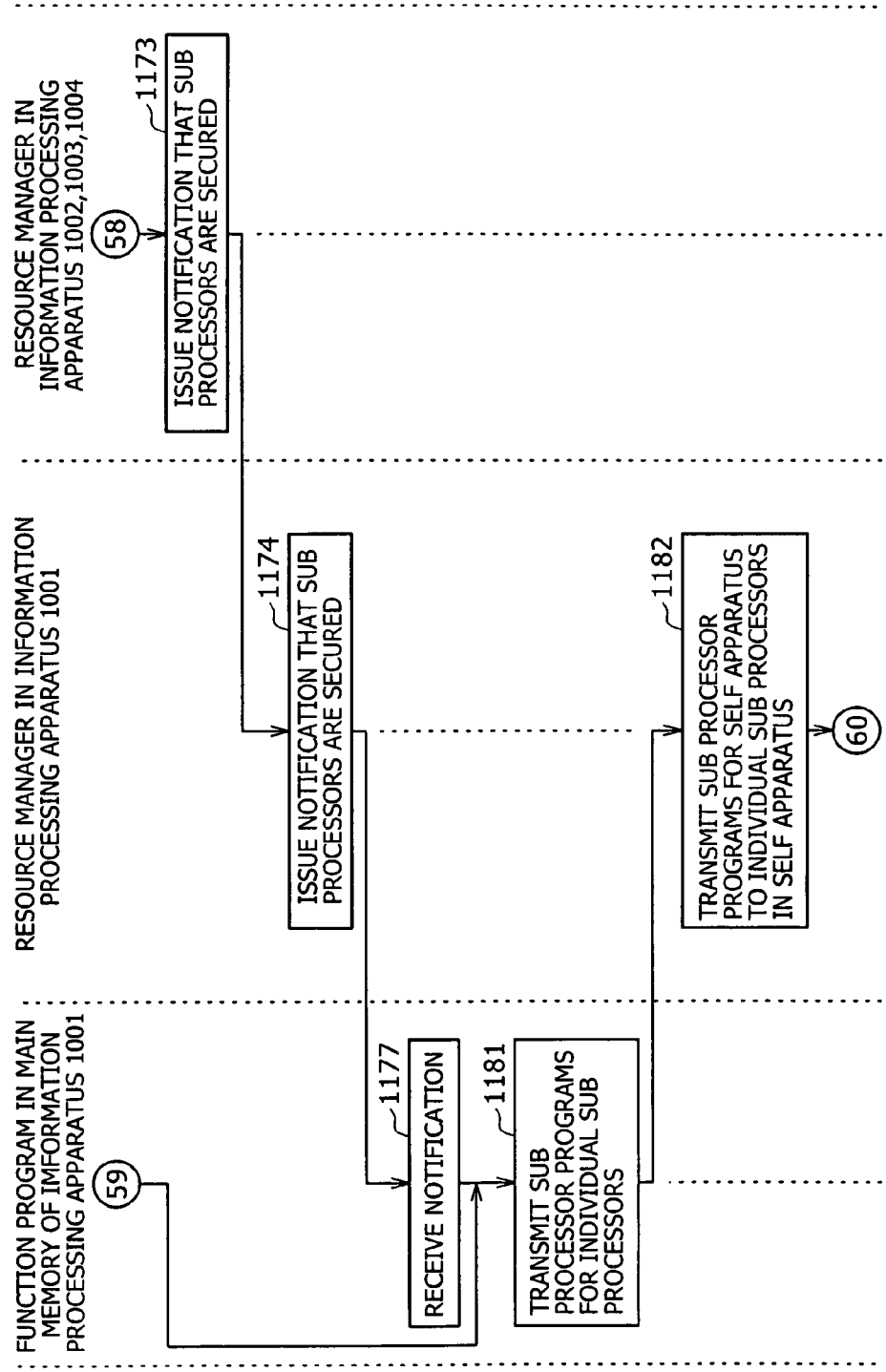

Further, the resource managers in the information processing apparatus 1002, 1003, and 1004 issue, at step 1173 in FIG. 66, a notification to the resource manager in the information processing apparatus 1001 that sub processors requested to the self apparatus have been secured in the self apparatus.

The notification is conveyed using such a software cell including a sub processor securing return command as the DMA command as seen in FIG. 29B. In particular, referring to FIG. 29B, the sub processor securing return command includes, as the DMA command, a sub processor securing return command body, a function program ID, a sub processor program priority, the number of secured sub processors, and a sub processor ID, a sub processor program ID, and a lock sequence number of each of the secured sub processors.

Referring to FIG. 66, after the resource manager in the information processing apparatus 1001 receives the sub processor securing notifications from the resource managers in the different information processing apparatus 1002, 1003, and 1004, it issues a notification to the function program at step 1174 that n sub processors are secured.

At step 1177, the function program receives the sub processor securing notification and transmits the sub processor programs for the sub processors to the resource manager in the self apparatus (information processing apparatus 1001).

In particular, if the function program receives, at step 1167 of FIG. 65 or step 1177 of FIG. 66, the notification from the resource manager in the information processing apparatus 1001 that n sub processors are secured, then it transmits, at step 1181 in FIG. 66, the sub processor programs for the secured sub processors together with the sub processor program ID, sub processor ID, and lock sequence number corresponding to each of the sub processor programs and the information processing apparatus IDs of those information processing apparatus in which the sub processors are secured.

Figure 67:
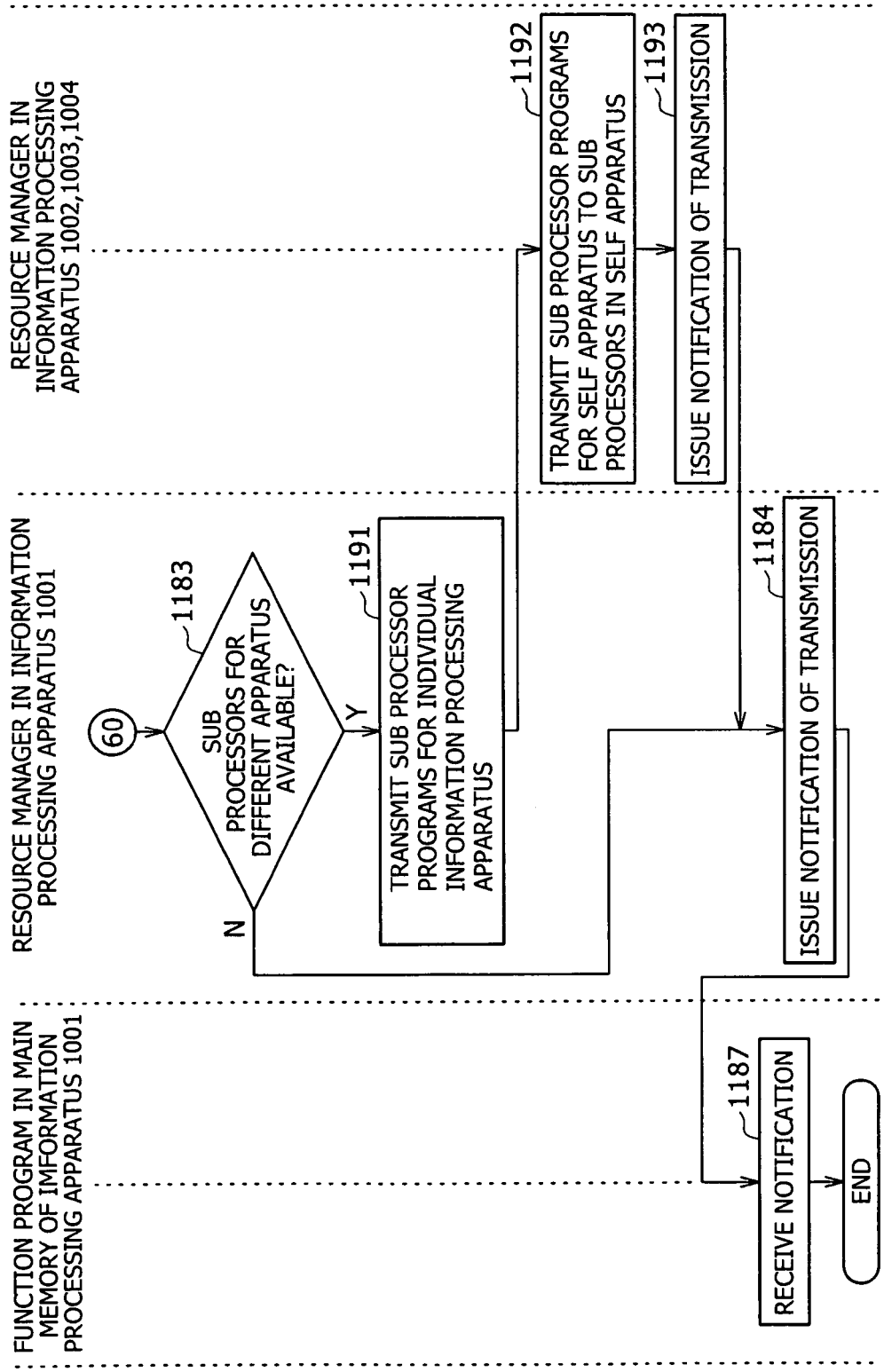

Referring to FIGS. 66 and 67, the resource manager in the information processing apparatus 1001 receives, at step 1182, the sub processor programs transmitted from the function program and transmits, if some of the sub processor programs are for the self apparatus (information processing apparatus 1001), the pertaining sub processor programs to the sub processors secured in the self apparatus. Then at step 1183, the resource manager in the information processing apparatus 1001 determines whether or not some of the sub processor programs are for one or more different information processing apparatus. If no sub processor program is for any different information processing apparatus, then the processing advances from step 1183 to step 1184, at which the resource manager in the information processing apparatus 1001 transmits a notification to the function program that the sub processor programs are transmitted to the secured sub processors.

On the other hand, if the sub processor programs transmitted from the function program include those sub processor programs for one or more different information processing apparatus, then the processing advances from step 1183 to step 1191. At step 1191, the resource manager in the information processing apparatus 1001 transmits the sub processor programs for the respective information processing apparatus 1002, 1003, and 1004 to the resource managers in the information processing apparatus 1002, 1003, and 1004, respectively.

For the transmission, such a software cell including a sub processor program transmission command as the DMA command as illustrated in FIG. 30 is used. In particular, referring to FIG. 30, the sub processor program transmission command includes, as a DMA command, a sub processor program transmission command body, a sub processor ID of each secured sub processor, a lock sequence number, a sub processor program ID of a sub processor program for each secured sub processor, and a sub processor program body for each secured sub processor.

At step 1192, the resource manager in each of the different information processing apparatus 1002, 1003, and 1004 transmits the sub processor programs for the self apparatus to the sub processors secured in the self apparatus. Then at step 1193, the resource manager in each of the information processing apparatus 1002, 1003, and 1004 issues a notification to the resource manager in the information processing apparatus 1001 that the sub processor programs are transmitted to the secured sub processors. At step 1184, the resource manager in the information processing apparatus 1001 receives the notifications from the information processing apparatus 1002, 1003, and 1004 and issues a notification to the function program that the sub processor programs are transmitted to the secured sub processor programs.

It is to be noted that each of the resource manager in the information processing apparatus 1001 and the resource managers in the information processing apparatus 1002, 1003, and 1004 determines, at step 1182 of FIG. 66 or step 1192 of FIG. 67, whether or not the sub processor program IDs and the lock sequence numbers of the sub processor programs for the secured sub processors received from the function program are same as those in the sub processor management table in the self apparatus. Then, if they are different, then the resource manager in the information processing apparatus 1001 issues directly, or the resource managers in the information processing apparatus 1002, 1003, and 1004 issue through the resource manager in the information processing apparatus 1001, a notification of an error to the function program. However, in FIGS. 66 and 67, this is omitted, but only a case is illustrated wherein no error is involved.

Referring to FIG. 67, the function program receives, at step 1187, the notification from the resource manager in the information processing apparatus 1001 that the sub processor programs are transmitted to the secured sub processors.

The sub processor allocation process is performed in such a manner as described above. n sub processors cannot be secured only from free sub processors in the information processing apparatus 1001 but can be secured only in the information processing apparatus 1001 if sub processors, which are executing sub processor programs having a lower priority in the information processing apparatus 1001, are included. Alternatively, n sub processors cannot be secured only from free sub processors in the information processing apparatus 1001 but if one or more different information processing apparatus are connected to the network in addition to the information processing apparatus 1001 and n sub processors can be secured only from free processors in the entire network system or including sub processors, which are executing sub processor programs having a lower priority in the entire network system.

Data to be processed by the secured sub processors are transmitted to the secured sub processors simultaneously with the transmission of the sub processor programs or after the transmission of the sub processor programs. Consequently, the secured sub processors can individually execute the sub processor programs.

Figure 68:
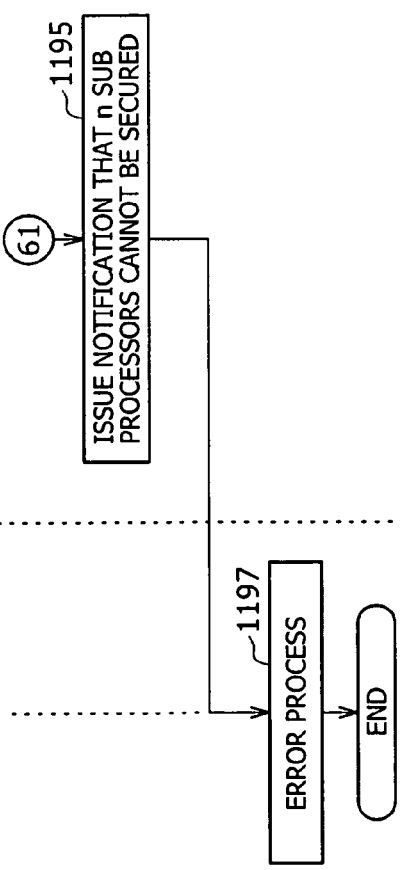

On the other hand, if the resource manager in the information processing apparatus 1001 determines at step 1151 of FIG. 64 that no different information processing apparatus is connected to the network, that is, if the resource manager in the information processing apparatus 1001 determines that n sub processors cannot be secured including free sub processors and sub processors, which are executing sub processor programs having a lower priority in the entire network system, the processing advances from step 1151 to step 1195 illustrated in FIG. 68. Referring to FIG. 68, at step 1195, the resource manager in the information processing apparatus 1001 issues a notification to the function program that n sub processors cannot be secured.

The function program receives the notification and executes an error process at step 1197. The error process in this instance may be to issue a notification to the user that the process cannot be executed immediately and execute the sub processor allocation process beginning with step 1112 of FIG. 60 again after a while or to urge the user to perform an operation.

It is to be noted that, if a notification that a sub processor has been taken away is issued to a sub processor program having a lower priority, then a different process corresponding to the sub processor program is executed.

In the example described above, an inquiry about a free situation of sub processors and a request to secure sub processors are issued in an ascending order of the replaced numerical value of the information processing apparatus ID, that is, in the order of the information processing apparatus 1001→information processing apparatus 1002→information processing apparatus 1003→information processing apparatus 1004. However, the system may be configured otherwise such that, for example, the resource manager in each information processing apparatus determines, when the priority of a sub processor program to be executed is high, the operation frequency of each of the information processing apparatus connected to the network 1009 from the main processor operation frequency of each information processing apparatus, which is part of the apparatus information described hereinabove, and issues an inquiry about a free situation of sub processors and a request to secure sub processors in a descending order of the operation frequency to the information processing apparatus.

Alternatively, the system may be configured such that the type of each of the information processing apparatus connected to the network 1009 is determined from the information processing apparatus type ID, which is part of the apparatus information, and an inquiry about a free situation of sub processors and a request to secure sub processors are issued in order from an information processing apparatus disconnected with a low possibility from the network 1009 like a hard disk recorder to another information processing apparatus disconnected with a high possibility from the network 1009 like a PDA or a portable CD player.

Further, in the example described above, when a necessary number of sub processors cannot be secured from free sub processors in the information processing apparatus 1001, the resource manager in the information processing apparatus 1001 first issues an inquiry about a free situation of sub processors to the resource manager in a different information processing apparatus and then issues, when the necessary number of sub processors can be secured in the entire network system, a request to secure sub processors. However, the system may be configured otherwise such that the resource manager in the information processing apparatus 1001 issues a request to secure sub processors to the resource manager in a different information processing apparatus without issuing an inquiry about a free situation of sub processors.

Furthermore, in the example described above, the information processing apparatus 1001 operates as a master apparatus, and the sub processor allocation process is executed using the master apparatus as a starting point. However, the system may be configured otherwise such that, for example, when an information processing apparatus, which operates as a slave apparatus, is operated by the user, the sub processor allocation process is executed using the operated slave apparatus as a starting point.

8. Distributed Process 2 by Allocation of Sub Processors When an Information Processing Apparatus is Disconnected from the Network A user may disconnects one of the information processing apparatus from the network 1009 by mistake (an information processing apparatus is disconnected physically from the network 1009 or the main power supply to an information processing apparatus is cut), while a plurality of information processing apparatus 1001, 1002, 1003, and 1004 are connected to the network 1009 as seen in FIG. 59. Alternatively, a certain information processing apparatus may be disconnected from the network 1009 by some external factor such as strong vibration. If sub processors in the disconnected information processing apparatus are executing or reserved for execution of sub processor programs included in another information processing apparatus, which is not disconnected from the network 1009, then preferably the sub processors in the information processing apparatus, which is not disconnected, execute the sub processor programs in place of the sub processors in the disconnected information processing apparatus.

Therefore, in such an instance, the sub processors in the information processing apparatus, which is not disconnected, are allocated for execution of the sub processor programs, which are being executed or reserved for execution by the sub processors in the disconnected information processing apparatus, in the following manner.

8-1. System Configuration

Figure 69:
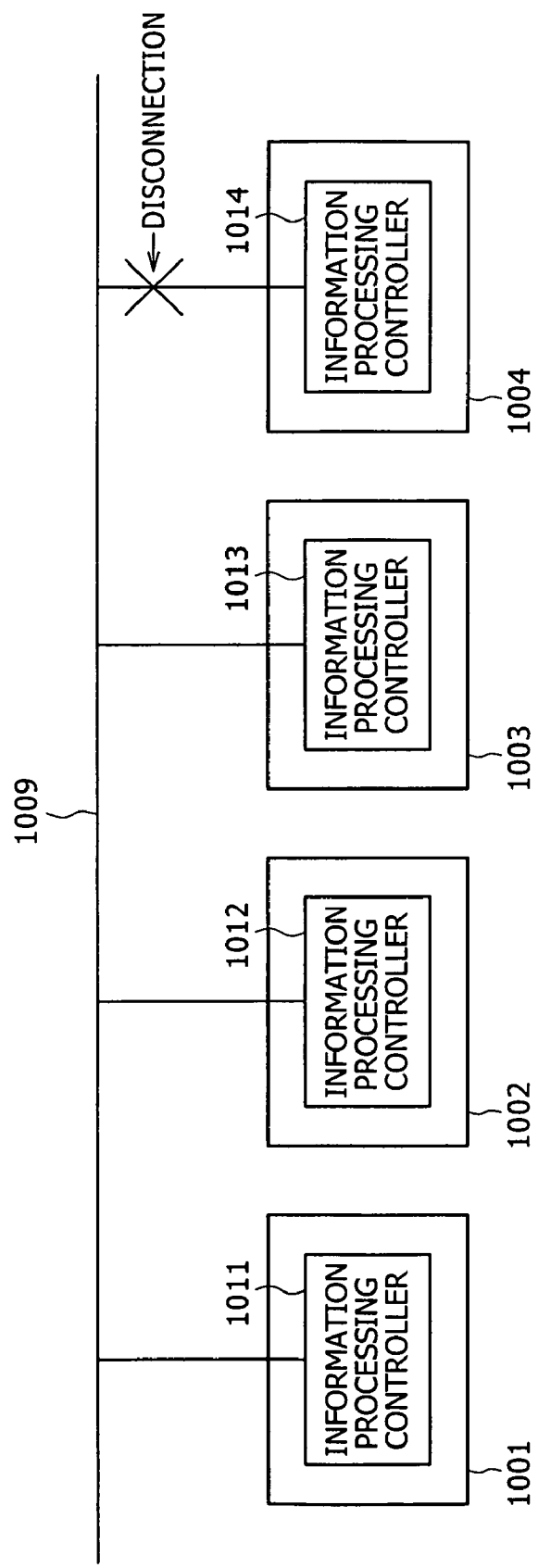
FIG. 69 is a diagrammatic view illustrating disconnection of an information processing apparatus in the network system shown in FIG. 59.

FIG. 69 shows that, while the four information processing apparatus 1001, 1002, 1003, and 1004 are connected to the network 1009 as shown in FIG. 59, the information processing apparatus 1004 is disconnected from the network 1009.

Each of the information processing apparatus includes, as a software configuration thereof, the resource manager as the control program as seen in FIG. 17 and prepares such a sub processor management table as described hereinabove with reference to FIG. 18 in the resource manager. The sub processor management table has such contents as described hereinabove.

8-2. Sub Processor Allocation Process

FIGS. 70 to 78 illustrate an example of the sub processor allocation process executed by a master/slave (MS) manager in the information processing apparatus 1001, a function program in the main memory 1026-1 of the information processing apparatus 1001, the resource manager in the information processing apparatus 1001, and the resource managers in the different information processing apparatus 1002 and 1003. When the information processing apparatus 1001 secures, in case, while the information processing apparatus 1001, 1002, 1003, and 1004 are connected to the network 1009 as shown in FIG. 69, the information processing apparatus 1004 is disconnected from the network 1009, sub processors in the information processing apparatus 1001 or the different information processing apparatus 1002 and 1003 for execution of sub processor programs. The sub processor programs operate cooperatively with a function program in the main memory 1026-1 in the information processing apparatus 1001.

It is detected by the MS managers in the information processing apparatus 1001, 1002, and 1003 that the information processing apparatus 1004 has been disconnected from the network 1009.

Figure 70:
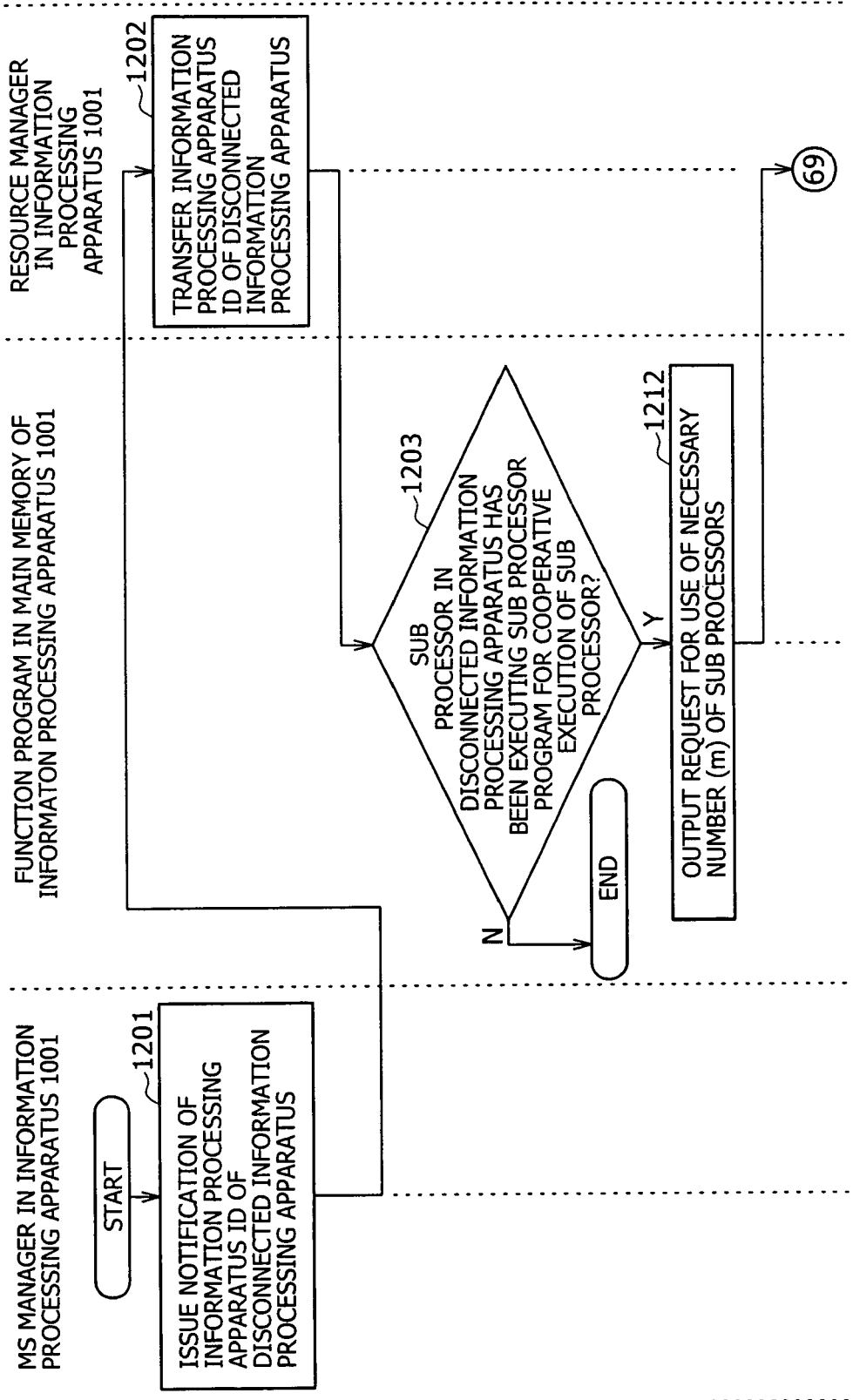

Then, after the MS manager in the information processing apparatus 1001 detects the disconnection of the information processing apparatus 1004 from the network 1009, it issues a notification of the information processing apparatus ID of the disconnected information processing apparatus 1004 to the resource manager in the self apparatus (information processing apparatus 1001) at step 1201 as seen in FIG. 70. Then at step 1202, the resource manager in the information processing apparatus 1001 transfers the information processing apparatus ID to the function program in the main memory 1026-1 of the self apparatus.

The function program in the main memory 1026-1 of the information processing apparatus 1001 receives the information processing apparatus ID and determines from a result of such a sub processor allocation process as described hereinabove with reference to FIGS. 28 to 30 and 60 to 68 whether or not the sub processors in the disconnected information processing apparatus 1004 have been executing sub processor programs, which operate cooperatively with the function program itself.

Also the "executing" in this instance includes not only the busy status (status wherein the sub processor programs are currently used) but also the reserved status (status where the sub processor programs are not currently used but are reserved for use).

Then, if none of the sub processors in the disconnected information processing apparatus 1004 have been executing sub processor programs, which operate cooperatively with the function program, then since later processing is unnecessary, the sub processor allocation process is ended immediately.

On the other hand, if some or all of the sub processors in the disconnected information processing apparatus 1004 have been executing sub processor programs, which operate cooperatively with the function program, then the processing advances from step 1203 to step 1212. At step 1212, the function program outputs a request for use of a number (represented by m) of sub processors necessary to execute sub processor programs, which are to operate cooperatively with the function program, in place of the sub processor programs in the disconnected information processing apparatus 1004 to the resource manager in the self apparatus (information processing apparatus 1001) attaching the function program ID of the function program and the sub processor program IDs of the sub processor programs having been executed (including reserved for execution as described hereinabove) by the sub processors in the disconnected information processing apparatus 1004, which are to operate cooperatively with the function program.

In response to the request, the resource manager in the information processing apparatus 1001 refers, at step 1213 illustrated in FIG. 71, to the sub processor management table shown in FIG. 18 of the self apparatus (information processing apparatus 1001) to determine whether or not m free sub processors are available in the self apparatus. If m or more free sub processors are available in the self apparatus, then the processing advances from step 1213 to step 1214. At step 1214, the resource manager in the information processing apparatus 1001 secures m sub processors in the self apparatus and, for each of the secured sub processors, rewrites the sub processor status in the sub processor management table from unused to reserved and rewrites the sub processor program ID, function program ID, and sub processor program priority so that they coincide with those of the sub processor program to be executed by the secured sub processor. Further, the resource manager issues lock sequence numbers and describes them into the sub processor management table.

Thereafter, the processing advances to step 1215, at which the resource manager in the information processing apparatus 1001 issues a notification of the fact that m sub processor programs are secured in the self apparatus and of the sub processor ID and lock sequence number of each of the m secured sub processors to the function program.

At step 1217, the function program receives the notification from the resource manager and transmits a number of sub processor IDs, sub processor program IDs, sub processor program bodies, and lock sequence numbers for the secured sub processors equal to the number of secured sub processors together with the function program ID of the function program itself to the resource manager in the self apparatus (information processing apparatus 1001).

Referring now to FIG. 72, at step 1221, the resource manager in the information processing apparatus 1001 receives the information transmitted from the function program and stores the sub processor programs for the sub processors. Then at step 1222, the resource manager in the information processing apparatus 1001 determines whether or not the received processor program IDs and lock sequence numbers are same as those in the sub processor management table of the self apparatus. If they are same, then the processing advances to step 1223, at which the resource manager in the information processing apparatus 1001 transmits the sub processor programs to the secured sub processors. Then at step 1224, the resource manager in the information processing apparatus 1001 issues a notification to the function program that the sub processor programs are transmitted to the sub processors.

The sub processor allocation process where a necessary number of sub processors can be secured only among free sub processors in the information processing apparatus 1001 is completed thereby.

Data to be processed by the secured sub processors are transmitted to the secured sub processors simultaneously with the transmission of the sub processor programs or after the transmission of the sub processor programs. Consequently, the secured sub processors can execute the respective sub processor programs.

If the resource manager in the information processing apparatus 1001 determines at step 1222 that the sub processor program IDs or the lock sequence numbers received from the function program are different from those in the sub processor management table of the self apparatus, then the processing advances from step 1222 to step 1226, at which the resource manager in the information processing apparatus 1001 issues a notification of an error to the function program. In this instance, the function program executes an error process at step 1227.

On the other hand, if the resource manager in the information processing apparatus 1001 determines at step 1213 of FIG. 71 that m free sub processors are not available in the self apparatus, that is, the information processing apparatus 1001 includes only m−1 free sub processors or less (including zero), then the processing advances from step 1213 to step 1229 illustrated in FIG. 73. Referring now to FIG. 73, at step 1229, if some free sub processors are included in the self apparatus, then the sub processors are secured as sub processors for the self apparatus.

Then, the processing advances to step 1231, at which the resource manager in the information processing apparatus 1001 determines whether or not some different information processing apparatus is connected to the network. FIG. 69 shows that the different information processing apparatus 1002 and 1003 are connected.

Then, if one or more different information processing apparatus are connected to the network, then the processing advances from step 1231 to step 1232, at which the resource manager in the information processing apparatus 1001 issues a request to secure free sub processors to the resource manager in one of the different information processing apparatus (in the present case, the information processing apparatus 1002).

The securing request is conveyed using such a sub processor securing request command as illustrated in FIG. 29A. The number of sub processors of the securing request is represented by m−a where "a" is the number of sub processors secured in the information processing apparatus 1001 at step 1229 and $0 \leq a < m$.

Referring to FIG. 73, in response to the securing request from the resource manager in the information processing apparatus 1001, the resource manager in the different information processing apparatus (in this instance, the information processing apparatus 1002) determines a free situation of the sub processors in the self apparatus from the sub processor management table in the self apparatus at step 1233. Then at step 1234, if free sub processors are available in the self apparatus, then the resource manager in the different information processing apparatus secures a number of sub processors equal to or smaller than m−a in the self apparatus. Then at step 1235, if sub processors are secured in the self apparatus, then the resource manager in the different information processing apparatus issues a notification of the number of secured sub processors and the sub processor ID, sub processor program ID, and lock sequence number of each of the secured sub processors to the resource manager in the information processing apparatus 1001. However, if no free sub processors can be secured in the self apparatus, then the resource manager in the different information processing apparatus issues a notification of this to the resource manager in the information processing apparatus 1001. This notification is conveyed using such a sub processor securing return command as described hereinabove with reference to FIG. 29B.

The resource manager in the information processing apparatus 1001 receives the notification and determines at step 1236 illustrated in FIG. 74 whether or not totaling m sub processors are secured successfully including the secured sub processors in the self apparatus (information processing apparatus 1001) and the secured sub processors in the different apparatus (information processing apparatus 1002).

Then, if totaling m sub processors cannot be secured, then the resource manager in the information processing apparatus 1001 advances (returns) the processing from step 1236 to step 1231 illustrated in FIG. 73. At step 1231, the resource manager in the information processing apparatus 1001 determines whether or not a further different information processing apparatus is connected to the network. FIG. 69 shows that the different information processing apparatus 1003 is connected to the network 1009 in addition to the information processing apparatus 1002.

Thereafter, the processes at steps 1232, 1233, 1234, 1235, 1236, and 1231 are repeated similarly as in the case of the information processing apparatus 1002 described above until after m sub processors are secured successfully over the entire network system or until after it is detected that any more information processing apparatus is not connected to the network.

Then, if m sub processors are secured successfully among free sub processors in the entire network system, then the processing advances from step 1236 to step 1237 illustrated in FIG. 74. At step 1237, the resource manager in the information processing apparatus 1001 issues a notification that m sub processors are secured to the function program.

At step 1238, the function program receives the sub processor securing notification and transmits the sub processor programs for the sub processors to the resource manager in the self apparatus (information processing apparatus 1001) as hereinafter described.

On the other hand, if the resource manager in the information processing apparatus 1001 determines at step 1231 of FIG. 73 that no more information processing apparatus is connected to the network, that is, if it determines that m sub processors cannot be secured from among free sub processors in the entire network system (where only the information processing apparatus 1001 is connected to the network, only in the information processing apparatus 1001), then the processing advances from step 1231 to step 1241 illustrated in FIG. 74. Referring to FIG. 74, at step 1241, the resource manager in the information processing apparatus 1001 determines whether or not the apparatus itself (information processing apparatus 1001) includes those sub processors, which are executing sub processor programs having a priority lower than that of the function program and, if such sub processors exist, detects the number of such sub processors.

Also the "executing" in this instance includes not only a case wherein sub processors are busy (currently used) but also another case wherein sub processors are reserved (although the sub processors are not used at present, they are reserved for use). In the following description, a sub processor program having a priority lower than that of the function program is referred to simply as "sub processor program having a lower priority".

Then at step 1242, if some of the sub processors in the information processing apparatus 1001 are executing sub processor programs having a lower priority, then the resource manager in the information processing apparatus 1001 secures those of the sub processors executing sub processor programs having a lower priority within a range within which m sub processors can be secured including the free sub processors in the entire network system. Further, the resource manager in the information processing apparatus 1001 issues a notification to the sub processor programs having a lower priority that the sub processors have been taken away.

Thereafter, the processing advances to step 1243 illustrated in FIG. 75. Referring to FIG. 75, at step 1243, the resource manager in the information processing apparatus 1001 determines where or not totaling m sub processors are secured successfully including the free sub processors in the entire network system and the sub processors executing sub processor programs having a lower priority in the self apparatus (information processing apparatus 1001). If m sub processors are secured successfully, then the processing advances from step 1243 to step 1244, at which the resource manager in the information processing apparatus 1001 issues a notification to the function program that m sub programs are secured successfully.

At step 1248, the function program receives the sub processor securing notification and transmits the sub processor programs for the sub processors to the resource manager in the self apparatus (information processing apparatus 1001) as hereinafter described.

On the other hand, if the resource manager in the information processing apparatus 1001 determines at step 1243 that totaling m sub processors cannot be secured including the free sub processors in the entire network system and the sub processors executing sub processor programs having a lower priority in the self apparatus, then the processing advances from step 1243 to step 1251. At step 1251, the resource manager in the information processing apparatus 1001 determines whether or not a different information processing apparatus is connected to the network.

If a different information processing apparatus is connected to the network, then the processing advances from step 1251 to step 1252, at which the resource manager in the information processing apparatus 1001 issues a request to secure those sub processors, which are executing sub processor programs having a lower priority to the resource manager in a different information processing apparatus (in this instance, the information processing apparatus 1002). The securing request is conveyed using such a sub processor securing request command as described hereinabove with reference to FIG. 29A.

Referring now to FIG. 76, in response to the securing request, the resource manager in the different information processing apparatus (in this instance, the information processing apparatus 1002) determines at step 1253 whether or not the self apparatus includes those sub processors, which are executing sub processor programs having a lower priority from the sub processor management table in the self apparatus. If such sub processors are present, then the resource manager in the different information processing apparatus secures the sub processors, which are executing the sub processor programs having a lower priority, and issues a notification of the number of the secured sub processors and the sub processor ID, sub processor program ID, and issued lock sequence number of each of the secured sub processors to the resource manager in the information processing apparatus 1001. However, if the self apparatus does not include those sub processors, which are executing sub processor programs having a lower priority, then the resource manager in the different information processing apparatus issues a notification of this to the resource manager in the information processing apparatus 1001. The notification is conveyed using such a sub processor securing return command as described hereinabove with reference to FIG. 29B.

It is to be noted that, if sub processors, which are executing sub processor programs having a lower priority in the different information processing apparatus (in this instance, the information processing apparatus 1002), are secured at step 1253, then the resource manager in the different information processing apparatus issues a notification to the function program, which operates cooperatively with the sub processor programs, that the sub processors have been taken away.

In response to the securing notification from the resource manager in the different information processing apparatus (in this instance, the information processing apparatus 1002), the resource manager in the information processing apparatus 1001 determines at step 1254 in FIG. 76 whether or not m sub processors are secured successfully including the free sub processors in the entire network system and the sub processors which are executing sub processor programs having a lower priority in the self apparatus (information processing apparatus 1001) and the different apparatus (in this instance, the information processing apparatus 1002). However, if totaling m sub processors cannot be secured, then the processing advances (returns) from step 1254 to step 1251 illustrated in FIG. 75, at which the resource manager in the information processing apparatus 1001 determines whether or not a further different information processing apparatus is connected to the network.

Thereafter, the processes at steps 1252, 1253, 1254, and 1251 are repeated similarly as in the case of the information processing apparatus 1002 described above until after m sub processors are secured successfully over the entire network system or until after it is detected that any more information processing apparatus is not connected to the network.

Then, if m sub processors are secured successfully in the entire network system including the free sub processors and those sub processors, which are executing sub processor programs having a lower priority, then the processing advances from step 1254 to step 1255. At step 1255, the resource manager in the information processing apparatus 1001 issues a notification to the function program that m sub processors are secured successfully.

At step 1258, the function program receives the processor securing notification and transmits the sub processor programs for the sub processors to the resource manager in the self apparatus (information processing apparatus 1001) in the following manner.

In particular, if the function program receives, at step 1238 of FIG. 74, step 1248 of FIG. 75, or step 1258 of FIG. 76, the notification that m sub processors are secured successfully from the resource manager in the information processing apparatus 1001, then it transmits the sub processor programs for the secured sub processors to the resource manager in the information processing apparatus 1001 at step 1281 illustrated in FIG. 77.

Referring to FIG. 77, the resource manager in the information processing apparatus 1001 receives, at step 1282, the sub processor programs transmitted from the function program and transmits, if some of the sub processor programs are for the self apparatus (information processing apparatus 1001), the pertaining sub processor programs to the sub processors secured in the self apparatus. Then at step 1283, the resource manager in the information processing apparatus 1001 determines whether or not some of the sub processor programs are for one or more different information processing apparatus. If no sub processor program is for any different information apparatus, then the processing advances from step 1283 to step 1284, at which the resource manager in the information processing apparatus 1001 transmits a notification to the function program that the sub processor programs are transmitted to the secured sub processors.

On the other hand, if the sub processor programs transmitted from the function program include those sub processor programs for one or more different information processing apparatus, then the processing advances from step 1283 to step 1291. At step 1291, the resource manager in the information processing apparatus 1001 transmits the sub processor programs for the respective information processing apparatus 1002 and 1003 to the resource managers in the information processing apparatus 1002 and 1003, respectively.

At step 1292, the resource manager in each of the different information processing apparatus 1002 and 1003 transmits the sub processor programs for the self apparatus to the sub processors secured in the self apparatus. Then at step 1293, the resource manager in each of the information processing apparatus 1002 and 1003 issues a notification to the resource manager in the information processing apparatus 1001 that the sub processor programs are transmitted to the secured sub processors. At step 1284, the resource manager in the information processing apparatus 1001 receives the notifications from the information processing apparatus 1002 and 1003 and issues a notification to the function program that the sub processor programs are transmitted to the secured sub processor programs.

It is to be noted that, if each of the resource manager in the information processing apparatus 1001 and the resource managers in the information processing apparatus 1002 and 1003 secures sub processors in the self apparatus at step 1229 or 1234 of FIG. 73, step 1242 of FIG. 74, or step 1253 of FIG. 76, then it rewrites the sub processor management table in the self apparatus and describes lock sequence numbers issued by the resource manager in the information processing apparatus 1001, 1002, or 1003 into the sub processor management table with regard to the secured sub processors. Further, at step 1282 or 1292 of FIG. 77, each of the resource manager in the information processing apparatus 1001 and the resource managers in the information processing apparatus 1002 and 1003 determines whether or not the sub processor program IDs and the lock sequence numbers received from the function program are same as those in the sub processor management table in the self apparatus. Then, if they are different, then the resource manager in the information processing apparatus 1001 issues directly, or the resource manager in each of the information processing apparatus 1002 and 1003 issues through the resource manager in the information processing apparatus 1001, a notification of an error to the function program. However, in FIGS. 74 to 77, this is omitted, but only a case is illustrated wherein no error is involved.

Referring to FIG. 77, the function program receives the notification that the sub processor programs are transmitted to the secured sub processors from the resource manager in the information processing apparatus 1001 at step 1287.

The sub processor allocation process is performed in such a manner as described above. m sub processors cannot be secured only from free sub processors in the information processing apparatus 1001 but can be secured only in the information processing apparatus 1001 if sub processors, which are executing sub processor programs having a lower priority in the information processing apparatus 1001, are included. Alternatively, m sub processors cannot be secured only from free sub processors in the information processing apparatus 1001 but if one or more different information processing apparatus are connected to the network in addition to the information processing apparatus 1001 and m sub processors can be secured only from free processors in the entire network system or including sub processors, which are executing sub processor programs having a lower priority in the entire network system.

Data to be processed by the secured sub processors are transmitted to the secured sub processors simultaneously with the transmission of the sub processor programs or after the transmission of the sub processor programs. Consequently, the secured sub processors can individually execute the sub processor programs.

On the other hand, if the resource manager in the information processing apparatus 1001 determines at step 1251 of FIG. 75 that no different information processing apparatus is connected to the network, that is, if the resource manager in the information processing apparatus 1001 determines that m sub processors cannot be secured including the free sub processors in the entire network system and sub processors, which are executing sub processor programs having a lower priority, the processing advances from step 1251 to step 1295 illustrated in FIG. 78. Referring to FIG. 78, at step 1295, the resource manager in the information processing apparatus 1001 issues a notification to the function program that m sub processors cannot be secured. The function program receives the notification and executes an error process at step 1297.

In the example described above, a request to secure sub processors is issued in an ascending order of the replaced numerical value of the information processing apparatus ID, that is, in the order of the information processing apparatus 1001→information processing apparatus 1002→information processing apparatus 1003→information processing apparatus 1004. However, the system may be configured otherwise such that, for example, the resource manager in each information processing apparatus determines, when the priority of a sub processor program to be executed is high, the operation frequency of each of the information processing apparatus connected to the network 1009 from the main processor operation frequency of each information processing apparatus, which is part of the apparatus information described hereinabove, and issues a request to secure sub processors in a descending order of the operation frequency to the information processing apparatus.

Alternatively, the system may be configured such that the type of each of the information processing apparatus connected to the network 1009 is determined from the information processing apparatus type ID, which is part of the apparatus information, and a request to secure sub processors is issued in order from an information processing apparatus disconnected with a low possibility from the network 1009 like a hard disk recorder to another information processing apparatus disconnected with a high possibility from the network 1009 like a PDA or a portable CD player.

Further, in the example described above, when a necessary number of sub processors cannot be secured from free sub processors in the information processing apparatus 1001, the resource manager in the information processing apparatus 1001 issues a request to secure sub processors immediately to the resource manager in a different information processing apparatus. However, the system may be configured otherwise such that the resource manager in the information processing apparatus 1001 first issues a free situation of sub processors to the resource manager in a different information processing apparatus and then issues, when the necessary number of sub processors can be secured in the entire network system, a request to secure sub processors to the different information processing apparatus.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An information processing apparatus connected to a different information processing apparatus through a network, said information processing apparatus comprising:
   a main processor;
   a first sub processor configured to execute a first program having a first priority;
   a second sub processor configured to execute a second program having a second priority; and
   a memory device storing instructions which when executed by the main processor, cause the main processor to operate with the first sub processor and the second processor to:

(a) manage said first sub processor and said second sub processor using a management table, said management table including:
  (i) a first identifier for specifying said first sub processor;
  (ii) a second identifier for specifying said second sub processor; and
  (iii) use situation information representative of whether or not:
    (A) said first sub processor specified with the first identifier is executing or is reserved for execution of a program; and
    (B) said second sub processor specified with the second identifier is executing or is reserved for execution of a program;
(b) in response to a securing request from the different information processing apparatus, said securing request indicating a first number of processors and a program priority:
  (i) determine a second number of processors, the second number indicating a quantity of said sub processors which are not executing nor are reserved for execution of a program;
  (ii) if said determined second number is less than said first number:
    (A) for the first sub processor, determine whether the first priority is lower than the program priority;
    (B) if the first priority is lower than the program priority, for the different information processing apparatus, secure said first sub processor;
    (C) for the second sub processor, determine whether the second priority is lower than the program priority; and
    (D) if the second priority is lower than the program priority, for the different information processing apparatus, secure said second sub processor; and
  (iii) rewrite said management table.

2. The information processing apparatus of claim 1, wherein when executed by said main processor, the instructions cause the main processor to, in response to the securing request from the different information processing apparatus, secure said first sub processor and said second sub processor which are not executing nor are reserved for execution of a program.

3. The information processing apparatus of claim 1, wherein when executed by said main processor, the instructions cause the main processor to:
  (a) in response to an inquiry from the different information processing apparatus, return information on said management table to the different information processing apparatus; and
  (b) in response to a later securing request from the different information processing apparatus, secure, for the different information processing apparatus, said first sub processor and said second sub processor which are not executing nor are reserved for execution of a program.

4. The information processing apparatus of claim 1, wherein when executed by said main processor, the instructions cause the main processor to, in response to the securing request from the different information processing apparatus and if said determine second number of processors is equal to or greater than said first number, secure said second number of processors.

5. The information processing apparatus of claim 1, wherein when executed by said main processor, the instructions cause the main processor to:
  (a) in response to an inquiry from the different information processing apparatus, return information on said management table to the different information processing apparatus; and
  (b) in response to a later securing request from the different information processing apparatus and if the determined second number of processors is equal to or greater than said first number, secure said second number of processors.

6. An information processing system comprising:
a first information processing apparatus connected to a network, said first information processing apparatus including:
  (a) a first main processor;
  (b) a first sub processor configured to execute a first program having a first priority;
  (c) a second sub processor configured to execute a second program having a second priority;
  (d) a first memory device storing instructions which when executed by the first main processor, cause the first main processor to manage said first sub processor and said second sub processor using a first management table, said first management table including:
    (i) a first identifier for specifying said first sub processor;
    (ii) a second identifier for specifying said second sub processor; and
    (iii) first use situation information representative of whether or not:
      (A) said first sub processor specified with the first identifier is executing or is reserved for execution of a program; and
      (B) said second processor specified with the second identifier is reserved for execution of a program;
a second information processing apparatus connected to the network, said second information processing apparatus including:
  (a) a second main processor;
  (b) a third sub processor configured to execute a thirds program having a third priority;
  (c) a fourth sub processor configured to execute a fourth program having a fourth priority; and
  (d) a second memory device storing instructions which when executed by the second main processor, cause the second main processor to:
    (i) manage said third sub processor and said fourth sub processor using a second management table, said second management table including:
      (A) a third identifier for specifying said third sub processor;
      (B) a fourth identifier for specifying said fourth sub processor; and
      (C) second use situation information representative of whether or not:
        (x) said third sub processor specified with the third identifier is executing or is reserved for execution of a program; and
        (y) said fourth sub processor specified with the fourth identifier is executing or is reserved for execution of a program;
    (ii) transmit a securing request to the first information processing apparatus, said securing request indicating a first number of processors and a program priority, wherein in response to said first information processing apparatus receiving said securing request, said first information processing apparatus:
  (A) determines a second number of processors, the second number indicating a quantity of sub processors of said first information processing apparatus which are not executing nor are reserved for execution of a program;
  (B) if said determined second number is less than said first number:
    (I) for the first sub processor, determines whether the first priority is lower than the program priority;
    (II) if the first priority is lower than the program priority, for the second information processing apparatus, secures said first sub processor;
    (III) for the second sub processor, determines whether the second priority is lower than the program priority; and
    (IV) if the second priority is lower than the program priority, for the second information processing apparatus, secures said second sub processor; and
    (V) rewrites said first management table.

7. A method of operating an information processing system comprising:
  (a) providing a first information processing apparatus including:
    (i) a first main processor;
    (ii) a first sub processor configured to execute a first program having a first priority;
    (iii) a second sub processor configured to execute a second program having a second priority;
    (iv) a first memory device storing instructions;
  (b) causing the main processor to execute the instructions to manage said first sub processor and said second sub processor using, a first management table, said first management table including:
    (i) a first identifier for specifying said first sub processor;
    (ii) a second identifier for specifying said second sub processor; and
    (iii) first use situation information representative of whether or not:
      (A) said first sub processor specified with the first identifier is executing or is reserved for execution of a program; and
      (B) said second processor specified with the second identifier is reserved for execution of a program;
  (c) providing a second information processing apparatus including:
    (i) a second main processor;
    (ii) a third sub processor configured to execute a third program having a third priority;
    (iii) a fourth sub processor configured to execute a fourth program having a fourth priority; and
    (iv) a second memory device storing second instructions
  (d) causing the second main processor to execute the second instruction to manage said third sub processor using, a second management table, said second management table including:
    (i) a third identifier for specifying said third sub processor;
    (ii) a fourth identifier for specifying said fourth sub processor; and
    (iii) second use situation information representative of whether or not:
      (A) said third sub processor specified with the third identifier is executing or is reserved for execution of a program; and,
      (B) said fourth sub processor specified with the fourth identifier is executing or is reserved for execution of a program;
  (e) causing the second information processing apparatus to transmit a securing request to the first information processing apparatus, said securing request indicating a first number of processors and a program priority;
  (f) in response to said first information processing apparatus receiving said securing request;
    (i) causing said first main processor to execute the instructions to determine a second number of processors, the second number indicating a quantity of sub processors of said first information processing apparatus which are not executing nor are reserved for execution of a program;
    (ii) if said determined second number is less than said first number:
      (A) causing the first main processor to execute the instructions to, for the first sub processor, determine whether the first priority is lower than the program priority, and
      (B) if the first priority is lower than the program priority, causing the first main processor to execute the instructions to, for the second information processing apparatus, secure said first sub processor;
      (C) for the second sub processor, causing the first main processor to execute the instructions to determine whether the second priority is lower than the program priority; and
      (D) if the second priority is lower than the program priority, for the second information processing apparatus, causing the first main processor to execute the instruction to secure said second sub processor; and
    (iii) causing said first main processor to execute the instructions to rewrite said first management table.

8. The method of claim 7, which includes causing said first main processor to execute the instructions to, for the second information processing apparatus, secure said first sub processor and said second sub processor based on said first sub processor and said second sub processor each not executing nor being reserved for execution of a program for execution of a program.

9. The method of claim 7, which includes:
  (a) causing said second main processor to execute the second instructions to secure said third sub processor based on said third sub processor not executing nor being reserved for execution of a program; and
  (b) if a number of said sub processors of the second information processing apparatus which are not executing nor are reserved for execution of a program is smaller than a number of sub processors indicated by a second securing request from the first information processing apparatus, causing said second main processor to execute the second instructions to secure any of said sub processors of the second information processing apparatus which are executing or are reserved for execution of a program having a program priority lower than that of a certain program.

10. The method of claim 7, which includes causing said second main processor to execute the second instructions to preferentially select an information processing apparatus of a particular type as the first information processing apparatus to which the securing request for processors is to be issued.

11. A non-transitory computer readable storage medium storing instructions which cause an information processing apparatus to:
  (a) produce a management table which includes:
    (i) a first identifier for specifying a first sub processor configured to execute a first program having a first priority;
    (ii) a second identifier for specifying a second sub processor configured to execute a second program having a second priority; and
    (iii) use situation information representative of whether or not:
      (A) said first sub processor specified with the first identifier is executing or is reserved for execution of a program; and
      (B) said second sub processor specified with the second identifier is executing or is reserved for execution of a program;
  (b) in response to a securing request from a different information processing apparatus, said securing request indicating a first number of processors and a program priority:
    (i) determine a second number of processors, the second number of processors indication a quantity of said sub processors which are not executing nor are reserved for execution of a program;
    (ii) if said determined second number is less than said first number;
      (A) for the first sub processor, determine whether the first priority is lower than the program priority;
      (B) if the first priority is lower than the program priority, for the different information processing apparatus, secure said first sub processor;
      (C) for the second sub processor, determine whether the second priority is lower than the program priority; and
      (D) if the second priority is lower than the program priority, for the different information processing apparatus, secure said second sub processor; and
    (iii) rewrite said management table.

\* \* \* \* \*